(12) United States Patent
Buller et al.

(10) Patent No.: US 12,005,647 B2
(45) Date of Patent: Jun. 11, 2024

(54) MATERIAL MANIPULATION IN THREE-DIMENSIONAL PRINTING

(71) Applicant: Velo3D, Inc., Fremont, CA (US)

(72) Inventors: Benyamin Buller, Cupertino, CA (US); Thomas Blasius Brezoczky, Los Gatos, CA (US); Yacov Elgar, Sunnyvale, CA (US); James Frechman, San Jose, CA (US); Alan Rick Lappen, Rio Rancho, NM (US)

(73) Assignee: Velo3D, Inc., Fremont, CA (US)

( * ) Notice: Subject to any disclaimer, the term of this patent is extended or adjusted under 35 U.S.C. 154(b) by 0 days.

(21) Appl. No.: 17/695,092

(22) Filed: Mar. 15, 2022

(65) Prior Publication Data
US 2022/0339822 A1 Oct. 27, 2022

Related U.S. Application Data

(63) Continuation of application No. 17/540,740, filed on Dec. 2, 2021, now abandoned, which is a continuation
(Continued)

(51) Int. Cl.
*B29C 64/357* (2017.01)
*B01D 46/00* (2022.01)
(Continued)

(52) U.S. Cl.
CPC .......... *B29C 64/35* (2017.08); *B01D 46/0002* (2013.01); *B04C 9/00* (2013.01);
(Continued)

(58) Field of Classification Search
CPC .................................................. B29C 64/357
See application file for complete search history.

(56) References Cited

U.S. PATENT DOCUMENTS

| 430,047 A | 6/1890 | Tylee |
| 1,003,518 A | 9/1911 | Schiller |

(Continued)

FOREIGN PATENT DOCUMENTS

| CN | 1057034 C | 10/2000 |
| CN | 1476362 | 2/2004 |

(Continued)

OTHER PUBLICATIONS

US 10,507,527 B2, 12/2019, Romano (withdrawn)
(Continued)

*Primary Examiner* — Timothy Kennedy
(74) *Attorney, Agent, or Firm* — MacMillan, Sobanski & Todd, LLC

(57) ABSTRACT

The present disclosure provides three-dimensional (3D) printing systems, apparatuses, software, and methods for the production of at least one requested 3D object. The 3D printer includes a material conveyance system, filtering system, and unpacking station. The material conveyance system may transport pre-transformed material against gravity. The 3D printing described herein comprises facilitating non-interrupted material dispensing through a component of the 3D printer, such as a layer dispenser.

25 Claims, 22 Drawing Sheets

Related U.S. Application Data of application No. 17/406,744, filed on Aug. 19, 2021, now abandoned, which is a continuation of application No. 17/316,964, filed on May 11, 2021, now abandoned, which is a continuation of application No. 17/140,819, filed on Jan. 4, 2021, now abandoned, which is a continuation of application No. 17/023,214, filed on Sep. 16, 2020, now abandoned, which is a continuation of application No. 16/895,334, filed on Jun. 8, 2020, now abandoned, which is a continuation of application No. 16/784,175, filed on Feb. 6, 2020, now abandoned, which is a continuation of application No. 16/657,980, filed on Oct. 18, 2019, now abandoned, which is a continuation of application No. 15/937,798, filed on Mar. 27, 2018, now Pat. No. 10,449,696.

(60) Provisional application No. 62/477,848, filed on Mar. 28, 2017.

(51) Int. Cl.

| | | |
|---|---|---|
| *B04C 9/00* | (2006.01) | |
| *B22F 10/73* | (2021.01) | |
| *B22F 12/30* | (2021.01) | |
| *B22F 12/70* | (2021.01) | |
| *B22F 12/90* | (2021.01) | |
| *B28B 1/00* | (2006.01) | |
| *B28B 13/02* | (2006.01) | |
| *B29C 31/08* | (2006.01) | |
| *B29C 64/135* | (2017.01) | |
| *B29C 64/153* | (2017.01) | |
| *B29C 64/176* | (2017.01) | |
| *B29C 64/188* | (2017.01) | |
| *B29C 64/245* | (2017.01) | |
| *B29C 64/25* | (2017.01) | |
| *B29C 64/255* | (2017.01) | |
| *B29C 64/307* | (2017.01) | |
| *B29C 64/321* | (2017.01) | |
| *B29C 64/35* | (2017.01) | |
| *B29C 64/364* | (2017.01) | |
| *B29C 64/371* | (2017.01) | |
| *B29C 64/393* | (2017.01) | |
| *B33Y 10/00* | (2015.01) | |
| *B33Y 30/00* | (2015.01) | |
| *B33Y 40/00* | (2020.01) | |
| *B33Y 40/20* | (2020.01) | |
| *B01D 45/16* | (2006.01) | |
| *B01D 46/10* | (2006.01) | |
| *B01D 50/20* | (2022.01) | |
| *B22F 3/00* | (2021.01) | |
| *B22F 10/28* | (2021.01) | |
| *B22F 10/366* | (2021.01) | |
| *B22F 12/41* | (2021.01) | |
| *B22F 12/43* | (2021.01) | |
| *B22F 12/53* | (2021.01) | |
| *B33Y 40/10* | (2020.01) | |
| *B33Y 50/02* | (2015.01) | |

(52) U.S. Cl.
CPC ............ *B22F 10/73* (2021.01); *B22F 12/30* (2021.01); *B22F 12/70* (2021.01); *B22F 12/90* (2021.01); *B28B 1/001* (2013.01); *B28B 13/02* (2013.01); *B29C 31/085* (2013.01); *B29C 64/135* (2017.08); *B29C 64/153* (2017.08); *B29C 64/176* (2017.08); *B29C 64/188* (2017.08); *B29C 64/245* (2017.08); *B29C 64/25* (2017.08); *B29C 64/255* (2017.08); *B29C 64/307* (2017.08); *B29C 64/321* (2017.08); *B29C 64/357* (2017.08); *B29C 64/364* (2017.08); *B29C 64/371* (2017.08); *B29C 64/393* (2017.08); *B33Y 10/00* (2014.12); *B33Y 30/00* (2014.12); *B33Y 40/00* (2014.12); *B33Y 40/20* (2020.01); *B01D 45/16* (2013.01); *B01D 46/0053* (2013.01); *B01D 46/10* (2013.01); *B01D 50/20* (2022.01); *B04C 2009/002* (2013.01); *B22F 3/005* (2013.01); *B22F 10/28* (2021.01); *B22F 10/366* (2021.01); *B22F 12/41* (2021.01); *B22F 12/43* (2021.01); *B22F 12/53* (2021.01); *B22F 2201/00* (2013.01); *B22F 2999/00* (2013.01); *B33Y 40/10* (2020.01); *B33Y 50/02* (2014.12); *Y02P 10/25* (2015.11)

(56) References Cited

U.S. PATENT DOCUMENTS

| | | |
|---|---|---|
| 1,003,530 A | 9/1911 | Smith |
| 1,011,223 A | 12/1911 | Messick |
| 1,025,233 A | 5/1912 | Austin |
| 1,025,904 A | 5/1912 | Earhart |
| 1,028,645 A | 6/1912 | Weaver |
| 1,028,660 A | 6/1912 | Barber |
| D229,000 S | 11/1973 | O'Neil |
| 3,790,787 A | 2/1974 | Geller |
| 3,849,003 A | 11/1974 | Velzel |
| 3,864,809 A | 2/1975 | Donachie |
| 4,019,066 A | 4/1977 | Lucas |
| 4,177,087 A | 12/1979 | Hills |
| 4,300,474 A | 11/1981 | Livsey |
| 4,323,756 A | 4/1982 | Brown |
| 4,359,622 A | 11/1982 | Dostoomian |
| 4,701,592 A | 10/1987 | Cheung |
| D296,286 S | 6/1988 | Fees |
| 4,823,158 A | 4/1989 | Casey |
| 4,845,356 A | 7/1989 | Baker |
| 4,863,538 A | 9/1989 | Deckard |
| 4,927,582 A | 5/1990 | Bryson |
| 4,938,816 A | 7/1990 | Beaman |
| 4,961,154 A | 10/1990 | Pomerantz |
| 4,962,988 A | 10/1990 | Swann |
| 5,088,047 A | 2/1992 | Bynum |
| 5,106,010 A | 4/1992 | Stueber |
| 5,127,037 A | 6/1992 | Bynum |
| 5,155,321 A | 10/1992 | Grube |
| 5,156,697 A | 10/1992 | Bourell |
| 5,162,660 A | 11/1992 | Popil |
| 5,202,837 A | 4/1993 | Coe |
| 5,203,944 A | 4/1993 | Prinz |
| 5,204,055 A | 4/1993 | Sachs |
| 5,208,431 A | 5/1993 | Uchiyama |
| 5,223,781 A | 6/1993 | Criswell |
| 5,252,264 A | 10/1993 | Forderhase |
| 5,255,057 A | 10/1993 | Stelter |
| 5,286,573 A | 2/1994 | Prinz |
| 5,296,062 A | 3/1994 | Bourell |
| 5,303,141 A | 4/1994 | Batchelder |
| 5,325,516 A | 6/1994 | Blomgren |
| 5,342,919 A | 8/1994 | Dickens, Jr. |
| 5,352,405 A | 10/1994 | Beaman |
| 5,354,414 A | 10/1994 | Feygin |
| 5,386,427 A | 1/1995 | Zayhowski |
| 5,387,380 A | 2/1995 | Cima |
| 5,393,482 A | 2/1995 | Benda |
| 5,396,333 A | 3/1995 | Aleshin |
| 5,424,834 A | 6/1995 | Akedo |
| 5,430,666 A | 7/1995 | Deangelis |
| 5,460,758 A | 10/1995 | Langer |
| 5,508,489 A | 4/1996 | Benda |
| 5,527,019 A | 6/1996 | Schwarz |
| 5,527,877 A | 6/1996 | Dickens, Jr. |

(56) References Cited

U.S. PATENT DOCUMENTS

| | | |
|---|---|---|
| 5,530,221 A | 6/1996 | Benda |
| 5,534,104 A | 7/1996 | Langer |
| 5,536,467 A | 7/1996 | Reichle |
| 5,554,837 A | 9/1996 | Goodwater |
| 5,582,876 A | 12/1996 | Langer |
| 5,593,531 A | 1/1997 | Penn |
| 5,594,652 A | 1/1997 | Penn |
| 5,601,737 A | 2/1997 | Asahi |
| 5,615,013 A | 3/1997 | Rueb |
| 5,640,667 A | 6/1997 | Freitag |
| 5,647,931 A | 7/1997 | Retallick |
| 5,648,450 A | 7/1997 | Dickens, Jr. |
| 5,658,412 A | 8/1997 | Retallick |
| 5,665,401 A | 9/1997 | Serbin |
| 5,730,925 A | 3/1998 | Mattes |
| 5,733,497 A | 3/1998 | McAlea |
| 5,745,834 A | 4/1998 | Bampton |
| 5,749,041 A | 5/1998 | Lakshminarayan |
| 5,753,171 A | 5/1998 | Serbin |
| 5,753,274 A | 5/1998 | Wilkening |
| 5,764,874 A | 6/1998 | White |
| 5,786,562 A | 7/1998 | Larson |
| 5,800,579 A | 9/1998 | Billingsley |
| 5,818,718 A | 10/1998 | Thomas |
| 5,821,475 A | 10/1998 | Morehead |
| 5,824,259 A | 10/1998 | Allanic |
| 5,832,415 A | 11/1998 | Wilkening |
| 5,859,786 A | 1/1999 | Klein |
| 5,876,550 A | 3/1999 | Feygin |
| 5,876,767 A | 3/1999 | Mattes |
| 5,904,890 A | 5/1999 | Lohner |
| 5,908,569 A | 6/1999 | Wilkening |
| 5,932,059 A | 8/1999 | Langer |
| 5,951,864 A | 9/1999 | Hazrati |
| 6,024,792 A | 2/2000 | Kurz |
| 6,042,774 A | 3/2000 | Wilkening |
| 6,066,285 A | 5/2000 | Kumar |
| 6,085,122 A | 7/2000 | Manning |
| 6,106,659 A | 8/2000 | Spence |
| 6,126,276 A | 10/2000 | Davis |
| 6,136,257 A | 10/2000 | Graf |
| 6,138,892 A | 10/2000 | Kim |
| 6,143,378 A | 11/2000 | Harwell |
| 6,151,345 A | 11/2000 | Gray |
| 6,169,605 B1 | 1/2001 | Penn |
| 6,175,422 B1 | 1/2001 | Penn |
| 6,206,672 B1 | 3/2001 | Grenda |
| 6,207,097 B1 | 3/2001 | Iverson |
| 6,215,093 B1 | 4/2001 | Meiners |
| 6,251,488 B1 | 6/2001 | Miller |
| 6,261,077 B1 | 7/2001 | Bishop |
| 6,268,584 B1 | 7/2001 | Keicher |
| 6,336,480 B2 | 1/2002 | Gaylo |
| 6,337,459 B1 | 1/2002 | Terwijn |
| 6,341,042 B1 | 1/2002 | Matsunaka |
| 6,376,148 B1 | 4/2002 | Liu |
| 6,391,251 B1 | 5/2002 | Keicher |
| 6,401,001 B1 | 6/2002 | Jang |
| 6,483,596 B1 | 11/2002 | Philippi |
| 6,492,651 B2 | 12/2002 | Kerekes |
| 6,531,036 B1 | 3/2003 | Leitgeb |
| 6,531,086 B1 | 3/2003 | Larsson |
| 6,554,600 B1 | 4/2003 | Hofmann |
| 6,583,379 B1 | 6/2003 | Meiners |
| 6,621,039 B2 | 9/2003 | Wang |
| 6,636,676 B1 | 10/2003 | Renn |
| 6,656,409 B1 | 12/2003 | Keicher |
| 6,656,410 B2 | 12/2003 | Hull |
| 6,672,343 B1 | 1/2004 | Perret |
| 6,682,688 B1 | 1/2004 | Higashi |
| 6,688,886 B2 | 2/2004 | Hughes |
| 6,722,872 B1 | 4/2004 | Swanson |
| 6,767,499 B1 | 7/2004 | Hory |
| 6,811,744 B2 | 11/2004 | Keicher |
| 6,814,823 B1 | 11/2004 | White |
| 6,815,636 B2 | 11/2004 | Chung |
| 6,823,124 B1 | 11/2004 | Renn |
| 6,824,714 B1 | 11/2004 | Harald |
| 6,861,613 B1 | 3/2005 | Meiners |
| 6,905,645 B2 | 6/2005 | Iskra |
| 6,930,278 B1 | 8/2005 | Chung |
| 6,932,935 B1 | 8/2005 | Oberhofer |
| 6,945,638 B2 | 9/2005 | Teung |
| 6,949,216 B2 | 9/2005 | Brice |
| 6,955,023 B2 | 10/2005 | Rotheroe |
| 6,963,338 B1 | 11/2005 | Bachelder |
| 6,986,654 B2 | 1/2006 | Imiolek |
| 6,989,115 B2 | 1/2006 | Russell |
| 6,994,894 B2 | 2/2006 | Hofmeister |
| 6,998,568 B2 | 2/2006 | Brehm |
| 7,002,754 B2 | 2/2006 | Baer |
| 7,008,209 B2 | 3/2006 | Iskra |
| 7,027,887 B2 | 4/2006 | Gaylo |
| 7,045,015 B2 | 5/2006 | Renn |
| 7,047,098 B2 | 5/2006 | Lindemann |
| 7,073,442 B2 | 7/2006 | Fedor |
| 7,084,370 B2 | 8/2006 | Hagemeister |
| 7,107,118 B2 | 9/2006 | Orozco |
| 7,108,894 B2 | 9/2006 | Renn |
| 7,149,596 B2 | 12/2006 | Berger |
| 7,153,463 B2 | 12/2006 | Leuterer |
| 7,229,272 B2 | 6/2007 | Martin |
| 7,241,415 B2 | 7/2007 | Khoshnevis |
| 7,261,542 B2 | 8/2007 | Hickerson |
| 7,261,550 B2 | 8/2007 | Herzog |
| 7,270,844 B2 | 9/2007 | Renn |
| 7,294,366 B2 | 11/2007 | Renn |
| 7,296,599 B2 | 11/2007 | Cox |
| 7,326,377 B2 | 2/2008 | Adams |
| 7,357,629 B2 | 4/2008 | Weiskopf |
| 7,419,632 B2 | 9/2008 | Keller |
| 7,435,368 B2 | 10/2008 | Davidson |
| 7,452,500 B2 | 11/2008 | Uckelmann |
| 7,454,262 B2 | 11/2008 | Larsson |
| 7,485,345 B2 | 2/2009 | Renn |
| 7,515,986 B2 | 4/2009 | Huskamp |
| 7,521,652 B2 | 4/2009 | Mark |
| 7,537,722 B2 | 5/2009 | Andersson |
| 7,540,738 B2 | 6/2009 | Larsson |
| 7,604,768 B2 | 10/2009 | Kritchman |
| 7,615,179 B2 | 11/2009 | Dumond |
| 7,628,600 B2 | 12/2009 | Perret |
| 7,635,825 B2 | 12/2009 | Larsson |
| 7,639,267 B1 | 12/2009 | Desimone |
| 7,658,163 B2 | 2/2010 | Renn |
| 7,661,948 B2 | 2/2010 | Perret |
| 7,665,979 B2 | 2/2010 | Heugel |
| 7,674,107 B2 | 3/2010 | Perret |
| 7,674,671 B2 | 3/2010 | Renn |
| 7,686,605 B2 | 3/2010 | Perret |
| 7,704,432 B2 | 4/2010 | Dumond |
| 7,704,565 B2 | 4/2010 | Slaughter |
| 7,713,048 B2 | 5/2010 | Perret |
| 7,713,454 B2 | 5/2010 | Larsson |
| 7,740,683 B2 | 6/2010 | Thorsson |
| 7,741,578 B2 | 6/2010 | Adams |
| 7,789,037 B2 | 9/2010 | Teulet |
| 7,799,253 B2 | 9/2010 | Hoechsmann |
| 7,814,441 B2 | 10/2010 | Bae |
| 7,820,241 B2 | 10/2010 | Perret |
| 7,833,465 B2 | 11/2010 | Larsson |
| 7,837,458 B2 | 11/2010 | Perret |
| 7,847,212 B2 | 12/2010 | Renz |
| 7,850,885 B2 | 12/2010 | Philippi |
| 7,863,544 B2 | 1/2011 | Serruys |
| 7,871,551 B2 | 1/2011 | Wallgren |
| 7,879,394 B1 | 2/2011 | Keicher |
| 7,891,095 B2 | 2/2011 | Jonsson |
| 7,901,604 B2 | 3/2011 | Oberhofer |
| 7,931,462 B2 | 4/2011 | Mattes |
| 7,936,352 B2 | 5/2011 | Baran |
| 7,938,079 B2 | 5/2011 | King |
| 7,938,341 B2 | 5/2011 | King |
| 7,946,840 B2 | 5/2011 | Perret |

(56) References Cited

U.S. PATENT DOCUMENTS

| | | |
|---|---|---|
| 7,976,302 B2 | 7/2011 | Halder |
| 7,987,813 B2 | 8/2011 | Renn |
| 7,991,465 B2 | 8/2011 | Bartic |
| 8,025,831 B2 | 9/2011 | Kong |
| 8,031,384 B2 | 10/2011 | Perret |
| 8,034,279 B2 | 10/2011 | Dimter |
| 8,048,359 B2 | 11/2011 | Wang |
| 8,073,315 B2 | 12/2011 | Philippi |
| 8,075,814 B2 | 12/2011 | Fruth |
| 8,083,513 B2 | 12/2011 | Montero-Escuder |
| 8,110,247 B2 | 2/2012 | Renn |
| 8,124,192 B2 | 2/2012 | Paasche |
| 8,132,744 B2 | 3/2012 | King |
| 8,137,739 B2 | 3/2012 | Philippi |
| 8,172,562 B2 | 5/2012 | Mattes |
| 8,186,414 B2 | 5/2012 | Furlong |
| 8,186,990 B2 | 5/2012 | Perret |
| 8,187,521 B2 | 5/2012 | Larsson |
| 8,187,522 B2 | 5/2012 | Higashi |
| 8,249,480 B2 | 8/2012 | Aslam |
| 8,260,447 B2 | 9/2012 | Mattes |
| 8,272,579 B2 | 9/2012 | King |
| 8,299,208 B2 | 10/2012 | Mueller |
| 8,303,886 B2 | 11/2012 | Philippi |
| 8,308,466 B2 | 11/2012 | Ackelid |
| 8,313,087 B2 | 11/2012 | Hesse |
| 8,317,508 B2 | 11/2012 | Bokodi |
| 8,366,432 B2 | 2/2013 | Perret |
| 8,414,281 B2 | 4/2013 | Schleiss |
| 8,455,051 B2 | 6/2013 | Renn |
| 8,488,994 B2 | 7/2013 | Hanson |
| 8,501,075 B2 | 8/2013 | Philippi |
| 8,502,107 B2 | 8/2013 | Uckelmann |
| 8,524,142 B2 | 9/2013 | Uckelmann |
| 8,525,071 B2 | 9/2013 | Leuterer |
| 8,543,361 B2 | 9/2013 | Chen |
| 8,556,981 B2 | 10/2013 | Jones |
| 8,570,534 B1 | 10/2013 | Loewgren |
| 8,590,157 B2 | 11/2013 | Kruth |
| 8,640,975 B2 | 2/2014 | King |
| 8,658,078 B2 | 2/2014 | Weidinger |
| 8,663,539 B1 | 3/2014 | Kolodziejska |
| 8,705,144 B2 | 4/2014 | Gullentops |
| 8,710,144 B2 | 4/2014 | Hesse |
| 8,728,387 B2 | 5/2014 | Jones |
| 8,734,694 B2 | 5/2014 | Perret |
| 8,753,105 B2 | 6/2014 | Scott |
| 8,784,720 B2 | 7/2014 | Oberhofer |
| 8,784,721 B2 | 7/2014 | Philippi |
| 8,794,263 B2 | 8/2014 | Scott |
| 8,796,146 B2 | 8/2014 | Renn |
| 8,803,073 B2 | 8/2014 | Philippi |
| 8,845,319 B2 | 9/2014 | Oberhofer |
| 8,884,186 B2 | 11/2014 | Uckelmann |
| 8,887,658 B2 | 11/2014 | Essien |
| 8,895,893 B2 | 11/2014 | Perret |
| 8,906,216 B2 | 12/2014 | Detor |
| 8,915,620 B2 | 12/2014 | Vaes |
| 8,945,456 B2 | 2/2015 | Zenere |
| 8,967,990 B2 | 3/2015 | Weidinger |
| 8,968,625 B2 | 3/2015 | Tan |
| 8,994,592 B2 | 3/2015 | Scott |
| 9,011,982 B2 | 4/2015 | Muller |
| 9,037,068 B2 | 5/2015 | Kojima |
| 9,064,671 B2 | 6/2015 | Ljungblad |
| 9,073,265 B2 | 7/2015 | Snis |
| 9,079,248 B2 | 7/2015 | Ackelid |
| 9,114,478 B2 | 8/2015 | Scott |
| 9,114,652 B1 | 8/2015 | Wayman |
| 9,117,039 B1 | 8/2015 | Mosterman |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King |
| 9,205,691 B1 | 12/2015 | Jones |
| 9,221,100 B2 | 12/2015 | Schwarze |
| 9,233,507 B2 | 1/2016 | Bibas |
| 9,254,535 B2 | 2/2016 | Buller |
| 9,272,369 B2 | 3/2016 | Bruck |
| 9,308,583 B2 | 4/2016 | El-Dasher |
| 9,314,972 B2 | 4/2016 | Green |
| 9,327,450 B2 | 5/2016 | Hein |
| 9,327,451 B2 | 5/2016 | Teulet |
| 9,346,127 B2 | 5/2016 | Buller |
| 9,366,422 B2 | 6/2016 | McClure |
| 9,380,304 B1 | 6/2016 | Chang |
| 9,399,256 B2 | 7/2016 | Buller |
| 9,403,235 B2 | 8/2016 | Buller |
| 9,415,443 B2 | 8/2016 | Ljungblad |
| 9,486,878 B2 | 11/2016 | Buller |
| 9,498,921 B2 | 11/2016 | Teulet |
| 9,505,057 B2 | 11/2016 | Nordkvist |
| D774,326 S | 12/2016 | Chang |
| 9,522,426 B2 | 12/2016 | Das |
| 9,527,246 B2 | 12/2016 | Wiesner |
| 9,533,452 B2 | 1/2017 | Guenster |
| 9,550,207 B2 | 1/2017 | Ackelid |
| 9,573,193 B2 | 2/2017 | Buller |
| 9,573,225 B2 | 2/2017 | Buller |
| 9,586,290 B2 | 3/2017 | Buller |
| 9,592,554 B2 | 3/2017 | Abe |
| 9,662,840 B1 | 5/2017 | Buller |
| 9,676,145 B2 | 6/2017 | Buller |
| 9,700,908 B2 | 7/2017 | Baker |
| 9,757,760 B2 | 9/2017 | Halder |
| 9,821,411 B2 | 11/2017 | Buller |
| 9,827,717 B2 | 11/2017 | Huang |
| 9,835,568 B2 | 12/2017 | Woods |
| 9,886,526 B2 | 2/2018 | Huang |
| 9,919,360 B2 | 3/2018 | Buller |
| 9,919,476 B2 | 3/2018 | Paternoster |
| 9,931,697 B2 | 4/2018 | Levin |
| 9,962,767 B2 | 5/2018 | Buller |
| 10,022,915 B2 | 7/2018 | Bostick |
| 10,035,188 B2 | 7/2018 | Weilhammer |
| 10,035,304 B2 | 7/2018 | Reinarz |
| 10,058,920 B2 | 8/2018 | Buller |
| 10,065,270 B2 | 9/2018 | Buller |
| 10,071,422 B2 | 9/2018 | Buller |
| 10,093,123 B2 | 10/2018 | Schwarze |
| 10,112,236 B2 | 10/2018 | Schlick |
| 10,144,062 B2 | 12/2018 | Bayer |
| 10,144,176 B1 | 12/2018 | Buller |
| 10,183,330 B2 | 1/2019 | Buller |
| 10,195,693 B2 | 2/2019 | Buller |
| 10,207,454 B2 | 2/2019 | Buller |
| 10,252,335 B2 | 4/2019 | Buller |
| 10,252,336 B2 | 4/2019 | Buller |
| 10,259,044 B2 | 4/2019 | Buller |
| 10,272,525 B1 | 4/2019 | Buller |
| 10,286,452 B2 | 5/2019 | Buller |
| 10,286,603 B2 | 5/2019 | Buller |
| 10,315,252 B2 | 6/2019 | Symeonidis |
| 10,357,829 B2 | 7/2019 | Spink |
| 10,357,957 B2 | 7/2019 | Buller |
| 10,369,629 B2 | 8/2019 | Symeonidis |
| 10,434,573 B2 | 10/2019 | Buller |
| 10,442,003 B2 | 10/2019 | Symeonidis |
| 10,449,696 B2 | 10/2019 | Elgar |
| 10,493,564 B2 | 12/2019 | Buller |
| 10,507,549 B2 | 12/2019 | Buller |
| 10,583,482 B2 | 3/2020 | Heugel |
| 10,611,092 B2 | 4/2020 | Buller |
| 10,625,374 B2 | 4/2020 | Schwarze |
| 10,688,722 B2 | 6/2020 | Buller |
| 10,888,925 B2 | 1/2021 | Symeonidis |
| D911,065 S | 2/2021 | Borodchuk |
| 11,186,034 B2 | 11/2021 | Vial |
| 2001/0014403 A1 | 8/2001 | Brown |
| 2001/0017085 A1 | 8/2001 | Kubo |
| 2001/0050448 A1 | 12/2001 | Kubo |
| 2002/0017509 A1 | 2/2002 | Ishide |
| 2002/0020945 A1 | 2/2002 | Cho |
| 2002/0041818 A1 | 4/2002 | Abe |

(56) References Cited

U.S. PATENT DOCUMENTS

| | | |
|---|---|---|
| 2002/0079601 A1 | 6/2002 | Russell |
| 2002/0090410 A1 | 7/2002 | Tochimoto |
| 2002/0104973 A1 | 8/2002 | Kerekes |
| 2002/0129485 A1 | 9/2002 | Mok |
| 2002/0145213 A1 | 10/2002 | Liu |
| 2002/0152002 A1 | 10/2002 | Lindemann |
| 2002/0158054 A1 | 10/2002 | Manetsberger |
| 2002/0166896 A1 | 11/2002 | Mazumder |
| 2002/0195747 A1 | 12/2002 | Hull |
| 2003/0106378 A1 | 6/2003 | Giannakopoulos |
| 2003/0201255 A1 | 10/2003 | Manetsberger |
| 2003/0206820 A1 | 11/2003 | Keicher |
| 2003/0222066 A1 | 12/2003 | Low |
| 2003/0232512 A1 | 12/2003 | Dickinson |
| 2004/0003738 A1 | 1/2004 | Imiolek |
| 2004/0003741 A1 | 1/2004 | Iskra |
| 2004/0004303 A1 | 1/2004 | Iskra |
| 2004/0004653 A1 | 1/2004 | Pryor |
| 2004/0005182 A1 | 1/2004 | Gaylo |
| 2004/0026807 A1 | 2/2004 | Andersson |
| 2004/0045941 A1 | 3/2004 | Herzog |
| 2004/0056022 A1 | 3/2004 | Meiners |
| 2004/0061260 A1 | 4/2004 | Martin |
| 2004/0084814 A1 | 5/2004 | Boyd |
| 2004/0094728 A1 | 5/2004 | Herzog |
| 2004/0099996 A1 | 5/2004 | Herzog |
| 2004/0118309 A1 | 6/2004 | Fedor |
| 2004/0121257 A1 | 6/2004 | Kaminsky |
| 2004/0173946 A1 | 9/2004 | Pfeifer |
| 2004/0179808 A1 | 9/2004 | Renn |
| 2004/0197493 A1 | 10/2004 | Renn |
| 2004/0200816 A1 | 10/2004 | Chung |
| 2004/0204785 A1 | 10/2004 | Richardson |
| 2004/0217095 A1 | 11/2004 | Herzog |
| 2004/0222549 A1 | 11/2004 | Sano |
| 2004/0228004 A1 | 11/2004 | Sercel |
| 2004/0262261 A1 | 12/2004 | Fink |
| 2005/0011631 A1 | 1/2005 | Hong |
| 2005/0035285 A1 | 2/2005 | Tan |
| 2005/0116391 A1 | 6/2005 | Lindemann |
| 2005/0126476 A1* | 6/2005 | Shutic .................. B05B 5/1683 118/308 |
| 2005/0133527 A1 | 6/2005 | Dullea |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |
| 2005/0207901 A1 | 9/2005 | Klobucar |
| 2005/0258570 A1 | 11/2005 | Kong |
| 2005/0278933 A1 | 12/2005 | Macke, Jr. |
| 2005/0287031 A1 | 12/2005 | Macke, Jr. |
| 2006/0000814 A1 | 1/2006 | Gu |
| 2006/0003095 A1 | 1/2006 | Bullen |
| 2006/0019232 A1 | 1/2006 | Fischer |
| 2006/0054079 A1 | 3/2006 | Withey |
| 2006/0111807 A1 | 5/2006 | Gothait |
| 2006/0118532 A1 | 6/2006 | Chung |
| 2006/0156978 A1 | 7/2006 | Lipson |
| 2006/0180300 A1 | 8/2006 | Lenehan |
| 2006/0181700 A1 | 8/2006 | Andrews |
| 2006/0187326 A1 | 8/2006 | Spencer |
| 2006/0192322 A1 | 8/2006 | Abe |
| 2006/0208396 A1 | 9/2006 | Abe |
| 2006/0211158 A1 | 9/2006 | Arai |
| 2006/0214335 A1 | 9/2006 | Cox |
| 2006/0228248 A1 | 10/2006 | Larsson |
| 2006/0228897 A1 | 10/2006 | Timans |
| 2006/0249485 A1 | 11/2006 | Partanen |
| 2006/0280866 A1 | 12/2006 | Marquez |
| 2007/0001342 A1 | 1/2007 | Oberhofer |
| 2007/0003656 A1 | 1/2007 | LaBossiere |
| 2007/0019028 A1 | 1/2007 | Renn |
| 2007/0023977 A1 | 2/2007 | Braun |
| 2007/0035069 A1 | 2/2007 | Wust |
| 2007/0040557 A1 | 2/2007 | Johnstad |
| 2007/0051704 A1 | 3/2007 | Husmann |
| 2007/0052836 A1 | 3/2007 | Yamada |
| 2007/0057412 A1 | 3/2007 | Weiskopf |
| 2007/0122562 A1 | 5/2007 | Adams |
| 2007/0142914 A1 | 6/2007 | Jones |
| 2007/0154634 A1 | 7/2007 | Renn |
| 2007/0175875 A1 | 8/2007 | Uckelmann |
| 2007/0176312 A1 | 8/2007 | Clark |
| 2007/0183918 A1 | 8/2007 | Monsheimer |
| 2007/0196561 A1 | 8/2007 | Philippi |
| 2007/0241482 A1 | 10/2007 | Giller |
| 2007/0290409 A1 | 12/2007 | Brice |
| 2008/0006334 A1 | 1/2008 | Davidson |
| 2008/0013299 A1 | 1/2008 | Renn |
| 2008/0014457 A1 | 1/2008 | Gennaro |
| 2008/0026338 A1 | 1/2008 | Cinader |
| 2008/0060330 A1 | 3/2008 | Davidson |
| 2008/0131540 A1 | 6/2008 | Perret |
| 2008/0138515 A1 | 6/2008 | Williams |
| 2008/0151951 A1 | 6/2008 | Elliott |
| 2008/0204748 A1 | 8/2008 | Nomaru |
| 2008/0206460 A1 | 8/2008 | Rhoades |
| 2008/0208268 A1 | 8/2008 | Bartic |
| 2008/0257867 A1 | 10/2008 | Malshe |
| 2009/0004380 A1 | 1/2009 | Hochsmann |
| 2009/0017220 A1 | 1/2009 | Muller |
| 2009/0025638 A1 | 1/2009 | Inoue |
| 2009/0035411 A1 | 2/2009 | Seibert |
| 2009/0039570 A1 | 2/2009 | Clark |
| 2009/0042050 A1 | 2/2009 | Matteazzi |
| 2009/0045553 A1 | 2/2009 | Weidinger |
| 2009/0047165 A1 | 2/2009 | Syvanen |
| 2009/0059235 A1 | 3/2009 | Qu |
| 2009/0061077 A1 | 3/2009 | King |
| 2009/0069301 A1 | 3/2009 | Milburn |
| 2009/0090298 A1 | 4/2009 | King |
| 2009/0114151 A1 | 5/2009 | Renn |
| 2009/0152771 A1 | 6/2009 | Philippi |
| 2009/0185178 A1 | 7/2009 | Miyoshi |
| 2009/0206065 A1 | 8/2009 | Kruth |
| 2009/0206522 A1 | 8/2009 | Hein |
| 2009/0257672 A1 | 10/2009 | Sullender |
| 2009/0314391 A1 | 12/2009 | Crump |
| 2010/0004454 A1 | 1/2010 | Fukuzumi |
| 2010/0006228 A1 | 1/2010 | Abe |
| 2010/0012630 A1 | 1/2010 | Leuterer |
| 2010/0044547 A1 | 2/2010 | Higashi |
| 2010/0125356 A1 | 5/2010 | Shkolnik |
| 2010/0138028 A1 | 6/2010 | Tasker |
| 2010/0140550 A1 | 6/2010 | Keller |
| 2010/0161102 A1 | 6/2010 | Mattes |
| 2010/0163405 A1 | 7/2010 | Ackelid |
| 2010/0173096 A1 | 7/2010 | Kritchman |
| 2010/0174392 A1 | 7/2010 | Fink |
| 2010/0215856 A1 | 8/2010 | Kritchman |
| 2010/0233012 A1 | 9/2010 | Higashi |
| 2010/0242843 A1 | 9/2010 | Peretti |
| 2010/0305743 A1 | 12/2010 | Larsson |
| 2010/0323050 A1 | 12/2010 | Kumagai |
| 2011/0029093 A1 | 2/2011 | Bojarski |
| 2011/0033887 A1 | 2/2011 | Fang |
| 2011/0035597 A1 | 2/2011 | Kevenaar |
| 2011/0042031 A1 | 2/2011 | Furlong |
| 2011/0046916 A1 | 2/2011 | Yu |
| 2011/0052927 A1 | 3/2011 | Martinoni |
| 2011/0061591 A1 | 3/2011 | Stecker |
| 2011/0106290 A1 | 5/2011 | Simone |
| 2011/0122381 A1 | 5/2011 | Hickerson |
| 2011/0123383 A1 | 5/2011 | Fuwa |
| 2011/0133367 A1 | 6/2011 | Weidinger |
| 2011/0135840 A1 | 6/2011 | Doye |
| 2011/0165339 A1 | 7/2011 | Skoglund |
| 2011/0165340 A1 | 7/2011 | Baumann |
| 2011/0168091 A1 | 7/2011 | Baumann |
| 2011/0187713 A1 | 8/2011 | Pershing |
| 2011/0190904 A1 | 8/2011 | Lechmann |
| 2011/0221100 A1 | 9/2011 | Wesselky |
| 2011/0223349 A1 | 9/2011 | Scott |
| 2011/0259862 A1 | 10/2011 | Scott |

(56) References Cited

U.S. PATENT DOCUMENTS

| | | |
|---|---|---|
| 2011/0278773 A1 | 11/2011 | Bokodi |
| 2011/0287185 A1 | 11/2011 | Felstead |
| 2011/0291331 A1 | 12/2011 | Scott |
| 2011/0293771 A1 | 12/2011 | Oberhofer |
| 2012/0000893 A1 | 1/2012 | Broude |
| 2012/0010741 A1 | 1/2012 | Hull |
| 2012/0013256 A1 | 1/2012 | McDermott |
| 2012/0013710 A1 | 1/2012 | Ehrlich |
| 2012/0052145 A1 | 3/2012 | Chen |
| 2012/0090734 A1 | 4/2012 | Heinlein |
| 2012/0100031 A1 | 4/2012 | Ljungblad |
| 2012/0106150 A1 | 5/2012 | Vaes |
| 2012/0107496 A1 | 5/2012 | Thoma |
| 2012/0119399 A1 | 5/2012 | Fruth |
| 2012/0126457 A1 | 5/2012 | Abe |
| 2012/0130525 A1 | 5/2012 | Tsai |
| 2012/0133928 A1 | 5/2012 | Urano |
| 2012/0134386 A1 | 5/2012 | Bender |
| 2012/0139166 A1 | 6/2012 | Abe |
| 2012/0139167 A1 | 6/2012 | Fruth |
| 2012/0145806 A1 | 6/2012 | Yang |
| 2012/0155606 A1 | 6/2012 | Simon |
| 2012/0164322 A1 | 6/2012 | Teulet |
| 2012/0186779 A1 | 7/2012 | Tan |
| 2012/0203365 A1 | 8/2012 | Hummeler |
| 2012/0211926 A1 | 8/2012 | Larsson |
| 2012/0213615 A1 | 8/2012 | Sakaue |
| 2012/0213659 A1 | 8/2012 | Bayer |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King |
| 2012/0234671 A1 | 9/2012 | Ackelid |
| 2012/0235548 A1 | 9/2012 | Cordes |
| 2012/0251378 A1 | 10/2012 | Abe |
| 2012/0267347 A1 | 10/2012 | Arjakine |
| 2012/0308781 A1 | 12/2012 | Abe |
| 2012/0318777 A1 | 12/2012 | Kwok |
| 2013/0016400 A1 | 1/2013 | Yamashita |
| 2013/0064706 A1 | 3/2013 | Schwarze |
| 2013/0080866 A1 | 3/2013 | Ogilvie |
| 2013/0089642 A1 | 4/2013 | Lipson |
| 2013/0093866 A1 | 4/2013 | Ohlhues |
| 2013/0101746 A1 | 4/2013 | Keremes |
| 2013/0108460 A1 | 5/2013 | Szwedowicz |
| 2013/0112366 A1 | 5/2013 | Mottin |
| 2013/0112672 A1 | 5/2013 | Keremes |
| 2013/0134637 A1 | 5/2013 | Wiesner |
| 2013/0162643 A1 | 6/2013 | Cardle |
| 2013/0168902 A1 | 7/2013 | Herzog |
| 2013/0171019 A1 | 7/2013 | Gessler |
| 2013/0180959 A1 | 7/2013 | Weston |
| 2013/0186558 A1 | 7/2013 | Comb |
| 2013/0206058 A1 | 8/2013 | Mauck |
| 2013/0218531 A1 | 8/2013 | Deichmann |
| 2013/0228302 A1 | 9/2013 | Rickenbacher |
| 2013/0256953 A1 | 10/2013 | Teulet |
| 2013/0270750 A1 | 10/2013 | Green |
| 2013/0272746 A1 | 10/2013 | Hanson |
| 2013/0277891 A1 | 10/2013 | Teulet |
| 2013/0280547 A1 | 10/2013 | Brandl |
| 2013/0287933 A1 | 10/2013 | Kaiser |
| 2013/0295212 A1 | 11/2013 | Chen |
| 2013/0300035 A1 | 11/2013 | Snis |
| 2013/0300286 A1 | 11/2013 | Ljungblad |
| 2013/0312928 A1 | 11/2013 | Mercelis |
| 2013/0329098 A1 | 12/2013 | Lim |
| 2013/0330470 A1 | 12/2013 | Gersch |
| 2013/0341313 A1 | 12/2013 | Himmelsbach |
| 2014/0000836 A1 | 1/2014 | Xu |
| 2014/0034626 A1 | 2/2014 | Illston |
| 2014/0035182 A1 | 2/2014 | Boyer |
| 2014/0049779 A1 | 2/2014 | Tin |
| 2014/0049964 A1 | 2/2014 | McClure |
| 2014/0065194 A1 | 3/2014 | Yoo |
| 2014/0086654 A1 | 3/2014 | Kojima |
| 2014/0086780 A1 | 3/2014 | Miller |
| 2014/0123458 A1 | 5/2014 | Fearon |
| 2014/0147328 A1 | 5/2014 | Abe |
| 2014/0150992 A1 | 6/2014 | Koontz |
| 2014/0154088 A1 | 6/2014 | Etter |
| 2014/0157579 A1 | 6/2014 | Chhabra |
| 2014/0163717 A1 | 6/2014 | Das |
| 2014/0176127 A1 | 6/2014 | Kogej |
| 2014/0197139 A1 | 7/2014 | Burbaum |
| 2014/0241615 A1 | 8/2014 | Shroff |
| 2014/0246809 A1 | 9/2014 | Hofmann |
| 2014/0251481 A1 | 9/2014 | Kroll |
| 2014/0252687 A1 | 9/2014 | El-Dasher |
| 2014/0265045 A1 | 9/2014 | Cullen |
| 2014/0271221 A1 | 9/2014 | Soucy |
| 2014/0271328 A1 | 9/2014 | Burris |
| 2014/0271965 A1 | 9/2014 | Ferrar |
| 2014/0287080 A1 | 9/2014 | Scott |
| 2014/0288890 A1 | 9/2014 | Khainson |
| 2014/0301883 A1 | 10/2014 | Wiesner |
| 2014/0302187 A1 | 10/2014 | Pawlikowski |
| 2014/0314609 A1 | 10/2014 | Ljungblad |
| 2014/0314964 A1 | 10/2014 | Ackelid |
| 2014/0329953 A1 | 11/2014 | Paternoster |
| 2014/0332507 A1 | 11/2014 | Fockele |
| 2014/0335313 A1 | 11/2014 | Chou |
| 2014/0348691 A1 | 11/2014 | Ljungblad |
| 2014/0348692 A1 | 11/2014 | Bessac |
| 2014/0348969 A1 | 11/2014 | Scott |
| 2014/0361464 A1 | 12/2014 | Holcomb |
| 2014/0363585 A1 | 12/2014 | Pialot |
| 2014/0370323 A1 | 12/2014 | Ackelid |
| 2014/0374935 A1 | 12/2014 | Flitsch |
| 2014/0377117 A1 | 12/2014 | Herrmann |
| 2015/0004046 A1 | 1/2015 | Graham |
| 2015/0014281 A1 | 1/2015 | Trimmer |
| 2015/0017013 A1 | 1/2015 | Tozzi |
| 2015/0021815 A1 | 1/2015 | Albrecht |
| 2015/0021832 A1 | 1/2015 | Yerazunis |
| 2015/0034606 A1 | 2/2015 | Blackmore |
| 2015/0035206 A1 | 2/2015 | Maggiore |
| 2015/0037599 A1 | 2/2015 | Blackmore |
| 2015/0048528 A1 | 2/2015 | Barton |
| 2015/0049082 A1 | 2/2015 | Coffey |
| 2015/0050463 A1 | 2/2015 | Nakano |
| 2015/0054191 A1 | 2/2015 | Ljungblad |
| 2015/0060042 A1 | 3/2015 | Shilpiekandula |
| 2015/0061170 A1 | 3/2015 | Engel |
| 2015/0061195 A1 | 3/2015 | Defelice |
| 2015/0064047 A1 | 3/2015 | Hyde |
| 2015/0064048 A1 | 3/2015 | Bessac |
| 2015/0071809 A1 | 3/2015 | Nordkvist |
| 2015/0076739 A1 | 3/2015 | Batchelder |
| 2015/0084240 A1 | 3/2015 | Shuck |
| 2015/0088295 A1 | 3/2015 | Hellestam |
| 2015/0090074 A1 | 4/2015 | Etter |
| 2015/0091200 A1 | 4/2015 | Mech |
| 2015/0093720 A1 | 4/2015 | Beeby |
| 2015/0097307 A1 | 4/2015 | Batchelder |
| 2015/0097308 A1 | 4/2015 | Batchelder |
| 2015/0108098 A1 | 4/2015 | Arjakine |
| 2015/0110910 A1 | 4/2015 | Hartmann |
| 2015/0115490 A1 | 4/2015 | Reinarz |
| 2015/0139849 A1 | 5/2015 | Pialot, Jr. |
| 2015/0142153 A1 | 5/2015 | Chun |
| 2015/0145169 A1 | 5/2015 | Liu |
| 2015/0145177 A1 | 5/2015 | El-Siblani |
| 2015/0158249 A1 | 6/2015 | Goto |
| 2015/0165525 A1 | 6/2015 | Jonasson |
| 2015/0165545 A1 | 6/2015 | Goehler |
| 2015/0165681 A1 | 6/2015 | Fish |
| 2015/0165683 A1 | 6/2015 | Cheverton |
| 2015/0165684 A1 | 6/2015 | Deane |
| 2015/0174658 A1 | 6/2015 | Ljungblad |
| 2015/0174822 A1 | 6/2015 | Huang |
| 2015/0177158 A1 | 6/2015 | Cheverton |
| 2015/0178286 A1 | 6/2015 | Dhollander |

(56) References Cited

U.S. PATENT DOCUMENTS

| | | |
|---|---|---|
| 2015/0185454 A1 | 7/2015 | Kalkbrenner |
| 2015/0197060 A1 | 7/2015 | Carr |
| 2015/0198052 A1 | 7/2015 | Pavlov |
| 2015/0210013 A1 | 7/2015 | Teulet |
| 2015/0246485 A1 | 9/2015 | Guenster |
| 2015/0251355 A1 | 9/2015 | Rehme |
| 2015/0258609 A1 | 9/2015 | Teulet |
| 2015/0268099 A1 | 9/2015 | Craig |
| 2015/0283610 A1 | 10/2015 | Ljungblad |
| 2015/0283611 A1 | 10/2015 | Takezawa |
| 2015/0283613 A1 | 10/2015 | Backlund |
| 2015/0283761 A1 | 10/2015 | Maeda |
| 2015/0290741 A1 | 10/2015 | Abe |
| 2015/0298211 A1 | 10/2015 | Abe |
| 2015/0298397 A1 | 10/2015 | Chen |
| 2015/0306667 A1 | 10/2015 | Yao |
| 2015/0306820 A1 | 10/2015 | Colin |
| 2015/0321422 A1 | 11/2015 | Boyer |
| 2015/0328839 A1 | 11/2015 | Willis |
| 2015/0331402 A1 | 11/2015 | Lin |
| 2015/0336330 A1 | 11/2015 | Herzog |
| 2015/0360418 A1 | 12/2015 | Shah |
| 2015/0367415 A1 | 12/2015 | Buller |
| 2015/0367416 A1 | 12/2015 | Buller |
| 2015/0367417 A1 | 12/2015 | Buller |
| 2015/0367418 A1 | 12/2015 | Buller |
| 2015/0367419 A1 | 12/2015 | Buller |
| 2015/0367446 A1 | 12/2015 | Buller |
| 2015/0367447 A1 | 12/2015 | Buller |
| 2015/0367448 A1 | 12/2015 | Buller |
| 2015/0367453 A1 | 12/2015 | Herzog |
| 2015/0367574 A1 | 12/2015 | Araie |
| 2015/0375456 A1 | 12/2015 | Cheverton |
| 2016/0001365 A1 | 1/2016 | Blanchet |
| 2016/0001401 A1 | 1/2016 | Dimter |
| 2016/0022336 A1 | 1/2016 | Bateman |
| 2016/0026337 A1 | 1/2016 | Wassvik |
| 2016/0026889 A1 | 1/2016 | Parkhomenko |
| 2016/0052057 A1 | 2/2016 | Xu |
| 2016/0052212 A1 | 2/2016 | Schmidt |
| 2016/0054115 A1 | 2/2016 | Snis |
| 2016/0054121 A1 | 2/2016 | Snis |
| 2016/0059310 A1 | 3/2016 | Junker |
| 2016/0059352 A1 | 3/2016 | Sparks |
| 2016/0067740 A1 | 3/2016 | Voris |
| 2016/0067778 A1 | 3/2016 | Liu |
| 2016/0067779 A1 | 3/2016 | Dautova |
| 2016/0082666 A1 | 3/2016 | De Pena |
| 2016/0082668 A1 | 3/2016 | Perret |
| 2016/0090848 A1 | 3/2016 | Engeli |
| 2016/0096318 A1 | 4/2016 | Bickel |
| 2016/0107263 A1 | 4/2016 | Koerber |
| 2016/0114431 A1 | 4/2016 | Cheverton |
| 2016/0114432 A1 | 4/2016 | Ferrar |
| 2016/0114531 A1 | 4/2016 | Chuang |
| 2016/0114535 A1 | 4/2016 | Kritchman |
| 2016/0121399 A1 | 5/2016 | Buller |
| 2016/0121548 A1 | 5/2016 | Nauka |
| 2016/0129502 A1 | 5/2016 | Varetti |
| 2016/0129631 A1 | 5/2016 | Chen |
| 2016/0136730 A1 | 5/2016 | McMurtry |
| 2016/0136896 A1 | 5/2016 | Wighton |
| 2016/0144574 A1 | 5/2016 | Eilken |
| 2016/0151833 A1 | 6/2016 | Tsao |
| 2016/0151860 A1 | 6/2016 | Engeli |
| 2016/0154906 A1 | 6/2016 | Schmidt |
| 2016/0159010 A1 | 6/2016 | Perez |
| 2016/0179064 A1 | 6/2016 | Arthur |
| 2016/0184891 A1 | 6/2016 | Mironets |
| 2016/0185048 A1 | 6/2016 | Dave |
| 2016/0187272 A1 | 6/2016 | Ishii |
| 2016/0193696 A1 | 7/2016 | McFarland |
| 2016/0193785 A1 | 7/2016 | Bell |
| 2016/0193790 A1 | 7/2016 | Shuck |
| 2016/0207109 A1 | 7/2016 | Buller |
| 2016/0214175 A1 | 7/2016 | Nordstrom |
| 2016/0221264 A1 | 8/2016 | Doherty |
| 2016/0228987 A1 | 8/2016 | Baudimont |
| 2016/0236279 A1 | 8/2016 | Ashton |
| 2016/0236414 A1 | 8/2016 | Reese |
| 2016/0236419 A1 | 8/2016 | Griffin |
| 2016/0241885 A1 | 8/2016 | Ström |
| 2016/0243721 A1 | 8/2016 | Tew |
| 2016/0246908 A1 | 8/2016 | Komzsik |
| 2016/0250717 A1 | 9/2016 | Kruger |
| 2016/0258045 A1 | 9/2016 | Carter, Jr. |
| 2016/0271698 A1 | 9/2016 | Schmidt |
| 2016/0271884 A1 | 9/2016 | Herzog |
| 2016/0271885 A1 | 9/2016 | Shi |
| 2016/0279706 A1 | 9/2016 | Domrose |
| 2016/0279707 A1 | 9/2016 | Mattes |
| 2016/0284123 A1 | 9/2016 | Hare |
| 2016/0288254 A1 | 10/2016 | Pettit |
| 2016/0297006 A1 | 10/2016 | Buller |
| 2016/0297007 A1 | 10/2016 | Buller |
| 2016/0299996 A1 | 10/2016 | Huang |
| 2016/0300356 A1 | 10/2016 | Kitamura |
| 2016/0303687 A1 | 10/2016 | Ljungblad |
| 2016/0311025 A1 | 10/2016 | Kaneko |
| 2016/0318129 A1 | 11/2016 | Hu |
| 2016/0320236 A1 | 11/2016 | Fortin |
| 2016/0320771 A1 | 11/2016 | Huang |
| 2016/0321384 A1 | 11/2016 | Pal |
| 2016/0326880 A1 | 11/2016 | Slavens |
| 2016/0332384 A1 | 11/2016 | De Pena |
| 2016/0339639 A1 | 11/2016 | Chivel |
| 2016/0361874 A1 | 12/2016 | Park |
| 2016/0368215 A1 | 12/2016 | Miyano |
| 2017/0001371 A1 | 1/2017 | Sobue |
| 2017/0001379 A1 | 1/2017 | Long |
| 2017/0008126 A1 | 1/2017 | Long |
| 2017/0008776 A1 | 1/2017 | Zemmouri |
| 2017/0014902 A1 | 1/2017 | Tanaka |
| 2017/0015066 A1 | 1/2017 | Herrmann |
| 2017/0021420 A1 | 1/2017 | Buller |
| 2017/0021455 A1 | 1/2017 | Dallarosa |
| 2017/0036404 A1 | 2/2017 | Rengers |
| 2017/0056975 A1 | 3/2017 | Carter |
| 2017/0066052 A1 | 3/2017 | Abe |
| 2017/0066084 A1 | 3/2017 | Ladewig |
| 2017/0087769 A1 | 3/2017 | Lancaster-Larocque |
| 2017/0090461 A1 | 3/2017 | Chong |
| 2017/0100885 A1 | 4/2017 | Desimone |
| 2017/0102689 A1 | 4/2017 | Khajepour |
| 2017/0106603 A1 | 4/2017 | Pobihun |
| 2017/0123222 A1 | 5/2017 | Demuth |
| 2017/0129052 A1 | 5/2017 | Buller |
| 2017/0129185 A1 | 5/2017 | Buller |
| 2017/0136574 A1 | 5/2017 | Zenzinger |
| 2017/0136703 A1 | 5/2017 | Hayes |
| 2017/0144248 A1 | 5/2017 | Yoshimura |
| 2017/0144254 A1 | 5/2017 | Buller |
| 2017/0144374 A1 | 5/2017 | Ono |
| 2017/0144874 A1 | 5/2017 | Huebinger |
| 2017/0145586 A1 | 5/2017 | Xiao |
| 2017/0157704 A1 | 6/2017 | Ladewig |
| 2017/0157845 A1 | 6/2017 | Bihari |
| 2017/0165751 A1 | 6/2017 | Buller |
| 2017/0165752 A1 | 6/2017 | Buller |
| 2017/0165753 A1 | 6/2017 | Buller |
| 2017/0165754 A1 | 6/2017 | Buller |
| 2017/0165792 A1 | 6/2017 | Buller |
| 2017/0173883 A1 | 6/2017 | Gray |
| 2017/0189963 A1 | 7/2017 | Buller |
| 2017/0216917 A1 | 8/2017 | Zhang |
| 2017/0217095 A1 | 8/2017 | Buller |
| 2017/0225198 A1 | 8/2017 | Nevarez |
| 2017/0227408 A1 | 8/2017 | Helvajian |
| 2017/0232515 A1 | 8/2017 | Demuth |
| 2017/0239719 A1 | 8/2017 | Buller |
| 2017/0239720 A1 | 8/2017 | Levin |
| 2017/0239721 A1 | 8/2017 | Buller |
| 2017/0239752 A1 | 8/2017 | Buller |
| 2017/0239891 A1 | 8/2017 | Buller |

(56) References Cited

U.S. PATENT DOCUMENTS

| | | |
|---|---|---|
| 2017/0239892 A1 | 8/2017 | Buller |
| 2017/0246810 A1 | 8/2017 | Gold |
| 2017/0252975 A1 | 9/2017 | Park |
| 2017/0259337 A1 | 9/2017 | Furukawa |
| 2017/0259502 A1 | 9/2017 | Chapiro |
| 2017/0259504 A1 | 9/2017 | Lin |
| 2017/0266878 A1 | 9/2017 | Furukawa |
| 2017/0266887 A1 | 9/2017 | Roviaro |
| 2017/0274589 A1 | 9/2017 | Wu |
| 2017/0282245 A1 | 10/2017 | Yasuda |
| 2017/0282294 A1 | 10/2017 | Uchida |
| 2017/0291372 A1 | 10/2017 | Milshtein |
| 2017/0297110 A1 | 10/2017 | Echigo |
| 2017/0304894 A1 | 10/2017 | Buller |
| 2017/0304944 A1 | 10/2017 | Symeonidis |
| 2017/0305140 A1 | 10/2017 | Wüst |
| 2017/0320265 A1 | 11/2017 | Baumann |
| 2017/0333994 A1 | 11/2017 | Schmitt |
| 2017/0334024 A1 | 11/2017 | Buller |
| 2017/0341143 A1 | 11/2017 | Abe |
| 2017/0341183 A1 | 11/2017 | Buller |
| 2017/0341299 A1 | 11/2017 | Kniola |
| 2017/0341307 A1 | 11/2017 | Xavier |
| 2017/0348771 A1 | 12/2017 | Kawada |
| 2017/0355146 A1 | 12/2017 | Buller |
| 2017/0355147 A1 | 12/2017 | Buller |
| 2017/0368753 A1 | 12/2017 | Yang |
| 2018/0001553 A1 | 1/2018 | Buller |
| 2018/0001556 A1 | 1/2018 | Buller |
| 2018/0001557 A1 | 1/2018 | Buller |
| 2018/0015670 A1 | 1/2018 | Gu |
| 2018/0021855 A1 | 1/2018 | De Lajudie |
| 2018/0029126 A1 | 2/2018 | Ng |
| 2018/0029298 A1 | 2/2018 | Takaya |
| 2018/0056391 A1 | 3/2018 | Buller |
| 2018/0056392 A1 | 3/2018 | Ichijo |
| 2018/0071986 A1 | 3/2018 | Buller |
| 2018/0093373 A1 | 4/2018 | Niederberger |
| 2018/0093416 A1 | 4/2018 | Prexler |
| 2018/0093418 A1 | 4/2018 | Lappas |
| 2018/0093419 A1 | 4/2018 | Lappas |
| 2018/0095450 A1 | 4/2018 | Lappas |
| 2018/0099454 A1 | 4/2018 | Hümmeler |
| 2018/0104892 A1 | 4/2018 | Herzog |
| 2018/0111193 A1 | 4/2018 | Romano |
| 2018/0111194 A1 | 4/2018 | Buller |
| 2018/0111195 A1 | 4/2018 | Romano |
| 2018/0111196 A1 | 4/2018 | Brezoczky |
| 2018/0111197 A1 | 4/2018 | Romano |
| 2018/0111198 A1 | 4/2018 | Vitanov |
| 2018/0111319 A1 | 4/2018 | Brezoczky |
| 2018/0111320 A1 | 4/2018 | Zhao |
| 2018/0117837 A1 | 5/2018 | Reese |
| 2018/0117845 A1 | 5/2018 | Buller |
| 2018/0126460 A1 | 5/2018 | Murphree |
| 2018/0126461 A1 | 5/2018 | Buller |
| 2018/0126462 A1 | 5/2018 | Murphree |
| 2018/0126629 A1 | 5/2018 | Staal |
| 2018/0126649 A1 | 5/2018 | Romano |
| 2018/0126650 A1 | 5/2018 | Murphree |
| 2018/0133635 A1 | 5/2018 | Hofmann |
| 2018/0133801 A1 | 5/2018 | Buller |
| 2018/0133956 A1 | 5/2018 | Buller |
| 2018/0133975 A1 | 5/2018 | Zhao |
| 2018/0141126 A1 | 5/2018 | Buller |
| 2018/0154442 A1 | 6/2018 | Milshtein |
| 2018/0154443 A1 | 6/2018 | Milshtein |
| 2018/0161875 A1 | 6/2018 | Buller |
| 2018/0178286 A1 | 6/2018 | Martin |
| 2018/0178292 A1 | 6/2018 | Berggren |
| 2018/0185893 A1 | 7/2018 | Joseph |
| 2018/0185915 A1 | 7/2018 | Beauchamp |
| 2018/0185961 A1 | 7/2018 | Meidani |
| 2018/0186067 A1 | 7/2018 | Buller |
| 2018/0186079 A1 | 7/2018 | Xavier |
| 2018/0186080 A1 | 7/2018 | Milshtein |
| 2018/0186081 A1 | 7/2018 | Milshtein |
| 2018/0186082 A1 | 7/2018 | Randhawa |
| 2018/0207721 A1 | 7/2018 | Schlick |
| 2018/0207722 A1 | 7/2018 | Feldmann |
| 2018/0221948 A1 | 8/2018 | Rowland |
| 2018/0236550 A1 | 8/2018 | Herzog |
| 2018/0236714 A1 | 8/2018 | Thelakkadan |
| 2018/0244034 A1 | 8/2018 | Sutcliffe |
| 2018/0250744 A1 | 9/2018 | Symeonidis |
| 2018/0250745 A1 | 9/2018 | Spink |
| 2018/0250746 A1 | 9/2018 | Symeonidis |
| 2018/0250771 A1 | 9/2018 | Brown |
| 2018/0250772 A1 | 9/2018 | Symeonidis |
| 2018/0250773 A1 | 9/2018 | Symeonidis |
| 2018/0250774 A1 | 9/2018 | Symeonidis |
| 2018/0250775 A1 | 9/2018 | Spink |
| 2018/0281067 A1 | 10/2018 | Small |
| 2018/0281236 A1 | 10/2018 | Elgar |
| 2018/0281237 A1 | 10/2018 | Frechman |
| 2018/0281282 A1 | 10/2018 | Elgar |
| 2018/0281283 A1 | 10/2018 | Frechman |
| 2018/0281284 A1 | 10/2018 | Elgar |
| 2018/0297114 A1 | 10/2018 | Preston |
| 2018/0318928 A1 | 11/2018 | Christiansen |
| 2018/0319150 A1 | 11/2018 | Buller |
| 2018/0326485 A1 | 11/2018 | Brown |
| 2018/0326488 A1 | 11/2018 | Lappas |
| 2018/0341248 A1 | 11/2018 | Mehr |
| 2018/0361509 A1 | 12/2018 | Reznik |
| 2019/0022944 A1 | 1/2019 | Döhler |
| 2019/0054696 A1 | 2/2019 | Alonso |
| 2019/0061002 A1 | 2/2019 | Symeonidis |
| 2019/0118263 A1 | 4/2019 | Buller |
| 2019/0118286 A1 | 4/2019 | Sugatani |
| 2019/0118481 A1 | 4/2019 | Brown |
| 2019/0134747 A1 | 5/2019 | Herzog |
| 2019/0143412 A1 | 5/2019 | Buller |
| 2019/0160755 A1 | 5/2019 | Blasco |
| 2019/0230248 A1 | 7/2019 | Mizes |
| 2019/0232429 A1 | 8/2019 | Buller |
| 2019/0291184 A1 | 9/2019 | Buller |
| 2019/0366638 A1 | 12/2019 | Buller |
| 2019/0375010 A1 | 12/2019 | Richardson |
| 2019/0381736 A1 | 12/2019 | Jensen |
| 2020/0004255 A1 | 1/2020 | Mohammadiha |
| 2020/0039000 A1 | 2/2020 | Sweetland |
| 2020/0139631 A1 | 5/2020 | Buller |
| 2020/0269500 A1 | 8/2020 | Pieger |
| 2020/0406545 A1 | 12/2020 | Schmale |
| 2021/0039318 A1 | 2/2021 | Monaco |
| 2021/0138397 A1 | 5/2021 | Schulz-Sciberras |
| 2021/0178406 A1 | 6/2021 | Ringwald |
| 2021/0370403 A1 | 12/2021 | Narita |
| 2022/0118513 A1 | 4/2022 | Kleinhans |
| 2022/0297186 A1 | 9/2022 | Buller |
| 2022/0297187 A1 | 9/2022 | Buller |
| 2022/0379381 A1 | 12/2022 | Buller |
| 2023/0030232 A1 | 2/2023 | Buller |
| 2023/0040341 A1 | 2/2023 | Buller |
| 2023/0122002 A1 | 4/2023 | Buller |
| 2023/0142672 A1 | 5/2023 | Kleinhans et al. |
| 2023/0150030 A1 | 5/2023 | Brown |
| 2023/0150204 A1 | 5/2023 | Buller |
| 2023/0356330 A1 | 11/2023 | Buller |
| 2023/0364861 A1 | 11/2023 | Buller |
| 2024/0001617 A1 | 1/2024 | Romano |
| 2024/0017355 A1 | 1/2024 | Buller |
| 2024/0018626 A1 | 1/2024 | Buller |
| 2024/0024984 A1 | 1/2024 | Buller |

FOREIGN PATENT DOCUMENTS

| | | |
|---|---|---|
| CN | 1648802 A | 8/2005 |
| CN | 101835554 A | 9/2010 |
| CN | 102076456 A | 5/2011 |
| CN | 102549178 | 7/2012 |
| CN | 102695476 A | 9/2012 |
| CN | 103341625 A | 10/2013 |

(56) References Cited

FOREIGN PATENT DOCUMENTS

| | | |
|---|---|---|
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| CN | 203635913 U | 6/2014 |
| CN | 103917348 A | 7/2014 |
| CN | 204136439 | 2/2015 |
| CN | 104589647 | 5/2015 |
| CN | 204842978 | 12/2015 |
| CN | 105383059 | 3/2016 |
| CN | 105904729 A | 8/2016 |
| CN | 105921747 A | 9/2016 |
| CN | 106077625 | 11/2016 |
| CN | 107340027 | 11/2017 |
| CN | 107486558 | 12/2017 |
| CN | 107891148 | 4/2018 |
| CN | 108422661 | 8/2018 |
| CN | 108422667 | 8/2018 |
| CN | 108940841 | 12/2018 |
| CN | 110548872 | 12/2019 |
| CN | 210080723 | 2/2020 |
| CN | 210211384 | 3/2020 |
| CN | 113634770 A | 11/2021 |
| CN | 214774026 | 11/2021 |
| DE | 4300478 C1 | 8/1994 |
| DE | 19649865 C1 | 2/1998 |
| DE | 19939616 A1 | 3/2001 |
| DE | 102004061836 A1 | 7/2006 |
| DE | 102007029142 A1 | 1/2009 |
| DE | 102004057866 B4 | 6/2010 |
| DE | 102008051478 A1 | 6/2010 |
| DE | 102009015130 A1 | 10/2010 |
| DE | 102009036153 A1 | 2/2011 |
| DE | 102009043317 | 3/2011 |
| DE | 102009051479 | 5/2011 |
| DE | 102010048335 A1 | 4/2012 |
| DE | 102011112581 A1 | 3/2013 |
| DE | 202013009787 U1 | 12/2013 |
| DE | 102013208651 A1 | 11/2014 |
| DE | 102013223411 A1 | 5/2015 |
| DE | 102014000022 A1 | 7/2015 |
| DE | 102014204528 A1 | 9/2015 |
| DE | 102014010932 A1 | 1/2016 |
| DE | 102015005780 A1 | 12/2016 |
| DE | 102015211538 A1 | 12/2016 |
| DE | 102016225124 | 6/2017 |
| DE | 102016013041 | 5/2018 |
| EP | 0296818 B1 | 4/1993 |
| EP | 0690780 | 1/1996 |
| EP | 0861927 | 9/1998 |
| EP | 1151849 | 11/2001 |
| EP | 1348781 | 10/2003 |
| EP | 1424158 | 6/2004 |
| EP | 1466718 A2 | 10/2004 |
| EP | 1775104 | 4/2007 |
| EP | 1793979 | 6/2007 |
| EP | 1622086 B1 | 9/2008 |
| EP | 1992709 A1 | 11/2008 |
| EP | 2277687 A1 | 1/2011 |
| EP | 2335848 | 6/2011 |
| EP | 2361704 A1 | 8/2011 |
| EP | 2522446 A1 | 11/2012 |
| EP | 2583773 A2 | 4/2013 |
| EP | 2620241 A1 | 7/2013 |
| EP | 2774703 A1 | 9/2014 |
| EP | 2789413 A1 | 10/2014 |
| EP | 2832473 A1 | 2/2015 |
| EP | 2832474 A1 | 2/2015 |
| EP | 2873751 A1 | 5/2015 |
| EP | 2992942 A1 | 3/2016 |
| EP | 3127635 A1 | 2/2017 |
| EP | 3165303 A1 | 5/2017 |
| EP | 3208077 A1 | 8/2017 |
| EP | 3263316 A1 | 1/2018 |
| EP | 3428585 | 1/2019 |
| EP | 3263316 B1 | 2/2019 |
| EP | 3441213 | 2/2019 |
| EP | 3237177 | 5/2019 |
| EP | 2992942 | 6/2019 |
| EP | 3650204 A1 | 5/2020 |
| EP | 3822001 | 5/2021 |
| GB | 1018656 A | 1/1966 |
| GB | 2515287 A | 12/2014 |
| JP | S6237109 | 2/1987 |
| JP | S6261617 | 3/1987 |
| JP | H06503764 | 4/1994 |
| JP | 2001009921 A | 1/2001 |
| JP | 2001277368 A | 10/2001 |
| JP | 2001334581 | 12/2001 |
| JP | 2003502184 A | 1/2003 |
| JP | 2003245981 A | 9/2003 |
| JP | 2004143581 A | 5/2004 |
| JP | 2005335203 A | 12/2005 |
| JP | 2006150977 A | 6/2006 |
| JP | 2007111989 | 5/2007 |
| JP | 2007536130 A | 12/2007 |
| JP | 2008291318 A | 12/2008 |
| JP | 2008302607 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| JP | 2014227587 A | 12/2014 |
| JP | 2016502603 | 1/2016 |
| JP | 2016540109 | 12/2016 |
| JP | 2017137563 A | 8/2017 |
| KR | 20160059726 A | 5/2016 |
| KR | 20160076708 A | 7/2016 |
| KR | 20180098741 | 9/2018 |
| NO | 317085 B1 | 8/2004 |
| NO | 2017179001 A1 | 10/2017 |
| RU | 2524467 | 7/2014 |
| SE | 524467 C2 | 8/2004 |
| TW | 201634234 | 10/2016 |
| WO | 9208592 A1 | 5/1992 |
| WO | 9511100 A1 | 4/1995 |
| WO | 9511101 | 4/1995 |
| WO | 9529387 | 11/1995 |
| WO | 9711837 A1 | 4/1997 |
| WO | 9828124 A2 | 7/1998 |
| WO | 9933641 A1 | 7/1999 |
| WO | 0102160 A1 | 1/2001 |
| WO | 0177988 A2 | 10/2001 |
| WO | 2004005014 | 1/2004 |
| WO | 2004037469 A1 | 5/2004 |
| WO | 2004039531 | 5/2004 |
| WO | 2005099635 | 10/2005 |
| WO | 2006066939 A1 | 6/2006 |
| WO | 2008028443 A2 | 3/2008 |
| WO | 2008049384 A1 | 5/2008 |
| WO | 2008064620 A1 | 6/2008 |
| WO | 2008067496 A2 | 6/2008 |
| WO | 2008074287 A1 | 6/2008 |
| WO | 2008096105 A1 | 8/2008 |
| WO | 2008128502 A2 | 10/2008 |
| WO | 2009015619 A2 | 2/2009 |
| WO | 2009096750 A2 | 8/2009 |
| WO | 2010026396 A2 | 3/2010 |
| WO | 2010027317 | 3/2010 |
| WO | 2010115588 A2 | 10/2010 |
| WO | 2011020912 | 2/2011 |
| WO | 2011036087 | 3/2011 |
| WO | 2011066989 | 6/2011 |
| WO | 2013092997 A1 | 6/2013 |
| WO | 2013113372 A1 | 8/2013 |
| WO | 2013160188 A1 | 10/2013 |
| WO | 2013167903 A1 | 11/2013 |
| WO | 2013178825 A2 | 12/2013 |
| WO | 2013179017 A1 | 12/2013 |
| WO | 2013189473 A1 | 12/2013 |
| WO | 2014023657 A1 | 2/2014 |
| WO | 2014042970 A1 | 3/2014 |

(56) References Cited

FOREIGN PATENT DOCUMENTS

| | | |
|---|---|---|
| WO | 2014044589 A1 | 3/2014 |
| WO | 2014049159 A1 | 4/2014 |
| WO | 2014083292 A1 | 6/2014 |
| WO | 2014118783 A1 | 8/2014 |
| WO | 2014120991 A1 | 8/2014 |
| WO | 2014135136 A1 | 9/2014 |
| WO | 2014144255 A2 | 9/2014 |
| WO | 2014144360 A2 | 9/2014 |
| WO | 2014144482 A1 | 9/2014 |
| WO | 2014144630 A1 | 9/2014 |
| WO | 2014176536 A1 | 10/2014 |
| WO | 2014193406 A1 | 12/2014 |
| WO | 2015020939 | 2/2015 |
| WO | 2015023612 A2 | 2/2015 |
| WO | 2015025171 A2 | 2/2015 |
| WO | 2015034362 A1 | 3/2015 |
| WO | 2015040433 A2 | 3/2015 |
| WO | 2015051915 A1 | 4/2015 |
| WO | 2015053946 A1 | 4/2015 |
| WO | 2015077077 | 5/2015 |
| WO | 2015082677 A1 | 6/2015 |
| WO | 2015106836 | 7/2015 |
| WO | 2015151865 A1 | 10/2015 |
| WO | 2015173355 | 11/2015 |
| WO | 2015176709 A1 | 11/2015 |
| WO | 2015183796 A1 | 12/2015 |
| WO | 2015196149 A1 | 12/2015 |
| WO | 2016022336 | 2/2016 |
| WO | 2016026852 A1 | 2/2016 |
| WO | 2016026853 A1 | 2/2016 |
| WO | 2016049621 | 3/2016 |
| WO | 2016055523 A1 | 4/2016 |
| WO | 2016075025 A1 | 5/2016 |
| WO | 2016075026 A1 | 5/2016 |
| WO | 2016077250 A1 | 5/2016 |
| WO | 2016079494 A2 | 5/2016 |
| WO | 2016094827 A1 | 6/2016 |
| WO | 2016113253 A1 | 7/2016 |
| WO | 2016169768 A1 | 10/2016 |
| WO | 2016196223 A1 | 12/2016 |
| WO | 2016196382 A1 | 12/2016 |
| WO | 2017011456 A1 | 1/2017 |
| WO | 2017015217 A2 | 1/2017 |
| WO | 2017039858 | 3/2017 |
| WO | 2017040675 | 3/2017 |
| WO | 2017054842 A1 | 4/2017 |
| WO | 2017079091 A1 | 5/2017 |
| WO | 2017100695 A1 | 6/2017 |
| WO | 2017118569 A1 | 7/2017 |
| WO | 2017143077 A1 | 8/2017 |
| WO | 2017179001 A1 | 10/2017 |
| WO | 2017189982 | 11/2017 |
| WO | 2017196344 | 11/2017 |
| WO | 2017201120 | 11/2017 |
| WO | 2018005439 A1 | 1/2018 |
| WO | 2018064349 A1 | 4/2018 |
| WO | 2018075741 A1 | 4/2018 |
| WO | 2018106586 A1 | 6/2018 |
| WO | 2018128695 A2 | 7/2018 |
| WO | 2018129089 A1 | 7/2018 |
| WO | 2018160807 A1 | 9/2018 |
| WO | 2018183396 A1 | 10/2018 |
| WO | 2018202305 | 11/2018 |
| WO | 2018202307 | 11/2018 |
| WO | 2018231664 | 12/2018 |
| WO | 2019057523 | 3/2019 |
| WO | 2019070644 | 4/2019 |
| WO | 2019076705 | 4/2019 |
| WO | 2019086231 | 5/2019 |
| WO | 2019173000 | 9/2019 |
| WO | 2019195062 A1 | 10/2019 |
| WO | 2019212520 | 11/2019 |
| WO | 2020006468 A1 | 1/2020 |
| WO | 2020033124 A1 | 2/2020 |
| WO | 2020072986 | 4/2020 |
| WO | 2020083531 | 4/2020 |
| WO | 2020146416 A2 | 7/2020 |
| WO | 2021021469 A1 | 2/2021 |
| WO | 2021092646 | 5/2021 |
| WO | 2021151938 | 8/2021 |
| WO | 2023114006 | 6/2023 |
| WO | 2023114029 | 6/2023 |
| WO | 2023129489 | 7/2023 |
| WO | 2023215606 | 11/2023 |

OTHER PUBLICATIONS

Office Action dated Mar. 23, 2017 for U.S. Appl. No. 15/399,186. 15 pages.
Office action dated Mar. 4, 2016 for U.S. Appl. No. 14/744,988. 18 pages.
Office Action dated Mar. 6, 2017 for U.S. Appl. No. 14/744,910. 12 pages.
Office action dated Mar. 7, 2017 for U.S. Appl. No. 15/339,712. 11 pages.
Office Action dated Mar. 7, 2018 for U.S. Appl. No. 15/399,186. 32 pages.
Office action dated Nov. 1, 2016 for U.S. Appl. No. 15/085,884. 27 pages.
Office action dated Nov. 12, 2015 for U.S. Appl. No. 14/745,108. 16 pages.
Office Action dated Nov. 16, 2017 for U.S. Appl. No. 15/634,267. 10 pages.
Office action dated Nov. 18, 2016 for U.S. Appl. No. 15/188,939. 15 pages.
Office Action dated Nov. 27, 2017 for U.S. Appl. No. 15/374,318. 10 pages.
Office Action dated Oct. 19, 2017 for U.S. Appl. No. 15/399,186. 19 pages.
Office action dated Oct. 2, 2015 for U.S. Appl. No. 14/744,955. 7 pages.
Office action dated Sep. 10, 2015 for U.S. Appl. No. 14/744,675. 17 pages.
Office Action dated Sep. 11, 2017 for U.S. Appl. No. 15/374,821. 12 pages.
Office action dated Sep. 13, 2016 for U.S. Appl. No. 15/188,939. 8 pages.
Office Action dated Sep. 15, 2017 for U.S. Appl. No. 15/374,616. 24 pages.
Office Action dated Sep. 18, 2017 for U.S. Appl. No. 15/634,228. 17 pages.
Optomec. Lens 850R 3D Printer for Structual Metals. Optomec. YouTube—Web. Published on Jun. 3, 2012. 3 pages. URL:< https://www.youtube.com/watch?v=mkUVURLkxS4>.
Papadakis, et al. Numerical computation of component shape distortion manufactured by selective laser melting. Procedia CIRP. Aug. 2014; 18:90-95.
PCT/US2017/060035 International Search Report and Written Opinion dated Jul. 20, 2018. 13 pages.
PCT/US2017/064474 International Search Report and Written Opinion dated Apr. 30, 2018. 14 pages.
PCT/US2018/012250 International Search Report and Written Opinion dated Apr. 30, 2018. 15 pages.
PCT/US2018/020406 International Search Report and Written Opinion dated Jun. 28, 2018. 12 pages.
PCT/US2018/024667 International Search Report and Written Opinion dated Jul. 17, 2018. 14 pages.
PCT/US2019/014635 International Search Report and Written Opinion dated May 13, 2019. 13 pages.
PCT/US2019/024402 International Search Report and Written Opinion dated Aug. 6, 2019. 11 pages.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermomechanical model. Additive Manufacturing; vol. 22, Aug. 2018, pp. 869-882.

(56) References Cited

OTHER PUBLICATIONS

Proto Labs. Direct Metal Laser Sintering (DMLS). Published Sep. 10, 2014. https://www.protolabs.com/additive-manufacturing/direct-metal-laser-sintering, 2 pages.
Rhinehart, R.R. §2.13 Control Theory: Mode-Based Control, in Bela G. Liptak, Instrument Engineers' Handbook, vol. 2: Process Control and Optimization, 209-213. CRC Press; 4 editior (Sep. 29, 2005).ISBN-13: 978-0849310812.
Riecker, et al. 3D multi-material metal printing of delicate structures. EuroPM 2014—AM Technologies, http://www.fam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015). 6 pages.
RP Photonics Consulting GmbH. Definition of "Optical Intensity". Encyclopedia of Laser Physics and Technology. Jun. 2012. 3 pages. URL:< https://www.rp-photonics.com/optical_intensity.html>.
Ryan et al. Fabrication methods of porous metals for use in orthopaedic applications. Biomaterials. May 2006; vol. 27, Issue 13, pp. 2651-2670.
Salvati et al. An Investigation of Residual Stress Gradient Effects in FIB-DIC Micro-Ring-Core Analysis. Proceedings of the International MultiConference of Engineers and Computer Scientists 2015 vol. II, IMECS 2015, Hong Kong, Mar. 18-20, 2015. 4 pages.
Sandvik Materials Technology website. Accessed Nov. 14, 2014. http://www.smt.sandvik.com/en/products/metal-powder/additive-manufacturing/. 2 pages.
Saunders, Marc. Real-time AM monitoring opens up new process control opportunities. Web: Linkedin. Published on Jan. 3, 2018. 12 pages. URL:< https://www.linkedin.com/pulse/real-time-am-monitoring-opens-new-process-control-marc-saunders/>.
SCHOTT. TIE-19: Temperature Coefficient of the Refractive Index. Technical Information: Advanced Optics. SCHOTT AG. Jul. 2016. 10 pages.
SCHOTT. TIE-19: Temperature Coefficient of the Refractive Index. Technical Information: Advanced Optics. SCHOTT North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB89I.
Shen et al. An analytical model for estimating deformation in laser forming. Computational Materials Science, 37, Oct. 2006, pp. 593-598.
Shen et al. Modelling of laser forming—An review. Computational Materials Science 46, Oct. 2009, pp. 834-840.
Spears, et al. In-process sensing in selective laser melting (SLM) additive manufacturing. Integrating Materials and Manufacturing Innovation. Feb. 11, 2016; 5:2. DOI: 10.1186/S40192-016-0045-4. 25 pages.
Strano, et al. A new approach to the design and optimisation of support structures in additive manufacturing. Int J Adv Manuf Technol (2013) 66:1247-1254, DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Symeonidis, Kimon. The Controlled Diffusion Solidification Process: Fundamentals and Principles. Ph.D. Thesis. Worcester Polytechnic Institute. Apr. 2009. 137 pages.
Third Party Observations concerning the International Application PCT/US2020/042596, published as WO 2021/021469, dated Nov. 19, 2021. 20 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm?objectgroup_id=7794>.
U.S. Appl. No. 15/803,686 Notice of Allowance dated Jan. 23, 2020.
U.S. Appl. No. 15/861,544 Notice of Allowance dated Feb. 4, 2020.
U.S. Appl. No. 15/937,798 Office Action dated Mar. 7, 2019.
U.S. Appl. No. 15/937,798 Office Action dated Oct. 26, 2018.
U.S. Appl. No. 15/937,812 Office Action dated Sep. 7, 2018.
U.S. Appl. No. 15/937,817 Office Action dated Nov. 23, 2018.
U.S. Appl. No. 16/195,810 Office Action dated Dec. 27, 2019.
U.S. Appl. No. 15/339,712 Notice of Allowance dated Jul. 24, 2018.
U.S. Appl. No. 15/339,712 Notice of Allowance dated Jun. 18, 2018.
U.S. Appl. No. 15/374,318 Notice of Allowance dated Apr. 20, 2018.
U.S. Appl. No. 15/374,442 Notice of Allowance dated Oct. 3, 2018.
U.S. Appl. No. 15/374,535 Notice of Allowance dated Sep. 24, 2018.
U.S. Appl. No. 15/435,065 Office Action dated Aug. 16, 2018.
U.S. Appl. No. 15/435,078 Notice of Allowance dated Sep. 4, 2019.
U.S. Serial No. 15/435,110 Notice of Allowance dated Sep. 25, 2018.
U.S. Appl. No. 15/435,110 Office Action dated Apr. 19, 2018.
U.S. Appl. No. 15/490,219 Office Action dated Oct. 12, 2018.
U.S. Appl. No. 15/614,979 Office Action dated Jun. 8, 2018.
U.S. Appl. No. 15/634,228 Notice of Allowance dated Feb. 20, 2019.
U.S. Appl. No. 15/634,267 Office Action dated Apr. 3, 2018.
U.S. Appl. No. 15/634,267 Office Action dated Sep. 6, 2018.
U.S. Appl. No. 15/634,727 Office Action dated Sep. 20, 2018.
U.S. Appl. No. 15/668,662 Office Action dated Oct. 1, 2020.
U.S. Appl. No. 15/719,133 Office Action dated Mar. 28, 2018.
U.S. Appl. No. 15/803,688 Office Action dated Sep. 20, 2018.
U.S. Appl. No. 15/808,434 Office Action dated Feb. 21, 2020.
U.S. Appl. No. 15/808,777 Office Action dated Feb. 6, 2020.
U.S. Appl. No. 15/830,421 Office Action dated Jul. 26, 2018.
U.S. Appl. No. 15/830,421 Office Action dated Nov. 13, 2018.
U.S. Appl. No. 15/855,744 Office Action dated Apr. 27, 2018.
U.S. Appl. No. 15/861,561 Office Action dated Jun. 16, 2020.
U.S. Appl. No. 15/871,763 Notice of Allowance dated Nov. 5, 2018.
U.S. Appl. No. 15/871,763 Notice of Allowance dated Sep. 17, 2018.
U.S. Appl. No. 15/886,544 Office Action dated Mar. 21, 2019.
U.S. Appl. No. 15/886,544 Office Action dated May 14, 2020.
U.S. Appl. No. 15/886,544 Office Action dated Sep. 6, 2019.
U.S. Appl. No. 15/893,523 Notice of Allowance dated Jul. 25, 2018.
U.S. Appl. No. 15/893,523 Notice of Allowance dated Jun. 15, 2018.
U.S. Appl. No. 15/909,406 Notice of Allowance dated Apr. 4, 2019.
U.S. Appl. No. 15/909,826 Notice of Allowance dated Aug. 30, 2018.
U.S. Appl. No. 15/937,778 Office Action dated Sep. 21, 2018.
U.S. Appl. No. 15/937,812 Office Action dated Feb. 7, 2019.
U.S. Appl. No. 16/025,915 Office Action dated Nov. 2, 2020.
U.S. Appl. No. 16/030,795 Office Action dated Dec. 21, 2020.
U.S. Appl. No. 16/245,183 Office Action dated Jan. 6, 2021.
U.S. Appl. No. 16/404,579 Office Action dated Oct. 16, 2020.
U.S. Appl. No. 29/653,429 Office Action dated Oct. 7, 2020.
U.S. Appl. No. 15/374,616 Notice of Allowance dated Apr. 2, 2019.
U.S. Appl. No. 15/615,029 Office Action dated Apr. 30, 2020.
Van Der Eijk, et al. Metal printing process: development of a new rapid manufacturing process for metal parts. Proceedings of the World PM 2004 conference held in Vienna. Oct. 17-21, 2004. 5 pages.
Wang et al. Effects of thermal cycles on the microstructure evolution of Inconel 718 during selective laser melting process. Additive Manufacturing. vol. 18, Dec. 2017, pp. 1-14.
Wang, et al. Research on the fabricating quality optimization of the overhanging surface in SLM process. Int J Adv Manuf Technol (2013) 65:1471-1484, DOI 10.1007/s00170-012-4271-4. Published online: Jun. 16, 2012.
Notice of Allowance dated Dec. 8, 2017 for U.S. Appl. No. 15/435,128. 13 pages.
Notice of Allowance dated Dec. 9, 2016 for U.S. Appl. No. 15/188,939. 14 pages.
Notice of Allowance dated Dec. 11, 2017 for U.S. Appl. No. 15/435,120. 23 pages.

(56) References Cited

OTHER PUBLICATIONS

Notice of allowance dated Dec. 14, 2015 for U.S. Appl. No. 14/745,081. 3 pages.
Notice of allowance dated Dec. 15, 2015 for U.S. Appl. No. 14/745,081. 3 pages.
Notice of allowance dated Aug. 10, 2016 for U.S. Appl. No. 14/967,118. 5 pages.
Notice of Allowance dated Aug. 7, 2017 for U.S. Appl. No. 14/744,910. 9 pages.
Notice of Allowance dated Dec. 11, 2017 for U.S. Appl. No. 15/435,120. 7 pages.
Notice of Allowance dated Dec. 8, 2017 for U.S. Appl. No. 15/435,128. 4 pages.
Notice of Allowance dated Dec. 9, 2016 for U.S. Appl. No. 15/188,939. 8 pages.
Notice of Allowance dated Feb. 16, 2018 for U.S. Appl. No. 15/435,120. 2 pages.
Notice of Allowance dated Feb. 21, 2018 for U.S. Appl. No. 15/435,128. 5 pages.
Notice of Allowance dated Feb. 6, 2018 for U.S. Appl. No. 15/374,821. 4 pages.
Notice of Allowance dated Jan. 12, 2018 for U.S. Appl. No. 15/435,120. 5 pages.
Notice of allowance dated Jan. 5, 2017 for U.S. Appl. No. 15/085,884. 10 pages.
Notice of allowance dated Jun. 20, 2016 for U.S. Appl. No. 14/744,675. 2 pages.
Notice of allowance dated Mar. 1, 2016 for U.S. Appl. No. 14/745,108. 7 pages.
Notice of Allowance dated Mar. 16, 2017 for U.S. Appl. No. 15/339,775. 7 pages.
Notice of Allowance dated Mar. 20, 2017 for U.S. Appl. No. 15/339,759. 8 pages.
Notice of allowance dated May 11, 2016 for U.S. Appl. No. 14/744,955. 9 pages.
Notice of allowance dated May 25, 2016 for U.S. Appl. No. 14/744,675. 7 pages.
Notice of allowance dated Nov. 30, 2015 for U.S. Appl. No. 14/745,081. 3 pages.
Notice of allowance dated Sep. 17, 2015 for U.S. Appl. No. 14/745,081. 6 pages.
Notice of allowance dated Sep. 28, 2015 for U.S. Appl. No. 14/745,081. 2 pages.
Notice of allowance dated Sep. 6, 2016 for U.S. Appl. No. 14/745,032. 8 pages.
Office Action dated Jan. 2, 2018 for U.S. Appl. No. 15/288,251. 15 pages.
Office action dated Jan. 7, 2016 for U.S. Appl. No. 14/744,859. 19 pages.
Office action dated Jan. 11, 2016 for U.S. Appl. No. 14/745,032. 21 pages.
Office Action dated Jan. 24, 2018 for U.S. Appl. No. 15/615,004. 71 pages.
Office Action dated Jan. 25, 2018 for U.S. Appl. No. 15/634,727. 61 pages.
Office Action dated Feb. 7, 2017 for U.S. Appl. No. 14/744,988. 13 pages.
Office Action dated Feb. 7, 2017 for U.S. Appl. No. 15/399,712. 7 pages.
Office Action dated Feb. 7, 2018 for U.S. Appl. No. 15/614,979. 67 pages.
Office Action dated Feb. 7, 2018 for U.S. Appl. No. 15/719,229. 21 pages.
Office Action dated Feb. 8, 2017 for U.S. Appl. No. 14/744,859. 35 pages.
Office action dated Feb. 10, 2016 for U.S. Appl. No. 14/744,910. 16 pages.
Office Action dated Feb. 14, 2018 for U.S. Appl. No. 15/634,228. 29 pages.
Office action dated Feb. 16, 2016 for U.S. Appl. No. 14/744,955. 7 pages.
Office action dated Mar. 4, 2016 for U.S. Appl. No. 14/744,988. 17 pages.
Office Action dated Mar. 6, 2017 for U.S. Appl. No. 14/744,910. 24 pages.
Office Action dated Mar. 7, 2018 for U.S. Appl. No. 15/399,186. 20 pages.
Office action dated Mar. 10, 2016 for U.S. Appl. No. 14/744,675. 13 pages.
Office Action dated Mar. 23, 2017 for U.S. Appl. No. 15/399,186. 54 pages.
Office Action dated Apr. 28, 2017 for U.S. Appl. No. 15/374,616. 59 pages.
Office Action dated Jun. 15, 2017 for U.S. Appl. No. 15/288,251. 14 pages.
Office action dated Jun. 29, 2016 for U.S. Appl. No. 14/744,859. 15 pages.
Office Action dated Jun. 29, 2017 for U.S. Appl. No. 15/435,128. 6 pages.
Craeghs, et al. Feedback control of layerwise laser melting using optical sensors. Physics Procedia. Dec. 2010; 5:505-514.
Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.
Dahotre et al. Laser Fabrication and Machining of Materials. Springer; 2008 edition (Nov. 26, 2007).561 pages. DOI: 10.1007/978-0-387-72344-0.
Das et al. Producing metal parts with selective laser sintering/hot isostatic pressing. JOM; Dec. 1998, vol. 50, Issue 12, pp. 17-20.
David et al. Welding: Solidification and microstructure. The Journal of The Minerals, Metals & Materials Society (TMS). Jun. 2003, vol. 55, Issue 6, pp. 14-20.
De Dietrich Process Systems, Inc. Powder Pump™. Product Brochure. Created Jul. 3, 2012. 2 pages.
Direct Manufacturing: ARCAM. Uploaded on Jun. 6, 2011. 2 pages, https://www.youtube.com/watch?v=M_qSnjKN7f8.
Doxygen. CGAL 4.11.1—Kinetic Data Structures. User Manual. Web. Published Apr. 8, 2006. 4 pages. URL:< https://doc.cgal.org/latest/Manual/how_to_cite_cgal.html>.
EOS. Direct Metal Laser Sintering Published Aug. 22, 2012. https://www.youtube.com/watch?v=cRE-Pzl6uZA. 3 pages.
EP15809160.3 European Search Report dated Aug. 7, 2018. 11 pages.
EP15866668.5 European Search Report dated Aug. 7, 2018. 10 pages.
EP16862767.7 European Search Report dated Jun. 26, 2019. 9 pages.
EP16874003.3 Extended European Search Report dated Oct. 10, 2019. 10 pages.
EP17178143.8 Notice of Opposition dated Nov. 19, 2019. 3 pages.
EP18209400.3 European Search Report dated May 7, 2019. 6 pages.
European Search Report and Search Opinion dated Nov. 30, 2017 for European Patent Application No. EP17178143.8. 5 pages.
Everton et al. Review of in-situ process monitoring and in-situ metrology for metal additive manufacturing. Materials and Design 95 (2016) 431-445.
Ex Parte Quayle Action dated Apr. 19, 2017 for U.S. Appl. No. 15/374,821. 6 pages.
Extended European Search Report dated Jul. 7, 2017 for European Patent Application No. EP17156707.6. 9 pages.
*Formlabs* v. *DWS*. Civil Action filed on Jun. 29, 2018 in the United States Court for the Eastern District of Virginia. Case No. 1:18-cv-00810-CMH-IDD. 13 pages.
Gaudin, Sharon. Researcher works to make 3D-printed metals stronger, customizable. Oct. 2014. Accessed online on Mar. 22, 2018. 4 pages. URL:<https://www.computerworld.com/article/2838780/researcher-works-to-make-3d-printed-materials-stronger-customizable.html>.

(56) References Cited

OTHER PUBLICATIONS

Geiger, et al. The Mechanisms of Laser Forming. Annals of the CIRP, vol. 42, Jan. 1993, pp. 301-304.
Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.
Gibson, et al. Additive Manufacturing Technologies, Springer2010, ISBN978-1-4419-1119-3 (Print 978-1-4419-1120-9 (Online). Published: Dec. 14, 2009. 472 pages. pp. 27-31, 98-99, 264-267, 295, 382-383.
Gibson, et al. Additive Manufacturing Technologies, Springer2015. Chapter5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Gibson, et al. Additive Manufacturing Technologies, Springer 2010, Chapter 5, pp. 103-142. ISBN978-1-4419-1119-3 (Print978-1-4419-1120-9 (Online). Published: Dec. 14, 2009.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 1, 20155; 33(16): 3419-3425.
Gu et al. Laser Additive manufacturing of metallic components: materials, processes and mechanisms. International Materials Reviews 57(3):133-164 (2012).
Hauser, et al. Further Developments in Process Mapping and modelling in direct metal selective laser melting. Aug. 2004, 15th solid Free Form Fabrication Proceedings. Austin, Texas, pp. 448-459.
Hu et al. Experimental and numerical modeling of buckling instability of laser sheet forming. International Journal of Machine Tools & Manufacture, 42, Oct. 2002, pp. 1427-1439.
Hu, et al. Computer simulation and experimental investigation of sheet metal bending using laser beam scanning. International Journal of Machine Tools and Manufacture, 41, Mar. 2001, pp. 589-607.
Hussein. The development of Lightweight Cellular Structures for Metal Additive Manufacturing. Nov. 2013, thesis of University of Exeter, pp. 1-228.
integrativemodeling.org. IMP, the Integrative Modeling Platform. Web. Published Jul. 26, 2013.1 page. URL:<https://integrativemodeling.org/>.
International search report and written opinion dated Sep. 20, 2016 for PCT/US2016/034454. 12 pages.
International search report and written opinion dated Apr. 11, 2016 for PCT/US2015/065297. 17 pages.
International Search Report and Written Opinion dated Apr. 5, 2017 for International PCT Patent Application No. PCT/ US2016/066000. 11 pages.
International Search Report and Written Opinion dated Aug. 30, 2017 for International PCT Patent Application No. PCT/US2017/039422. 164 pages.
International Search Report and Written Opinion dated Feb. 12, 2018 for International PCT Patent Application No. PCT/US2017/057340. 25 pages.
International Search Report and Written Opinion dated Feb. 14, 2017 for International PCT Patent Application No. PCT/US2016/042818. 14 pages.
International Search Report and Written Opinion dated Feb. 19, 2016 for International PCT Patent Application No. PCT/US2015/059790. 11 pages.
International search report and written opinion dated Feb. 19, 2016 for PCT/US2015/059790. 11 pages.
International Search Report and Written Opinion dated Jan. 16, 2017 for International PCT Patent Application No. PCT/US2016/059781. 12 pages.
International Search Report and Written Opinion dated Jan. 9, 2018 for International PCT Patent Application No. PCT/2017/054043. 14 pages.
International Search Report and Written Opinion dated May 18, 2017 for International PCT Patent Application No. PCT/US2017/018191. 17 pages.
International Search Report and Written Opinion dated Oct. 18, 2016 for International PCT Patent Application No. PCT/US2016/041895. 9 pages.
International search report and written opinion dated Oct. 30, 2015 for PCT Application No. US2015/036802. 19 pages.
International search report and written opinion dated Sep. 13, 2016 for PCT Application No. US-2016034857. 13 pages.
International search report and written opinion dated Sep. 19, 2016 for PCT Application No. PCT/US2016/034857. 13 pages.
International Search Report and Written Opinion dated Sep. 20, 2016 for International PCT Patent Application No. PCT/US2016/034454. 12 pages.
IUPAC. "Inert gas". IUPAC Compendium of Chemical Terminology. Published Feb. 24, 2014.< http://goldbook.iupac.Org/html/l/l03027.html. 1 page.
Wilkes, et al. Emerald Artide: Additive manufacturing of Zr02—Al203 ceramic components by selective laser melting. Rapid Prototyping Journal, vol. 19, Issue 1, Aug. 7, 2012. 13 pages.
Wohlfart, Michael. Can you Build a 100 mm Support-free Horizontal Disk? Linkedin. Web article. Published Mar. 11, 2019. 14 pages. URL: https://www.linkedin.com/pulse/can-you-build-100-mm-support-free-horizontal-disk-michael-wohlfart/>.
Wright, Roger. Wire Technology, Process Engineering and Metallurgry, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008.10 pages.
Xu et al. In situ tailoring microstructure in additively manufactured Ti—6Al—4V for superior mechanical performance. Acta Materialia. Volume 125, Feb. 15, 2017, pp. 390-400.
Yin. Accurately quantifying process-relevant powder properties for AMPM applications. Freeman Technology. May 2014. 39 pages.
U.S. Appl. No. 15/719,084 Office Action dated Jul. 12, 2018.
U.S. Appl. No. 15/719,133 Office Action dated Sep. 24, 2018.
U.S. Appl. No. 15/719,229 Office Action dated May 16, 2019.
U.S. Appl. No. 15/719,229 Office Action dated Oct. 5, 2018.
U.S. Appl. No. 15/788,418 Office Action dated Jul. 8, 2019.
U.S. Appl. No. 15/788,495 Office Action dated Oct. 3, 2018.
U.S. Appl. No. 15/803,683 Office Action dated Jun. 19, 2019.
U.S. Appl. No. 15/803,686 Notice of Allowance dated Feb. 19, 2019.
U.S. Appl. No. 15/803,686 Office Action dated Sep. 19, 2018.
U.S. Appl. No. 15/830,470 Office Action dated Jul. 5, 2018.
U.S. Appl. No. 15/853,700 Office Action dated Apr. 6, 2018.
U.S. Appl. No. 15/853,700 Office Action dated Sep. 11, 2018.
U.S. Appl. No. 15/855,744 Notice of Allowance dated Feb. 15, 2019.
U.S. Appl. No. 15/855,744 Office Action dated Nov. 19, 2018.
U.S. Appl. No. 15/861,544 Office Action dated Feb. 15, 2019.
U.S. Appl. No. 15/861,544 Office Action dated Jul. 11, 2019.
U.S. Appl. No. 15/861,548 Office Action dated Sep. 6, 2018.
U.S. Appl. No. 15/861,553 Office Action dated Aug. 7, 2018.
U.S. Appl. No. 15/861,553 Office Action dated Dec. 14, 2018.
U.S. Appl. No. 15/870,561 Office Action dated Jun. 15, 2018.
U.S. Appl. No. 15/870,561 Office Action dated Nov. 19, 2018.
U.S. Appl. No. 15/871,763 Notice of Allowance dated Aug. 15, 2018.
U.S. Appl. No. 15/871,763 Office Action dated Apr. 19, 2018.
U.S. Appl. No. 15/886,544 Office Action dated Aug. 27, 2018.
U.S. Appl. No. 15/893,523 Notice of Allowance dated May 7, 2018.
U.S. Appl. No. 15/909,388 Office Action dated Dec. 14, 2018.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,406 Notice of Allowance dated May 6, 2019.
U.S. Appl. No. 15/909,406 Office Action dated Aug. 27, 2018.
U.S. Appl. No. 15/909,784 Notice of Allowance dated Jun. 27, 2019.
U.S. Appl. No. 15/909,784 Notice of Allowance dated Mar. 27, 2019.
U.S. Appl. No. 15/909,784 Office Action dated Jan. 18, 2019.
U.S. Appl. No. 15/909,784 Office Action dated Jul. 13, 2018.

(56) References Cited

OTHER PUBLICATIONS

U.S. Appl. No. 15/909,806 Office Action dated Aug. 13, 2018.
U.S. Appl. No. 15/909,806 Office Action dated Dec. 26, 2018.
U.S. Appl. No. 15/909,809 Notice of Allowance dated Feb. 14, 2019.
U.S. Appl. No. 15/909,809 Notice of Allowance dated Jun. 19, 2019.
U.S. Appl. No. 15/909,809 Notice of Allowance dated May 31, 2019.
U.S. Appl. No. 15/909,809 Office Action dated Aug. 10, 2018.
U.S. Appl. No. 15/909,826 Notice of Allowance dated Jul. 1, 2019.
U.S. Appl. No. 15/909,826 Office Action dated Feb. 13, 2019.
U.S. Appl. No. 15/909,826 Office Action dated May 2, 2018.
U.S. Appl. No. 15/937,778 Office Action dated Feb. 12, 2019.
U.S. Appl. No. 15/937,790 Office Action dated Jan. 31, 2019.
U.S. Appl. No. 15/937,790 Office Action dated Sep. 25, 2018.
U.S. Appl. No. 15/937,798 Notice of Allowance dated Jun. 12, 2019.
U.S. Appl. No. 15/873,832 Office Action dated Jun. 12, 2020.
U.S. Appl. No. 16/195,810 Notice of Allowance dated Apr. 8, 2020.
U.S. Appl. No. 16/195,810 Notice of Allowance dated May 11, 2020.
U.S. Appl. No. 14/744,675, filed Jun. 19, 2015 Buller et al.
U.S. Appl. No. 14/744,859, filed Jun. 19, 2015 Buller et al.
U.S. Appl. No. 14/744,910, filed Jun. 19, 2015 Buller et al.
U.S. Appl. No. 14/744,955, filed Jun. 19, 2015 Buller et al.
U.S. Appl. No. 14/744,988, filed Jun. 19, 2015 Buller et al.
U.S. Appl. No. 14/745,032, filed Jun. 19, 2015 Buller et al.
U.S. Appl. No. 14/745,081, filed Jun. 19, 2015 Buller et al.
U.S. Appl. No. 14/745, 108, filed Jun. 19, 2015 Buller et al.
U.S. Appl. No. 15/188,885 Notice of Allowance dated Jul. 29, 2019.
U.S. Appl. No. 15/188,885 Office Action dated Apr. 9, 2019.
U.S. Appl. No. 15/339,712 Notice of Allowance dated Jul. 10, 2018.
U.S. Appl. No. 15/339,712 Notice of Allowance dated May 23, 2018.
U.S. Appl. No. 15/339,712 Office Action dated Jan. 10, 2018.
U.S. Appl. No. 15/374,442 Office Action dated May 21, 2018.
U.S. Appl. No. 15/374,535 Office Action dated Apr. 20, 2018.
U.S. Appl. No. 15/374,616 Notice of Allowance dated Feb. 26, 2019.
U.S. Appl. No. 15/374,616 Notice of Allowance dated Feb. 5, 2019.
U.S. Appl. No. 15/374,616 Office Action dated Aug. 15, 2018.
U.S. Appl. No. 15/374,616 Office Action dated Mar. 26, 2018.
U.S. Appl. No. 15/374,821 Notice of Allowance dated Apr. 4, 2018.
U.S. Appl. No. 15/399,186 Notice of Allowance dated Dec. 20, 2018.
U.S. Appl. No. 15/399,186 Notice of Allowance dated Sep. 17, 2018.
U.S. Appl. No. 15/435,078 Notice of Allowance dated Aug. 21, 2019.
U.S. Appl. No. 15/435,078 Notice of Allowance dated Jul. 10, 2019.
U.S. Appl. No. 15/435,078 Notice of Allowance dated May 20, 2019.
U.S. Appl. No. 15/435,078 Office Action dated Aug. 16, 2018.
U.S. Appl. No. 15/435,078 Office Action dated Jan. 10, 2019.
U.S. Appl. No. 15/435,090 Office Action dated May 18, 2018.
U.S. Appl. No. 15/435,110 Notice of Allowance dated Dec. 20, 2018.
U.S. Appl. No. 15/436,558 Notice of Allowance dated Aug. 21, 2019.
U.S. Appl. No. 15/436,558 Office Action dated May 23, 2019.
U.S. Appl. No. 15/479,531 Office Action dated Jan. 9, 2019.
U.S. Appl. No. 15/490,219 Notice of Allowance dated Apr. 10, 2019.
U.S. Appl. No. 15/523,524 Office Action dated Jun. 7, 2019.
U.S. Appl. No. 15/614,979 Office Action dated Nov. 5, 2018.
U.S. Appl. No. 15/615,004 Office Action dated Jun. 8, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,228 Office Action dated Jun. 14, 2018.
U.S. Appl. No. 15/634,267 Notice of Allowance dated Dec. 28, 2018.
U.S. Appl. No. 15/634,666 Office Action dated Oct. 18, 2018.
U.S. Appl. No. 15/634,727 Notice of Allowance dated Feb. 7, 2019.
U.S. Appl. No. 15/634,727 Office Action dated May 25, 2018.
U.S. Appl. No. 15/719,084 Office Action dated Feb. 8, 2019.
"Active", definition by the Merriam-Webster dictionary at https://www.merriam-webster.com/dictionary/active published Nov. 3, 2017. 9 pages.
"Passive", definition by the Merriam-Webster dictionary at https://www.merriam-webster.com/dictionary/passive?pronunciation&lang=en_us&dir=p&file=passiv03 first viewed Aug. 16, 2022. 9 pages.
Adam, et al. Design for additive manufacturing—element transitions and aggregated structures. CIRP Journal of Manufacturing Science and Technology. Nov. 2014; 7:20-28.
Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.
Anusci, Victor. Aerosint Is Developing the First Commercial Multi-powder SLS 3d Printer. 3D Printing Media Network. Web. Published Jan. 28, 2018. 4 pages. URL: <https://www.3dprintingmedia.network/aerosint-multi-powder-SLS-3d-printer/.
Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.
Arcam EBM at Sirris Belgium. Uploaded Jun. 17, 2010. 2 pages. https://www.youtube.com/watch?v=nR7EtduqVYw&list=PLD7ckJoR_kR6uaOGOMlyJ1mpCKh3_42il_1.
Arnet et al. Extending Laser Bending for the Generation of Convex Shapes. Proc. Instn. Mech. Engrs., vol. 209, Dec. 1, 1995, pp. 433-442.
Ashby, Mike. Teach Yourself: Phase Diagrams and Phase Transformations. 5th Edition, Mar. 2009, Cambridge. 55 pages.
Barriobero-Vila et al. Inducing Stable a + p Microstructures during Selective Laser Melting of Ti—6Al—4V Using Intensified Intrinsic Heat Treatments. Materials (Basel). vol. 10, No. 3, Mar. 2017, 14 pages.
Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.
Bohnet, M. Advances in the Design of Pneumatic Conveyors. International Chemical Engineering, vol. 25, No. 3, Jul. 1985, pp. 387-405.
Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
Bremen et al. Selective Laser Melting. Laser Technik Journal 9(2); Apr. 2012. 6 pages.
Calvert, Jack G. Glossary of Atmospheric Chemistry Terms (Recommendations 1990). Pure &Appl. Chem., vol. 62, No. 11, Jan. 1, 1990, pp. 2167-2219.
Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.
Childs, et al. Raster scan of selective laser melting of the surface layer of a tool steel powder bed. Proc. IMechE. Jan. 26, 2005; vol. 219, Part B, pp. 379-384.
Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.
Chivel, et al. On-line temperature monitoring in selective laser sintering/melting. Physics Procedia. Dec. 31, 2010; (5):515-521.

(56) References Cited

OTHER PUBLICATIONS

Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.
Co-pending International PCT Patent Application No. PCT/US17/39422, filed Jun. 27, 2017. 3 pages.
Co-pending PCT patent application No. PCT/US2019/024402, filed on Mar. 27, 2019.
Co-pending U.S. Appl. No. 14/967,118, filed Dec. 11, 2015. 7 pages.
Co-pending U.S. Appl. No. 15/085,884, filed Mar. 30, 2016. 9 pages.
Co-pending U.S. Appl. No. 15/188,885, filed Jun. 21, 2016. 10 pages.
Co-pending U.S. Appl. No. 15/188,939, filed Jun. 21, 2016. 9 pages.
Co-pending U.S. Appl. No. 15/288,251, filed Oct. 7, 2016. 9 pages.
Co-pending U.S. Appl. No. 15/339,712, filed Oct. 31, 2016. 19 pages.
Co-pending U.S. Appl. No. 15/339,759, filed Oct. 31, 2016. 150 pages.
Co-pending U.S. Appl. No. 15/339,775, filed Oct. 31, 2016. 148 pages.
Co-pending U.S. Appl. No. 15/374,318, filed Dec. 9, 2016. 188 pages.
Co-pending U.S. Appl. No. 15/374,442, filed Dec. 9, 2016. 189 pages.
Co-pending U.S. Appl. No. 15/374,535, filed Dec. 9, 2016. 189 pages.
Co-pending U.S. Appl. No. 15/374,616, filed Dec. 9, 2016. 188 pages.
Co-pending U.S. Appl. No. 15/374,821, filed Dec. 9, 2016. 30 pages.
Co-pending U.S. Appl. No. 15/399,186, filed Jan. 5, 2017. 214 pages.
Co-pending U.S. Appl. No. 15/435,065, filed Feb. 16, 2017. 223 pages.
Co-pending U.S. Appl. No. 15/435,078, filed Feb. 16, 2017. 224 pages.
Co-pending U.S. Appl. No. 15/435,090, filed Feb. 16, 2017. 223 pages.
Co-pending U.S. Appl. No. 15/435,110, filed Feb. 16, 2017. 223 pages.
Co-pending U.S. Appl. No. 15/435,120, filed Feb. 16, 2017. 222 pages.
Co-pending U.S. Appl. No. 15/435,128, filed Feb. 16, 2017. 223 pages.
Co-pending U.S. Appl. No. 15/436,558, filed Feb. 17, 2017. 212 pages.
Co-pending U.S. Appl. No. 15/490,219, filed Apr. 18, 2017. 10 pages.
Co-pending U.S. Appl. No. 15/614,979, filed Jun. 6, 2017. 8 pages.
Co-pending U.S. Appl. No. 15/615,004, filed Jun. 6, 2017. 8 pages.
Co-pending U.S. Appl. No. 15/615,029, filed Jun. 6, 2017.
Co-pending U.S. Appl. No. 15/634,228, filed Jun. 27, 2017.
Co-pending U.S. Appl. No. 15/634,267, filed Jun. 27, 2017.
Co-pending U.S. Appl. No. 15/634,666, filed Jun. 27, 2017.
Co-pending U.S. Appl. No. 16/686,045, inventors Lappas; Tasso et al., filed Nov. 15, 2019. 166 pages.
Co-pending U.S. Appl. No. 16/694,963, inventors Buller; Benyamin et al., filed Nov. 25, 2019. 210 pages.
Co-pending U.S. Appl. No. 16/709,887, inventors Buller; Benyamin et al., filed Dec. 10, 2019. 232 pages.
Co-pending U.S. Appl. No. 16/714,638, inventors Buller; Benyamin et al., filed Dec. 13, 2019. 219 pages.
Co-pending U.S. Appl. No. 16/716,414, inventors Buller; Benyamin et al., filed Dec. 16, 2019. 220 pages.
Co-pending U.S. Appl. No. 16/719,679, inventors Buller; Benyamin et al., filed Dec. 18, 2019. 212 pages.
Co-pending U.S. Appl. No. 16/749,430, inventors Milshtein; Erel et al., filed Jan. 22, 2020. 226 pages.
Co-pending U.S. Appl. No. 16/749,899, filed Jan. 22, 2020. 46 pages.
Co-pending U.S. Appl. No. 16/783,490, inventors Buller; Benyamin et al., filed Feb. 6, 2020. 212 pages.
Co-pending U.S. Appl. No. 16/789,905, inventors Buller; Benyamin et al., filed Feb. 13, 2020. 160 pages.
Co-pending U.S. Appl. No. 16/790,129, inventors Romano; Richard Joseph et al., filed Feb. 13, 2020. 220 pages.
Co-pending U.S. Appl. No. 16/793,257, inventor Buller; Benyamin, filed Feb. 18, 2020. 158 pages.
Co-pending U.S. Appl. No. 16/820,459, inventors Buller; Benyamin et al., filed Mar. 16, 2020. 221 pages.
Co-pending U.S. Appl. No. 16/825,696, inventors Lappas; Tasso et al., filed Mar. 20, 2020. 166 pages.
Co-pending U.S. Appl. No. 16/841,161, inventors Buller; Benyamin et al., filed Apr. 6, 2020. 231 pages.
Co-pending U.S. Appl. No. 16/843,725, inventors Buller; Benyamin et al., filed Apr. 8, 2020. 221 pages.
Co-pending U.S. Appl. No. 16/846,058, inventors Buller; Benyamin et al., filed Apr. 10, 2020. 211 pages.
Co-pending U.S. Appl. No. 16/857,453, inventors Buller; Benyamin et al., filed Apr. 24, 2020. 210 pages.
Co-pending U.S. Appl. No. 16/866,949, inventors Milshtein; Erel et al., filed May 5, 2020. 227 pages.
Co-pending U.S. Appl. No. 16/872,646, inventors Buller; Benyamin et al., filed May 12, 2020. 46 pages.
Co-pending U.S. Appl. No. 16/872,714, inventors Buller; Benyamin et al., filed May 12, 2020. 196 pages.
Co-pending U.S. Appl. No. 16/876,608, filed May 18, 2020. 155 pages.
Co-pending U.S. Appl. No. 16/877,029, filed May 18, 2020. 213 pages.
Co-pending U.S. Appl. No. 16/883,262, inventors Buller; Benyamin et al., filed May 26, 2020. 160 pages.
Co-pending U.S. Appl. No. 16/890,895, inventor Buller; Benyamin, filed Jun. 2, 2020. 158 pages.
Co-pending U.S. Appl. No. 16/917,927, inventors Buller; Benyamin et al., filed Jul. 1, 2020. 222 pages.
Co-pending U.S. Appl. No. 16/917,933, filed Jul. 1, 2020. 166 pages.
Co-pending U.S. Appl. No. 16/917,937, inventors Buller; Benyamin et al., filed Jul. 1, 2020. 210 pages.
Co-pending U.S. Appl. No. 16/933,188, inventors Christiansen; Daniel et al., filed Jul. 20, 2020. 202 pages.
Co-pending U.S. Appl. No. 16/939,847, inventors Buller; Benyamin et al., filed Jul. 27, 2020. 148 pages.
Co-pending U.S. Appl. No. 17/009,608, inventors Buller; Benyamin et al., filed Sep. 1, 2020. 155 pages.
Co-pending U.S. Appl. No. 17/011,950, inventors Buller; Benyamin et al., filed Sep. 3, 2020. 160 pages.
Co-pending U.S. Appl. No. 17/020,714, filed Sep. 14, 2020. 47 pages.
Co-pending U.S. Appl. No. 17/022,334, filed Sep. 16, 2020. 161 pages.
Co-pending U.S. Appl. No. 29/653,429, inventors Coulier; Pieter et al., filed Jun. 14, 2018. 63 pages.
Co-pending U.S. Appl. No. 16/253,103, filed Jan. 21, 2019. 10 pages.
Co-pending U.S. Appl. No. 16/578,190, filed Sep. 20, 2019.
Co-pending U.S. Appl. No. 16/590,868, filed Oct. 2, 2019.
Co-pending U.S. Appl. No. 16/716,414, filed Dec. 16, 2019.
Co-pending U.S. Appl. No. 16/749,430, filed Jan. 22, 2020.
Co-pending U.S. Appl. No. 16/749,899, filed Jan. 22, 2020.
Co-pending U.S. Appl. No. 16/790, 129, filed Feb. 13, 2020.
Co-pending U.S. Appl. No. 16/843,725, filed Apr. 8, 2020. 10 pages.
Co-pending U.S. Appl. No. 16/857,453, filed Apr. 24, 2020. 10 pages.
Co-pending U.S. Appl. No. 16/872,646, filed May 12, 2020. 9 pages.
Co-pending U.S. Appl. No. 16/917,927, filed Jul. 1, 2020. 10 pages.
Co-pending U.S. Appl. No. 17/020,714, filed Sep. 14, 2020. 8 pages.
Co-pending U.S. Appl. No. 15/435,110, filed Feb. 16, 2017.
Co-pending U.S. Appl. No. 15/435,120, filed Feb. 16, 2017.

(56) References Cited

OTHER PUBLICATIONS

Co-pending U.S. Appl. No. 15/435,128, filed Feb. 16, 2017.
3D Printers. 3D Systems, https://www.3dsystems.com/3d-printers. Web page cached Jun. 23, 2013.7 pages.
3D Systems, DMP Factory 350 and DMP Factory 350 Dual, Google shows that this page was cached on Nov. 13, 2018, https://www.3dsystems.com/3d-printers/dmp-factory-350, 13 pages.
B. Baufeld, E. Brandl, and O. Van der Biest: J. Mater. Process. Technol., 2011, vol. 211, pp. 1146-1158.
B. Baufeld, O. van der Biest, R. Gault, Mater. Des. 2010, 31, 106.
B. Gorny, T. Niendorf, J. Lackmann, M. Thoene, T. Troester, and H. J. Maier: Mater. Sci. Eng. A, 2011, vol. A528, pp. 7962-7967.
Bansal et al., "Experimental and theoretical analysis of scanning laser epitaxy applied to nickel-based superalloys", 2011, 8 pages.
Co-pending U.S. Appl. No. 15/634,727, filed Jun. 27, 2017.
Co-pending U.S. Appl. No. 16/516,148, inventors Symeonidis; Kimon et al., filed Jul. 18, 2019.
Co-pending U.S. Appl. No. 16/557,965, inventors Symeonidis; Kimon et al., filed Aug. 30, 2019.
Co-pending U.S. Appl. No. 16/696,094, inventors Symeonidis; Kimon et al., filed Nov. 26, 2019.
Co-pending U.S. Appl. No. 16/721,294, inventors Symeonidis; Kimon et al., filed Dec. 19, 2019.
Co-pending U.S. Appl. No. 16/820,493, inventors Symeonidis; Kimon et al., filed Mar. 16, 2020.
Co-pending U.S. Appl. No. 17/849,866, inventors Buller; Benyamin et al., filed Jun. 27, 2022.
Co-pending U.S. Appl. No. 17/861,015, inventors Buller; Benyamin et al., filed Jul. 8, 2022.
E. Yasa and J. P. Kruth: Process Eng., 2011, vol. 19, pp. 389-395.
EP17156707.6 EP Office Action dated Apr. 29, 2020.
EP21185947.5 Extended European Search Report dated Jan. 21, 2022.
Extended European Search Report, EP 13194232.8, SLM Solutions GmbH, dated Mar. 17, 2014.
F. Brenne, T. Niendorf, H. J. Maier, J. Mater. Proc. Technol. 2013, 213, 1558.
F. Liu, X. Lin,, C. Huang, M. Song, J. Chen, W. Huan, and F. Liu: J. Alloys Comp., 2011, vol. 509, pp. 4505-4509.
FIT AG & SLM Solutions (German)—YouTube, published Nov. 16, 2016, URL: https://www.youtube.com/watch?v=xOoRL_IHfcg.
Flashforge Adventurer 3C FDM 3D Printer, https://www.flashforgeshop.com/product/flashforge-adventurer-3c-3d-printer?cID=31. Webpage https://www.flashforgeshop.com/product/flashforge-adventurer-3c-3d-printer?cID=31 cached Nov. 8, 2019. 13 pages.
G. N. Levy, R. Schindel, and J. P. Kruth: CIRP Ann. Manuf. Technol., 2003, vol. 52, pp. 589-609.
GE Additive, Concept Laser M2 Series 5, According to the wayback machine, this page was first crawled May 29, 2020; the related press release was on Nov. 19, 2019: https://www.ge.com/additive/press-releases/ge-additive-unveils-new-concept-laser-m2-series-5; https://www.ge.com/additive/additive-manufacturing/machines/m2series5.
Gebhardt. Generative Fertigungsverfahren: Rapid Prototyping—Rapid Tooling—Rapid Manufacturing. Carl Hanser Verlag, Munchen, cover page, inside cover page, and p. 121 (2007). With English translation of p. 121. 5 pages total.
Gibson et al. Additive Manufacturing Technologies. Springer. Jan. 2010. 472 pages.
Glowforge 3D Laser Printer. Glowforge. https://glowforge.com/products. Sub-page first cached May 15, 2019. 17 pages.
Hubbard, ed. The Handbook of Surface Imaging and Visualization, cover sheets and pp. 39-40, CRC Press (1995).
Hunt , J.D. , "Steady State Columnar and Equiaxed Growth of Dendrites and Eutectic ," Materials Science and Engineering , 65 ( 1984 ) pp . 75-83 , Received Sep. 30, 1983 ( 9 pages ).
Ilschner , B. et al . , Werkstoffwissenschaften und Fertigungstechnik , Springer Verlag , 2010 , Chapter 7 , English Translated Title : Material Science and Production Technology , pp . 127-164 ( 39 pages ) . Please see Jul. 20 , 2010 First Online Date and partial English translation.
International Search Report and Written Opinion , PCT / EP2013 /053946 , SLM Solutions GmbH , dated Nov. 18, 2013.
International Search Report and Written Opinion issued in App. No. PCT/US2022/052322, dated Apr. 14, 2023, 10 pages.
International Search Report and Written Opinion, Application No. PCT/US2022/052902, dated Dec. 14, 2022.
International Search Report issued in App. No. PCT/US2022/051107, dated Apr. 7, 2023, 13 pages.
International Search Report issued in App. No. PCT/US2022/051736, dated Apr. 10, 2023, 8 pages.
International Written Opinion, Application No. PCT/US2022/052902, dated Apr. 28, 2023.
J. Campbell: in Complete Casting Handbook, 2011, vol. 2, pp. 1013-1023. 10. Applied for patent, SLM Solutions GmbH, 2013.
L. E. Murr, S. M. Gaytan, A. Ceylan, E. Martinez, J. J. Martinez, D. H. Hernandez, B. I. Machado, D. A. Ramirez, F. Medina, S. Collins, and R. B. Wicker: Acta Mater., 2010, vol. 58, pp. 1887-1894.
L. E. Murr, S. M. Gaytan, D. A. Ramirez, E. Martinez, J. Hernandez, K. N. Amato, P. W. Shindo, F. R. Medina, R. B. Wicker, J. Mater. Sci. Technol. 2012, 28, 1.
L. Thijs, M. L. M. Sistiaga, R. Wauthle, Q. Xie, J. P. Kruth, J. Van Humbeeck, Acta Mater. 2013, 61, 4657.
Lore Thijs et al., "Fine-structured aluminium products with controllable texture by selective laser melting of pre-alloyed AlSi10Mg powder", Acta Materialia 61, 2013, 1809-1819.
Meiners, Dissertation, Direct selective laser sintering of one-component metallic materials, 1999. 266 pages.
Meiners. Direktes Selektives Laser Sintemn einkomponentiger metallischer Werkstoffe. Dissertation. Abstract Only (1999). Wth English translation.
Mercelis. Residual stresses in selective laser sintering and selective laser melting. Rapid Prototyping Journal, vol. 12, Issue 5, pp. 254-265 (2006).
Niendorf Thomas et al., "Labeling additively manufactured parts by micro structural gradation-advanced copy-proof design" submitted to Rapid Prototyping Journal, Sep. 2014.
Notification of Reasons for Refusal , JP2015-559427 , dated Aug. 23, 2016 , with partial translation , 15 pages.
Notification of the Second Office Action , CN201380073909.3 , dated Sep. 19, 2016 , with English translation of the substantial part of the Second Office Action , pages.
O. Rehme, Cellular Design for Laser Freeform Fabrication, PhD Thesis, Hamburg University of Technology, CuvillierVerlag, Goettingen, 2010.
Office Action dated Jan. 31, 2023 for Japanese Application No. 2021-204515, translation 2 pages.
Over , Christoph , Generative Fertigung von Bauteilen aus Werkzeugstahl X38CrMoV5-1 , und titan TiAl6V4 mit Selective Laser Melting , PhD Thesis , RWTH Aachen ( 74 pages ) . Date of Oral Examination : Jun. 18 , 2003. Please see partial English translation on pp. 136 to 139 ( 2 pages ).
PCT International Search Report and Written Opinion, Application No. PCT/US22/51453, dated May 26, 2023.
PCT International Search Report and Written Opinion, Application No. PCT/US23/21231, dated Oct. 17, 2023.
Betriebsanleitung (Operating Manual). Selective Laser Melting-Anlage. SLM® 125HL. SLM Solutions, pp. 1-6, pp. 43-49, 53, 68, 69, 84-87, and 92 (Jun. 1, 2015). 21 pages total. With English translation.
Mani et al., NISTIR 8036, "Measurement Science Needs for Real-time Control of Additive Manufacturing Power Bed Fusion Processes", National Institute of Standards and Technology (NIST), Feb. 2015, retrived Mar. 20, 2023, URL: http://nvlpubs.nist.gov/nistpubs/ir/2015/NIST.IR.8036.pdf.
Merriam-Webster. Definition of "for". Accessed Aug. 25, 2022 at URL:<https://www.merriam-webster.com/dictionary/for.
Niendorf et al., "The Deformation Behavior of Functionally Graded TWIP Steel under Monotonic Loading at Ambient Temperature", Material Res. Lett., 2013, vol. 1, No. 2, 96-101.

(56) References Cited

OTHER PUBLICATIONS

Notice of Allowance, U.S. Appl. No. 16/419,912, dated Feb. 24, 2023.
Office Action (Non-Final Rejection) dated Oct. 25, 2023 for U.S. Appl. No. 17/849,866.
Office Action (Non-Final Rejection) dated Oct. 25, 2023 for U.S. Appl. No. 17/991,878.
Office Action (Non-Final Rejection) dated Jan. 5, 2024 for U.S. Appl. No. 18/209,603.
PCT International Search Report and Written Opinion, Application No. PCT/US2022/051736, dated Apr. 10, 2023.
PCT International Search Report and Written Opinion, Application No. PCT/US2022/053881, dated Apr. 21, 2023.
Co-pending U.S. Appl. No. 18/197,158, filed May 15, 2023, Buller et al.
Co-pending U.S. Appl. No. 18/209,603, filed Jun. 14, 2023, Lappas et al.
Co-pending U.S. Appl. No. 18/221,471, filed Jul. 13, 2023, Milshtein et al.
Co-pending U.S. Appl. No. 18/225,184, filed Jul. 24, 2023, Buller et al.
Co-pending U.S. Appl. No. 18/234,032, filed Aug. 15, 2023, Buller et al.
Co-pending U.S. Appl. No. 18/238,496, filed Aug. 27, 2023, Buller et al.
Co-pending U.S. Appl. No. 18/244,366, filed Sep. 11, 2023, Buller et al.
Co-pending U.S. Appl. No. 18/235,942, filed Aug. 21, 2023, Buller et al.
Co-pending U.S. Appl. No. 18/539,704, filed Dec. 14, 2023, Tralongo et al.
P. Kanagarajah, F. Brenne, T. Niendorf, H. J. Maier, Mater. Sci. Eng. A 2013, A588, 188.
PCT/US2019/039909 International Search Report dated Oct. 23, 2019.
PCT/US2019/042637 International Search Report dated Nov. 6, 2019.
Renishaw, "RenAM 500 metal additive manufacturing (3D printing) systems", Google shows that it was first cached Nov. 17, 2021, https://www.renishaw.com/en/renam-500-metal-additive-manufacturing-3d-printing-systems--37011, 9 pages.
S. Leuders, M. Thoene, A. Riemer, T. Niendorf, T. Treoster, H. A. Richard, H. J. Maier, Int. J. Fatigue 2013, 48, 300.
SLM Solutions GmbH, Operating Manual, Selective Laser Melting System, SLM 125, 2015.
SLM Solutions, Bugatti Chiron Titanium brake caliper 3D printed on SLM Solutions—YouTube, published Feb. 8, 2018, URL: https://www.youtube.com/watch?v=SRA5CFLYKUQ.
SLM Solutions, NXG XII 600 Digital Launch—YouTube, published Mar. 11, 2021, URL: https://www.youtube.com/watch?v=cPckZZTO1fc.
SLM Solutions, NXG XII 600 Digital Launch—YouTube, published Jun. 23, 2021, URL: https://freefloat.slm-solutions.com/.
SLM Solutions, NXG XII 600, publication date Oct. 15, 2020, URL: https://www.sim-pushing-the-limits.com/.
SLM Solutions, SLM 280 2.0, Google shows that it was first cached Nov. 14, 2016, https://www.sim-solutions.com/products-and-solutions/machines/slm-280/, 7 pages.
SLM®—Selective Laser Melting Technology—The Elements (english)—YouTube, published Nov. 23, 2017, URL: https://www.youtube.com/watch?v=R5WCyafMPLs.
Sloan, Jeff. Tidal turbine blade toughened for turbulent sea salt, CompositesWorld (Nov. 30, 2012). Retrieved web page archived Jan. 16, 2013. Retrieved on Apr. 9, 2020 from https://web.archive.org/web/20130116115034/https ://www. compositesworld.com/articles/tidal-turbine-blade-toughened-for-turbulent-salt-sea. 7 pages.
State Intellectual Property Office of P.R. China , First Office Action , CN201380073909.3 , dated Mar. 28, 2016 , 12 pages . See English Translation Attached.
T. Niendorf, F. Brenne, M. Schaper, Metall. Mater Trans. B 2014, submitted.
T. Niendorf, F. Brenne, Mater. Charact. 2013, 85, 57.
T. Niendorf, J. Dadda, D. Canadinc, H. J. Maier, I. Karaman, Mater. Sci. Eng. A 2009, A517, 225.
Third Party Observations concerning the International Application PCT/US2021/035350, published as WO 2021/247640, dated Dec. 8, 2022. 6 pages.
Thomas Niendorf et al., "Functionally Graded Alloys Obtained by Additive Manufacturing", Advanced Engineering Materials 2014, 16, No. 7, 5 pages.
Thomas Niendorf et al., "Highly Anisotropic Steel Processed by Selective Laser Melting", Metallurgical and Materials Transactions, vol. 44B, Aug. 2013, 5 pages.
U.S. Appl. No. 15/909,396 Office Action dated Aug. 22, 2019.
U.S. Appl. No. 15/909,396 Office Action dated Mar. 5, 2020.
U.S. Appl. No. 15/909,783 Ex Parte Quayle dated Apr. 29, 2020.
U.S. Appl. No. 15/909,783 Notice of Allowance dated Oct. 26, 2020.
U.S. Appl. No. 16/125,644 Office Action dated Mar. 13, 2020.
U.S. Appl. No. 16/177,090 Office Action dated Apr. 13, 2020.
U.S. Appl. No. 16/419,912 Office Action dated Dec. 23, 2021.
U.S. Appl. No. 16/419,912 Office Action dated Jun. 22, 2022.
U.S. Appl. No. 16/419,912 Office Action dated Sep. 29, 2022.
U.S. Appl. No. 17/584,881 Office Action dated May 8, 2023.
U.S. Appl. No. 29/653,429 Office Action dated Apr. 9, 2021.
U.S. Appl. No. 29/653,429 Office Action dated Dec. 15, 2021.
U.S. Appl. No. 29/653,429 Office Action dated Jun. 9, 2022.
W. Cheng, F. Y. H. Fuh, A. Y. C. Nee, Y. S. Wong, H. T. Loh, T. Miyazawa, Rapid Prototyping J. 1995, 1, 12.
Co-pending U.S. Appl. No. 15/668,662, filed Aug. 3, 2017. 9 pages.
Co-pending U.S. Appl. No. 15/719,084, filed Sep. 28, 2017. 8 pages.
Co-pending U.S. Appl. No. 15/719,133, filed Sep. 28, 2017. 9 pages.
Co-pending U.S. Appl. No. 15/719,229, filed Sep. 28, 2017. 9 pages.
Co-pending U.S. Appl. No. 15/788,364, filed Oct. 19, 2017. 9 pages.
Co-pending U.S. Appl. No. 15/788,418, filed Oct. 19, 2017. 9 pages.
Co-pending U.S. Appl. No. 15/788,463, filed Oct. 19, 2017. 9 pages.
Co-pending U.S. Appl. No. 15/788,495, filed Oct. 19, 2017. 9 pages.
Co-pending U.S. Appl. No. 15/788,532, filed Oct. 19, 2017. 9 pages.
Co-pending U.S. Appl. No. 15/788,568, filed Oct. 19, 2017. 9 pages.
Co-pending U.S. Appl. No. 15/788,662, filed Oct. 19, 2017. 9 pages.
Co-pending U.S. Appl. No. 15/803,675, filed Nov. 3, 2017. 11 pages.
Co-pending U.S. Appl. No. 15/803,683, filed Nov. 3, 2017. 10 pages.
Co-pending U.S. Appl. No. 15/803,686, filed Nov. 3, 2017. 9 pages.
Co-pending U.S. Appl. No. 15/803,688, filed Nov. 3, 2017. 9 pages.
Co-pending U.S. Appl. No. 15/803,692, filed Nov. 3, 2017. 9 pages.
Co-pending U.S. Appl. No. 15/808,434, filed Nov. 9, 2017. 10 pages.
Co-pending U.S. Appl. No. 15/808,777, filed Nov. 9, 2017. 9 pages.
Co-pending U.S. Appl. No. 15/830,421, filed Dec. 4, 2017. 9 pages.
Co-pending U.S. Appl. No. 15/830,470, filed Dec. 4, 2017. 9 pages.
Co-pending U.S. Appl. No. 15/853,700, filed Dec. 22, 2017. 9 pages.
Co-pending U.S. Appl. No. 15/855,744, filed Dec. 27, 2017. 8 pages.
Co-pending U.S. Appl. No. 15/861,544, filed Jan. 3, 2018. 9 pages.
Co-pending U.S. Appl. No. 15/861,548, filed Jan. 3, 2018. 9 pages.
Co-pending U.S. Appl. No. 15/861,553, filed Jan. 3, 2018. 9 pages.
Co-pending U.S. Appl. No. 15/861,561, filed Jan. 3, 2018. 8 pages.
Co-pending U.S. Appl. No. 15/870,561, filed Jan. 12, 2018. 9 pages.
Co-pending U.S. Appl. No. 15/871,763, filed Jan. 15, 2018. 8 pages.
Co-pending U.S. Appl. No. 15/873,832, filed Jan. 17, 2018. 10 pages.
Co-pending U.S. Appl. No. 15/886,544, filed Feb. 1, 2018. 8 pages.
Co-pending U.S. Appl. No. 15/893,523, filed Feb. 9, 2018. 9 pages.
Co-pending U.S. Appl. No. 15/909,388, filed Mar. 1, 2018. 10 pages.
Co-pending U.S. Appl. No. 15/909,396, filed Mar. 1, 2018. 9 pages.
Co-pending U.S. Appl. No. 15/909,406, filed Mar. 1, 2018. 10 pages.
Co-pending U.S. Appl. No. 15/909,783, filed Mar. 1, 2018. 9 pages.

(56) References Cited

OTHER PUBLICATIONS

Co-pending U.S. Appl. No. 15/909,784, filed Mar. 1, 2018. 11 pages.
Co-pending U.S. Appl. No. 15/909,806, filed Mar. 1, 2018. 9 pages.
Co-pending U.S. Appl. No. 15/909,809, filed Mar. 1, 2018. 9 pages.
Co-pending U.S. Appl. No. 15/909,826, filed Mar. 1, 2018. 11 pages.
Co-pending U.S. Appl. No. 15/937,778, filed Mar. 27, 2018.
Co-pending U.S. Appl. No. 15/937,790, filed Mar. 27, 2018.
Co-pending U.S. Appl. No. 15/937,798, filed Mar. 27, 2018.
Co-pending U.S. Appl. No. 15/937,812, filed Mar. 27, 2018.
Co-pending U.S. Appl. No. 15/937,817, filed Mar. 27, 2018.
Co-pending U.S. Appl. No. 16/030,795, filed Jul. 9, 2018. 10 pages.
Co-pending U.S. Appl. No. 16/031,896, filed Jul. 10, 2018. 10 pages.
Co-pending U.S. Appl. No. 16/125,644, filed Sep. 7, 2018. 10 pages.
Co-pending U.S. Appl. No. 16/137,295, filed Sep. 20, 2018. 8 pages.
Co-pending U.S. Appl. No. 16/177,090, filed Oct. 31, 2018. 11 pages.
Co-pending U.S. Appl. No. 16/183,557, filed Nov. 7, 2018. 9 pages.
Office action dated Jul. 1, 2016 for U.S. Appl. No. 14/745,032. 10 pages.
Office Action dated Jul. 3, 2017 for U.S. Appl. No. 15/435, 120. 47 pages.
Office action dated Jul. 19, 2016 for U.S. Appl. No. 15/085,884. 25 pages.
Office action dated Jul. 21, 2016 for U.S. Appl. No. 14/744,910. 14 pages.
Office Action dated Jul. 28, 2017 for U.S. Appl. No. 14/744,988. 14 pages.
Office Action dated Aug. 2, 2017 for U.S. Appl. No. 15/435,090. 52 pages.
Office Action dated Aug. 18, 2017 for U.S. Appl. No. 15/374,318. 58 pages.
Office action dated Aug. 25, 2016 for U.S. Appl. No. 14/744,988. 16 pages.
Office Action dated Aug. 25, 2017 for U.S. Appl. No. 15/339,712. 19 pages.
Office action dated Sep. 10, 2015 for U.S. Appl. No. 14/744,675. 15 pages.
Office Action dated Sep. 11, 2017 for U.S. Appl. No. 15/374,821. 30 pages.
Office action dated Sep. 13, 2016 for U.S. Appl. No. 15/188,939. 7 pages.
Office Action dated Sep. 15, 2017 for U.S. Appl. No. 15/374,616. 34 pages.
Office Action dated Sep. 18, 2017 for U.S. Appl. No. 15/634,228. 18 pages.
Office action dated Oct. 2, 2015 for U.S. Appl. No. 14/744,955. 6 pages.
Office Action dated Oct. 19, 2017 for U.S. Appl. No. 15/399,186. 36 pages.
Office action dated Nov. 12, 2015 for U.S. Appl. No. 14/745,108. 15 pages.
Office Action dated Nov. 16, 2017 for U.S. Appl. No. 15/634,267. 57 pages.
Office action dated Nov. 18, 2016 for U.S. Appl. No. 15/188,939. 7 pages.
Office Action dated Nov. 27, 2017 for U.S. Appl. No. 15/374,318. 17 pages.
Office Action dated Dec. 8, 2017 for U.S. Appl. No. 15/435,090. 6 pages.
Office Action dated Dec. 15, 2017 for U.S. Appl. No. 15/435,110. 74 pages.
Office Action dated Apr. 28, 2017 for U.S. Appl. No. 15/374,616. 22 pages.
Office Action dated Aug. 18, 2017 for U.S. Appl. No. 15/374,318. 10 pages.
Office Action dated Aug. 2, 2017 for U.S. Appl. No. 15/435,090. 6 pages.
Office action dated Aug. 25, 2016 for U.S. Appl. No. 14/744,988. 17 pages.
Office Action dated Aug. 25, 2017 for U.S. Appl. No. 15/339,712. 7 pages.
Office Action dated Dec. 15, 2017 for U.S. Appl. No. 15/435, 110. 20 pages.
Office Action dated Dec. 8, 2017 for U.S. Appl. No. 15/435,090. 17 pages.
Office action dated Feb. 10, 2016 for U.S. Appl. No. 14/744,910. 17 pages.
Office Action dated Feb. 14, 2018 for U.S. Appl. No. 15/634,228. 28 pages.
Office Action dated Feb. 7, 2017 for U.S. Appl. No. 14/744,988. 6 pages.
Office Action dated Feb. 7, 2018 for U.S. Appl. No. 15/614,979. 12 pages.
Office Action dated Feb. 8, 2017 for U.S. Appl. No. 14/744,859. 12 pages.
Office action dated Jan. 11, 2016 for U.S. Appl. No. 14/745,032. 22 pages.
Office Action dated Jan. 2, 2018 for U.S. Appl. No. 15/288,251. 30 pages.
Office Action dated Jan. 24, 2018 for U.S. Appl. No. 15/615,004. 16 pages.
Office Action dated Jan. 25, 2018 for U.S. Appl. No. 15/634,727. 9 pages.
Office action dated Jan. 7, 2016 for U.S. Appl. No. 14/744,859. 20 pages.
Office action dated Jul. 19, 2016 for U.S. Appl. No. 15/085,884. 26 pages.
Office action dated Jul. 21, 2016 for U.S. Appl. No. 14/744,910. 15 pages.
Office Action dated Jul. 28, 2017 for U.S. Appl. No. 14/744,988. 13 pages.
Office Action dated Jul. 3, 2017 for U.S. Appl. No. 15/435, 120. 6 pages.
Office Action dated Jun. 15, 2017 for U.S. Appl. No. 15/288,251. 13 pages.
Office action dated Jun. 29, 2016 for U.S. Appl. No. 14/744,859. 16 pages.
Office action dated Mar. 10, 2016 for U.S. Appl. No. 14/744,675. 15 pages.
Co-pending U.S. Appl. No. 16/195,810, filed Nov. 19, 2018. 10 pages.
Co-pending U.S. Appl. No. 16/245,183, filed Jan. 10, 2019. 9 pages.
Co-pending U.S. Appl. No. 16/248,665, filed Jan. 15, 2019. 8 pages.
Co-pending U.S. Appl. No. 16/291,759, filed Mar. 4, 2019. 37 pages.
Co-pending U.S. Appl. No. 16/351,030, filed Mar. 12, 2019. 202 pages.
Co-pending U.S. Appl. No. 16/404,579, filed May 6, 2019. 9 pages.
Co-pending U.S. Appl. No. 16/419,912, filed May 22, 2019. 10 pages.
Co-pending U.S. Appl. No. 16/439,614, filed Jun. 12, 2019. 217 pages.
Co-pending U.S. Appl. No. 16/449,965, filed Jun. 24, 2019. 37 pages.
Co-pending U.S. Appl. No. 16/450,853, filed Jun. 24, 2019. 202 pages.
Co-pending U.S. Appl. No. 16/505,520, filed Jul. 8, 2019. 149 pages.
Co-pending U.S. Appl. No. 16/506,911, filed Jul. 9, 2019. 209 pages.
Co-pending U.S. Appl. No. 16/542,208, filed Aug. 15, 2019. 52 pages.
Co-pending U.S. Appl. No. 16/550,088, filed Aug. 23, 2019.
Co-pending U.S. Appl. No. 16/591,549, filed Oct. 2, 2019.
Co-pending U.S. Appl. No. 16/653,933, filed Oct. 15, 2019.
Co-pending U.S. Appl. No. 16/662,764, filed Oct. 24, 2019.
Co-pending U.S. Appl. No. 16/662,933, filed Oct. 24, 2019.
Co-pending U.S. Appl. No. 16/686,045, filed Nov. 15, 2019.
Co-pending U.S. Appl. No. 16/694,963, filed Nov. 25, 2019.
Co-pending U.S. Appl. No. 16/709,887, filed Dec. 10, 2019.

(56) References Cited

OTHER PUBLICATIONS

Co-pending U.S. Appl. No. 16/714,638, filed Dec. 13, 2019.
Co-pending U.S. Appl. No. 16/719,679, filed Dec. 18, 2019.
Co-pending U.S. Appl. No. 16/783,490, filed Feb. 6, 2020.
Co-pending U.S. Appl. No. 16/789,905, filed Feb. 13, 2020.
Co-pending U.S. Appl. No. 16/820,459, filed Mar. 16, 2020.
Co-pending U.S. Appl. No. 16/825,696, filed Mar. 20, 2020.
Co-pending U.S. Appl. No. 29/653,429, filed Jun. 14, 2018.
Co-pending U.S. Appl. No. 16/137,295, inventor Buller; Benyamin, filed Sep. 20, 2018. 51 pages.
Co-pending U.S. Appl. No. 16/248,665, inventor Buller; Benyamin, filed Jan. 15, 2019. 52 pages.
Co-pending U.S. Appl. No. 16/253,103, inventor Buller; Benyamin, filed Jan. 21, 2019. 195 pages.
Co-pending U.S. Appl. No. 16/291,759, inventors Buller; Benyamin et al., filed Mar. 4, 2019. 37 pages.
Co-pending U.S. Appl. No. 16/351,030, inventors Buller; Benyamin et al., filed Mar. 12, 2019. 202 pages.
Co-pending U.S. Appl. No. 16/431,232, inventor Buller; Benyamin, filed Jun. 4, 2019. 148 pages.
Co-pending U.S. Appl. No. 16/439,614, inventors Milshtein; Erel et al., filed Jun. 12, 2019. 217 pages.
Co-pending U.S. Appl. No. 16/449,965, inventor Buller; Benyamin, filed Jun. 24, 2019. 37 pages.
Co-pending U.S. Appl. No. 16/450,853, inventors Buller; Benyamin et al., filed Jun. 24, 2019. 202 pages.
Co-pending U.S. Appl. No. 16/505,520, inventor Buller; Benyamin, filed Jul. 8, 2019. 149 pages.
Co-pending U.S. Appl. No. 16/506,911, inventor Romano; Richard Joseph, filed Jul. 9, 2019. 209 pages.
Co-pending U.S. Appl. No. 16/542,208, inventors Buller; Benyamin et al., filed Aug. 15, 2019. 52 pages.
Co-pending U.S. Appl. No. 16/550,088, inventors Buller; Benyamin et al., filed Aug. 23, 2019. 222 pages.
Co-pending U.S. Appl. No. 16/578,190, inventors Milshtein; Erel et al., filed Sep. 20, 2019. 217 pages.
Co-pending U.S. Appl. No. 16/586,849, inventor Buller; Benyamin, filed Sep. 27, 2019. 149 pages.
Co-pending U.S. Appl. No. 16/590,868, filed Oct. 2, 2019. 37 pages.
Co-pending U.S. Appl. No. 16/591,549, inventors Buller; Benyamin et al., filed Oct. 2, 2019. 194 pages.
Co-pending U.S. Appl. No. 16/653,933, inventors Buller; Benyamin et al., filed Oct. 15, 2019. 203 pages.
Co-pending U.S. Appl. No. 16/662,764, inventors Buller; Benyamin et al., filed Oct. 24, 2019. 149 bages.
Kannatey-Asibu Jr, Elijah. Principles of laser materials processing. John Wiley & Sons, 2009, Chapter 10, pp. 231-405. Published: Apr. 20, 2009.
Kannatey-Asibu Jr, Elijah. Principles of laser materials processing. John Wiley & Sons, 2009, Chapter 16, pp. 502-668. Published: Apr. 20, 2009.
Kant et al. An integrated FEM-ANN model for laser bending process with inverse estimation of absorptivity. Mechanics of Advanced Materials and Modern Processes. Dec. 2015, vol. 1, No. 6, 12 pages.
Kopeliovich, Dmitri. Electropolishing. SubsTech: Substances & Technologies. Web Article. Dec. 14, 2013. Printed Jan. 13, 2019. 5 pages. URL:< http://www.substech.com/dokuwiki/doku.php?id=electropolishing.
Kruth, et al. Feedback control of selective laser melting. Proceedings of the 3rd International Conference on Advanced Research in Virtual and Rapid Prototyping, Leiria, Portugal, Sep. 2007. 521-527.
Kruth, et al. Selective laser melting of iron-based power. Journal of Materials Processing Technology. Nov. 2004; 149:616-622.
Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi: 10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1)7-13.
Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015). 4 pages.
Kumar. Powder deposition and sintering for a two-powder approach to solid freeform fabrication. Department of Mechanical Engineering, University of Florida. Aug. 1998; 169-173.
Laser Engineered Net Shaping (LENS) 850-R system overview. System features and example application video clips. Published Jun. 3, 2012. https://www.youtube.com/watch?v=mkUVURLkxS4. 2 pages.
Leirvag. Additive Manufacturing for Large Products. Feb. 2013, thesis. Norwegian University of Science and Technology. 76 pages.
Lu et al. Chapter 6: Metal-Based System via Laser Melting. Laser-Induced Materials and Processes for Rapid Prototyping. Kluwer Acad. Publ., USA, pp. 143-186 (2001).
Lyckfeldt. Powder rheology of steel powders for additive manufacturing. Swerea IVF. Oct. 24, 2013. 1 page.
Maji et al. Finite Element Analysis and Experimental Investigations on Laser Bending of AlSi304 Stainless Steel Sheet. Procedia Engineering 64, Dec. 2013, pp. 528-535.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Manzhirov, et al. Mathematical Modeling of Additive Manufacturing Technologies. Proc. of the World Congress of Engineering 2014, vol. II. WCE2014, Jul. 2-4, 2014, London, U.K. 6 pages.
Merriam-Webster. Definition of "reservoir". Retrieved Dec. 21, 2017. 13 pages. URL:<https://merriam-webster.com/dictionary/reservoir>. ?
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):369-395.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
NETFABB—Professional 5.2, User Manual, Netfabb GmbH 2014, Version: Jul. 29, 2014, Chapter 6: sections 6.1, 6.3, Chapter 7: section 7.7, Chapter 9: section 9.6. 237 pages.
Notice of Allowability dated Oct. 17, 2017 for U.S. Appl. No. 14/744,910. 6 pages.
Notice of Allowance (second) dated Apr. 6, 2017 for U.S. Appl. No. 15/339,759. 4 pages.
Notice of Allowance dated Jan. 12, 2018 for U.S. Appl. No. 15/435,128. 5 pages.
Notice of Allowance dated Feb. 6, 2018 for U.S. Appl. No. 15/374,821. 5 pages.
Notice of Allowance dated Feb. 16, 2018 for U.S. Appl. No. 15/435,120. 10 pages.
Notice of Allowance dated Feb. 28, 2018 for U.S. Appl. No. 15/374,821. 11 pages.

(56) References Cited

OTHER PUBLICATIONS

Notice of Allowance dated Mar. 16, 2017 for U.S. Appl. No. 15/339,775. 47 pages.
Notice of Allowance dated Mar. 20, 2017 for U.S. Appl. No. 15/339,759. 47 pages.
Notice of allowance dated May 25, 2016 for U.S. Appl. No. 14/744,675. 8 pages.
Notice of Allowance dated Aug. 7, 2017 for U.S. Appl. No. 14/744,910. 21 pages.
Notice of allowance dated Aug. 10, 2016 for U.S. Appl. No. 14/967,118. 6 pages.
Notice of allowance dated Sep. 17, 2015 for U.S. Appl. No. 14/745,081. 7 pages.

\* cited by examiner

MATERIAL MANIPULATION IN THREE-DIMENSIONAL PRINTING

CROSS REFERENCE TO RELATED APPLICATIONS

This application is a continuation of U.S. patent application Ser. No. 17/540,770 filed Dec. 2, 2021, which is a continuation of U.S. patent application Ser. No. 17/406,744 filed Aug. 19, 2021, which is a continuation of U.S. patent application Ser. No. 17/316,964 filed May 11, 2021, which is a continuation of U.S. patent application Ser. No. 17/140,819 filed Jan. 4, 2021 now ABN, which is a continuation of U.S. patent application Ser. No. 17/023,214 filed Sep. 16, 2020 now ABN, which is a continuation of U.S. patent application Ser. No. 16/895,334, filed Jun. 8, 2020 now ABN, which is a continuation of U.S. patent application Ser. No. 16/784,175, filed Feb. 6, 2020 now ABN, which is a continuation of U.S. patent application Ser. No. 16/657,980, filed October 18, 2019 now ABN, which is a continuation of U.S. patent application Ser. No. 15/937,798, filed Mar. 27, 2018, now U.S. Pat. No. 10,449,696, which claims the benefit of U.S. Provisional Patent Application Ser. No. 62/477,848, filed Mar. 28, 2017, each of which are entirely incorporated herein by reference.

BACKGROUND

Three-dimensional (3D) printing (e.g., additive manufacturing) is a process for making a three-dimensional object of any shape from a design. The design may be in the form of a data source such as an electronic data source, or may be in the form of a hard copy. The hard copy may be a two-dimensional representation of a 3D object. The data source may be an electronic 3D model. 3D printing may be accomplished through an additive process in which successive layers of material are laid down one on top of another. This process may be controlled (e.g., computer controlled, manually controlled, or both). A 3D printer can be an industrial robot.

3D printing can generate custom parts. A variety of materials can be used in a 3D printing process including elemental metal, metal alloy, ceramic, elemental carbon, or polymeric material. In some 3D printing processes (e.g., additive manufacturing), a first layer of hardened material is formed (e.g., by welding powder), and thereafter successive layers of hardened material are added one by one, wherein each new layer of hardened material is added on a pre-formed layer of hardened material, until the entire designed three-dimensional structure (3D object) is layer-wise materialized.

3D models may be created with a computer aided design package, via 3D scanner, or manually. The manual modeling process of preparing geometric data for 3D computer graphics may be similar to plastic arts, such as sculpting or animating. 3D scanning is a process of analyzing and collecting digital data on the shape and appearance of a real object (e.g., real-life object). Based on this data, 3D models of the scanned object can be produced.

A number of 3D printing processes are currently available. They may differ in the manner layers are deposited to create the materialized 3D structure (e.g., hardened 3D structure). They may vary in the material or materials that are used to materialize the designed 3D object. Some methods melt, sinter, or soften material to produce the layers that form the 3D object. Examples for 3D printing methods include selective laser melting (SLM), selective laser sintering (SLS), direct metal laser sintering (DMLS) or fused deposition modeling (FDM). Other methods cure liquid materials using different technologies such as stereo lithography (SLA). In the method of laminated object manufacturing (LOM), thin layers (made inter alia of paper, polymer, or metal) are cut to shape and joined together.

At times, during the process of dispensing pre-transformed (e.g., particulate) material as part of the 3D printing, the pre-transformed material may be dispensed in a discontinuous manner, or cease to be dispensed. For examples, there may be one or more intermissions in the conveyance of the pre-transformed material during the 3D printing. The intermissions(s) may be undesired. For example, the material dispenser may run out of pre-transformed material. For example, the material dispensing process may pause (e.g., stop) to refill the material dispenser. In some situations, it may be desired to diminish the number of (e.g., undesired) interruptions to the material dispensing process. At times, it may be desirable to facilitate a continuous movement (e.g., flow) of the pre-transformed material (e.g., to allow non-interrupted and/or smooth deposition). At times, it may be desirable to convey an excess amount of pre-transformed material (e.g., as a result of leveling, vacuuming, or unused material) to the material dispenser. At times, there may be an excess of material that is not used during the 3D printing. The excess of material may be recycled and/or reused during the 3D printing. In some embodiments, there may be a need for a conveyance system of the excess material to the material dispenser.

In some embodiments, material is supplied in bulk qualities. There may be a need for a conveyance system that conveys material to the material dispenser. The conveyance system may facilitate uninterrupted function of the material dispenser. The conveyance system may facilitate continuous flow of pre-transformed material to the material dispenser.

In some examples, it may be beneficial to transport pre-transformed material against gravity (e.g., in an upwards direction). For example, it may be beneficial to transport the pre-transformed material from a reservoir containing a large amount of pre-transformed material, against gravity to a reservoir containing a smaller amount of pre-transformed material. For example, it may be beneficial to keep large quantities of the pre-transformed material in a large reservoir disposed at a low elevation (e.g., relative to a position of the material dispenser) for ease of operation (e.g., handling), and/or safety consideration.

SUMMARY

In an aspect, the present disclosure comprises a transporting of pre-transformed material from a reservoir during a portion of the 3D printing process. The transporting may be against gravity.

In another aspect, a system for three-dimensional printing of at least one three-dimensional object comprises: a material dispenser that dispenses a pre-transformed material towards a platform; a first pressure container that is configured to contain the pre-transformed material, which first pressure container is operatively coupled to the material dispenser; a gas conveyor channel that is operatively coupled to the first pressure container; a material conveyor channel that is operatively coupled to the first pressure container, the gas conveyor channel, and the material dispenser; and at least one controller that is operatively coupled to the material dispenser, the first pressure container, the gas conveyor channel, and the material conveyor channel, which at least one controller is programmed to direct performance of the following operations: operation (i) direct insertion of at least one gas into the first pressure container, through the gas conveyor channel, to elevate the pressure in the pressure container, operation (ii) direct conveying of the pre-transformed material from the pressure container to the material dispenser through the material conveyor channel, as a result of an elevated pressure in the pressure container, operation (iii) direct dispensing of conveyed pre-transformed material towards the platform, and operation (iv) direct printing, during dispensing or after dispensing, of at least a portion of the at least one three-dimensional object, from the pre-transformed material.

In some embodiments, the system further comprises a second pressure container that is configured to contain the pre-transformed material, which second pressure container is operatively coupled to the material dispenser, and the material conveyor channel. In some embodiments, the at least one controller is programmed to direct performance of conveying the pre-transformed material from the second pressure container to the material dispenser. In some embodiments, conveying from the second pressure container comprises dense phase conveying. In some embodiments, the at least one controller is programmed to direct performance of alternatingly conveying the pre-transformed material to the material dispenser, from the first pressure container and from the second pressure container. In some embodiments, the at least one controller is programmed to direct performance of switching conveying from the first pressure container to the second pressure container. In some embodiments, at least two of operation (i), operation (ii), operation (iii), and operation (iv) are directed by the same controller. In some embodiments, the at least one controller is a plurality of controllers and wherein at least two of operation (i), operation (ii), operation (iii), and operation (iv) are directed by different controllers.

In another aspect, an apparatus for three-dimensional printing of at least one three-dimensional object comprises: a material dispenser that dispenses pre-transformed material towards a platform, which pre-transformed material is used to print at least a portion of the at least one three-dimensional object, wherein the print is after the dispensing or during the dispensing; a first pressure container that is configured to contain the pre-transformed material, which first pressure container is operatively coupled to the material dispenser; a first gas conveyor channel that is operatively coupled to the first pressure container, which first gas conveyor channel is configured to at least facilitate an insertion of at least one gas into the first pressure container, wherein the insertion can form an elevated pressure in the first pressure container; and a material conveyor channel that is operatively coupled to the first pressure container, the first gas conveyor channel, and the material dispenser, which material conveyor channel conveys pre-transformed material from the first pressure container to the material dispenser, on insertion of the at least one gas into the first pressure container to form the elevated pressure in the pressure container.

In some embodiments, elevated is relative to an ambient pressure. In some embodiments, the first pressure container is additionally configured to facilitate an extraction of the at least one gas from the first pressure container, wherein the extraction forms a reduced pressure in the first pressure container. In some embodiments, reduced is relative to an ambient pressure. In some embodiments, the apparatus further comprises a second pressure container that is configured to contain the pre-transformed material, which second pressure container is operatively coupled to the material dispenser, and the material conveyor channel. In some embodiments, the apparatus further comprises a second gas conveyor channel that is operatively coupled to the second pressure container, which second gas conveyor channel is configured to at least facilitate insertion of at least one gas into the second pressure container, wherein the insertion can form an elevated pressure in the second pressure container. In some embodiments, the second gas conveyor channel is different from the first gas conveyor channel. In some embodiments, the second gas conveyor channel is operatively coupled to the first gas conveyor channel. In some embodiments, the second gas conveyor channel is the same as the first gas conveyor channel. In some embodiments, at least a portion of the material conveyor channel is inserted into an interior of the first pressure container. In some embodiments, the material conveyor channel extends into an interior of the first pressure container. In some embodiments, the material conveyor channel comprises one or more boundaries that comprise a smooth internal surface, which smooth internal surface is configured to facilitate conveyance of the pre-transformed material. In some embodiments, the internal surface comprises a static dissipative surface. In some embodiments, the internal surface comprises a charge. In some embodiments, the charge is altered. In some embodiments, the charge is altered is during the conveyance of the pre-transformed material. In some embodiments, the apparatus further comprises a separator, which separator is operatively coupled to the material conveyor channel and the material dispenser, which separator is configured to at least partially separate the at least one gas from the pre-transformed material. In some embodiments, the apparatus further comprises a separator, which separator is operatively coupled to the material conveyor channel and a recycling mechanism, which separator is configured to at least partially separate the at least one gas from the pre-transformed material, wherein the recycling mechanism comprises an entrance port and/or an exit port In another aspect, an apparatus for three-dimensional printing of at least one three-dimensional object comprises at least one controller that is programmed to perform the following operations: operation (a) direct conveying of a pre-transformed material from a first pressure container to a material dispenser, which conveying comprises dense phase conveying; operation (b) direct dispensing of a conveyed pre-transformed material from the material dispenser towards a platform; and operation (c) direct printing of at least a portion of the at least one three-dimensional object from the pre-transformed material after the dispensing or during the dispensing.

In some embodiments, the at least two of operation (a), operation (b), and operation (c) are directed by the same controller. In some embodiments, the at least one controller is a plurality of controllers and wherein at least two of operation (a), operation (b), and operation (c) are directed by different controllers In another aspect, a method for printing at least one three-dimensional object comprises: a. conveying a pre-transformed material from a first pressure container to a material dispenser, which conveying comprises dense phase conveying; b. dispensing a conveyed pre-transformed material from the material dispenser towards a platform; and c. printing at least a portion of the at least one three-dimensional object from the pre-transformed material after the dispensing or during the dispensing.

In some embodiments, dense phase conveying comprises (i) inserting pre-transformed material into the first pressure container, (ii) inserting at least one gas into the first pressure container to form a pressure gradient between the first pressure container and a target to facilitate dispensing the conveyed pre-transformed material, and (iii) conveying the pre-transformed material from the first pressure container to the target, across the pressure gradient. In some embodiments, the target includes a bulk reservoir, the material dispenser, a processing chamber, or any combination thereof. In some embodiments, the method further comprises conveying the pre-transformed material from a second pressure container to the material dispenser. In some embodiments, conveying from the second pressure container comprises dense phase conveying. In some embodiments, the method further comprises alternatingly conveying the pre-transformed material to the material dispenser, from the first pressure container and from the second pressure container. In some embodiments, the conveying is continuous. In some embodiments, the conveying is discontinuous. In some embodiments, the conveying includes packets of pre-transformed material. In some embodiments, the method further comprises switching conveying from the first pressure container to the second pressure container. In some embodiments, the method further comprises facilitating continuous flow of pre-transformed material into the material dispenser. In some embodiments, the method further comprises switching conveying from the second pressure container to the first pressure container. In some embodiments, the switching is alternating. In some embodiments, the switching is controlled. In some embodiments, the switching is during dispensing the conveyed pre-transformed material from the material dispenser. In some embodiments, the switching is coordinated with evacuating at least a portion of the pre-transformed material from the first pressure container or the second pressure container. In some embodiments, the switching is coordinated with filling of the first pressure container or the second pressure container with the pre-transformed material. In some embodiments, filling comprises filling with pre-transformed material from an external material source. In some embodiments, filling comprises filling with an excess of pre-transformed material from a processing chamber in which the at least one three-dimensional object is printed. In some embodiments, filling comprises filling with an excess of pre-transformed material from a leveler or from a material remover, wherein the leveler and/or the material remover planarize an exposed surface of a material bed that the material dispenser forms upon dispensing pre-transformed material. In some embodiments, evacuating comprises conveying pre-transformed material to the material dispenser. In some embodiments, evacuating comprises conveying pre-transformed material to a bulk reservoir. In some embodiments, evacuating comprises conveying pre-transformed material to an external material source. In some embodiments, the method further comprises conveying (i) pre-transformed material from the first pressure container to the material dispenser and (ii) pre-transformed material from the material dispenser to the second pressure container. In some embodiments, the conveying of (i) and (ii) is simultaneous. In some embodiments, the conveying of (i) and (ii) is sequential. In some embodiments, the method further comprises (i) evacuating pre-transformed material from the first pressure container, and (ii) filling pre-transformed material to the second pressure container. In some embodiments, the conveying of (i) and (ii) is simultaneous. In some embodiments, the conveying of (i) and (ii) is sequential. In some embodiments, conveying comprises conveying via a material conveying channel In another aspect, a computer software product for three-dimensional printing of at least one three-dimensional object comprises a non-transitory computer-readable medium in which program instructions are stored, which instructions, when read by a computer, cause the computer to perform operations comprises: operation (a) directing conveying of a pre-transformed material from a first pressure container to a material dispenser, which conveying comprises dense phase conveying; operation (b) directing dispensing of a conveyed pre-transformed material from the material dispenser towards a platform; and operation (c) directing printing of at least a portion of the at least one three-dimensional object from the pre-transformed material after the dispensing or during the dispensing.

In some embodiments, at least two of operation (a), operation (b), and operation (c) are directed by the same controller. In some embodiments, the computer software product further comprises a plurality of controllers configured to read the program instructions, and wherein at least two of operation (a), operation (b), and operation (c) are directed by different controllers.

In another aspect, a system for three-dimensional printing of at least one three-dimensional object comprises: a processing chamber that is configured to expel an excess amount of a pre-transformed material, which excess is generated during printing of at least a portion of the at least one three-dimensional object; a first pressure container, which first pressure container is operatively coupled to the processing chamber; a material conveyor channel, wherein the material conveyor channel is operatively coupled to the first pressure container and to the processing chamber; and at least one controller that is operatively coupled to the processing chamber, the first pressure container and the material conveyor channel, which at least one controller is programmed to collectively or separately direct performance of the following operations: operation (i) direct collecting an excess amount of pre-transformed material that is expelled from the processing chamber, and operation (ii) direct dilute phase conveyance of the excess pre-transformed material from the processing chamber to the first pressure container, through the material conveyor channel.

In some embodiments, the system further comprises a second pressure container that is configured to collect the excess amount of pre-transformed material that is expelled from the processing chamber, which second pressure container is operatively coupled to the processing chamber, and to the material conveyor channel. In some embodiments, the at least one controller is programmed to direct performance of conveying the pre-transformed material from the processing chamber to the second pressure container. In some embodiments, conveying to the second pressure container comprises dilute phase conveying In another aspect, an apparatus for three-dimensional printing of at least one three-dimensional object comprises: a processing chamber comprising an exit opening from which an excess amount of pre-transformed material in the processing chamber is expelled, which excess amount of pre-transformed material is generated during printing of at least a portion of the at least one three-dimensional object; a first pressure container that collects the excess amount of pre-transformed material that is expelled from the processing chamber, which first pressure container is operatively coupled to the processing chamber; and a material conveyor channel that is configured to convey the excess amount of the pre-transformed material from the processing chamber to the first pressure container by dilute phase conveyance, wherein the material conveyor channel is operatively coupled to the first pressure container and to the processing chamber.

In some embodiments, the apparatus further comprises a gas source that is configured to deliver at least one gas to the material conveyor channel to facilitate the dilute phase conveyance, wherein the material conveyor channel is operatively coupled to the gas source. In some embodiments, the apparatus further comprises a recycling mechanism that is configured to collect the excess amount of the pre-transformed material, which recycling mechanism is operatively coupled to the processing chamber, which recycling mechanism comprises an opening. In some embodiments, the apparatus further comprises a material remover that is configured to facilitate collection and/or expulsion of the excess amount of pre-transformed material. In some embodiments, the apparatus further comprises a material leveler that is configured to facilitate collection and/or expulsion of the excess amount of pre-transformed material. In some embodiments, the apparatus further comprises a second pressure container that is configured to collect the excess amount of pre-transformed material that is expelled from the processing chamber, which second pressure container is operatively coupled to the processing chamber, and to the material conveyor channel. In some embodiments, the apparatus further comprises a separator, which separator is operatively coupled to the material conveyor channel and the first pressure container, which separator is configured to at least partially separate the at least one gas from pre-transformed material. In some embodiments, the apparatus further comprises a separator, which separator is operatively coupled to the material conveyor channel and the second pressure container, which separator is configured to at least partially separate the at least one gas from pre-transformed material In another aspect, an apparatus for three-dimensional printing of at least one three-dimensional object comprises at least one controller that is collectively or separately programmed to perform the following operations: operation (a) direct collecting an excess amount of pre-transformed material from a processing chamber, which excess is generated during printing of at least a portion of the at least one three-dimensional object; and operation (b) direct conveying a collected excess amount of pre-transformed material from the processing chamber to a first pressure container, which conveying comprises dilute phase conveying.

In another aspect, a method for printing at least one three-dimensional object comprises: (a) collecting an excess amount of a pre-transformed material from a processing chamber, which excess is generated during printing of at least a portion of the at least one three-dimensional object; and (b) conveying a collected excess amount of the pre-transformed material from the processing chamber to a first pressure container, which conveying comprises dilute phase conveying.

In some embodiments, the method further comprises before (b), recycling and/or reconditioning the excess amount of the pre-transformed material. In some embodiments, the method further comprises after (a), recycling and/or reconditioning the excess amount of the pre-transformed material. In some embodiments, collecting comprises transferring an excess amount of the pre-transformed material into a recycling mechanism. In some embodiments, a material leveler transfers the excess amount of the pre-transformed material into the recycling mechanism. In some embodiments, a material remover transfers the excess amount of the pre-transformed material into the recycling mechanism. In some embodiments, dilute phase conveying comprises (i) inserting the pre-transformed material into a material conveying channel from the processing chamber, (ii) inserting at least one gas into the material conveying channel, which at least one gas comprises a conveying velocity to form a suspended pre-transformed material from at least a portion of the pre-transformed material, and (iii) conveying the suspended pre-transformed material from the processing chamber to the first pressure container. In some embodiments, the method further comprises maintaining the conveying velocity while conveying through the material conveying channel. In some embodiments, the conveying velocity is constant while conveying through the material conveying channel. In some embodiments, the conveying velocity is altered while conveying through the material conveying channel. In some embodiments, the method further comprises maintaining a suspension of the suspended pre-transformed material while conveying through the material conveying channel. In some embodiments, the inserting at least one gas comprises pressurizing the at least one gas. In some embodiments, the method further comprises conveying the collected excess amount of the pre-transformed material from the processing chamber to a second pressure container. In some embodiments, conveying to the second pressure container comprises dilute phase conveying. In some embodiments, the method further comprises conveying the excess amount of the pre-transformed material from a material dispenser to the first pressure container and the second pressure container. In some embodiments, the method further comprises simultaneously conveying (i) pre-transformed material from the first pressure container to a material dispenser and (ii) excess pre-transformed material from the material dispenser to the second pressure container. In some embodiments, the method further comprises simultaneously (i) evacuating pre-transformed material from the first pressure container, and (ii) filling excess pre-transformed material into the second pressure container. In some embodiments, the method further comprises alternatingly (i) evacuating pre-transformed material from the first pressure container, and (ii) filling excess pre-transformed material into the second pressure container. In some embodiments, the conveying is continuous. In some embodiments, the conveying is discontinuous. In some embodiments, the conveying includes packets of pre-transformed material. In some embodiments, the method further comprises switching conveying to the first pressure container from the second pressure container. In some embodiments, the method further comprises facilitating continuous dispensing of pre-transformed material from the material dispenser. In some embodiments, the method further comprises switching conveying to the second pressure container from the first pressure container. In some embodiments, the switching is alternating. In some embodiments, the switching is controlled. In some embodiments, the switching is during the printing of the at least one three-dimensional object. In some embodiments, the switching is during material dispensing from the material dispenser. In some embodiments, the switching is coordinated with emptying of the first pressure container or the second pressure container. In some embodiments, the switching is coordinated with filling of the first pressure container or the second pressure container.

In another aspect, a computer software product for three-dimensional printing of at least one three-dimensional object comprises a non-transitory computer-readable medium in which program instructions are stored, which instructions, when read by a computer, cause the computer to perform operations comprises: operation (a) directing collecting an excess amount of pre-transformed material from a processing chamber, which excess is generated during printing of at least a portion of the at least one three-dimensional object;

and operation (b) directing conveying the collected excess amount of pre-transformed material from the processing chamber to a first pressure container, which conveying comprises dilute phase conveying.

In another aspect, an apparatus for printing at least one three-dimensional object comprises: an enclosure comprising at least one wall that encloses a volume configured to accommodate a gas and the at least one three-dimensional object; an energy source that is configured to provide an energy beam that transforms a pre-transformed material to a transformed material to print the at least one three-dimensional object, which energy beam generates soot during transformation of the pre-transformed material to the transformed material; a channel configured to transport a first mixture that includes the gas, the soot, and the pre-transformed material which channel is operatively coupled to the enclosure; a separator that is operatively coupled to the channel, which separator is configured to separate the first mixture to a second mixture rich in the gas and the soot, and a third mixture rich in the pre-transformed material (and may comprise the soot), wherein the channel is configured to transport the first mixture between the enclosure and the separator; and a collector comprising an inlet opening operatively coupled to the separator and configured to facilitate flow of the second mixture therethrough, which collector is configured to collect at least a portion of the soot from the second mixture.

In some embodiments, the apparatus further comprising a layer dispenser that dispenses a planar layer of the pre-transformed material to form a material bed in which the at least one three-dimensional object is printed. In some embodiments, the layer dispenser is configured to extract the first mixture that additionally comprises spatter generated during the printing. In some embodiments, the soot is a byproduct of the transformation of the pre-transformed material to the transformed material. In some embodiments, the soot comprises particles having a fundamental length scale (FLS) of at most about 5 microns, and wherein the pre-transformed material comprises particles having a FLS of at least about 10 microns. In some embodiments, the first mixture further comprises spatter, which spatter is a byproduct of the transformation of the pre-transformed material to the transformed material. In some embodiments, the third mixture comprises the spatter. In some embodiments, the printing of the at least one three-dimensional object comprises a printing cycle, and wherein the collector is configured to collect the at least the portion of the soot from the second mixture at least during the printing cycle. In some embodiments, the collector is configured to collect the at least the portion of the soot during printing of at least a portion of the at least one three-dimensional object. In some embodiments, the printing cycle comprises layerwise printing of the at least one three-dimensional object, and wherein the collecting in (d) is following each layer. In some embodiments, the collector comprises a filter. In some embodiments, the apparatus further comprises one or more sensors operatively coupled with the separator and/or the collector, which one or more sensors are operable to detect a characteristic of the soot, spatter, and/or the pre-transformed material. In some embodiments, the characteristic comprises (i) a level, (ii) a volume, (iii) a flux, (iv) a chemical composition, or (v) any combination thereof. In some embodiments, the one or more sensors facilitate controlling one or more apparatuses of the printing by considering output of the one or more sensors. In some embodiments, the one or more apparatuses comprises a remover that removes the mixture by (i) attracting a gas and the material into an internal volume of the remover and (ii) cyclonically separating the material from the gas in the remover. In some embodiments, the apparatus further comprises a power connector coupled with the one or more apparatuses, which power connector comprises an outlet, an inlet, a wire, or any combination thereof. In some embodiments, the collector further comprises an outlet opening. In some embodiments, the outlet opening is configured to facilitate flow of the gas therethrough. In some embodiments, the channel is a first channel, and wherein the apparatus further comprises a second channel operatively coupled to the outlet opening and to the enclosure, which second channel is configured to transport the gas. In some embodiments, the apparatus further comprises one or more valves coupled with the first channel and/or the second channel, which one or more valves are configured to alternately block or allow flow of gas therethrough. In some embodiments, the first channel and the second channel are the same. In some embodiments, the separator is a cyclonic separator. In some embodiments, the separator comprises at least two cyclonic separators that are operatively coupled in parallel or sequentially. In some embodiments, the at least two cyclonic separators are arranged in a sequence, such that an outlet of a first cyclonic separator is coupled with an inlet of a following cyclonic separator of the sequence. In some embodiments, the separator comprises a wall enclosing an internal volume, which separator is configured to gravitationally collect the third mixture in the internal volume. In some embodiments, the internal volume comprises a reservoir. In some embodiments, the separator is configured to collect the third mixture in at least a portion of the internal volume that does not share a flow path with the second mixture through the internal volume In another aspect, an apparatus for printing at least one three-dimensional object comprises: at least one controller that is operatively coupled to an energy source, a separator, and an inlet opening, which at least one controller is programmed to (i) direct the energy source to generate an energy beam to transform a pre-transformed material to a transformed material to print the at least one three-dimensional object and generate soot in an enclosure that encloses a gas, (ii) facilitate transport of a first mixture comprising the pre-transformed material, the soot, and the gas, to the separator, (iii) direct the separator to separate the first mixture to a second mixture rich in gas and soot, and a third mixture rich in (soot and) pre-transformed material, and (iv) facilitate collection of at least part of the soot of the second mixture in a collector.

In some embodiments, the at least one controller is operatively coupled to a layer dispensing mechanism. In some embodiments, the controller is further configured to direct planarizing an exposed surface of a material bed in which the at least one three-dimensional object is printed, which planarizing comprises extracting the first mixture that additionally comprises spatter generated during the printing. In some embodiments, the apparatus comprises one or more valves and/or a compressed gas source coupled with the separator, the enclosure, and/or the collector, wherein the at least one controller is coupled with the one or more valves and/or the compressed gas source. In some embodiments, the at least one controller is programmed to direct at least one valve of the one or more valves and/or the compressed gas source to facilitate the transport in (ii). In some embodiments, the compress gas source is an active compressed gas source that comprises a blower, a fan, a compressor, or a pump. In some embodiments, the compress gas source is a passive compressed gas source (e.g., a gas cylinder). In some embodiments, to facilitate comprises controlling an opening or closing of the one or more valves, or a flow of the compressed gas. In some embodiments, the soot is a byproduct of a transformation of the pre-transformed material to the transformed material. In some embodiments, the soot comprises particles having a fundamental length scale (FLS) of at most about 5 microns, and wherein the pre-transformed material comprises particles having a FLS of at least about 10 microns. In some embodiments, the printing the at least one three-dimensional object comprises a printing cycle, wherein the printing cycle includes a layer-by-layer formation of the three-dimensional object. In some embodiments, the at least one controller is programmed to facilitate the collection in (iv) following formation of each layer. In some embodiments, the collection is from a remover that is configured to attract the mixture during the printing. In some embodiments, the at least one controller is programmed to facilitate at least two of the transport in (ii), the separation in (iii) and the collection in (iv) at least during the printing. In some embodiments, the apparatus further comprises the at least one controller operatively coupled with one or more sensors, which one or more sensors are configured to detect at least one characteristic of the soot the pre-transformed material and/or any spatter produced during the printing. In some embodiments, the at least one characteristic comprises (i) a level, (ii) a volume, (iii) a flux, (iv) an amount, (v) a chemical composition, or (vi) any combination thereof. In some embodiments, the at least one controller is configured to adjust at least one of the at least one characteristic (i)-(v), considering a detection of the at least one characteristic. In some embodiments, to adjust comprises a closed loop control scheme, which comprises a feedback or a feed-forward control scheme. In some embodiments, the closed loop control is in real time, which real time comprises during the printing at least a portion of the at least one three-dimensional object. In some embodiments, the at least one controller is configured utilize a closed loop control scheme that is utilized is in real time during printing of at least a portion of the at least one three-dimensional object. In some embodiments, the at least one controller is programmed to facilitate adjustment to a rate at which the first mixture is transported to the separator. In some embodiments, the adjustment is considering a detection of a rate at which second mixture is flowing to the collector. In some embodiments, at least two (i)-(iv) are directed by the same controller. In some embodiments, at least two of (i)-(iv) re directed by different controllers.

In another aspect, a method of printing at least one three-dimensional object comprises: (a) generating an energy beam to transform a pre-transformed material to a transformed material to print the at least one three-dimensional object in an enclosure and generate soot, which enclosure comprises a gas; (b) flowing a first mixture comprising the gas, the soot, and the pre-transformed material from the enclosure to a separator; (c) separating the first mixture to a second mixture rich in the gas and the soot, and a third mixture rich in the pre-transformed material (and may comprise soot); and (d) collecting at least part of the soot of the second mixture.

In some embodiments, the method further comprises before flowing the first mixture, planarizing an exposed surface of a material bed in which the at least one three-dimensional object is printed, which planarizing comprises extracting the first mixture that additionally comprises spatter generated during the printing. In some embodiments, the soot is a byproduct of transforming the pre-transformed material to the transformed material. In some embodiments, the soot comprises particles having a fundamental length scale (FLS) of at most about 5 microns, and wherein the pre-transformed material comprises particles having a FLS of at least about 10 microns. In some embodiments, the first mixture further comprises spatter, which spatter is a byproduct of transforming the pre-transformed material to the transformed material. In some embodiments, the separating in (c) comprises the third mixture to further be rich in the spatter. In some embodiments, the printing the at least one three-dimensional object comprises a printing cycle, wherein the collecting in (d) is during the printing cycle. In some embodiments, the collecting in (d) is during printing of a portion of the at least one three-dimensional object. In some embodiments, the printing cycle comprises layerwise printing of the at least one three-dimensional object, and wherein the collecting in (d) is following each layer. In some embodiments, the collecting in (d) comprises filtering. In some embodiments, the method further comprises detecting a characteristic of the soot, the pre-transformed material, and any spatter produced during the printing. In some embodiments, the characteristic comprises (i) a level, (ii) a volume, (iii) a flux, (iv) a chemical composition, (v) and amount, or (vi) any combination thereof. In some embodiments, the method further comprises flowing the gas to the enclosure, following the collecting in (d). In some embodiments, the separating comprises gravitationally collecting the third mixture in an internal volume of the separator. In some embodiments, the method further comprises storing the third mixture in a reservoir. In some embodiments, the collecting the third mixture is in a portion of the internal volume through which the second mixture does not flow. In some embodiments, the separating comprises cyclonic separation. In some embodiments, the separating in (c) comprises at least two separating operations, each separating operation reducing an amount of the soot and pre-transformed material from the first mixture. In some embodiments, each separating operation of the at least two separating operations comprises a respective collecting of the soot and pre-transformed material. In some embodiments, each separating operation is by a respective separator. In some embodiments, the at least two separating operations are performed sequentially. In some embodiments, the pre-transformed material comprises an elemental metal, metal alloy, ceramic, an allotrope of elemental carbon, a polymer, or a resin.

In another aspect, a system for printing a three-dimensional object comprises: an enclosure comprising at least one wall enclosing a volume that accommodates the three-dimensional object during the printing; a dispenser that is configured to dispense a dispensed amount of pre-transformed material through an opening of the dispenser toward a target surface that is disposed in the enclosure in which the three-dimensional object is printed, which dispensed amount of pre-transformed material is at least twice an amount of pre-transformed material required to form a material bed in which the three-dimensional object is printed, wherein an excess material comprise the dispensed pre-transformed material that did not form the material bed and/or the at least one three-dimensional object; and a recycling system comprising a sieve, wherein the recycling system is operatively coupled to the enclosure and is configured to (i) accommodate at least a portion of the excess material and (ii) recycle the at least a portion of the excess material at least in part by sieving the excess material through the sieve.

In some embodiments, the recycling system comprises an entrance opening configured to facilitate flow of the excess material therethrough. In some embodiments, the recycling system is operatively coupled to a remover that removes the excess material by (i) attracting a gas and the excess material into an internal volume of the remover and (ii) cyclonically separating the excess material from the gas in the remover. In some embodiments, the flow of the excess material comprises a mixture of a gas and the excess material. In some embodiments, the system further comprises a separator coupled with the enclosure and the entrance opening of the recycling system, which separator is configured to separate at least part of the excess material from the gas. In some embodiments, the separator comprises a cyclonic separator. In some embodiments, the excess material comprises any soot or any spatter produced in the printing. In some embodiments, the system further comprises a material reservoir having a material inlet coupled to an outlet of the recycling system, which material reservoir is configured to store a recycled pre-transformed material. In some embodiments, the material reservoir is configured to provide at least part of the recycle pre-transformed material during the printing of the three-dimensional object and/or during a subsequent printing. In some embodiments, the printing the three-dimensional object is during a print cycle, which print cycle comprises a layer-by-layer formation of the three-dimensional object. In some embodiments, the recycling system is configured to recycle in (ii) following each layer formation. In some embodiments, the recycling system is configured to recycle at least 40 cubic centimeters of the excess material following each layer formation. In some embodiments, the recycling system and/or sieve is configured to filter at least 50 kilograms. In some embodiments, the recycling system and/or sieve is configured to filter at least 500 kilograms. In some embodiments, the recycling system and/or sieve is configured to filter at a throughput of at least about six (6) cubic centimeters of material per hour (cc/hr). In some embodiments, the recycling system and/or sieve is configured to filter the excess material that has a fundamental length scale of at most 1000 micrometers. In some embodiments, the recycling system and/or sieve is configured to filter the excess material that has a fundamental length scale of at most 100 micrometers. In some embodiments, each layer of the layer-by-layer formation comprises a substantially equal layer height in the material bed. In some embodiments, a height of the dispensed amount of pre-transformed is at least five times a layer height. In some embodiments, the height of the dispensed amount of pre-transformed material comprises an average height across the target surface. In some embodiments, the system comprises a material removal member that is adjacent to the target surface, wherein the material removal member is operable to remove the excess material from the enclosure. In some embodiments, the excess material comprises at least five (5) times the layer height. In some embodiments, to remove is with aid of one or more a magnetic force, an electrostatic force, and a gas flow (e.g., vacuum). In some embodiments, the pre-transformed material comprises a particulate material. In some embodiments, the pre-transformed material comprises an elemental metal, metal alloy, ceramic, an allotrope of elemental carbon, a polymer, or a resin. In some embodiments, the system further comprises a power connector coupled with the dispenser and/or the recycling system, which power connector comprises an outlet, an inlet, a wire, or any combination thereof. In some embodiments, the apparatus further comprises a material remover that is configured to planarize an exposed surface of the material bed in which the three-dimensional object is printed to form the layer height. In some embodiments, the material remover attracts from the material bed the excess material and a gas and at least partially separates the excess material from the gas in the material remover by using a cyclonic separator integrated in the material remover.

In another aspect, an apparatus for printing at least one three-dimensional object comprises: at least one controller that is operatively coupled to a dispenser and to a recycling system, which at least one controller is configured (e.g., programmed) to (i) direct dispensing of a dispensed amount of a pre-transformed material in an enclosure to form (a) a material bed in which the at least one three-dimensional object is printed, and (b) an excess material, which dispensed amount is at least twice an amount of pre-transformed material required to form the material bed, which excess material comprises the dispensed material that does not form the material bed and/or the at least one three-dimensional object, and (ii) direct recycling of the excess material at least in part by sieving the excess material.

In some embodiments, the recycling system comprises an entrance opening configured to facilitate flow of the excess material therethrough, wherein in (ii) the at least one controller is programmed to facilitate entry of the excess material from the enclosure to the recycling system. In some embodiments, the excess material comprises any soot or any spatter produced in the printing. In some embodiments, the at least one controller is programmed to direct recycling of the excess material at least in part during the printing. In some embodiments, the at least one controller is programmed to direct recycling of the excess material to be continuous during the printing. In some embodiments, the at least one controller is programmed to direct recycling of the excess material to form a recycled pre-transformed material, and to direct use of the recycled pre-transformed material during the printing of the three-dimensional object and/or during a subsequent printing. In some embodiments, to facilitate comprises controlling (I) one or more valves to open or close, (II) a compressed gas source to selectively flow gas, or (III) a power source to selectively supply power. In some embodiments, the recycling system further comprises an outlet opening configured to facilitate conveyance of the recycled pre-transformed material to a material reservoir. In some embodiments, the material reservoir comprises a material port coupled with an inlet port of the dispenser, wherein the at least one controller is programmed to (iii) facilitate conveying the pre-transformed material to the dispenser from the material reservoir. In some embodiments, the conveying comprises a dense phase conveyance of the pre-transformed material. In some embodiments, the outlet opening is configured to facilitate conveyance of the recycled pre-transformed material to at least two material reservoirs. In some embodiments, the at least one controller is programmed to direct conveying the recycled excess to the at least two material reservoirs alternatingly. In some embodiments, the printing the three-dimensional object comprises a printing cycle, which printing cycle comprises layer-by-layer formation of the three-dimensional object. In some embodiments, the at least one controller is programmed to direct during the printing cycle recycling of a total amount of recycled excess material that is greater than a total material bed volume at the completion of the printing cycle. In some embodiments, the total amount of recycled excess material is at least 5 times the total material bed volume. In some embodiments, the at least one controller is programmed to direct the recycling in (ii) following at least one (e.g., each) layer of the layer-by-layer formation. In some embodiments, the at least one controller is programmed to direct the recycling to sieve at a rate of at least 0.5 cubic centimeters of the excess per minute, per square centimeter of a sieving area. In some embodiments, the at least one controller is programmed to direct the recycling to sieve at least 50 kilograms. In some embodiments, the at least one controller is programmed to direct the recycling to sieve at least 500 kilograms. In some embodiments, the at least one controller is programmed to direct the recycling to sieve at a throughput of at least about six (6) cubic centimeters of material per hour (cc/hr). In some embodiments, the at least one controller is programmed to direct the recycling to sieve the excess material that has a fundamental length scale of at most 1000 micrometers. In some embodiments, the at least one controller is programmed to direct the recycling to sieve the excess material that has a fundamental length scale of at most 100 micrometers. In some embodiments, the at least one controller is programmed to facilitate maintaining the enclosure at a first atmosphere, and a recycling system enclosure at a second atmosphere, which first atmosphere and second atmosphere are different than an external atmosphere that comprises a reactive agent. In some embodiments, the at least one controller is programmed to facilitate flow of a gas comprising an inert atmosphere for the maintaining the first atmosphere and the second atmosphere. In some embodiments, the apparatus further comprises a removal member comprising a removal opening disposed over the material bed, which at least one controller is programmed to facilitate removal of the excess material from the enclosure through the removal opening. In some embodiments, removal is with the aid of one or more of a magnetic force, an electrostatic force, and a gas flow.

In another aspect, a method for printing a three-dimensional object comprises: (a) dispensing a dispensed amount of a pre-transformed material to form (i) a material bed in which the three-dimensional object is printed and (ii) an excess amount of the pre-transformed material, which dispensed amount can fill at least twice a volume of the material bed; and (b) recycling the excess amount of the pre-transformed material at least in part by sieving the excess amount of the pre-transformed material, wherein the excess amount of the pre-transformed material comprises dispensed pre-transformed material that does not form the material bed and/or the at least one three-dimensional object In some embodiments, the recycling is at least in part during the printing. In some embodiments, the recycling is continuous during the printing. In some embodiments, the excess pre-transformed material comprises any soot or any spatter produced in the printing. In some embodiments, the recycling is to form a recycled pre-transformed material that is used during the printing of the three-dimensional object and/or during a subsequent printing. In some embodiments, the method further comprises providing the recycled pre-transformed material to a material reservoir, following the recycling in (b). In some embodiments, the method further comprises flowing the pre-transformed material to a dispenser from the material reservoir. In some embodiments, the flowing comprises a dense phase conveyance of the pre-transformed material. In some embodiments, the providing the recycled pre-transformed material is to at least two material reservoirs. In some embodiments, the method further comprises providing the recycled excess to the at least two material reservoirs alternatingly. In some embodiments, the printing the three-dimensional object comprises a printing cycle, which printing cycle comprises a layer-by-layer formation of the three-dimensional object. In some embodiments, a total amount of recycled excess pre-transformed material during the printing cycle is greater than a total material bed volume at the completion of the printing cycle. In some embodiments, the total amount of recycled excess pre-transformed material is at least 5 times the total material bed volume. In some embodiments, the recycling in (b) is following each layer of the layer-by-layer formation. In some embodiments, the recycling comprises sieving at a rate of at least 0.5 cubic centimeters of the excess amount of the pre-transformed material per minute, per square centimeter of a sieving area. In some embodiments, the pre-transformed material comprises a powder. In some embodiments, the dispensing in (a) is in a first enclosure at a first atmosphere, and the recycling in (b) is in a second enclosure at a second atmosphere, which first atmosphere and second atmosphere are different than an external atmosphere that comprises a reactive agent. In some embodiments, the reactive agent is reactive with respect to a reactant and/or to a product (e.g., byproduct) of the printing the three-dimensional object. In some embodiments, the first atmosphere and the second atmosphere are substantially the same. In some embodiments, the first atmosphere and the second atmosphere are different. In some embodiments, the method further comprises conveying the excess pre-transformed material from the first enclosure to the second enclosure in a dilute phase. In some embodiments, recycling and/or sieving is of at least 50 kilograms. In some embodiments, recycling system and/or sieving is of least 500 kilograms. In some embodiments, recycling and/or sieving is at a throughput of at least about six (6) cubic centimeters of material per hour (cc/hr). In some embodiments, recycling and/or sieving is of the excess pre-transformed material that has a fundamental length scale of at most 1000 micrometers. In some embodiments, recycling and/or sieving is of the excess pre-transformed material that has a fundamental length scale of at most 100 micrometers.

In another aspect, an apparatus for printing at least one three-dimensional object comprises: an enclosure configured to accommodate the three-dimensional object during printing; a compressed gas source configured to flow a gas in a direction; a material reservoir having at least one first wall that encloses a first volume configured to hold (i) a first atmosphere that has a gas content different from an ambient atmosphere and a first pressure, and (ii) a first material port disposed in the at least one first wall and configured to facilitate transport of a pre-transformed material therethrough, which material reservoir is operatively coupled (e.g., connected) to the enclosure and is configured to facilitate supply of the pre-transformed material to the enclosure to print the three-dimensional object; and a bulk reservoir configured to hold a second atmosphere having a pressure above the first pressure and a gas content different from an ambient atmosphere, which bulk reservoir comprises a second material port, a gas port, and at least one second wall that encloses a second volume configured to accommodate the pre-transformed material, which compressed gas source is operatively coupled to the bulk reservoir through the gas port to facilitate pressurized conveyance of the pre-transformed material from the bulk reservoir through the second material port to the first material port at least in part against the gravitational field.

In some embodiments, the apparatus further comprises a vertically translatable platform configured to support the at least one three-dimensional object during the printing. In some embodiments, the platform is disposed in the enclosure. In some embodiments, the pressurized conveyance of the pre-transformed material comprises dense phase conveyance. In some embodiments, the bulk reservoir comprises a transportable container or a stationary reservoir, which stationary reservoir is configured to couple with at least one material reservoir through the second material port.

In some embodiments, the first material port is coupled with a valve, which valve is operable to open to facilitate the pressurized conveyance of the pre-transformed material, and to close to prevent the pressurized conveyance. some embodiments, the material reservoir comprises one or more sensors, which one or more sensors are operable to detect a level, type, and/or volume of pre-transformed material within the material reservoir. In some embodiments, the material reservoir comprises one or more sensors. In some embodiments, the one or more sensors are operable to detect a reactive species within the reservoir (e.g., oxygen or humidity). In some embodiments, the valve is operable to open in response to a detection by the one or more sensors that the pre-transformed material is below a threshold level. In some embodiments, the first pressure is established by an operation of the valve. In some embodiments, the enclosure comprises a second material port configured to accept the pre-transformed material from the material reservoir during the printing without interruption to the printing of the at least one three-dimensional object, and/or without interruption of the pressurized conveyance. In some embodiments, without interruption to the printing comprises printing continuously for at least 8 hours. In some embodiments, without interruption to the printing comprises printing continuously for at least 15 days. In some embodiments, the printing comprises printing at a rate of at least 45 cubic centimeters per hour (cc/hr). In some embodiments, the apparatus further comprises a (e.g., vertically translatable) platform configured to support the at least one three-dimensional object during the printing. In some embodiments, the apparatus further comprises at least one valve operatively coupled with the gas port, which one valve is configured to open and close to facilitate and to prevent, respectively, ingress of the compressed gas. In some embodiments, the ambient atmosphere comprises a reactive agent that is reactive (e.g., during and/or after the printing) with a reactant and/or with a product of the printing. In some embodiments, the at least the one first wall and/or the at least the one second wall are hermetically sealed and/or comprise a sealant, wherein the first volume and/or the second volume are configured to hold a positive pressure with respect to an ambient pressure. In some embodiments, the apparatus further comprises a system frame enclosing a system frame volume, which system frame volume comprises the enclosure and the material reservoir. In some embodiments, the apparatus further comprises a recycling system coupled with an outlet port of the enclosure, which recycling system is configured to receive a mixture of an excess pre-transformed material and a debris from the printing through the outlet port, and to separate at least part of the debris from the excess pre-transformed material by cyclonic separation. In some embodiments, the recycling system is operatively coupled to a material remover to receive the mixture for filtration from the material remover and/or provide the filtered mixture to the material remover (e.g., before, after, and/or during the printing). In some embodiments, the material remover removes the mixture by (i) attracting a gas and the material into an internal volume of the remover and (ii) cyclonically separating the material from the gas in the remover. In some embodiments, the apparatus the apparatus further comprises a power connector coupled with the compressed gas source, which power connector comprises an outlet, an inlet, a wire, or any combination thereof.

In another aspect, an apparatus for printing at least one three-dimensional object comprises: one or more controllers that are operatively coupled to a compressed gas source, to a material reservoir, and to a bulk reservoir, which one or more controllers are individually or collectively configured to (i) direct the compressed gas source to flow a gas through a gas inlet port of the bulk reservoir to establish a first atmosphere that has a first gas content that is different from an ambient atmosphere and a first pressure, which first atmosphere is of an internal volume of the bulk reservoir; and (ii) facilitate pressurized transport of a pre-transformed material from the bulk reservoir to the material reservoir against a gravitational force, which material reservoir holds a second atmosphere that has a second gas content that is different from the ambient atmosphere and a second pressure lower than the first pressure, wherein pre-transformed material in the material reservoir is used for printing the three-dimensional object.

In some embodiments, the one or more controllers further direct vertically translating the platform that is configured to support the at least one three-dimensional object during the printing. In some embodiments, the one or more controllers are configured to direct facilitating addition of the pre-transformed material to the material reservoir through a material inlet port, which material inlet port is configured to accept pre-transformed material from a storage container during the printing. In some embodiments, the one or more controllers are configured to facilitate flowing the gas flow from the compressed gas source through a gas storage inlet of the storage container to establish a third atmosphere that has a third gas content that is different from the ambient atmosphere and a third pressure. In some embodiments, facilitate flowing comprises directing a compressed gas flow to flow the gas, or alerting an operator to initiate the flow of the gas. In some embodiments, the compressed gas flow is passive (e.g., a cylinder). In some embodiments, the compressed gas flow is active (e.g., a pump or blower). In some embodiments, the one or more controllers are operatively coupled with a sieve inlet port of a sieve assembly disposed between the bulk reservoir and the material reservoir, wherein the pressurized transport in (ii) comprises transport through the sieve inlet port for sieving at least part of the pre-transformed material. In some embodiments, the pressurized transport comprises a dense phase conveyance of the pre-transformed material. In some embodiments, the sieve assembly comprises an outlet opening configured to facilitate conveyance of sieved pre-transformed material to a respective storage inlet port of at least two storage containers. In some embodiments, the outlet opening and/or the respective storage inlet comprises a gate and/or a switch, wherein the one or more controllers are configured to control a position of the gate and/or the switch to direct the conveyance of sieved pre-transformed material to the at least two storage containers. In some embodiments, the one or more controllers are programmed to direct the conveyance of sieved pre-transformed material to the at least two storage containers alternatingly. In some embodiments, the one or more controllers are programmed to facilitate conveyance of pre-transformed material to the material reservoir from a storage container of the at least two storage containers that is not receiving pre-transformed material from the bulk reservoir and/or the sieve assembly. In some embodiments, the one or more controllers are programmed to alternate conveying from a first storage container of the at least two storage containers to a second storage of the at least two storage containers considering a level of the pre-transformed material in the first storage container, which level is detected by a sensor operatively coupled with the one or more controllers. In some embodiments, during the printing comprises without interruption of the printing, and/or without interruption of conveyance against the gravitational force of the pre-transformed material to the material reservoir. In some embodiments, without interruption comprises printing continuously for at least 8 hours. In some embodiments, without interruption comprises printing continuously for at least 15 days. In some embodiments, the printing comprises printing at a rate of at least 45 cubic centimeters per hour (cc/hr). In some embodiments, the pre-transformed material comprises an elemental metal, metal alloy, ceramic, an allotrope of elemental carbon, a polymer, or a resin. In some embodiments, the material reservoir is disposed within an enclosure in which the three-dimensional object is printing. In some embodiments, the one or more controllers are programmed to adjust the first atmosphere and/or the second atmosphere in response to a detection of one or more sensors, which one or more sensors are configured to detect at least one characteristic of the first atmosphere and/or the second atmosphere. In some embodiments, the at least one characteristic comprises (I) a pressure differential between the first atmosphere and the second atmosphere, and/or (II) an atmospheric level of a reactive agent. In some embodiments, the reactive agent is reactive (e.g., during and/or after the printing) with a reactant (e.g., pre-transformed material) and/or with a product (e.g., transformed and/or hardened material) of the printing. In some embodiments, the one or more controllers are configured to adjust the pressure differential between the first atmosphere and the second atmosphere such that the first pressure is higher than the second pressure. In some embodiments, to direct the compressed gas in (i) and to facilitate the pressurized transport in (ii) are performed by the same controller. In some embodiments, to direct the compressed gas in (i) and to facilitate the pressurized transport in (ii) are performed by different controllers.

In another aspect, a method of printing at least one three-dimensional object comprises: holding a first atmosphere in a first volume of a material reservoir which first atmosphere has a first gas content that is different from an ambient atmosphere, and a first pressure; flowing compressed gas into a bulk reservoir to establish a second atmosphere that has a second gas content that is different from the ambient atmosphere and a second pressure greater than the first pressure; and flowing a pre-transformed material from the bulk reservoir to the material reservoir, which pre-transformed material in the material reservoir is used for printing the three-dimensional object.

In some embodiments, the method further comprises (e.g., vertically) translating a platform supports the at least one three-dimensional object during the printing. In some embodiments, the flowing in (c) comprises dense phase conveyance of the pre-transformed material. In some embodiments, the method further comprises establishing the first pressure by flowing the compressed gas into the first volume. In some embodiments, the method further comprises establishing the first pressure in the first volume in response to the pre-transformed material being below a threshold level within the material reservoir. In some embodiments, the threshold level corresponds to an amount of material required to fill a material bed in which the at least one three-dimensional object is printing. In some embodiments, the method further comprises holding (e.g., maintaining) the bulk reservoir at the second pressure, such that the flowing in (c) commences upon the establishing of the first pressure in the first volume. In some embodiments, the second atmosphere comprises substantially the same gas as the first atmosphere. In some embodiments, the first atmosphere and/or the second atmosphere comprise an inert atmosphere. In some embodiments, the flowing in (c) comprises sieving the pre-transformed material between the bulk reservoir and the material reservoir. In some embodiments, the sieving is in a third atmosphere that has a third gas content that is different from the ambient atmosphere and at least by having a third pressure that is lower than the second pressure. In some embodiments, the method further comprises flowing the pre-transformed material from the bulk reservoir to at least two material reservoirs. In some embodiments, the method further comprises (d) conveying the pre-transformed material from the at least two material reservoirs to an enclosure within which the at least one three-dimensional object is printing. In some embodiments, flowing the pre-transformed material in (c) and/or conveyance of the pre-transformed material in (d) is against a gravitational field. In some embodiments, flowing the pre-transformed material in (c) is without interruption to the printing of the at least one three-dimensional object, and/or without interruption of conveyance of the pre-transformed material in (d). In some embodiments, without interruption to the printing comprises printing continuously for at least 8 hours. In some embodiments, without interruption to the printing comprises printing continuously for at least 15 days. In some embodiments, the printing comprises transforming the pre-transformed material to a transformed material at a rate of at least 45 cubic centimeters per hour (cc/hr). In some embodiments, conveyance of the pre-transformed material in (d) comprises switching from a first material reservoir to a second material reservoir. In some embodiments, flowing the pre-transformed material in (c) is to a material reservoir of the at least two material reservoirs that is not currently conveying the pre-transformed material in (d). In some embodiments, the conveying to the enclosure is continuous. In some embodiments, the conveying to the enclosure is discontinuous. In some embodiments, the ambient atmosphere comprises a reactive agent that is reactive (e.g., before and/or after the printing) with a reactant and/or with a product of the printing.

In another aspect, an apparatus for printing at least one three-dimensional object comprises: a filtering enclosure comprising: (i) at least one wall enclosing a volume configured to accommodate an atmosphere, (ii) an inlet port disposed in the at least one wall, which inlet port is configured to facilitate ingress of a material into the volume, wherein the material comprises (1) a remainder of the printing of the three-dimensional object, or (2) a debris produced during the printing of the three-dimensional object, and (iii) a collection volume in the volume that facilitates collection of a filtered material and/or an exit port disposed in the at least one wall, which exit port is configured to facilitate egress of the filtered material from the volume; and a supportive structure configured to accommodate a filtration member having a filter and a frame that is configured to support the filter, which filtration member is (a) disposed in the volume at an angle with respect to a normal to the gravitational field vector and (b) divides the volume into an upper portion and a lower portion, which upper portion is partially defined by a fraction of the at least one wall that includes the inlet port, and which lower portion is partially defined by a fraction of the at least one wall that includes the exit port and/or the collection volume.

In some embodiments, the apparatus further comprises a processing chamber configured to accommodate printing of the three-dimensional object. In some embodiments, the apparatus further comprises a vertically translatable platform configured to support the three-dimensional object during its printing. In some embodiments, the platform is disposed in the processing chamber. In some embodiments, the filtering enclosure is operatively coupled to a material remover to receive the material for filtration from the material remover. In some embodiments, the material remover removes the material by (i) attracting a gas and the material into an internal volume of the remover and (ii) cyclonically separating the material from the gas in the remover. In some embodiments, the supportive structure comprises a protrusion, depression, ledge, or a railing. In some embodiments, the supportive structure is configured to support the filtration member (e.g., cartridge) upon filtering at least 50 kilograms. In some embodiments, the supportive structure is configured to support the filtration member (e.g., cartridge) upon filtering at least 500 kilograms. In some embodiments, the supportive structure is configured to support the filtration member (e.g., cartridge) upon filtering at a throughput of at least about six (6) cubic centimeters of material per hour (cc/hr). In some embodiments, the supportive structure is configured to support the filtration member (e.g., cartridge) upon filtering a material having a fundamental length scale of at most 1000 micrometers. In some embodiments, the material comprises a pre-transformed material has a fundamental length scale of at most 1000 micrometers. In some embodiments, the debris comprises material having a fundamental length scale of above 50 micrometers. In some embodiments, the apparatus further comprises an enclosure configured to accommodate the three-dimensional object during the printing. In some embodiments, the apparatus further comprises a movable platform configured to support the three-dimensional object during its printing in the enclosure. In some embodiments, the apparatus further comprises an energy beam configured to transform a pre-transformed material to a transformed material to print the three-dimensional object. In some embodiments, the pre-transformed material comprises a particulate material. In some embodiments, the material comprises a small material and a large material. In some embodiments, the small material comprises a pre-transformed material, wherein the large material comprises a byproduct of printing the three-dimensional object by transforming the pre-transformed material to a transformed material. In some embodiments, the byproduct of the printing comprises spatter. In some embodiments, the at least one wall comprises a secondary exit opening disposed adjacent to the filtration member to accommodate egress of material therethrough (e.g., adjacent and/or at the top surface of the filtration member). In some embodiments, the filtration member is configured to filter the small material from the large material, wherein the angle facilitates simultaneous (1) filtration of any small material, and (2) eviction of any large material through the secondary exit opening. In some embodiments, the small material comprises particles having a maximal fundamental length scale (FLS), which maximal FLS is at most about 50 microns, and wherein the large material comprises particles having a larger FLS than the maximal FLS. In some embodiments, the angle is such that facilitates the simultaneous filtration and eviction. In some embodiments, the angle is from about 1 degree to about 8 degrees. In some embodiments, the filtering enclosure further comprises a leveling member to controllably dispose the filtration member at the angle. In some embodiments, the leveling member comprises a gas- or liquid-filled bladder, a pin, an actuator, a jack, a lever, or a screw. In some embodiments, the actuator comprises an (e.g., magnetic) encoder, or a (e.g., servo) motor. In some embodiments, the supportive structure, frame and/or the at least one wall comprises an isolation element operable for mechanical and/or thermal isolation of the frame from the at least one wall. In some embodiments, the isolation element comprises a gasket, a bumper, a spring, a sponge, a bellow, a cloth, a cork, or a membrane. In some embodiments, the frame comprises one or more skeleton structures (e.g., support structures, or scaffold structures) disposed to support the filter. In some embodiments, the one or more skeleton structures are configured to support a filter of the filtration member below the inlet port when the filtration member is engaged with the supportive structure in the volume, wherein below is with respect to the gravitational field vector, such that the ingress of the material is at least partially directed towards the one or more skeleton structures. In some embodiments, the inlet is disposed laterally adjacent to a first side of the supportive structure that places the filtration member that is angled at a more distant position from the gravitational center as compared to a second side of the filtration member that is angled. In some embodiments, the one or more skeleton structure(s) and/or supportive structure comprise a material that is durable with respect to filtering metallic particles. In some embodiments, the skeleton structure is configured to support a filter upon filtering at least 50 kilograms. In some embodiments, the skeleton structure is configured to support a filter upon filtering at least 500 kilograms. In some embodiments, the skeleton structure is configured to support a filter upon filtering at a throughput of at least about six (6) cubic centimeters of material per hour (cc/hr). In some embodiments, the skeleton structure is configured to support a filter upon filtering a material having a fundamental length scale of at most 1000 micrometers. In some embodiments, the one or more skeleton structures are operatively coupled (e.g., affixed) to the frame of the filtration member and/or to a filter operatively coupled (e.g., connected) to the filtration member. In some embodiments, the one or more skeleton structures are disposed to span at least a portion of a long and/or a short axis of the filtration member. In some embodiments, the apparatus further comprises at least one agitator having a controllably movable member, which movable member is coupled with the frame of the filtration member and is operable for moving the filtration member to facilitate filtration of the material thereby. In some embodiments, the at least one agitator comprises an ultrasonic transducer. In some embodiments, moving the filtration member comprises a vibration of the filtration member and/or a back and forth movement of the filtration member. In some embodiments, at least one wall comprises an outlet configured to facilitate travel of a filtered material therethrough, which outlet is disposed laterally adjacent to a second side of the supportive structure that places the filtration member that is angled at a more adjacent position to the gravitational center as compared to a first side of the filtration member that is angled.

In another aspect, an apparatus for printing at least one three-dimensional object comprises: one or more controllers that are operatively coupled to a filtration member and to an inlet port of a filtering enclosure, which one or more controllers are collectively or individually programmed to facilitate ingress of a material to the filtering enclosure through the inlet port to impinge upon the filtration member that is tilted at an angle with respect to a normal to the gravitational field vector, which filtration member is disposed in a volume of the filtering enclosure, the material comprising (1) a remainder of the printing of the three-dimensional object, or (2) a debris produced during the printing of the three-dimensional object.

In some embodiments, the one or more controllers are operatively coupled to a platform. In some embodiments, the platform is configured to support the at least one three-dimensional object during the printing, In some embodiments, the one or more controllers are further programmed to direct the platform to translate vertically during the printing of the at least one three-dimensional object. In some embodiments, the apparatus further comprises a sensor and wherein the sensor detects a characteristic of an atmosphere of the volume of the filtering enclosure, which characteristic of the atmosphere includes a temperature and/or a reactive agent, wherein the reactive agent comprises oxygen or humidity. In some embodiments, the apparatus further comprises a sensor. In some embodiments, the sensor detects a characteristic of the flow comprises a flow rate of (I) the remainder, (II) the first portion of the remainder and/or (III) the second portion of the remainder. In some embodiments, the sensor detects a characteristic of an accumulation of (I) the first portion of the remainder and/or (II) the second portion of the remainder. In some embodiments, the angle is configured to facilitate simultaneous separation between (i) a first portion of the remainder that flows through the filtration member from one exposed surface of the filtration member to an opposing exposed surface of the filtration member, and (ii) a second portion of the remainder that slides on the one exposed surface of the filtration member to (a) an outlet port of the filtering enclosure and/or (b) a collection volume. In some embodiments, the filtering enclosure further comprises a leveling member, wherein the one or more controllers are operatively coupled with the leveling member to controllably adjust the angle of the filtration member. In some embodiments, the first portion of the remainder comprises a pre-transformed material that is used as a starting material to form the three-dimensional object by transforming the pre-transformed material to a transformed material. In some embodiments, the second portion of the remainder comprises a material having a fundamental length scale that is larger than a fundamental length scale of the pre-transformed material, which material is a by-product of the printing. In some embodiments, the second material is spatter. In some embodiments, the apparatus further comprises a sensor. In some embodiments, the sensor detects a characteristic of the flow comprises a flow rate of (I) the remainder, (II) the first portion of the remainder and/or (III) the second portion of the remainder. In some embodiments, the sensor detects a characteristic of an accumulation of (I) the first portion of the remainder and/or (II) the second portion of the remainder. In some embodiments, the one or more controllers is configured to alter a function of at least one mechanism of the printing, by considering a signal detected by the sensor. In some embodiments, the at least one mechanism comprises an energy source, an optical element, a dispenser, a leveler, a remover, a gas source, or an actuator coupled to a platform. In some embodiments, the one or more controllers comprise a closed loop control scheme, which comprises a feedback or a feed-forward control scheme. In some embodiments, the controller is operatively coupled to a consolidation agent of the pre-transformed material that transforms the pre-transformed material into a transformed material to form the three-dimensional object. In some embodiments, the consolidation agent comprises an energy beam or a binding agent. In some embodiments, the controller controls one or more characteristics of the consolidation agent. In some embodiments, the one or more characteristics of the consolidation agent comprise translational speed, consolidation spot size, or consolidation rate. In some embodiments, the consolidation agent comprises an energy beam, wherein the one or more characteristics of the consolidation agent comprise translational speed, dwell time, intermission time, fundamental length scale of a cross-section, power density, or wavelength. In some embodiments, the controller is configured to control (e.g., the power of) an energy source configured to generate the energy beam. In some embodiments, the control is in real time during the printing. In some embodiments, the controller considers a signal detector by a sensor that is operatively coupled to the filter. In some embodiments, to controllably adjust the angle is from about 1 degree to about 8 degrees. In some embodiments, the one or more controllers are configured to controllably adjust the angle before, after, and/or during the printing the at least one three-dimensional object. In some embodiments, the leveling member comprises a gas- or liquid-filled bladder. In some embodiments, the one or more controllers are programmed to facilitate. filling at least a portion of the bladder with the gas or liquid to position the filtration member at the angle. In some embodiments, the one or more controllers are programmed to adjust the angle in response to a detection of one or more sensors, which one or more sensors are configured to detect at least one characteristic of the filtering. In some embodiments, the at least one characteristic comprises a flow rate and/or a level of (I) the first portion of the remainder and/or (II) the second portion of the remainder. In some embodiments, the filtration member is operatively coupled with a movable member of an agitator, wherein the one or more controllers are coupled with agitator and are programmed to facilitate the filtering by modulating the movable member. In some embodiments, the agitator comprises a transducer, which transducer comprises a transducer sensor operable to detect a power supply requirement of the transducer to achieve a setpoint movement (e.g., amplitude) of the movable member. In some embodiments, the one or more controllers are programmed to adjust the angle considering a detection of the transducer sensor. In some embodiments, at least two of (A) the ingress of the material, (B) modulating the movable member, and (C) adjust the angle are facilitated by the same controller. In some embodiments, at least two of (A) the ingress of the material, (B) modulating the movable member, and (C) adjust the angle are facilitated by different controllers. In some embodiments, the volume comprises an atmosphere that is different from an external atmosphere, which external atmosphere comprises a reactive agent. In some embodiments, the reactive agent is reactive with the pre-transformed material and/or a product of the printing. In some embodiments, the material comprises a pre-transformed material, which pre-transformed material is transformed to a transformed material by an energy beam during the printing. In some embodiments, the pre-transformed material comprises an elemental metal, metal alloy, ceramic, an allotrope of elemental carbon, a polymer, or a resin In another aspect, a method of printing at least one three-dimensional object comprises: (a) flowing a material to a volume of a filtering enclosure comprising an atmosphere, wherein the material comprises (1) a remainder of a pre-transformed material used to print the three-dimensional object, or (2) a debris produced during the printing of the three-dimensional object; and (b) filtering the remainder through a filtration member disposed in the volume, which filtration member is disposed at an angle with respect to a normal to the gravitational field vector.

In some embodiments, the method further comprises vertically translating a platform that supports the at least one three-dimensional object during the printing. In some embodiments, the angle facilitates simultaneous separation between (i) a first portion of the remainder that flows through the filtration member from one exposed surface of the filtration member to an opposing exposed surface of the filtration member, and (ii) a second portion of the remainder that slides on the one exposed surface of the filtration member to (a) an outlet port of the filtering enclosure and/or (b) a collection volume. In some embodiments, angle is adjustable. In some embodiments, adjustable is before, after, and/or during the printing the at least one three-dimensional object. In some embodiments, the method further comprises adjusting the angle in response to detecting a rate of the filtering of the remainder. In some embodiments, the method further comprises providing a filtered portion of the remainder to a material reservoir. In some embodiments, the method further comprises adjusting the angle in response to detecting a rate and/or a level of filtered material (e.g., in the material reservoir). In some embodiments, the method further comprises altering at least one mechanism of the printing in response to detecting a rate and/or a level of filtered material. In some embodiments, the level of the filtered material comprises the level of the first portion (e.g., collected at a first reservoir) and/or the level of the second portion (e.g., collected at a second reservoir). In some embodiments, the method further comprises alternatingly providing the filtered portion to at least two material reservoirs. In some embodiments, at least one of the at least two material reservoirs is providing at least a part of the filtered portion to a processing chamber for printing the at least one three-dimensional object. In some embodiments, the method further comprises providing the second portion of the remainder to a removal container. In some embodiments, the method further comprises adjusting the angle in response to detecting a rate and/or a level of removed material in the removal container. In some embodiments, the method further comprises isolating the filtration member from a remainder of the filtering enclosure. In some embodiments, the isolating comprises mechanically isolating or thermally isolating. In some embodiments, the method further comprises moving the filtration member within the volume to facilitate the filtering. In some embodiments, the moving comprises vibration. In some embodiments, the moving comprises a horizontal and/or vertical movement. In some embodiments, the moving comprises a cyclical movement. In some embodiments, the filtering comprises de-blinding a filter mesh of the filtration member. In some embodiments, the method further comprises filtering at a rate of at least about 0.5 cubic centimeters of material per minute, per square centimeter of filtration member filtering area. In some embodiments, the method further comprises filtering at a rate of at least about 50 kilograms of material. In some embodiments, the method further comprises separating at least some of the debris from the material prior to flowing the material to the volume in (a), wherein separating comprises cyclonic separation. In some embodiments, the material in (a) is from a processing chamber in which the at least one three-dimensional object is printing. In some embodiments, the debris is formed during transformation of the pre-transformed material (e.g., by an energy beam), during the printing. In some embodiments, filtering is during the printing. In some embodiments the filtering is during the printing and/or without (e.g., substantially) interrupting the printing.

In another aspect, a system for printing a three-dimensional object comprises: a filtering enclosure comprising: (i) at least one wall enclosing a volume that is configured to accommodate an internal atmosphere, wherein the internal atmosphere is different from an external atmosphere that comprises a reactive agent, (ii) an inlet port disposed in the at least one wall, which inlet port is configured to facilitate ingress of a material to the volume, which material comprises a remainder of a pre-transformed material used for printing the three-dimensional object, (iii) a cartridge opening disposed in the at least one wall, and (iv) a gas opening operatively coupled to the volume and configured to facilitate flow of gas there through; and a supportive structure configured to accommodate a cartridge comprising a filter and a frame configured to support the filter, which cartridge is configured to: allow entry through the cartridge opening, allow exit through the cartridge opening, and fit in the volume; and one or more controllers operatively coupled to the inlet port, wherein the one or more controllers are individually or collectively configured to direct: (A) upon disposal of the cartridge in the volume and establishment of the internal atmosphere in the volume, facilitate flow of the remainder of the pre-transformed material from a processing chamber through the inlet port into the volume; and (B) upon exit of the cartridge through the opening (i) facilitate reducing a rate at which the reactive agent from the external atmosphere exits from the volume through the inlet port to the processing chamber, which reducing is at least during the printing to print the three-dimensional printing in a printing atmosphere, and (ii) facilitate flow of an internal atmosphere gas into the volume to purge the reactive agent of the external atmosphere from the volume.

In some embodiments, the system further comprises a processing chamber configured to accommodate printing of the three-dimensional object. In some embodiments, the system further comprises a vertically translatable platform configured to support the three-dimensional object during its printing. In some embodiments, the platform is disposed in the processing chamber. In some embodiments, the one or more controllers are operatively coupled to the platform and are configured to direct the platform to translate vertically during the printing. In some embodiments, the filtering enclosure is operatively coupled to a material remover to receive the material for filtration from the material remover. In some embodiments, the material remover removes the material by (i) attracting a gas and the material into an internal volume of the remover and (ii) cyclonically separating the material from the gas in the remover. In some embodiments, the supportive structure comprises a protrusion, depression, ledge, or a railing. In some embodiments, the supportive structure is configured to support the cartridge upon filtering at least 50 kilograms. In some embodiments, the supportive structure is configured to support the cartridge upon filtering at least 500 kilograms. In some embodiments, the supportive structure is configured to support the cartridge upon filtering at a throughput of at least about six (6) cubic centimeters of material per hour (cc/hr). In some embodiments, the supportive structure is configured to support the cartridge upon filtering a material having a fundamental length scale of at most 1000 micrometers. In some embodiments, the pre-transformed material has a fundamental length scale of at most 1000 micrometers. In some embodiments, the debris comprises material having a fundamental length scale of above 50 micrometers. In some embodiments, the system further comprises an enclosure configured to accommodate the three-dimensional object during the printing. In some embodiments, the system further comprises a movable platform configured to support the three-dimensional object during its printing in the enclosure. In some embodiments, the system further comprises an energy beam configured to transform the pre-transformed material to a transformed material to print the three-dimensional object. In some embodiments, the pre-transformed material comprises a particulate material. In some embodiments, the remainder of the pre-transformed material comprises a debris that is generated during the printing of the three-dimensional object. In some embodiments, the system further comprises a secondary exit opening disposed in the at least one wall, wherein the filtering enclosure is configured to filter the pre-transformed material from a larger material and simultaneous eviction of any large material from the filtering enclosure through the secondary exit opening. In some embodiments, the larger material is a byproduct of the 3D printing. In some embodiments, (a) the inlet port comprises a first valve and/or (b) the gas opening comprise a second valve, wherein the one or more controllers are operatively coupled to the first valve and/or second valve. In some embodiments, the one or more controllers are configured to direct the first valve of the inlet port to open to facilitate the flow of the remainder of the pre-transformed material upon the disposal of the cartridge in (A). In some embodiments, the one or more controllers are configured to direct the second valve of the gas opening to open to facilitate establishing the internal atmosphere in the volume in (A). In some embodiments, the one or more controllers are configured to direct the first valve of the inlet port to close and/or the second valve of the gas opening to open, to facilitate reduction of the rate at which the reactive agent from the external atmosphere exits from the volume. In some embodiments, a gas flow is continuously provided to the inlet port and/or the gas opening, wherein the one or more controllers are configured to direct the first valve and/or second valve to open and close to allow and to prevent, respectively, the gas flow therethrough. In some embodiments, the system further comprises a gas source configured to supply gas via a source outlet coupled with the gas opening. In some embodiments, the gas is an active compressed gas source (e.g., a pump or a blower). In some embodiments, the gas is a passive compressed gas source (e.g., a compressed gas cylinder). In some embodiments, the one or more controllers are operatively coupled to the gas source and configured to direct the flow of gas therefrom. In some embodiments, the one or more controllers are configured to alternatively open or close the first valve to allow or to prevent the flow of gas therethrough. In some embodiments, a gas flow to the inlet port and the gas opening is the same, which gas flow comprises an inert atmosphere. In some embodiments, a gas flow to the inlet port and the gas opening are different, which gas flow comprises an inert atmosphere. In some embodiments, a gas flow to the inlet port is different than a second gas flow to the gas opening. In some embodiments, the reactive agent is reactive with the pre-transformed material and/or with a product of the printing. In some embodiments, the fit of the cartridge in the volume facilitates a filtering of the remainder of the pre-transformed material. In some embodiments, the fit of the cartridge in the volume facilitates a hermetic seal of the volume with respect to the external atmosphere. In some embodiments, the system further comprises a closure (e.g., face plate) that is configured to reversibly (e.g., hermetically) seal of the cartridge opening upon engagement. In some embodiments, the system further comprises at least one sensor disposed within the volume, the inlet port, and/or the gas opening, which at least one sensor is operable to detect a presence of the reactive agent and/or an operational condition of the filter. In some embodiments, the one or more controllers are configured to purge the reactive agent in (ii) considering a detection result from the at least one sensor. In some embodiments, the system further comprises a robotic arm operable to couple with the cartridge and to insert and remove the cartridge through the cartridge opening, wherein the one or more controllers are operatively coupled with the robotic arm, and are configured to direct the robotic arm to remove a first cartridge and/or to insert a second cartridge while: considering a detection result from the at least one sensor for operating the robotic arm, programmed to operate the robotic arm at predetermined time(s) (e.g., and manner(s)). In some embodiments, the inlet port is coupled to an outlet port of a recycling system, which recycling system comprises a cyclonic separator having an internal volume for cyclonically separating the remainder of the pre-transformed material from at least a part of a debris formed during the printing. In some embodiments, the system further comprises a faceplate operable to detachably couple with the filtering enclosure to seal the cartridge opening. In some embodiments, the faceplate is integrally formed with the frame of the cartridge.

In another aspect, a method of printing a three-dimensional object comprises at least while printing: (a) reducing a gas flow that flows from (1) an internal volume of a processing chamber in which the three-dimensional object is being printed to (2) an internal volume of a filtering enclosure; (b) removing a first filtering cartridge from the internal volume of the filtering enclosure to an external atmosphere comprising a reactive agent, which removing is through a cartridge opening, wherein a filtering cartridge is for filtering a remainder of a pre-transformed material used for printing the three-dimensional object; (c) inserting a second filtering cartridge from the external atmosphere through the cartridge opening to the internal volume of the filtering enclosure; and (d) purging the external atmosphere from the internal volume by flowing an internal atmosphere gas into the volume.

In some embodiments, the method further comprises vertically translating a platform for printing at least a portion of the three-dimensional object (e.g., in the processing chamber). In some embodiments, the method further comprises after (d) (e.g., and during the printing), increasing a gas flow that flows from (1) an internal volume of a processing chamber in which the three-dimensional object is being printed to (2) an internal volume of a filtering enclosure. In some embodiments, the removing the first filtering cartridge in (b), the inserting the second filtering cartridge in (c), and/or the purging the external atmosphere in (d) are during reduction of the gas flow in (a). In some embodiments, the method further comprises maintaining a printing atmosphere that is different from the external atmosphere in the internal volume of the processing chamber. In some embodiments, maintaining the printing atmosphere is during reduction of the gas flow in (a), removal of the first filtering cartridge in (b), insertion of the second filtering cartridge in (c), and/or purging of the external atmosphere in (d). In some embodiments, a same gas is used for maintaining the printing atmosphere and for purging the external atmosphere in (d). In some embodiments, a first gas used for maintaining the printing atmosphere is different than a second gas used for purging the external atmosphere in (d). In some embodiments, reducing the gas flow in (a) comprises closing a material inlet to the filtering enclosure, which material inlet is for receiving the remainder of the pre-transformed material. In some embodiments, the external atmosphere is an ambient atmosphere. In some embodiments, the reactive agent is reactive with a reactant and/or with a product of the printing (e.g., during the printing). In some embodiments, inserting the second filtering cartridge in (c) comprises hermetically sealing the filtering enclosure with respect to the external atmosphere. In some embodiments, removing the first filtering cartridge considers a (e.g., predetermined) duration over which the first filtering cartridge has been filtering the remainder of the pre-transformed material. In some embodiments, the method further comprises monitoring an operating condition of the first filtering cartridge, wherein (a)-(d) are performed considering the operating condition. In some embodiments, the operating condition comprises a filtering rate at which the first filtering cartridge is filtering the remainder of pre-transformed material. In some embodiments, the operating condition comprises any damage to the first filtering cartridge, which damage comprises a puncture, a tear, or a misalignment of the filtering cartridge. In some embodiments, the pre-transformed material comprises an elemental metal, metal alloy, ceramic, allotrope of elemental carbon, polymer, or a resin. In some embodiments, the method further comprises (e.g., prior to (a) and/or after (d)): simultaneously (i) separating the pre-transformed material from a larger byproduct of the 3D printing and (ii) evicting the larger byproduct from the filtering enclosure.

Another aspect of the present disclosure provides systems, apparatuses (e.g., controllers), and/or non-transitory computer-readable medium (e.g., software) that implement any of the methods disclosed herein.

In another aspect, an apparatus for printing one or more 3D objects comprises a controller that is programmed to direct a mechanism used in a 3D printing methodology to implement (e.g., effectuate) any of the method disclosed herein, wherein the controller is operatively coupled to the mechanism. The controller may implement any of the methods disclosed herein.

In another aspect, an apparatus for printing one or more 3D objects comprises at least one controller that is programmed to implement (e.g., effectuate) the method disclosed herein. The controller may implement any of the methods disclosed herein.

In another aspect, a system for printing one or more 3D objects comprises an apparatus (e.g., used in a 3D printing methodology) and at least one controller that is programmed to direct operation of the apparatus, wherein the at least one controller is operatively coupled to the apparatus. The apparatus may include any apparatus disclosed herein. The at least one controller may implement any of the methods disclosed herein. The at least one controller may direct any apparatus (or component thereof) disclosed herein.

In another aspect, a computer software product, comprising a non-transitory computer-readable medium in which program instructions are stored, which instructions, when read by a computer, cause the computer to direct a mechanism used in the 3D printing process to implement (e.g., effectuate) any of the method disclosed herein, wherein the non-transitory computer-readable medium is operatively coupled to the mechanism. Wherein the mechanism comprises an apparatus or an apparatus component.

Another aspect of the present disclosure provides a non-transitory computer-readable medium comprising machine-executable code that, upon execution by one or more computer processors, implements any of the methods disclosed herein.

Another aspect of the present disclosure provides a non-transitory computer-readable medium comprising machine-executable code that, upon execution by one or more computer processors, effectuates directions of the controller(s) (e.g., as disclosed herein).

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein and/or effectuates directions of the controller(s) disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

Figure 1:
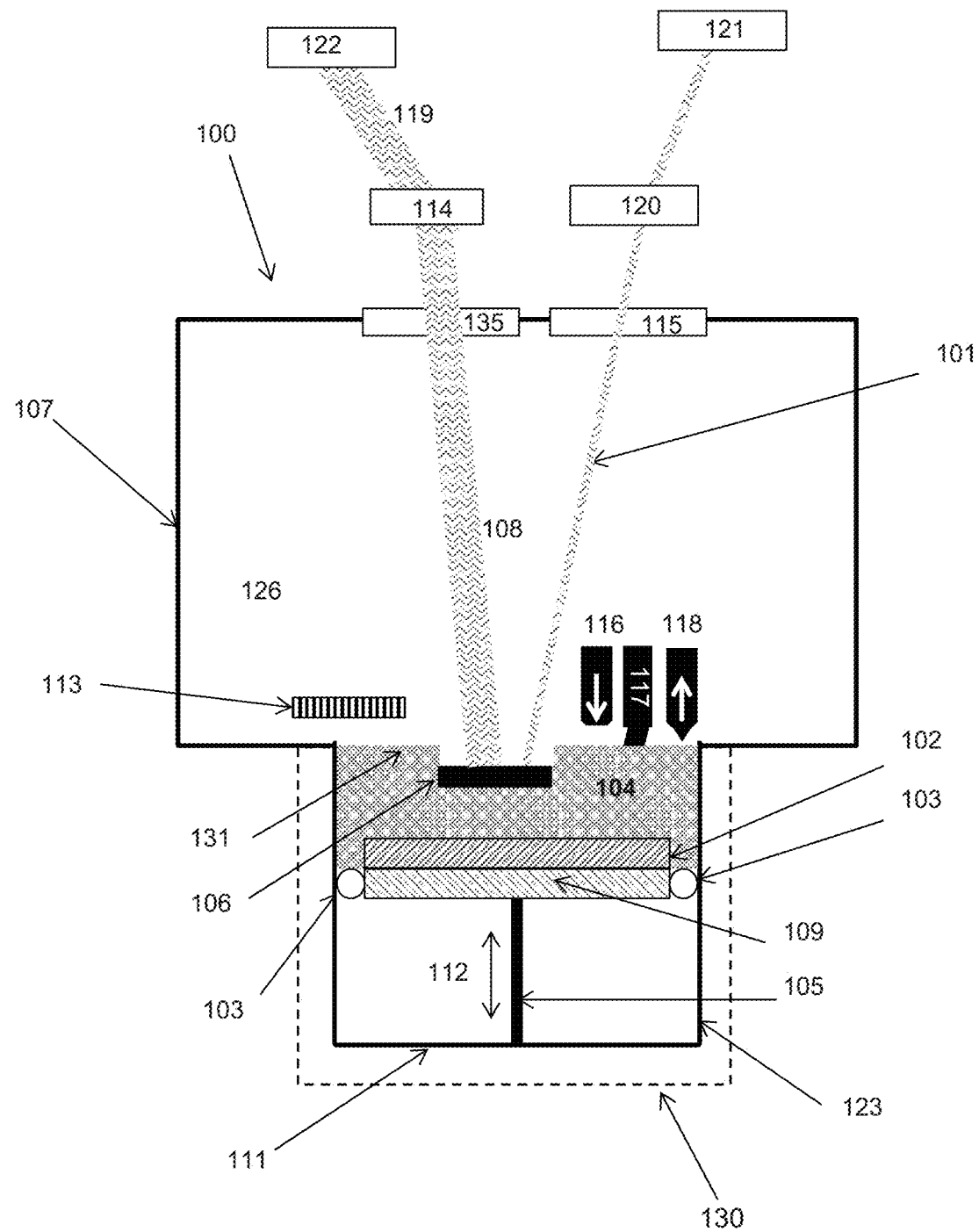
FIG. 1 schematically illustrates a vertical cross-sectional view of a three-dimensional (3D) printing system and its components.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a", "an" and "the" are not intended to refer to only a singular entity, but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes 'next to', 'adjoining', 'in contact with', and 'in proximity to.'

The term "operatively coupled" or "operatively connected" refers to a first mechanism that is coupled (or connected) to a second mechanism to allow the intended operation of the second and/or first mechanism. The coupling may comprise physical or non-physical coupling. The non-physical coupling may comprise signal induced coupling (e.g., wireless coupling).

The present disclosure provides three-dimensional (3D) printing apparatuses, systems, software, and methods for forming a 3D object. For example, a 3D object may be formed by sequential addition of material or joining of pre-transformed material to form a structure in a controlled manner (e.g., under manual or automated control). Pre-transformed material, as understood herein, is a material before it has been transformed during the 3D printing process. The transformation can be effectuated by utilizing an energy beam and/or flux. The pre-transformed material may be a material that was, or was not, transformed prior to its use in a 3D printing process. The pre-transformed material may be a starting material for the 3D printing process. The pre-transformed material may comprise a particulate material. The pre-transformed material may comprise a liquid, solid, or semi-solid. The particulate material may comprise solid particles, semi-solid particles, or vesicles (e.g., comprising liquid or semi-liquid material). Pre-transformed material as understood herein is a material before it has been transformed by an energy beam during the 3D printing process. The pre-transformed material may be a material that was, or was not, transformed prior to its use in the 3D printing process.

In some embodiments of a 3D printing process, the deposited pre-transformed material is fused, (e.g., sintered or melted), bound or otherwise connected to form at least a portion of the desired 3D object. Fusing, binding or otherwise connecting the material is collectively referred to herein as "transforming" the material. Fusing the material may refer to melting, smelting, or sintering a pre-transformed material.

At times, melting comprises liquefying the material (i.e., transforming to a liquefied state). A liquefied state refers to a state in which at least a portion of a transformed material is in a liquid state. Melting may comprise liquidizing the material (i.e., transforming to a liquidus state). A liquidus state refers to a state in which an entire transformed material is in a liquid state. The apparatuses, methods, software, and/or systems provided herein are not limited to the generation of a single 3D object, but are may be utilized to generate one or more 3D objects simultaneously (e.g., in parallel) or separately (e.g., sequentially). The multiplicity of 3D object may be formed in one or more material beds (e.g., powder bed). In some embodiments, a plurality of 3D objects is formed in one material bed. The fundamental length scale (FLS) (e.g., width, depth, and/or height) of the material bed can be at least about 50 millimeters (mm), 60 mm, 70 mm, 80 mm, 90 mm, 100 mm, 200 mm, 250 mm, 280 mm, 320 mm, 400 mm, 500 mm, 800 mm, 900 mm, 1 meter (m), 2 m or 5 m. The FLS (e.g., width, depth, and/or height) of the material bed can be at most about 50 millimeters (mm), 60 mm, 70 mm, 80 mm, 90 mm, 100 mm, 200 mm, 250 mm, 280 mm, 320 mm, 400 mm, 500 mm, 800 mm, 900 mm, 1 meter (m), 2 m or 5 m. The FLS of the material bed can be between any of the afore-mentioned values (e.g., from about 50 mm to about 5 m, from about 250 mm to about 500 mm, from about 280 mm to about 1 m).

In some embodiments, 3D printing methodologies comprises extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition.

In some embodiments, the 3D printing methodologies differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

In some embodiments, the deposited pre-transformed material within the enclosure comprises a liquid material, semi-solid material (e.g., gel), or a solid material (e.g., powder). The deposited pre-transformed material within the enclosure can be in the form of a powder, wires, sheets, or droplets. The material (e.g., pre-transformed, transformed, and/or hardened) may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball, or a carbon nanotube. The ceramic material may comprise cement. The ceramic material may comprise alumina, zirconia, or carbide (e.g., silicon carbide, or tungsten carbide). The ceramic material may include high performance material (HPM). The ceramic material may include a nitride (e.g., boron nitride or aluminum nitride). The material may comprise sand, glass, or stone. In some embodiments, the material may comprise an organic material, for example, a polymer or a resin (e.g., 114 W resin). The organic material may comprise a hydrocarbon. The polymer may comprise styrene or nylon (e.g., nylon 11). The polymer may comprise a thermoplast. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) and/or wires. The bound material can comprise chemical bonding. Transforming can comprise chemical bonding. Chemical bonding can comprise covalent bonding. The pre-transformed material may be pulverous. The printed 3D object can be made of a single material (e.g., single material type) or multiple materials (e.g., multiple material types). Sometimes one portion of the 3D object and/or of the material bed may comprise one material, and another portion may comprise a second material different from the first material. The material may be a single material type (e.g., a single alloy or a single elemental metal). The material may comprise one or more material types. For example, the material may comprise two alloys, an alloy and an elemental metal, an alloy and a ceramic, or an alloy and an elemental carbon. The material may comprise an alloy and alloying elements (e.g., for inoculation). The material may comprise blends of material types. The material may comprise blends with elemental metal or with metal alloy. The material may comprise blends excluding (e.g., without) elemental metal or including (e.g., with) metal alloy. The material may comprise a stainless steel. The material may comprise a titanium alloy, aluminum alloy, and/or nickel alloy.

In some cases, a layer within the 3D object comprises a single type of material. In some examples, a layer of the 3D object may comprise a single elemental metal type, or a single alloy type. In some examples, a layer within the 3D object may comprise several types of material (e.g., an elemental metal and an alloy, an alloy and a ceramic, an alloy, and an elemental carbon). In certain embodiments, each type of material comprises only a single member of that type. For example: a single member of elemental metal (e.g., iron), a single member of metal alloy (e.g., stainless steel), a single member of ceramic material (e.g., silicon carbide or tungsten carbide), or a single member of elemental carbon (e.g., graphite). In some cases, a layer of the 3D object comprises more than one type of material. In some cases, a layer of the 3D object comprises more than member of a type of material.

In some examples the material bed, platform, or both material bed and platform comprise a material type which constituents (e.g., atoms) readily lose their outer shell electrons, resulting in a free-flowing cloud of electrons within their otherwise solid arrangement. In some examples the powder, the base, or both the powder and the base comprise a material characterized in having high electrical conductivity, low electrical resistivity, high thermal conductivity, or high density. The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times." The high electrical conductivity can be between any of the afore-mentioned electrical conductivity values (e.g., from about $1*10^5$ S/m to about $1*10^8$ S/m). The thermal conductivity, electrical resistivity, electrical conductivity, and/or density can be measured at ambient temperature (e.g., at R.T., or 20° C.). The low electrical resistivity may be at most about $1*10^{-5}$ ohm times meter ($\Omega$*m), $5*10^{-6}$ $\Omega$*m, $1*10^{-6}$ $\Omega$*m, $5*10^{-7}$ $\Omega$*m, $1*10^{-7}$ $\Omega$*m, $5*10^{-8}$ or $1*10^{-8}$ $\Omega$*m. The low electrical resistivity can be between any of the afore-mentioned values (e.g., from about $1\times10^{-5}$ $\Omega$*m to about $1\times10^{-8}$ $\Omega$*m). The high thermal conductivity may be at least about 10 Watts per meter times Kelvin (W/mK), 15 W/mK, 20 W/mK, 35 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be between any of the afore-mentioned thermal conductivity values (e.g., from about 20 W/mK to about 1000 W/mK). The high density may be at least about 1.5 grams per cubic centimeter (g/cm$^3$), 1.7 g/cm$^3$, 2 g/cm$^3$, 2.5 g/cm$^3$, 2.7 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the afore mentioned values (e.g., from about 1 g/cm$^3$ to about 25 g/cm$^3$).

In some embodiments, the elemental metal comprises an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium or Osmium. The transition metal can be mercury. The rare earth metal can be a lanthanide or an actinide. The antinode metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth. The material may comprise a precious metal. The precious metal may comprise gold, silver, palladium, ruthenium, rhodium, osmium, iridium, or platinum. The material may comprise at least about 40%, 50%, 60%, 70%, 80%, 90%, 95%, 97%, 98%, 99%, 99.5% or more precious metal. The material may comprise at most about 40%, 50%, 60%, 70%, 80%, 90%, 95%, 97%, 98%, 99%, 99.5% or less precious metal. The material may comprise precious metal with any value in between the afore-mentioned values. The material may comprise at least a minimal percentage of precious metal according to the laws in the particular jurisdiction.

In some embodiments, the metal alloy comprises iron based alloy, nickel based alloy, cobalt based alloy, chrome based alloy, cobalt chrome based alloy, titanium based alloy, magnesium based alloy, scandium alloy or copper based alloy. The alloy may comprise an oxidation or corrosion resistant alloy. The alloy may comprise a super alloy (e.g., Inconel). The super alloy may comprise Inconel 600, 617, 625, 690, 718 or X-750. The alloy may comprise an alloy used for aerospace applications, automotive application, surgical application, or implant applications. The metal may include a metal used for aerospace applications, automotive application, surgical application, or implant applications. The super alloy may comprise IN 738 LC, IN 939, Rene 80, IN 6203 (e.g., IN 6203 DS), PWA 1483 (e.g., PWA 1483 SX), or Alloy 247.

In some embodiments, the metal alloys comprise Refractory Alloys. The refractory metals and alloys may be used for heat coils, heat exchangers, furnace components, or welding electrodes. The Refractory Alloys may comprise a high melting point, low coefficient of expansion, mechanically strong, low vapor pressure at elevated temperatures, high thermal conductivity, or high electrical conductivity.

At times, the material (e.g., alloy or elemental) comprises a material used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The material may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, tablet, i-pad), air conditioning, generators, furniture, musical equipment, art, jewelry, cooking equipment, or sport gear. The material may comprise an alloy used for products for human or veterinary applications comprising implants, or prosthetics. The metal alloy may comprise an alloy used for applications in the fields comprising human or veterinary surgery, implants (e.g., dental), or prosthetics.

At times, the alloy includes a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron-based alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron-based alloy may include cast iron or pig iron. The steel may include Bulat steel, Chromoly, Crucible steel, Damascus steel, Hadfield steel, High speed steel, HSLA steel, Maraging steel, Maraging steel (M300), Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 317L, 2205, 409, 904L, 321, 254SMO, 316Ti, 321H, 17-4, 15-5, 420 or 304H. The steel may comprise stainless steel of at least one crystalline structure selected from the group consisting of austenitic, superaustenitic, ferritic, martensitic, duplex and precipitation-hardening martensitic. Duplex stainless steel may be lean duplex, standard duplex, super duplex or hyper duplex. The stainless steel may comprise surgical grade stainless steel (e.g., austenitic 316, martensitic 420 or martensitic 440). The austenitic 316 stainless steel may include 316L or 316LVM. The steel may include 17-4 Precipitation Hardening steel (also known as type 630 is a chromium-copper precipitation hardening stainless steel; 17-4PH steel). The stainless steel may comprise 360L stainless steel.

At times, the titanium-based alloys include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38 or higher. In some instances, the titanium base alloy includes $TiAl_6V_4$ or $TiAl_6Nb_7$.

At times, the Nickel based alloy include Alnico, Alumel, Chromel, Cupronickel, Ferronickel, German silver, Hastelloy, Inconel, Monel metal, Nichrome, Nickel-carbon, Nicrosil, Nisil, Nitinol, Hastelloy X, Cobalt-Chromium or Magnetically "soft" alloys. The magnetically "soft" alloys may comprise Mu-metal, Permalloy, Supermalloy, or Brass. The Brass may include nickel hydride, stainless or coin silver.

The cobalt alloy may include Megallium, Stellite (e. g. Talonite), Ultimet, or Vitallium. The chromium alloy may include chromium hydroxide, or Nichrome.

At times, the aluminum-based alloy includes AA-8000, Al—Li (aluminum-lithium), Alnico, Duralumin, Hiduminium, Kryron Magnalium, Nambe, Scandium-aluminum, or, Y alloy. The magnesium alloy may be Elektron, Magnox or T-Mg—Al—Zn (Bergman phase) alloy. At times, the material excludes at least one aluminum-based alloy (e.g., $AlSi_{10}Mg$).

At times, the copper based alloy comprises Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu, or Speculum metal. The copper alloy may be a high-temperature copper alloy (e.g., GRCop-84). The elemental carbon may comprise graphite, Graphene, diamond, amorphous carbon, carbon fiber, carbon nanotube, or fullerene.

Any of the apparatuses and/or their components disclosed herein may be built by a material disclosed herein. The apparatuses and/or their components comprise a transparent or non-transparent (e.g., opaque) material. For example, the apparatuses and/or their components may comprise an organic or an inorganic material. For example, may comprise the apparatuses and/or their components may comprise an elemental metal, metal alloy, ceramic, or an allotrope of elemental carbon. For example, the enclosure, platform, recycling system, or any of their components may comprise an elemental metal, metal alloy, ceramic, or an allotrope of elemental carbon.

In some embodiments, the pre-transformed material (e.g., particulate material, such as powder material, (also referred to herein as a "pulverous material")) comprises a solid. The particulate material may comprise fine particles. The pre-transformed material may be a granular material. The pre-transformed material (e.g., powder) can be composed of individual particles. At least some of the particles can be spherical, oval, prismatic, cubic, or irregularly shaped. At least some of the particles can have a fundamental length scale (e.g., diameter, spherical equivalent diameter, length, width, or diameter of a bounding sphere). The fundamental length scale (abbreviated herein as "FLS") of at least some of the particles can be from about 1 nanometers (nm) to about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, or 5 nm. At least some of the particles can have a FLS of at least about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nanometers (nm) or more. At least some of the particles can have a FLS of at most about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nm or less. In some cases, at least some of the pre-transformed material particles may have a FLS in between any of the aforementioned FLSs.

In some embodiments, the pre-transformed (e.g., particulate) material is composed of a homogenously shaped particle mixture such that all of the particles have substantially the same shape and FLS magnitude within at most about 1%, 5%, 8%, 10%, 15%, 20%, 25%, 30%, 35%, 40%, 50%, 60%, 70%, or less distribution of FLS. In some cases, the powder can be a heterogeneous mixture such that the particles have variable shape and/or FLS magnitude. In some examples, at least about 30%, 40%, 50%, 60%, or 70% (by weight) of the particles within the powder material have a largest FLS that is smaller than the median largest FLS of the powder material. In some examples, at least about 30%, 40%, 50%, 60%, or 70% (by weight) of the particles within the powder material have a largest FLS that is smaller than the mean largest FLS of the powder material.

In some examples, the size of the largest FLS of the transformed material (e.g., height) is greater than the average largest FLS of the powder material by at least about 1.1 times, 1.2 times, 1.4 times, 1.6 times, 1.8 times, 2 times, 4 times, 6 times, 8 times, or 10 times. In some examples, the size of the largest FLS of the transformed material is greater than the median largest FLS of the powder material by at most about 1.1 times, 1.2 times, 1.4 times, 1.6 times, 1.8 times, 2 times, 4 times, 6 times, 8 times, or 10 times. The powder material can have a median largest FLS that is at least about 1 μm, 5 μm, 10 μm, 20 μm, 30 μm, 40 μm, 50 μm, 100 μm, or 200 μm. The powder material can have a median largest FLS that is at most about 1 μm, 5 μm, 10 μm, 20 μm, 30 μm, 40 μm, 50 μm, 100 μm, or 200 μm. In some cases, the powder particles may have a FLS in between any of the FLS listed above (e.g., from about 1 μm to about 200 μm, from about 1 μm to about 50 μm, or from about 5 μm to about 40 μm).

In another aspect provided herein is a system for generating a 3D object comprising: an enclosure for accommodating at least one layer of pre-transformed material (e.g., powder); an energy (e.g., energy beam) capable of transforming the pre-transformed material to form a transformed material; and a controller that directs the energy to at least a portion of the layer of pre-transformed material according to a path (e.g., as described herein). The transformed material may be capable of hardening to form at least a portion of a 3D object. The system may comprise an energy source, an optical system, a temperature control system, a material delivery mechanism (e.g., a recoater), a pressure control system, an atmosphere control system, an atmosphere, a pump, a nozzle, a valve, a sensor, a central processing unit, a display, a chamber, or an algorithm. The chamber may comprise a building platform. The system for generating a 3D object and its components may be any 3D printing system such as, for example, the one described in Patent Application serial number PCT/US15/36802 filed on Jun. 19, 2015, titled "APPARATUSES, SYSTEMS AND METHODS FOR THREE-DIMENSIONAL PRINTING;" in Patent Application serial number PCT/US17/18191 filed on Feb. 16, 2017, titled "ACCURATE THREE-DIMENSIONAL PRINTING;" in Patent Application serial number EP17156707.6 filed on Feb. 17, 2017, titled "ACCURATE THREE-DIMENSIONAL PRINTING;" or in patent application Ser. No. 15/435,065 filed on Feb. 16, 2017, titled "ACCURATE THREE-DIMENSIONAL PRINTING," each of which is entirely incorporated herein by reference.

In some embodiments, the 3D printing system comprises a chamber (e.g., FIG. 1, 126). The chamber may be referred herein as the "processing chamber." The processing chamber may comprise an energy beam (e.g., FIG. 1, 101; 108). The energy beam may be directed towards an exposed surface (e.g., FIG. 1, 131) of a material bed (e.g., FIG. 1, 104). The 3D printing system may comprise one or more modules. The one or more modules may be referred herein as the "build modules." At times, at least one build module (e.g., FIG. 1, 130) may be situated in the enclosure comprising the processing chamber (e.g., FIG. 1, 126). At times, at least one build module may engage with the processing chamber (e.g., FIG. 1). At times, at least one build module may not engage with the processing chamber. At times, a plurality of build modules may be situated in an enclosure comprising the processing chamber. At times, the build module may be connected to, or may comprise an autonomous guided vehicle (AGV). The AGV may have at least one of the following: a movement mechanism (e.g., wheels), positional (e.g., optical) sensor, and controller. The controller may enable self-docking (e.g., to a docking station) and/or self-driving of the AGV. The self-docking and/or self-driving may be to and from the processing chamber. The build module may reversibly engage with (e.g., couple to) the processing chamber. The engagement of the build module with the processing chamber may be controlled (e.g., by a controller). The control may be automatic and/or manual. The engagement of the build module with the processing chamber may be reversible. In some embodiments, the engagement of the build module with the processing chamber may be permanent.

In some embodiments, at least one of the build modules has at least one controller. The controller may be its own controller. The controller may be different than the controller controlling the 3D printing process and/or the processing chamber. The translation facilitator (e.g., build module delivery system) may comprise a controller (e.g., its own controller). The controller of the translation facilitator may be different than the controller controlling the 3D printing process and/or the processing chamber. The controller of the translation facilitator may be different than the controller of the build module. The build module controller and/or the translation facilitator controller may be a microcontroller. At times, the controller of the 3D printing process and/or the processing chamber may not interact with the controller of the build module and/or translation facilitator. At times, the controller of the build module and/or translation facilitator may not interact with the controller of the 3D printing process and/or the processing chamber. For example, the controller of the build module may not interact with the controller of the processing chamber. For example, the controller of the translation facilitator may not interact with the controller of the processing chamber. The controller of the 3D printing process and/or the processing chamber may be able to interpret one or more signals emitted from (e.g., by) the build module and/or translation facilitator. The controller of the build module and/or translation facilitator may be able to interpret one or more signals emitted from (e.g., by) the processing chamber. The one or more signals may be electromagnetic, electronic, magnetic, pressure, or sound signals. The electromagnetic signals may comprise visible light, infrared, ultraviolet, or radio frequency signals. The electromagnetic signals may comprise a radio frequency identification signal (RFID). The RFID may be specific for a build module, user, entity, 3D object model, processor, material type, printing instruction, 3D print job, or any combination thereof.

In some embodiments, the build module controller controls the translation of the build module, sealing status of the build module, atmosphere of the build module, engagement of the build module with the processing chamber, exit of the build module from the enclosure, entry of the build module into the enclosure, or any combination thereof. Controlling the sealing status of the build module may comprise opening or closing of the build module shutter. The build module controller may be able to interpret signals from the 3D printing controller and/or processing chamber controller. The processing chamber controller may be the 3D printing controller. For example, the build module controller may be able to interpret and/or respond to a signal regarding the atmospheric conditions in the load lock. For example, the build module controller may be able to interpret and/or respond to a signal regarding the completion of a 3D printing process (e.g., when the printing of a 3D object is complete). The build module may be connected to an actuator. The actuator may be translating or stationary. The controller of the build module may direct the translation facilitator (e.g., actuator) to translate the build module from one position to another, when translation is possible. The translation facilitator may be a build module delivery system. The translation facilitator may be autonomous. The translation facilitator may operate independently of the 3D printer (e.g., mechanisms directed by the 3D printing controller). The translation facilitator (e.g., build module delivery system) may comprise a controller and/or a motor. The translation facilitator may comprise a machine or a human. The translation is possible, for example, when the destination position of the build module is empty. The controller of the 3D printing and/or the processing chamber may be able to sense signals emitted from the controller of the build module. For example, the controller of the 3D printing and/or the processing chamber may be able to sense a signal from the build module that is emitted when the build module is docked into engagement position with the processing chamber. The signal from the build module may comprise reaching a certain position in space, reaching a certain atmospheric characteristic threshold, opening, or shutting the build platform closing, or engaging or disengaging (e.g., docking or undocking) from the processing chamber. The build module may comprise one or more sensors. For example, the build module may comprise a proximity, movement, light, sounds, or touch sensor.

In some embodiments, the build module is included as part of the 3D printing system. In some embodiments, the build module is separate from the 3D printing system. The build module may be independent (e.g., operate independently) from the 3D printing system. For example, build module may comprise their own controller, motor, elevator, build platform, valve, channel, or shutter. In some embodiments, one or more conditions differ between the build module and the processing chamber, and/or among the different build modules. The difference may comprise different pre-transformed materials, atmospheres, platforms, temperatures, pressures, humidity levels, oxygen levels, gas (e.g., inert), traveling speed, traveling method, acceleration speed, or post processing treatment. For example, the relative velocity of the various build modules with respect to the processing chamber may be different, similar, or substantially similar. The build platform may undergo different, similar, or substantially similar post processing treatment (e.g., further processing of the 3D object and/or material bed after the generation of the 3D object in the material bed is complete).

In some examples, a build module translates relative to the processing chamber. The translation may be parallel or substantially parallel to the bottom surface of the build module (e.g., build chamber). The bottom surface of the build module is the one closest to the gravitational center. The translation may be at an angle (e.g., planar or compound) relative to the bottom surface of the build module. The translation may use any device that facilitates translation (e.g., an actuator). For example, the translation facilitator may comprise a robotic arm, conveyor (e.g., conveyor belt), rotating screw, or a moving surface (e.g., platform). The translation facilitator may comprise a chain, rail, motor, or an actuator. The translation facilitator may comprise a component that can move another. The movement may be controlled (e.g., using a controller). The movement may comprise using a control signal and source of energy (e.g., electricity). The translation facilitator may use electricity, pneumatic pressure, hydraulic pressure, or human power.

In some embodiments, the 3D printing system comprises at least 1, 2, 3, 4, 5, 6, 7, 8, 9, or 10 build modules. At least one build module may engage with the processing chamber to expand the interior volume of the processing chamber. During at least a portion of the 3D printing process, the atmospheres of the chamber and enclosure may merge. At times, during at least a portion of the 3D printing process, the atmospheres of the chamber and enclosure may remain separate. During at least a portion of the 3D printing process, the atmospheres of the build module and processing chamber may be separate. The build module may be mobile or stationary. The build module may comprise an elevator. The elevator may be connected to a platform (e.g., building platform). The elevator may be reversibly connected to at least a portion of the platform (e.g., to the base). The elevator may be irreversibly connected to at least a portion of the platform (e.g., to the substrate). The platform may be separated from one or more walls (e.g., side walls) of the build module by a seal (e.g., FIG. 1, 103). The seal may be impermeable or substantially impermeable to gas. The seal may be permeable to gas. The seal may be flexible. The seal may be elastic. The seal may be bendable. The seal may be compressible. The seal may comprise rubber (e.g., latex), Teflon, plastic, or silicon. The seal may comprise a mesh, membrane, sieve, paper (e.g., filter paper), cloth (e.g., felt), or brush. The mesh, membrane, paper and/or cloth may comprise randomly and/or non-randomly arranged fibers. The paper may comprise a HEPA filter. The seal may be permeable to at least one gas, and impermeable to the pre-transformed (e.g., and to the transformed) material. The seal may not allow a pre-transformed (e.g., and to the transformed) material to pass through.

In some embodiments, a shutter of the build module engages with a shutter of the processing chamber. The engagement may be spatially controlled. For example, when the shutter of the build module is within a certain gap distance from the processing chamber shutter, the build module shutter engages with the processing chamber shutter. The gap distance may trigger an engagement mechanism. The gap trigger may be sufficient to allow sensing of at least one of the shutters. The engagement mechanism may comprise magnetic, electrostatic, electric, hydraulic, pneumatic, or physical force. The physical force may comprise manual force. In some embodiments, a build module shutter may be attracted upwards toward the processing chamber shutter and a processing chamber shutter may be attracted upwards toward the build module shutter. A single unit may be formed from the processing chamber shutter and the build module shutter, that is transferred away from the energy beam. In the single unit, the processing chamber shutter and the build module shutter may be held together by an engagement mechanism. Subsequent to the engagement, the single unit may transfer (e.g., relocate, or move) away from the energy beam. For example, the engagement may trigger the transferring (e.g., relocating) of the build module shutter and the processing chamber shutter as a single unit.

In some examples, removal of the shutter (e.g., of the build module and/or processing chamber) depends on an atmospheric characteristic (e.g., within the build module or the processing chamber). At times, removal of the shutter (e.g., of the build module and/or processing chamber) may depend on reaching a certain (e.g., predetermined) level of an atmospheric characteristics comprising a gas content (e.g., relative gas content), gas pressure, oxygen level, humidity, argon level, or nitrogen level. For example, the certain level may be an equilibrium between an atmospheric characteristic in the build module and that atmospheric characteristics in the processing chamber.

In some embodiments, the 3D printing process initiates after merging of the build module with the processing chamber. At the beginning of the 3D printing process, the build platform may be at an elevated position. At the end of the 3D printing process, the build platform may be at a vertically reduced position. The building module may translate between three positions during a 3D printing run. The build module may enter to the enclosure from a position away from the engagement position with the processing chamber. The build module may then advance toward the processing chamber, and engage with the processing chamber. The layer dispensing mechanism and energy beam will translate and form the 3D object within the material bed (e.g., as described herein), while the platform gradually lowers its vertical position. The layer dispensing mechanism can dispense material at a dispensing rate of at least about at 50 grams/second (g/s), 55 g/s, 60 g/s, 70 g/s, 80 g/s, 84 g/s, 90 g/s, 100 g/s, 120 g/s, 150 g/s, 200 g/s, or 500 g/s. The dispensing rate can be between any of the afore-mentioned dispensing rates (e.g., from about 50 g/s to about 100 g/s, from about 80 g/s to about 120 g/s, from about 84 g/s to about 500 g/s, from about 55 g/s to about 500 g/s or from about 60 g/s to about 200 g/s). The layer dispenser mechanism can dispense a layer of a height of at least about 100 microns ($\mu m$), 150 $\mu m$, 200 $\mu m$, 250 $\mu m$, 300 $\mu m$, 350 $\mu m$, 400 $\mu m$, 450 $\mu m$, 500 $\mu m$, 550 $\mu m$, 600 $\mu m$, 650 $\mu m$, 700 $\mu m$, 750 $\mu m$, 800 $\mu m$, 850 $\mu m$, 900 $\mu m$ or 950 $\mu m$. The height of material dispensed in a layer of material can be between any of the afore-mentioned amounts (e.g., from about 100 $\mu m$ to about 650 $\mu m$, from about 200 $\mu m$ to about 950 $\mu m$, from about 350 $\mu m$ to about 800 $\mu m$, from about 100 $\mu m$ to about 950 $\mu m$). The time taken to dispense a layer of material can be at least about 0.1 seconds (sec), 0.2 sec, 0.3 sec, 0.5 sec, 1 sec, 2 sec, 3 sec, 4 sec, 5 sec, 8 sec, 9 sec, 10 sec, 15 sec or 20 sec. The time taken to dispense a layer of material can be between any of the afore-mentioned times (e.g., from about 0.1 seconds to about 20 seconds, from about 0.2 seconds to about 1 second, from about 3 seconds to about 5 seconds, from about 0.5 seconds to about 20 seconds).

In some embodiments, once and/or after the 3D object printing is complete, the build module disengages from the processing chamber and translate away from the processing chamber engagement position. Disengagement of the build module from the processing chamber may include closing the processing chamber with its shutter, closing the build module with its shutter, or both closing the processing chamber shutter and closing the build module shutter. Disengagement of the build module from the processing chamber may include maintaining the processing chamber atmosphere to be separate from the enclosure atmosphere, maintaining the build module atmosphere to be separate from the enclosure atmosphere, or maintaining both the processing chamber atmosphere and the build atmosphere separate from the enclosure atmosphere. Disengagement of the build module from the processing chamber may include maintaining the processing chamber atmosphere to be separate from the ambient atmosphere, maintaining the build module atmosphere to be separate from the ambient atmosphere, or maintaining both the processing chamber atmosphere and the build atmosphere separate from the ambient atmosphere. The building platform that is disposed within the build module before engagement with the processing chamber, may be at its top most position, bottom most position, or anywhere between its top most position and bottom most position within the build module.

At times, the usage of sealable build modules, processing chamber, and/or unpacking chamber allows a small degree of operator intervention, low degree of operator exposure to the pre-transformed material, and/or low down time of the 3D printer. The 3D printing system may operate most of the time without an intermission. The 3D printing system may be utilized for 3D printing most of the time. Most of the time may be at least about 50%, 70%, 80%, 90%, 95%, 96%, 97%, 98%, or 99% of the time. Most of the time may be between any of the afore-mentioned values (e.g., from about 50% to about 99%, from about 80% to about 99%, from about 90% to about 99%, or from about 95% to about 99% of the time. The entire time includes the time during which the 3D printing system prints a 3D object, and time during which it does not print a 3D object. Most of the time may include operation during seven days a week and/or 24 hours during a day.

In some embodiments, the 3D printing requires assistance by one or more operators. At times, the 3D printing system requires operation of maximum a single standard daily work shift. The 3D printing system may require operation by a human operator working at most of about 8 hours (h), 7 h, 6 h, 5 h, 4 h, 3 h, 2 h, 1 h, or 0.5 h a day. The 3D printing system may require operation by a human operator working between any of the afore-mentioned time frames (e.g., from about 8 h to about 0.5 h, from about 8 h to about 4 h, from about 6 h to about 3 h, from about 3 h to about 0.5 h, or from about 2 h to about 0.5 h a day). The 3D printing system may require operation of maximum a single standard work week shift. The 3D printing system may require operation by a human operator working at most of about 50 h, 40 h, 30 h, 20 h, 10 h, 5 h, or 1 h a week. The 3D printing system may require operation by a human operator working between any of the afore-mentioned time frames (e.g., from about 40 h to about 1 h, from about 40 h to about 20 h, from about 30 h to about 10 h, from about 20 h to about 1 h, or from about 10 h to about 1 h a week). A single operator may support during his daily and/or weekly shift at least 1, 2, 3, 4, 5, 6, 7, 8, 9, or 10 3D printers (i.e., 3D printing systems).

In some embodiments, the enclosure and/or processing chamber of the 3D printing system is opened to the ambient environment sparingly (e.g., during, before, and/or after the 3D printing). In some embodiments, the enclosure and/or processing chamber of the 3D printing system may be opened by an operator (e.g., human) sparingly. Sparing opening may be at most once in at most every 1, 2, 3, 4, or 5 weeks. The weeks may comprise weeks of standard operation of the 3D printer.

In some embodiments, the 3D printer has a capacity of 1, 2, 3, 4, or 5 full prints in terms of pre-transformed material (e.g., powder) reservoir capacity. The 3D printer may have the capacity to print a plurality of 3D objects in parallel. For example, the 3D printer may be able to print at least 2, 3, 4, 5, 6, 7, 8, 9, or 10 3D objects in parallel.

In some embodiments, the printed 3D object is retrieved soon after terminating the last transformation operation of at least a portion of the material bed. Soon after terminating may be at most about 1 day, 12 hours, 6 hours, 3 hours, 2 hours, 1 hour, 30 minutes, 15 minutes, 5 minutes, 240 seconds (sec), 220 sec, 200 sec, 180 sec, 160 sec, 140 sec, 120 sec, 100 sec, 80 sec, 60 sec, 40 sec, 20 sec, 10 sec, 9 sec, 8 sec, 7 sec, 6 sec, 5 sec, 4 sec, 3 sec, 2 sec, or 1 sec. Soon after terminating may be between any of the afore-mentioned time values (e.g., from about 1 s to about 1 day, from about 1 s to about 1 hour, from about 30 minutes to about 1 day, or from about 20 s to about 240 s).

In some embodiments, the 3D printer has a capacity of 1, 2, 3, 4, or 5 full prints before requiring human intervention. Human intervention may be required for refilling the pre-transformed (e.g., powder) material, unloading the build modules, unpacking the 3D object, or any combination thereof. The 3D printer operator may condition the 3D printer at any time during operation of the 3D printing system (e.g., during the 3D printing process). Conditioning of the 3D printer may comprise refilling the pre-transformed material that is used by the 3D printer, replacing gas source, or replacing filters. The conditioning may be with or without interrupting the 3D printing system. For example, refilling and unloading from the 3D printer can be done at any time during the 3D printing process without interrupting the 3D printing process. Conditioning may comprise refreshing the 3D printer.

In some embodiments, the 3D printer comprises at least one filter. The filter may be a ventilation filter. The ventilation filter may capture fine powder from the 3D printing system. The filter may comprise a paper filter such as a high-efficiency particulate arrestance (HEPA) filter (a.k.a., high-efficiency particulate arresting or high-efficiency particulate air filter). The ventilation filter may capture spatter. The spatter may result from the 3D printing process. The ventilator may direct the spatter in a desired direction (e.g., by using positive or negative gas pressure). For example, the ventilator may use vacuum. For example, the ventilator may use gas blow.

In some embodiments, the time lapse between the end of printing in a first material bed, and the beginning of printing in a second material bed is at most about 60 minutes (min), 40 min, 30 min, 20 min, 15 min, 10 min, or 5 min. The time lapse between the end of printing in a first material bed, and the beginning of printing in a second material bed may be between any of the afore-mentioned times (e.g., from about 60 min to about 5 min, from about 60 min to about 30 min, from about 30 min to about 5 min, from about 20 min to about 5 min, from about 20 min to about 10 min, or from about 15 min to about 5 min). The speed during which the 3D printing process proceeds is disclosed in Patent Application serial number PCT/US15/36802 that is incorporated herein in its entirety.

In some embodiments, the 3D object is removed from the material bed after the completion of the 3D printing process. For example, the 3D object may be removed from the material bed when the transformed material that formed the 3D object hardens. For example, the 3D object may be removed from the material bed when the transformed material that formed the 3D object is no longer susceptible to deformation under standard handling operation (e.g., human and/or machine handling).

At times, the generated 3D object requires very little or no further processing after its retrieval. Further processing may be post printing processing. Further processing may comprise trimming, as disclosed herein. Further processing may comprise polishing (e.g., sanding). In some cases, the generated 3D object can be retrieved and finalized without removal of transformed material and/or auxiliary support features.

In some examples, the generated 3D object adheres (e.g., substantially) to a requested model of the 3D object. The 3D object (e.g., solidified material) that is generated can have an average deviation value from the intended dimensions (e.g., of a desired 3D object) of at most about 0.5 microns (μm), 1 μm, 3 μm, 10 μm, 30 μm, 100 μm, 300 μm or less from a requested model of the 3D object. The deviation can be any value between the afore-mentioned values. The average deviation can be from about 0.5 μm to about 300 μm, from about 10 μm to about 50 μm, from about 15 μm to about 85 μm, from about 5 μm to about 45 μm, or from about 15 μm to about 35 μm. The 3D object can have a deviation from the intended dimensions in a specific direction, according to the formula Dv+L/$K_{dv}$, wherein Dv is a deviation value, L is the length of the 3D object in a specific direction, and $K_{dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, 300 μm or less. Dv can have any value between the afore-mentioned values. For example, Dv can have a value that is from about 0.5 μm to about 300 μm, from about 10 μm to about 50 μm, from about 15 μm to about 85 μm, from about 5 μm to about 45 μm, or from about 15 μm to about 35 μm. $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the afore-mentioned values. For example, $K_{dv}$ can have a value that is from about 3000 to about 500, from about 1000 to about 2500, from about 500 to about 2000, from about 1000 to about 3000, or from about 1000 to about 2500.

At times, the generated 3D object (i.e., the printed 3D object) does not require further processing following its generation by a method described herein. The printed 3D object may require reduced amount of processing after its generation by a method described herein. For example, the printed 3D object may not require removal of auxiliary support (e.g., since the printed 3D object was generated as a 3D object devoid of auxiliary support). The printed 3D object may not require smoothing, flattening, polishing, or leveling. The printed 3D object may not require further machining. In some examples, the printed 3D object may require one or more treatment operations following its generation (e.g., post generation treatment, or post printing treatment). The further treatment step(s) may comprise surface scraping, machining, polishing, grinding, blasting (e.g., sand blasting, bead blasting, shot blasting, or dry ice blasting), annealing, or chemical treatment. The further treatment may comprise physical or chemical treatment. The further treatment step(s) may comprise electrochemical treatment, ablating, polishing (e.g., electro polishing), pickling, grinding, honing, or lapping. In some examples, the printed 3D object may require a single operation (e.g., of sand blasting) following its formation. The printed 3D object may require an operation of sand blasting following its formation. Polishing may comprise electro polishing (e.g., electrochemical polishing or electrolytic polishing). The further treatment may comprise the use of abrasive(s). The blasting may comprise sand blasting or soda blasting. The chemical treatment may comprise use or an agent. The agent may comprise an acid, a base, or an organic compound. The further treatment step(s) may comprise adding at least one added layer (e.g., cover layer). The added layer may comprise lamination. The added layer may be of an organic or inorganic material. The added layer may comprise elemental metal, metal alloy, ceramic, or elemental carbon. The added layer may comprise at least one material that composes the printed 3D object. When the printed 3D object undergoes further treatment, the bottom most surface layer of the treated object may be different than the original bottom most surface layer that was formed by the 3D printing (e.g., the bottom skin layer).

At times, the methods described herein are performed in the enclosure (e.g., container, processing chamber, and/or build module). One or more 3D objects can be formed (e.g., generated, and/or printed) in the enclosure (e.g., simultaneously, and/or sequentially). The enclosure may have a predetermined and/or controlled pressure. The enclosure may have a predetermined and/or controlled atmosphere. The control may be manual or via a control system. The atmosphere may comprise at least one gas.

In some examples, the enclosure comprises ambient pressure (e.g., 1 atmosphere), negative pressure (i.e., vacuum) or positive pressure. Different portions of the enclosure may have different atmospheres. The different atmospheres may comprise different gas compositions. The different atmospheres may comprise different atmosphere temperatures. The different atmospheres may comprise ambient pressure (e.g., 1 atmosphere), negative pressure (i.e., vacuum) or positive pressure. The different portions of the enclosure may comprise the processing chamber, build module, or enclosure volume excluding the processing chamber and/or build module. The vacuum may comprise pressure below 1 bar, or below 1 atmosphere. The positively pressurized environment may comprise pressure above 1 bar or above 1 atmosphere. The pressure in the enclosure can be at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or 1100 bar. The pressure in the enclosure can be at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the enclosure can be between any of the afore-mentioned enclosure pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The chamber can be pressurized to a pressure of at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The chamber can be pressurized to a pressure of at most $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The pressure in the chamber can be at a range between any of the afore-mentioned pressure values (e.g., from about $10^{-7}$ Torr to about 1000 bar, from about $10^{-7}$ Torr to about 1 Torr, from about 1 Torr to about 100 Barr, from about 1 bar to about 10 bar, from about 1 bar to about 100 bar, or from about 100 bar to about 1000 bar). In some cases, the chamber pressure can be standard atmospheric pressure. The pressure may be measured at an ambient temperature (e.g., room temperature, 20° C., or 25° C.).

In some embodiments, the enclosure includes an atmosphere. The enclosure may comprise a (e.g., substantially) inert atmosphere. The atmosphere in the enclosure may be (e.g., substantially) depleted by one or more gases present in the ambient atmosphere. The atmosphere in the enclosure may include a reduced level of one or more gases relative to the ambient atmosphere. For example, the atmosphere may be substantially depleted, or have reduced levels of water (i.e., humidity), oxygen, nitrogen, carbon dioxide, hydrogen sulfide, or any combination thereof. The level of the depleted or reduced level gas may be at most about 1 ppm, 10 ppm, 50 ppm, 100 ppm, 500 ppm, 1000 ppm, 5000 ppm, 10000 ppm, 25000 ppm, 50000 ppm, or 70000 ppm volume by volume (v/v). The level of the depleted or reduced level gas may be at least about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the oxygen gas may be at most about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the water vapor may be at most about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the gas (e.g., depleted or reduced level gas, oxygen, or water) may be between any of the afore-mentioned levels of gas. The atmosphere may comprise air. The atmosphere may be inert. The atmosphere may be non-reactive. The atmosphere may be non-reactive with the material (e.g., the pre-transformed material deposited in the layer of material (e.g., powder), or the material comprising the 3D object). The atmosphere may prevent oxidation of the generated 3D object. The atmosphere may prevent oxidation of the pre-transformed material within the layer of pre-transformed material before its transformation, during its transformation, after its transformation, before its hardening, after its hardening, or any combination thereof. The atmosphere may comprise argon or nitrogen gas. The atmosphere may comprise a Nobel gas. The atmosphere can comprise a gas selected from the group consisting of argon, nitrogen, helium, neon, krypton, xenon, hydrogen, carbon monoxide, and carbon dioxide. The atmosphere may comprise hydrogen gas. The atmosphere may comprise a safe amount of hydrogen gas. The atmosphere may comprise a v/v percent of hydrogen gas of at least about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise a v/v percent of hydrogen gas of at most about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise any percent of hydrogen between the afore-mentioned percentages of hydrogen gas. The atmosphere may comprise a v/v hydrogen gas percent that is at least able to react with the material (e.g., at ambient temperature and/or at ambient pressure), and at most adhere to the prevalent work-safety standards in the jurisdiction (e.g., hydrogen codes and standards). The material may be the material within the layer of pre-transformed material (e.g., powder), the transformed material, the hardened material, or the material within the 3D object. Ambient refers to a condition to which people are generally accustomed. For example, ambient pressure may be 1 atmosphere. Ambient temperature may be a typical temperature to which humans are generally accustomed. For example, from about 15° C. to about 30° C., from about −30° C. to about 60° C., from about −20° C. to about 50° C., from 16° C. to about 26° C., from about 20° C. to about 25° C. "Room temperature" may be measured in a confined or in a non-confined space. For example, "room temperature" can be measured in a room, an office, a factory, a vehicle, a container, or outdoors. The vehicle may be a car, a truck, a bus, an airplane, a space shuttle, a space ship, a ship, a boat, or any other vehicle. Room temperature may represent the small range of temperatures at which the atmosphere feels neither hot nor cold, for example, approximately 24° C., 20° C., 25° C., or any value from about 20° C. to about 25° C.

At times, the pre-transformed material is deposited in an enclosure (e.g., a container). FIG. 1 shows an example of a 3D printing system 100 and apparatuses, a (e.g., first) energy source 122 that emits a (e.g., first) energy beam 119. In the example of FIG. 1, the energy beam travels through an optical system 114 (e.g., comprising an aperture, lens, mirror, or deflector). A target surface may be a portion of a hardened material (e.g., 106) that was formed by transforming at least a portion of an exposed surface (e.g., 131) of a material bed (e.g., 104) by a (e.g., scanning) energy beam. In the example of FIG. 1 a (e.g., second) energy beam 101 is generated by a (e.g., second) energy source 121. The generated (e.g., second) energy beam may travel through an optical mechanism (e.g., 120) and/or an optical window (e.g., 115). FIG. 1 shows an example of a container 123. The container can contain the pre-transformed material (e.g., without spillage; FIG. 1, 104). The material may be placed in, or inserted to the container. The material may be deposited in, pushed to, sucked into, or lifted to the container. The material may be layered (e.g., spread) in the container. The container may comprise a substrate (e.g., FIG. 1, 109). The substrate may be situated adjacent to the bottom of the container (e.g., FIG. 1, 111). Bottom may be relative to the gravitational field, or relative to the position of the footprint of the energy beam (e.g., FIG. 1, 101, 108) on the layer of pre-transformed material as part of a material bed. The footprint of the energy beam may follow a Gaussian bell shape. In some embodiments, the footprint of the energy beam does not follow a Gaussian bell shape. The container may comprise a platform comprising a base (e.g., FIG. 1, 102). The platform may comprise a substrate. The base may reside adjacent to the substrate. The pre-transformed material may be layered adjacent to a side of the container (e.g., on the bottom of the container). The pre-transformed material may be layered adjacent to the substrate and/or adjacent to the base. Adjacent to may be above. Adjacent to may be directly above, or directly on. The substrate may have one or more seals that enclose the material in a selected area within the container (e.g., FIG. 1, 103). FIG. 1 shows an example of sealants 103 that hinders (e.g., prevent) the pre-transformed material from spilling from the material bed (e.g., 104) to the bottom 111 of an enclosure 107. The platform may translate (e.g., vertically, FIG. 1, 112) using a translating mechanism (e.g., an actuator, e.g., an elevator 105). The one or more seals may be flexible or non-flexible. The one or more seals may comprise a polymer or a resin. The one or more seals may comprise a round edge or a flat edge. The one or more seals may be bendable or non-bendable. The seals may be stiff. The container may comprise the base. The base may be situated within the container. The container may comprise the platform, which may be situated within the container. The enclosure, container, processing chamber, and/or building module may comprise an optical window. An energy beam may travel through an optical mechanism (e.g., 120). An example of an optical window can be seen in FIG. 1, 115, 135. The optical window may allow the energy beam (e.g., 101, 108) to pass through without (e.g., substantial) energetic loss. A ventilator may prevent spatter from accumulating on the surface optical window that is disposed within the enclosure (e.g., within the processing chamber) during the 3D printing. An opening of the ventilator may be situated within the enclosure 126.

At times, the pre-transformed material is deposited in the enclosure by a layer dispensing mechanism (e.g., FIGS. 1, 116, 117 and 118) to form a layer of pre-transformed material within the enclosure. The deposited material may be leveled by a leveling operation. The leveling operation may comprise using a material removal mechanism that does not contact the exposed surface of the material bed (e.g., FIG. 1, 118). The leveling operation may comprise using a leveling mechanism that contacts the exposed surface of the material bed (e.g., FIG. 1, 117). The material (e.g., powder) dispensing mechanism may comprise one or more dispensers (e.g., FIG. 1, 116). The material dispensing system may comprise at least one material (e.g., bulk) reservoir. The material may be deposited by a layer dispensing mechanism (e.g., recoater). The layer dispensing mechanism may level the dispensed material without contacting the material bed (e.g., the top surface of the powder bed). The layer dispensing mechanism may include any layer dispensing mechanism and/or a material (e.g., powder) dispenser used in 3D printing such as, for example, the ones disclosed in application number PCT/US15/36802, or in patent application Ser. No. 15/435,065, both of which are entirely incorporated herein by references.

In some embodiments, the layer dispensing mechanism includes components comprising a material dispensing mechanism, material leveling mechanism, material removal mechanism, or any combination or permutation thereof. In some configurations, the material dispensing mechanism may comprise a material dispenser. The material dispenser may be operatively coupled to a mechanism that causes at least a portion of the pre-transformed material within the material dispenser to vibrate (also referred to herein as a "vibration mechanism"). Vibrate may comprise pulsate, throb, resonate, shiver, tremble, flutter or shake. The vibration mechanism may include any vibration mechanism used in 3D printing such as, for example, the ones disclosed in Patent Application serial number PCT/US17/57340, filed on Oct. 19, 2017, titled "OPERATION OF THREE-DIMENSIONAL PRINTER COMPONENTS," which is entirely incorporated herein by reference.

In some embodiments, the 3D printer comprises at least one ancillary chamber. The ancillary chamber may be an integral part of the processing chamber. At times, the ancillary chamber may be separate from the processing chamber. The ancillary chamber may be mounted to the processing chamber (e.g., before, after, or during the 3D printing). The mounting may be reversible mounting. The mounting may be controlled (e.g., manually or by a controller). The atmosphere of the ancillary and processing chamber may be (e.g., substantially) the same atmosphere. At times, the atmosphere of the ancillary chamber and the processing chamber may differ. The atmosphere of the ancillary chamber may be an inert atmosphere. The atmosphere in the ancillary chamber may be deficient by one or more reactive species (e.g., water and/or oxygen). The ancillary chamber may be a garage. The garage may be used to park one or more components of the 3D printer. The component may be a layer dispensing mechanism. The ancillary chamber (e.g., FIG. 2, 240) may be coupled to one of the side walls of the processing chamber (e.g., FIG. 2, 226). In some embodiments, the ancillary chamber may be incorporated in the processing chamber. The processing chamber may be similar to the one described herein (e.g., FIG. 1, having an atmosphere 126, FIG. 2, having an atmosphere 226). At times, the ancillary chamber may be a part of the processing chamber. At times, the ancillary chamber may be coupled to the processing chamber. At times, the ancillary chamber may be coupled to one of the side walls of the processing chamber. The ancillary chamber may be mounted to the processing chamber. The mounting may be reversible mounting. The mounting may be controlled (e.g., manually or by a controller). The atmosphere of the ancillary chamber and processing chamber may be (e.g., substantially) the same atmosphere. At times, the atmosphere of the ancillary chamber and the processing chamber may differ.

Figure 2:
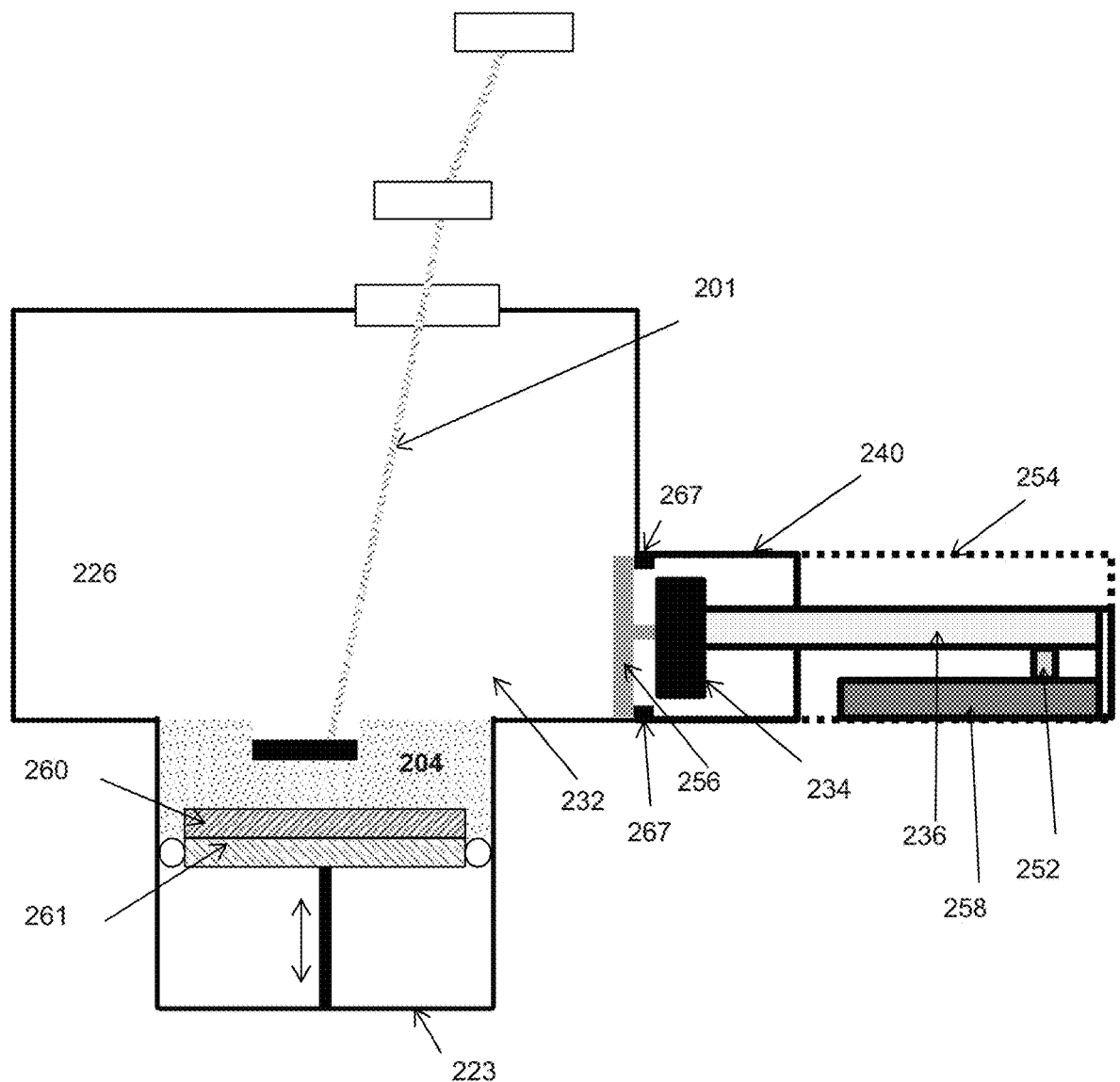
FIG. 2 schematically illustrates a vertical cross-sectional view of a 3D printing system and its components.

In some embodiments, the layer dispensing mechanism is coupled to one or more shafts (e.g., a rod, a pole, a bar, a cylinder, one or more spherical bearings coupled at a predetermined distance) (e.g., FIG. 2, 236). The shaft may comprise a vertical (e.g., small) cross section of a circle, triangle, square, pentagon, hexagon, octagon, or any other polygon. The vertical cross section may be of an amorphous shape. The one or more shafts may be movable. For example, the shaft may be movable to and from the ancillary chamber (e.g., before, during, and/or after the 3D printing). For example, the shaft may be movable from the ancillary chamber to the processing chamber (e.g., for deposition of a layer of material). For example, the shaft may be movable from the processing chamber to the ancillary chamber (e.g., in preparation for transforming at least a portion of the material bed). FIG. 2 shows an example of a shaft, 236. At times, at least a portion of the shaft may reside within the ancillary chamber (e.g., 240). At times, at least a portion of the shaft may reside out of the ancillary chamber (e.g., in the area 254). The atmosphere of the portion of the shaft residing within the ancillary chamber may be (e.g., substantially) the same atmosphere as the atmosphere of the ancillary chamber. The atmosphere of the ancillary chamber may be an inert atmosphere. The atmosphere in the ancillary chamber may be deficient by one or more reactive species (e.g., water and/or oxygen). The atmosphere of the portion of the shaft residing out of the ancillary chamber may differ from the atmosphere of the ancillary chamber. The atmosphere of the portion of the shaft residing out of the ancillary chamber may not be an inert atmosphere. The atmosphere of the portion of the shaft residing out of the ancillary chamber may be open to one or more reactive species (e.g., water and/or oxygen). The ancillary chamber may accommodate at least a portion of the shaft. FIG. 2 shows an example of components of an ancillary chamber including one or more shafts. The one or more shafts may comprise a conveying system. The one or more shafts may comprise a retracting system. The shaft may be (e.g., operatively) coupled to the layer dispensing mechanism (e.g., 234). Coupled may be physically attached to one of the components of the layer dispensing mechanism (also referred to herein as "layer dispensing system"). The attachment may be physical, magnetic, electrical, or any combination thereof. Coupled may comprise positional (e.g., optical) sensors to one or more components of the layer dispensing mechanism. The shaft may assist in moving the layer dispensing mechanism from the ancillary chamber to a position adjacent to the material bed. The position adjacent to the material bed may be within the processing chamber. The position adjacent to the material bed may be within the build module. The shaft may comprise an internal cavity. The internal cavity may be a channel. For example, the shaft may comprise one or more channels (e.g., 740). A portion of the one or more shaft channels may be enclosed within the shaft (e.g., 710). A portion of the one or more shaft channels may be external to the shaft (e.g., 708). The external portion of the shaft may be coupled to a reduced pressure (e.g. vacuum) system (e.g., 755). The reduced pressure system may comprise a pump (e.g., as disclosed herein). The one or more shaft channels may comprise a transit system. The vacuum system may insert positive pressure through the shaft channel to transit pre-transformed material. The vacuum system may insert negative pressure through the shaft channel to remove pre-transformed material from the ancillary chamber. The vacuum system may insert negative pressure through the shaft channel to remove pre-transformed material from the layer dispensing mechanism. The vacuum system may insert negative pressure through the shaft channel to remove pre-transformed material from the shaft. The vacuum system may transit the collected pre-transformed material to a recycling system (e.g., 790). The recycling system may recycle a collected pre-transformed material back to the layer dispensing mechanism (e.g., the pre-transformed material may be transferred manually to the bulk reservoir (e.g., doser) 725). At times, the transfer of pre-transformed material (e.g., conveying) back to the layer dispensing mechanism may be automated and/or controlled. Controlling may be performed before, after, and/or during the 3D printing. The recycling system may comprise a sieve. The recycling system may comprise a material re-conditioning system. The material re-conditioning system may recondition (e.g., remove any reactive species such as oxygen, water, etc.) the collected pre-transformed material. The reconditioned material may be recycled and used in the 3D printing. Recycling may comprise transporting the material to the layer dispensing mechanism. The recycling may be continuous during the 3D printing. For example, the recycling may be continuous during the time at which the layer dispensing mechanism is parked in the garage.

Figure 3:
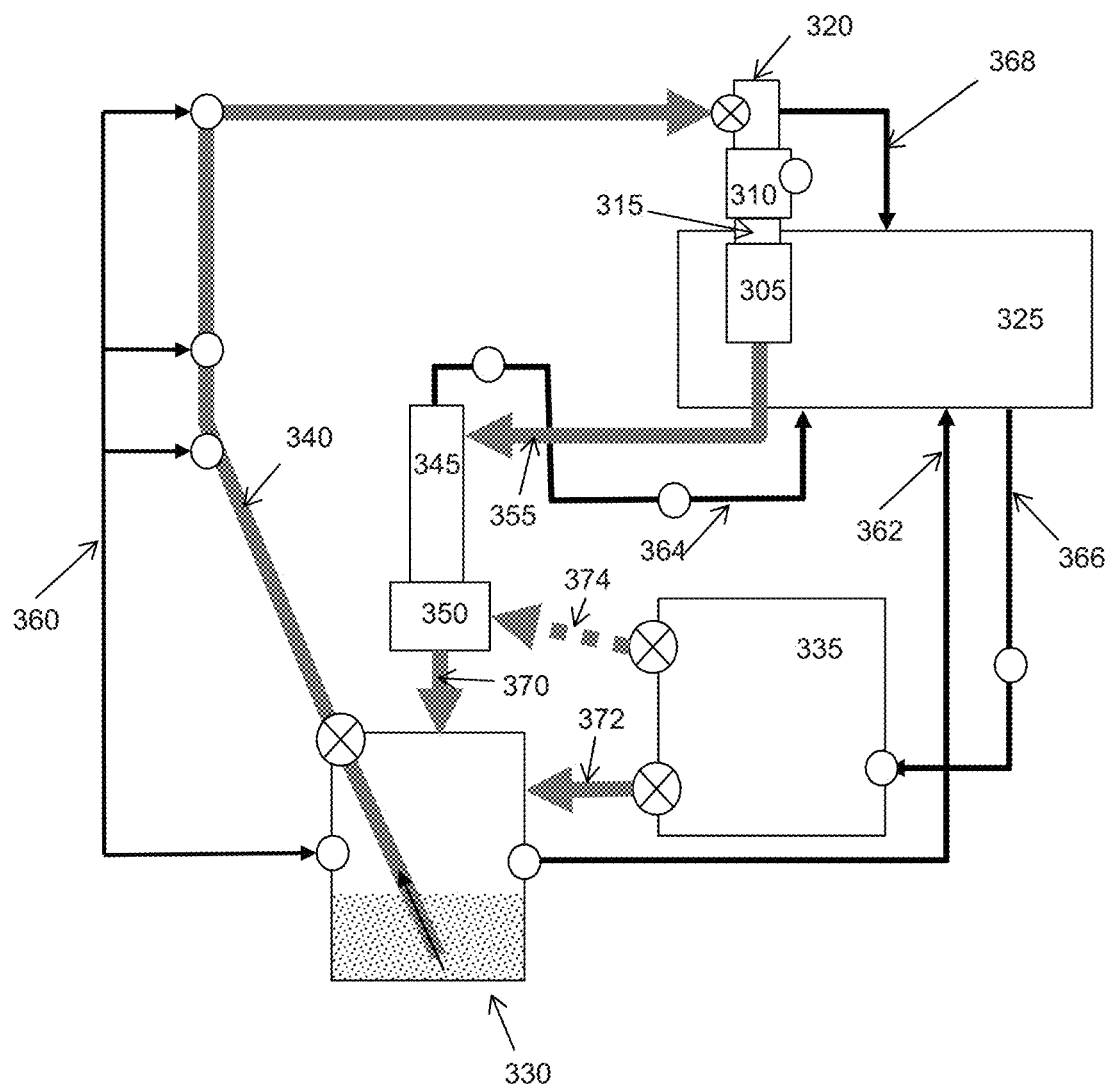
FIG. 3 schematically illustrates components of a 3D printing systems.

In some embodiments, the 3D printing system comprises a pre-transformed material conveyor system. The pre-transformed material conveyor system may be operatively coupled to a processing chamber, a build module, an ancillary chamber, a layer dispensing mechanism and/or a recycling mechanism. The one or more components of the pre-transformed material conveyor system may be replaceable, exchangeable, and/or modular. FIG. 3 shows an example of a pre-transformed material conveyor system coupled to a processing chamber (e.g., 325). The pre-transformed material conveyor system comprises a pressure container (e.g., 330). The pressure container comprises pre-transformed material. The pre-transformed material may be conveyed (e.g., directly, or indirectly) into the pressure container from (i) an external material source (e.g., a bulk feed 335) and/or from (ii) a layer dispensing mechanism (e.g., 305). The layer dispensing mechanism (also referred to herein as "layer dispenser") may be coupled to a bulk reservoir (e.g., 310) via a channel (e.g., 315). The bulk reservoir may be optionally coupled to a secondary separator (e.g., 320). The pre-transformed material may be conveyed (e.g., in a first loop) from the pressure container to the secondary separator (e.g., 310) via a material conveying channel (e.g., 340). The pre-transformed material conveyor system may comprise one or more material conveying channels. In some examples, the pre-transformed material conveyor system may comprise a plurality of material conveying channels (e.g., including 340, 355, 370, 372, and/or 374). At least two of the plurality of material conveying channels may be of the same characteristics. The channel characteristic may comprise a material from which the channel is constructed, cross-section, flow capacity, or internal surface finish. At least two of the plurality of material conveying channels may be different in at least one of the channel characteristic. At least two of the plurality of material conveying channels may be (e.g., substantially) the same in at least one of the channel characteristic. The material conveying channel may convey pre-transformed material to one or more components of the pre-transformed material conveyor system. In some examples, the material conveying channel may be coupled to the bulk reservoir and/or the layer dispensing mechanism. The pre-transformed material may be conveyed (e.g., in a second loop) from the layer dispensing mechanism to the pressure container. The pre-transformed material conveyance system may comprise at least one separator. The separator may comprise a cyclonic-separator, a sorter, classifier, or a sieve (e.g., filter). The classifier may comprise a gas classifier (e.g., air-classifier). For example, the second loop may comprise a first separator (e.g., 345) and/or a filter (e.g., 350). The filter may sieve pre-transformed material (e.g., that was not used during the 3D printing, that arrives from the bulk feed (e.g., from a supplier)) prior to conveying it to the pressure container and/or to the processing chamber (e.g., by using the material dispenser). In some examples, the filter may be operatively coupled to the bulk feed (e.g., 335) via a material conveying channel (e.g., 374). The pre-transformed material from an external material source (e.g., stored in the bulk feed 335) may be filtered, prior to conveying it to the pressure container and/or to the processing chamber. The pre-transformed material may be conveyed from the layer dispensing mechanism to the first separator via a material conveying channel (e.g., 355). Optionally, the separator may be operatively coupled to a buffer container. The pre-transformed material may reside in the buffer container while the first loop may be in operation of conveying pre-transformed material into the secondary separator. On completion of the first loop, the pre-transformed material from the buffer container into the pressure container. In some examples, the buffer container may convey pre-transformed material into the pressure container during the first loop. The buffer container may be inserted with pre-transformed material from the external material source (e.g., a bulk feed 335). The pre-transformed material conveyor system may comprise a gas conveying channel. In some examples, the pre-transformed material conveyor system may comprise a plurality of gas conveying channels (e.g., that are fluidly coupled, e.g., to allow flow of the pre-transformed material). The gas conveying channel may convey gas to one or more components of the pre-transformed material conveyor system. The gas may comprise a pressure. The gas conveying channel may equilibrate pressure and/or content within one or more components of the pre-transformed material conveyor system. For example, a gas conveying channel may equilibrate a first atmosphere of a processing chamber with a second atmosphere of the bulk feed, separator, and/or pressure chamber (in certain instances). The first atmosphere and/or second atmosphere may be a (e.g., substantially) inert, oxygen depleted, humidity depleted, organic material depleted, or any combination thereof. The gas conveying channel (e.g., 360, 362, 364, 366, and/or 368) may be operatively coupled to the material conveying channel, pressure container, processing chamber, external material source, separator, bulk reservoir, layer dispenser (e.g., material dispenser), and/or the buffer container. The channel (e.g., shaft channel, gas channel, and/or material conveyance channel may be a tube, hose, tunnel, duct, chute, or conduit). The pre-transformed material conveyor system may comprise one or more valves. A valve may be coupled to a material conveying channel and/or a gas conveying channel. For example, FIG. 3 shows examples of material conveying channel valves (e.g., denoted by a white circle comprising an X) and gas conveying channel valves (e.g., denoted by a white circle).

In some examples, the pre-transformed material conveyor system comprises a (e.g., optional) separator. The pre-transformed material conveyor system may comprise a plurality of separators. The separator may be exchangeable, replaceable, and/or modular. The separator may separate between a gas and a pre-transformed material. The separator may separate between various sizes (or size groups) of particulate material. The separator may separate between various types of material. The separator may comprise separation, sorting, and/or reconditioning the pre-transformed material. The separator may comprise a cyclonic separator, velocity reduction separator (e.g., screen, mesh, and/or baffle), and/or a separation column. The separator may utilize a gravitational force. The separator may utilize an artificially induced force (e.g., pneumatic, electronic, magnetic, hydraulic, and/or electrostatic force). The cyclonic separator may comprise using vortex separation. The cyclonic separator may comprise using centrifugal separation. The separator may include any material separator used in 3D printing such as, for example, the ones disclosed in patent application Ser. No. 15/374,318, filed on Dec. 9, 2016, titled "SKILLFUL THREE-DIMENSIONAL PRINTING," or in Patent Application serial number PCT/US16/66000, filed on Dec. 9, 2016, titled "SKILLFUL THREE-DIMENSIONAL PRINTING," each of which is entirely incorporated herein by reference. The separator may comprise a filter (e.g., sieve, column, and/or membrane). The separation may comprise separating the pre-transformed material from debris and/or gas. The pre-transformed material may be sorted as to material type and/or size. The pre-transformed material may be sorted using a gas classifier that classifies gas-borne material (e.g., liquid, or particulate) material. For example, using an air-classifier. For example, using a powder gas classifier. The reconditioning may comprise removing of an oxide layer forming on the pre-transformed material. Reconditioning may comprise physical and/or chemical reconditioning. The physical reconditioning may comprise ablation, spattering, blasting, or machining. The chemical reconditioning may comprise reduction. The separator and/or filter may be controlled. The controlling may be done manually and/or automated. Controlling may be performed before, after, and/or during at least a portion of the 3D printing. Controlling may be performed during, before and/or after the operation of the pre-transformed material conveyor system. The separator may comprise a sensor. The sensor may detect a system state of the separator. The sensor may detect the velocity of the pre-transformed material and/or gas during operation. In some examples, a plurality of separators may be operatively coupled to each other. A first separator may be connected to a second separator (e.g., in a serial manner). The separator may be optimized to operate with different types of material flow and/or pneumatic flows. For example, the separator may be optimized to operate with a number of pre-transformed material properties (e.g., particulate material size, material type, FLS of a particulate material, and/or particulate material shape). The pre-transformed material may comprise a particulate material (e.g., powder, or vesicles). The pre-transformed material may comprise a solid, semisolid, or liquid. For examples, the separator may be optimized to operate with a number of material flow properties (e.g., material density and/or material friction).

In some examples, a portion of a first separator is operatively coupled to the processing chamber, a recycling system, a build module, and/or at least one component of the layer dispensing mechanism. A portion of the separator may be operatively coupled to a pressure container. The separator may receive pre-transformed material (e.g., spillage, or an excess amount of material) from the processing chamber, a component of the layer dispensing mechanism and/or the build module. The separator may receive a remainder of the pre-transformed material that did not transform to form at least a portion of the 3D object. The separator may receive recycled pre-transformed material from the recycling system. In some examples, the separator may be coupled to the processing chamber, recycling system, build module and/or at least one component of the layer dispensing mechanism, via a channel (e.g., pipe). The channel may comprise one or more sensors. The sensor may be any sensor described herein. The channel may comprise one or more valves. The valve may be any valve described herein. The sensor and/or the valve may be controlled. The controlling may be done manually and/or automated. Controlling may be performed before, after, and/or during at least a portion of the 3D printing. Controlling may be performed during, before and/or after the operation of the pre-transformed material conveyor system. In some examples, the pre-transformed material conveyor system may optionally comprise a secondary separator. For example, the pre-transformed material conveyor system may comprise (i) a gas separator (e.g., cyclonic separator) and (ii) a particulate material size separator (e.g., sieve). A portion of the secondary separator (e.g., sieve) may be coupled to a material conveyor channel. A portion of the secondary separator may be coupled to the at least one component of the layer dispensing mechanism (e.g., material leveler, material remover, and/or material dispenser). The pre-transformed material from one or more pressure containers may be conveyed into the secondary separator via the material conveyor channel. The pre-transformed material may be sorted, separated and/or reconditioned by the (e.g., secondary) separator, and conveyed to at least one component of the layer dispensing mechanism.

Figure 4:
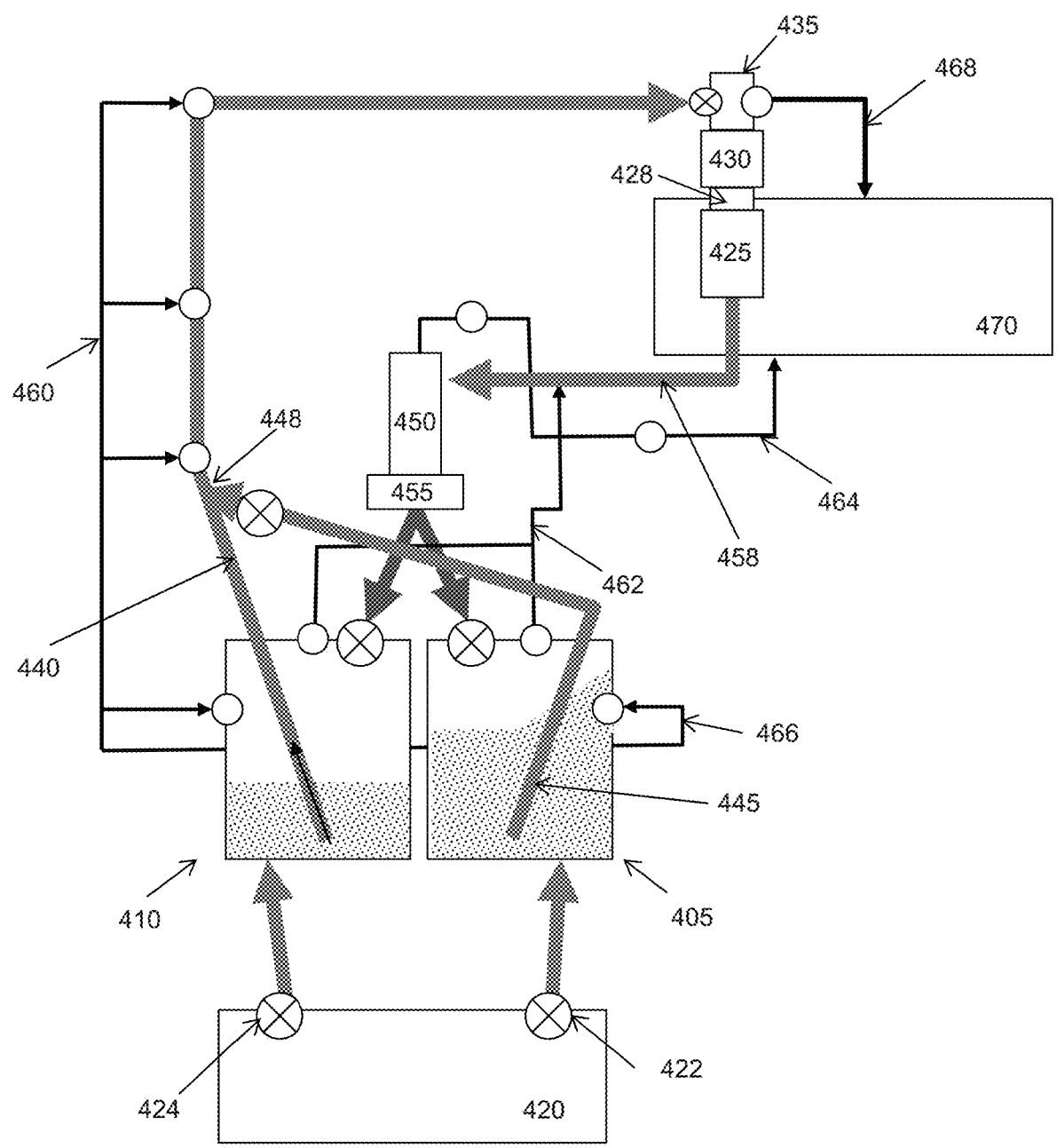
FIG. 4 schematically illustrates components in a 3D printing system.

In some examples, the pre-transformed material conveyor system comprises a pressure container. In some examples, the pre-transformed conveyor system may comprise multiple pressure containers (e.g., at least two, three, or four pressure containers). FIG. 4 shows an example of a pre-transformed material conveyor system with two pressure containers (e.g., 405, 410). At least one pressure container may contain pre-transformed material (e.g., during operation of the material conveyor). At least one pressure container may contain a low amount (e.g., no pre-transformed material) of pre-transformed material (e.g., during operation of the material conveyor). The pre-transformed material may be inserted into the two pressure containers from an external material source (e.g., a bulk feed 420) and/or from at least one separator. The pre-transformed material may be inserted into the two pressure containers (e.g., substantially) simultaneously. The pre-transformed material may be inserted into the two pressure containers alternatingly. The pre-transformed material may be inserted into the two pressure containers in a (e.g., predetermined) sequence. The insertion of the pre-transformed material into the pressure container may be controlled. Control may comprise using one or more valves (e.g., 422, and/or 424). The valves may be any valve described herein. In some examples, the pre-transformed material may be inserted from at least one component of the layer dispensing mechanism (e.g., 425). The layer dispensing mechanism may be coupled to a bulk reservoir (e.g., 430) via an optional conveyor (e.g., 428, e.g., pipe). The conveyor may facilitate coupling and/or fluid connection of the bulk reservoir with the material dispenser. The bulk reservoir may be optionally coupled to a secondary separator (e.g., 435). The pre-transformed material may be conveyed (e.g., in a first loop) from the pressure container to the secondary separator via one or more material conveying channels (e.g., 440, and/or 445). In some examples, a first pressure container (e.g., 405) may be operatively coupled to a first material conveying channel (e.g., 445), and a second pressure container (e.g., 410) may be operatively coupled to a second material conveying channel (e.g., 440). In some examples, the first material conveying channel and the second material conveying channel may be the same. In some examples, the first material conveying channel and the second material conveying channel may be different. In some examples, a portion of the first material conveying channel may be connected to a portion of the second material channel (e.g., 448). The material conveying channel may convey pre-transformed material to one or more components of the pre-transformed material conveyor system (e.g., with or against gravity). In some examples, the material conveying channel may be coupled to the bulk reservoir and/or at least one component of the layer dispensing mechanism. The pre-transformed material may be conveyed (e.g., in a second loop) from at least one component of the layer dispensing mechanism to at least one of the pressure containers. In some examples, the pre-transformed material may be conveyed into the two pressure containers (e.g., concurrently, and/or sequentially). The pre-transformed material may be conveyed into the two pressure containers simultaneously. The pre-transformed material may be conveyed into the two pressure containers alternatingly. The pre-transformed material may be conveyed into the two pressure containers in a sequence. The second loop may optionally comprise a first separator (e.g., 450) and/or a second separator (e.g., 455). The first and second separators may be of the same, or of different types. The pre-transformed material may be conveyed from the layer dispensing mechanism to the first separator via a third material conveying channel (e.g., 458). The pre-transformed material from the first separator may be filtered (e.g., sieved, separated from debris, and/or sorted). The pre-transformed material may be filtered and/or re-conditioned prior to conveying it to the pressure container. Optionally, the first separator and/or the filter may be operatively coupled to a buffer container. The pre-transformed material may reside in the buffer container while the first loop may be in operation of conveying pre-transformed material into the secondary separator. On completion of the first loop, the pre-transformed material from the buffer container into the pressure container. In some examples, the buffer container may convey pre-transformed material into the pressure container during the first loop. The pre-transformed material conveyor system may comprise a gas conveying channel. In some examples, the pre-transformed material conveyor system may comprise a plurality of gas conveying channels (e.g., 460, 455, 468, 464, and 462). At least two of the plurality of gas conveying channels may have at least one channel characteristic that is (e.g., substantially) the same. At least two of the plurality of gas conveying channels may have at least one channel characteristic that is different. The gas conveying channel may convey gas to one or more components of the pre-transformed material conveyor system. The gas may comprise a pressure. The gas conveying channel may equilibrate pressure and/or content within one or more components of the pre-transformed material conveyor system. For example, a gas conveying channel may equilibrate a first atmosphere within a processing chamber with a second atmosphere with the external material source. The first atmosphere and/or second atmosphere may be a (e.g., substantially) inert atmosphere. The gas conveying channel (e.g., 460, 462, 464, 466, and/or 468) may be operatively coupled (e.g., fluidly connected) to at least one of the material conveying channel, the pressure containers, the processing chamber (e.g., 470), the external material source, the first separator, the secondary separator, the bulk reservoir, and/or the buffer container. The pre-transformed material conveyor system with multiple pressure containers, may comprise one or more valves. A valve may be coupled to a material conveying channel and/or a gas conveying channel. For example, FIG. 4 shows examples of material conveying channel valves (e.g., denoted by a white circle comprising an X) and gas conveying channel valves (e.g., denoted by a white circle).

In some embodiments, the pressure container can withstand a pressure different from an ambient pressure (e.g., positive, or negative pressure relative to the ambient pressure). For example, the pressure container may be a container that can withstand elevated pressure and/or vacuum. The pressure container may withstand an ambient pressure, a positive pressure (e.g., above the ambient pressure) and/or a negative pressure (e.g., below the ambient pressure). In some instances, the pressure in the container and the pressure in the processing chamber may be the same. In some instances, the pressure in the container and the pressure in the processing chamber may be different. In some examples, the pressure in the pressure container may be greater than the pressure in the processing chamber by at least 1.1 times, 5 times, 10 times, 25 times, 30 times, 50 times, 75 times, 100 times, 200 times, 300 times, 500 times, 700 times, 900 times or, 1000 times. In some examples, the pressure in the container may be smaller than the pressure in the processing chamber by at least 1.1 times, 5 times, 10 times, 25 times, 30 times, 50 times, 75 times, 100 times, 200 times, 300 times, 500 times, 700 times, 900 times, or 1000 times.

Figure 6:
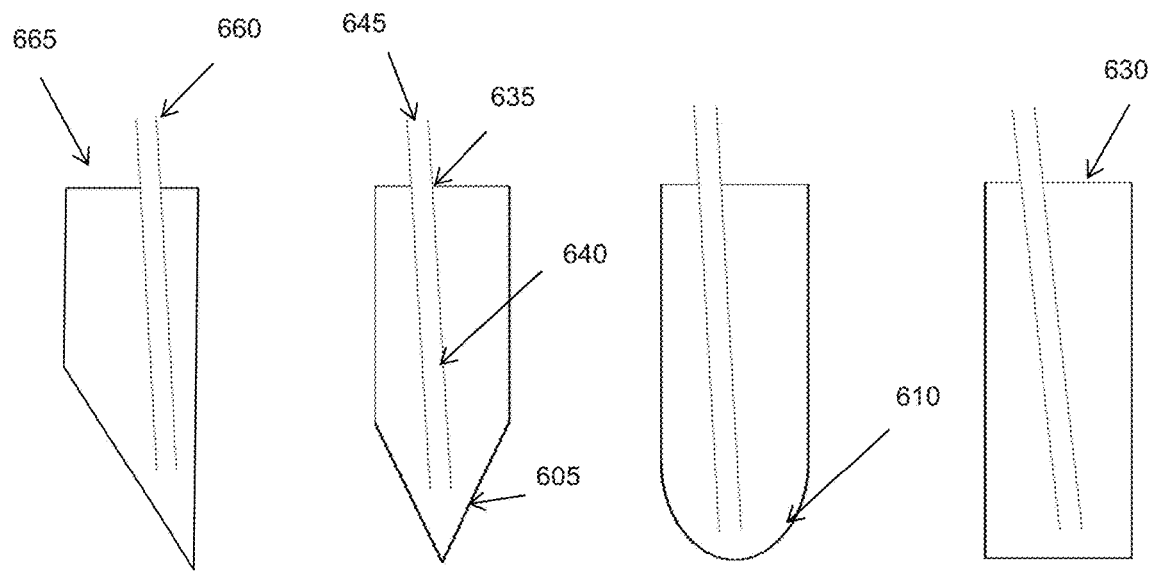
FIG. 6 schematically illustrates various vertical cross sectional views of a component of the 3D printing system.
Figure 6:
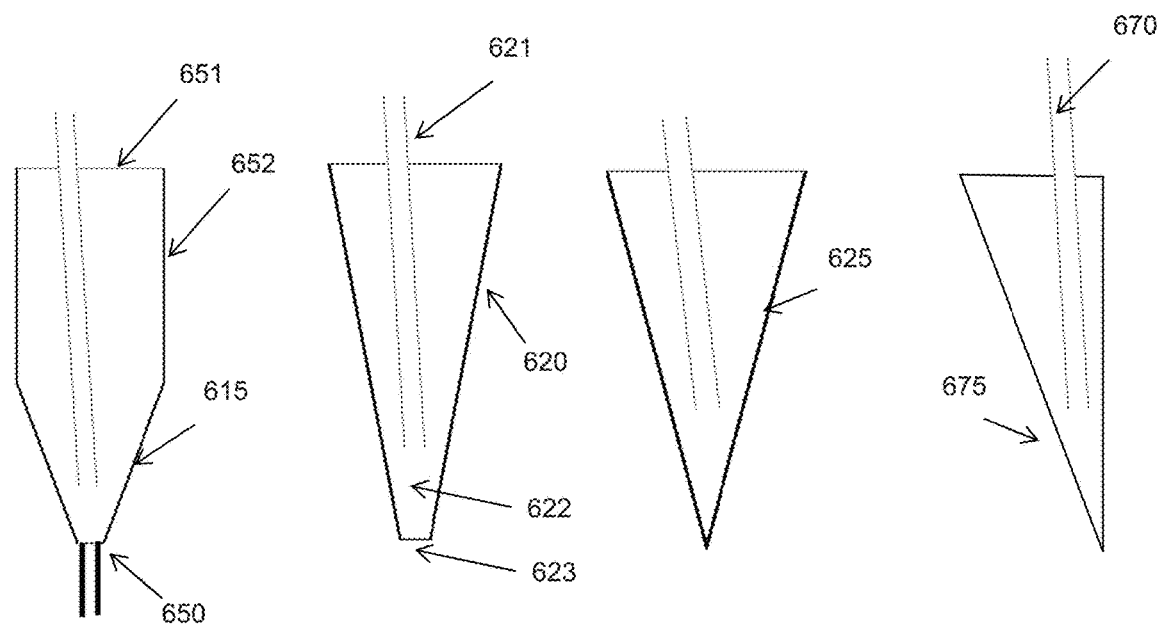

The pressure container may have an internal 3D shape. The internal shape may be the same or different as the external 3D shape of the pressure container. The pressure container may have a uniform or a non-uniform internal 3D shape. The 3D shape may comprise a cuboid (e.g., cube), a tetrahedron, a polyhedron (e.g., primary parallelohedron), at least a portion of an ellipse (e.g., circle), a cone, a triangular prism, hexagonal prism, cube, truncated octahedron, or gyrobifastigium, a pentagonal pyramid, or a cylinder. The polyhedron may be a prism (e.g., hexagonal prism), or octahedron (e.g., truncated octahedron). A vertical cross section (e.g., side cross section) of the 3D shape may comprise a circle, triangle (e.g., FIG. 6, 625), rectangle (e.g., square, e.g., 630), pentagon, hexagon, octagon, or any other polygon. The vertical cross section may be of an amorphous shape. The polygon may comprise at least 3, 4, 5, 6, 7, 8, 9, or 10 faces. The polygon may comprise at least 3, 4, 5, 6, 7, 8, 9, or 10 vertices. The cross-section may comprise a convex polygon. The polygon may be a closed polygon. The polygon may be equilateral, equiangular, regular convex, cyclic, tangential, edge-transitive, rectilinear, or any combination thereof. For example, the (e.g., vertical) cross-section of the 3D shape may comprise a square, rectangle, triangle, pentagon, hexagon, heptagon, octagon, nonagon, octagon, circle, or icosahedron. The container may comprise an internal 3D shape that may facilitates a maximum amount of pre-transformed material evacuation. The internal 3D shape of the pressure container may facilitate concentration of the pre-transformed material to be conveyed. FIG. 6 shows examples of various vertical cross sections of internal 3D shapes of a pressure container. The container may comprise one or more internal surfaces (e.g., walls). At least one internal surface may be (e.g., partially) slanted (e.g., FIG. 6, 605, 610, 615, 620, and/or 625) with respect to the horizon. The slanting may comprise a curvature (e.g., FIG. 6, 610). The slanting may be in a (e.g., substantially) uniform direction (e.g., straight, FIG. 6, 620, 625, or 675). The internal surface may comprise a (e.g., substantially) vertical portion (e.g., FIG. 6, 652) and a slanting portion (FIG. 6, 615). The top surface of the container may be (e.g., controllably) sealed. The top surface of the container (FIG. 6, 665) may comprise a material port (e.g., 635) and/or a gas port (e.g. vent). The material port may be coupled to a portion of the material conveying channel (e.g., 645, 660), and may facilitate conveying the pre-transformed material to and from the pressure container. The material conveying channel may extend into the pressure container interior (e.g., 640). In some examples, the bottom portion of the pressure container may comprise an outlet port (e.g., 650). The container may comprise pre-transformed material. The pre-transformed material may be filled, inserted, or sucked out of the pressure container. The channel (e.g., pre-transformed material and/or gas) may be a closed channel, e.g., across is elongated cross section. The material conveyor channel (e.g., 621) may be disposed close to (e.g., 622) a bottom surface of the container (e.g., 623) to (i) allow a flow of pre-transformed material through the channel (e.g., at an acceptable rate), and/or (ii) a maximal amount of the pre-transformed material to be evacuated from the internal volume of the pressure container.

In some embodiments, the pressure container comprises a gas port. In some embodiments, the pressure container is operatively (e.g., physically) coupled to a gas source and/or to a chamber/enclosure/channel that facilitates pressure equilibration. The pressure container may comprise a gas port. The gas port may be operatively coupled to a surface (e.g., top, side or a bottom) of the pressure container. The gas port may comprise an (e.g., controlled) opening. The gas port opening may be operatively coupled to a gas source. The gas source may be an external gas source. The gas source may be exchangeable (e.g., before, during, and/or after at least a portion of the 3D printing). The gas source may be replaceable. The gas port may allow insertion of gas into the container. The vent port may allow removal of gas from the container. Optionally, the vent port may be connected to a gas conveyor channel (e.g., a tube, pipe, duct, or a carrier). The gas may be conveyor channel may be inserted into the container. The gas channel (e.g., 360, and 362) may allow transporting (e.g., conveying and/or extracting) gas to and/or from the pressure container. The gas may flow through the pressure container. The gas may be at an ambient, positive, or a negative pressure. The gas pressure may be controlled (e.g., by a controller). Controlling may comprise using a (e.g., controllable) valve. The controlling may be done manually and/or automated. Controlling may be performed before, after, and/or during the 3D printing. Controlling may be performed during, before and/or after the operation of the pre-transformed material conveyor system. The vent port may be operatively coupled to a valve. The valve may facilitate control of gas pressure. The valve may facilitate control of gas insertion and/or removal. The valve may be controlled manually and/or automated. The valve may be in operation during, before, and/or after 3D printing. The valve may be in operation during, before, and/or after operation of the pre-transformed material conveyor system. The valve may comprise a pressure relief, pressure release, pressure safety, safety relief, pilot-operated relief, low pressure safety, vacuum pressure safety, low and vacuum pressure safety, pressure vacuum release, snap acting, pinch, metering, flapper, needle, check, control, solenoid, flow control, butterfly, bellows, ball, piston, plug, popping, rotary, manual, or modulating valve. The valve may comply with the legal industry standards presiding the jurisdiction. The pressure within the container may cause the pre-transformed material to flow (e.g., through the material conveyor channel). The flow of the pre-transformed material may be with or against gravity. The flow of the pre-transformed material may be from a high-pressure area (e.g., the area within the pressure container) to a low-pressure area (e.g., the area external to the pressure container, and/or the area within the material conveyor channel outside of the pressure container). The flow of the pre-transformed material may be to a (e.g., secondary) separator. The flow of the pre-transformed material may be to a material conveyor channel. The pressure may create a suction of the pre-transformed material to the low-pressure area (e.g., bulk reservoir, and/or material dispenser).

In some examples, the pressure container comprises a material port (e.g., through which pre-transformed material travels). The material port may be operatively coupled to a surface (e.g., top, side, or bottom) of the pressure container. The material port may comprise an opening. The opening may be operatively coupled to a pre-transformed material source. The pre-transformed material source may be an external material source (e.g., a bulk feed). The material source may be exchangeable (e.g., before, after, and/or during at least a portion of the 3D printing). The material source may be replaceable (e.g., before, after, and/or during at least a portion of the 3D printing). The material source may be operatively coupled to a controller. The controller may control insertion and/or removal of the pre-transformed material to/from the container. The insertion and/or removal of the pre-transformed material may be manual and/or automated. The material port may allow insertion of pre-transformed material into the container. The material port may allow removal of pre-transformed material from the container. The material port may be operatively coupled to a valve. The valve may facilitate insertion and/or removal of material. The valve may facilitate (e.g., control) a flow of material. The valve may be controlled manually and/or automated. The valve may be in operation during, before, and/or after 3D printing. The valve may be in operation during, before, and/or after operation of the pre-transformed material conveyor system. The valve may be any valve described herein.

In some examples, the material port may be connected to a material conveyor channel (e.g., tube, pipe, duct, or a carrier). The material conveyor channel may facilitate insertion and/or removal of pre-transformed material to/from the pressure container. At least a portion of the material conveyor channel may be inserted within the pressure container. The material conveyor channel may have an extension that extends into the container (e.g., close to a bottom surface of the container). In some examples, the material conveyor channel may not have an extension. In some examples, the material conveyor channel may not be inserted into the container (e.g., when the material port is at a side or bottom surface of the container). In some examples, the pre-transformed material is conveyed to the material conveyor channel through a bottom or side opening in the pressure container. In some example, the pressure conveyor does not have a material port at an upper portion of the pressure container (e.g., relative to the gravitational center). The upper portion of the container may comprise the top of the container (e.g., 651), or a portion of the container close to the top of the container (e.g., 651). In some embodiments, the container is rotatable upon an axis (e.g., that is different from a vertical axis). The rotational axis may allow rotation of the pressure container to allow pre-transformed material to concentrate at the material port (e.g., to be evacuated from the pressure container). The rotation may be manual and/or automatically controlled (e.g., by a controller); before, after, and/or during at least a portion of the 3D printing. In some embodiments, the pressure container is stationary (e.g., before, after, and/or during at least a portion of the 3D printing). In some examples, the material conveyor channel may be (e.g., externally) connected to a surface of the pressure container (e.g., to an opening at the bottom surface of the pressure container, or to an opening at the side surface of the pressure container). In some examples, the pressure container may comprise a plurality of material ports, for example, at the top (e.g., 651) and at the bottom (e.g., 650) of the pressure container. A portion of the material conveyor channel may be connected to a recycling system. The pre-transformed material from the recycling system may be conveyed into the container from the recycling system. A portion of the material conveyor channel may be connected to at least one component of the layer dispensing mechanism (e.g., to a material dispenser and/or material remover). The pre-transformed material (e.g., an excess amount of pre-transformed material) from the component of the layer dispensing mechanism (e.g., material dispenser, and/or the material leveler) may be conveyed into the pressure container from the layer dispensing mechanism. The pre-transformed material from the at least one component of the layer dispensing mechanism may be an excess amount of material (e.g., spillage, unused portions and/or overflow portions of pre-transformed material). A portion of the material conveyor channel may be connected to a (e.g., secondary) separator. The one or more boundaries (e.g., walls) of the material conveyor channel may comprise a smooth (e.g., polished) internal surface (e.g., that comes in contact with at least a portion of the pre-transformed material during its conveyance through the material conveyor channel). Smooth surface may be of an Ra value of at most about 3 µm, 4 µm, 5 µm, 6 µm, 7 µm, 8 µm, 9 µm, 10 µm, 30 µm, 40 µm, 50 µm, 75 µm, or 100 µm. Smooth surface may be of an Ra value that is between any of the afore-mentioned values (e.g., from about 3 µm to about 100 µm, from about 3 µm to about 40 µm, or from about 3 µm to about 10 µm). The smooth internal surface may exhibit a small, negligible, and/or insubstantial amount of friction with the pre-transformed material (e.g., relative to the intended purpose of conveying the pre-transformed material through the material conveyor channel, for example, from the pressure container to the processing chamber and/or vice versa). The small, negligible, and/or insubstantial amount of friction may facilitate (e.g., easy, uninterrupted, and/or continuous) conveying of the pre-transformed material in a desired manner. The one or more smooth walls of the material conveyor channel may be formed by a polishing process (e.g., soda-blasting, vapor polishing, flame polishing, paste polishing, or chemical-mechanical polishing). The one or more smooth walls of the material conveyor channel may be formed by coating a wall with a coating. Examples of polished material include mirror, or, polished stainless steel. The coating may alter the surface properties of the channel boundary. For example, the coating may alter the adhesion, attraction and/or repulsion of the pre-transformed material to the internal surface of the channel. For example, the coating may reduce the adhesion and/or attraction of the pre-transformed material to the internal surface. For example, the coating may cause the pre-transformed material to repel from the internal surface. The surface structure of the internal surface may comprise a low attachment surface (e.g., a Lilly pad, or shark skin type surfaces). The surface structure of the internal surface may be a static dissipative surface. The static dissipative surface may dissipate (e.g., repel) the pre-transformed material that may be statically charged. The static dissipative surface may facilitate conveying of the pre-transformed material, by reducing adhering of the pre-transformed material to the internal surface. The one or more boundaries of the material conveyor channel may be configured to withstand pressure (e.g., ambient, positive, and/or negative pressure). The amount of pressure inserted and/or released within the material conveyor channel may be adjustable (e.g., manually, and/or automatically, e.g., controlled by a controller). Adjustment may be performed to facilitate conveying of the pre-transformed material. The amount of adjustment may depend on the material type of the material conveyor channel and/or the pre-transformed material. The material type from which the material conveyor channel is constructed may comprise an elemental metal, metal alloy, glass, ceramic, elemental carbon, polymer, or resin. The polymer may comprise polyurethane. The material may be a composite material. The material type may be any material disclosed herein. In some examples, the charge (e.g., magnetic, electric, and/or electrostatic) on one or more walls of the material conveyor channel may be altered. Altering may comprise charging with gas. Altering may comprising grounding and/or connecting to a voltage. Altering may comprise facilitating ease of conveying (e.g., by dissipating, repelling, reducing adherence, and/or not attracting) the pre-transformed material to the internal surface of the material conveyor channel. In some examples, the material conveyor channel (also herein "material conveying channel") may comprise a flexible material. The material conveying channel may comprise a flexible (e.g., bendable, malleable, and/or pliable) portion. The material conveying channel may comprise a non-flexible (e.g., bendable, malleable, and/or pliable) portion. The non-flexible portion may resist structural alteration of the channel during conveying of the pre-transformed material through the material conveyor channel. The pre-transformed material may be conveyed through the material conveyor channel at a velocity of at least about 1 cm (centimeter)/sec (second), 2 cm/sec, 3 cm/sec, 5 cm/sec, 6 cm/sec, 7 cm/sec, 8 cm/sec, 9 cm/sec, 10 cm/sec, 30 cm/sec, 40 cm/sec, 50 cm/sec, 75 cm/sec, 80 cm/sec, 90 cm/sec, 95 cm/sec, 1 m(meter)/sec, 2 m/sec, 3 m/sec, 4 m/sec, 5 m/sec, 10 m/sec, 15 m/sec, 20 m/sec, 25 m/sec, 30 m/sec, 35 m/sec, 40 m/sec, 45 m/sec, 50 m/sec, 55 m/sec, 60 m/sec, 70 m/sec, 80 m/sec, or 90 m/sec. The pre-transformed material may be conveyed through the material conveyor channel at a velocity of at most about 2 cm/sec, 3 cm/sec, 5 cm/sec, 6 cm/sec, 7 cm/sec, 8 cm/sec, 9 cm/sec, 10 cm/sec, 30 cm/sec, 40 cm/sec, 50 cm/sec, 75 cm/sec, 80 cm/sec, 90 cm/sec, 95 cm/sec, 1 m(meter)/sec, 2 m/sec, 3 m/sec, 4 m/sec, 5 m/sec, 10 m/sec, 15 m/sec, 20 m/sec, 25 m/sec, 30 m/sec, 35 m/sec, 40 m/sec, 45 m/sec, 50 m/sec, 55 m/sec, 60 m/sec, 70 m/sec, 80 m/sec, 90 m/sec, or 100 m/sec. The velocity of conveying the pre-transformed material through the material conveyor channel may be between any of the afore-mentioned values (e.g., from about 1 cm/sec to about 100 m/sec, from about 1 cm/sec to about 30 cm/sec, from about 30 cm/sec to about 95 cm/sec, from about 1 m/sec to about 30 m/sec, or from about 30 m/sec to about 100 m/sec).

In some embodiments, the temperature of the pre-transformed material is altered and/or maintained before, after, and/or during at least a portion of the 3D printing. The material conveyed through the channel may be at a temperature below, above, or at ambient temperature. For example, the material in the bulk feed, separator, and/or pressure container may be cooled, heated, and/or maintained at a temperature. The bulk feed, separator, pressure container, and/or at least one component of the layer dispensing mechanism may be operatively coupled to a temperature alteration and/or maintenance source (e.g., heat transfer device, e.g., a cooling member). In some configurations, the channel (e.g., gas channel and/or material conveyor channel) may be coupled to the temperature alteration and/or maintenance source (e.g., comprising a thermostat). The temperature alteration and/or maintenance source may comprise a heat exchanger (e.g., active, or passive heat exchanger). The cooling member may comprise an energy conductive material. The cooling member may comprise an active energy transfer, or a passive energy transfer. The cooling member may comprise a cooling liquid (e.g., aqueous or oil), cooling gas or cooling solid. The cooling member may be further connected to a cooler or a thermostat. The gas or liquid comprising the cooling member may be stationary or circulating. The heat exchanger can circulate a cooling/heating fluid through a plumbing system. The plumbing system may comprise one or more channels (e.g., pipe, or coil). The cooling/heating fluid (e.g., coolant, or oil) can be configured to absorb/release heat from the heat exchanger through any one or combination of heat transfer mechanisms (e.g., conduction, natural convection, forced convection, and radiation).

In some examples, the pressure container comprises an outlet port. The outlet port may be operatively coupled to a surface (e.g., top, side, or bottom) of the container. The outlet port may comprise an opening. The outlet port may be coupled to the material conveyor channel. In some examples, the material port and the outlet port may be the same opening. The outlet port may be located adjacent to the material port (e.g., near a bottom surface of the container). The outlet port may facilitate removal (e.g., evacuation) of a portion pre-transformed material. In some examples, the outlet port may facilitate removal of gas and/or pressure from the container. A portion of the outlet port (e.g., the opening) may be controlled manually and/or automated. The outlet port may be in operation during, before, and/or after 3D printing (e.g., by using a valve). The outlet port may be in operation during, before, and/or after operation of the pre-transformed material conveyor system.

In some examples, the bulk feed is an external material source (e.g., comprising large quantity of pre-transformed material). For example, the quantity of material in the bulk feed may be larger than the quantity of material in the bulk reservoir, that is larger than the quantity of material in the material dispenser. For example, the bulk feed may contain pre-transformed material sufficient for to print tens, hundreds, or thousands of layers (e.g., an entire build), the bulk reservoir may contain material sufficient to print a plurality of layers (e.g., at most about 2, 3, 4, 6, 7, 8, 9, or 10 layers), and the material dispenser may comprise one or a few layers (e.g., at most 1, 2, or 3 layers). The bulk feed may comprise pre-transformed material sufficient to print at least about 10, 11, 15, 20, 50, 80, 100, 500, 1000, 5000, or 10000 layers. The bulk feed may be connected (e.g., operatively coupled to, and/or physically coupled) to one or more pressure container. The bulk feed may be located above, below or to the side of a pressure container. In some embodiments, the bulk feed is located below the bulk reservoir, and/or the material dispenser. The bulk feed may be under an ambient atmosphere. The bulk feed may be under oxygen depleted, humidity depleted, and/or inert atmosphere. Pre-transformed material can be stored in the bulk feed. Pre-transformed material from the bulk feed can travel to the pressure container via a conveyor mechanism (e.g., material conveyor channel). The material from the bulk feed may be inserted into the pressure container before, after, and/or during at least a portion of the 3D printing. The pre-transformed material from the bulk feed may be inserted into the pressure container before, after, and/or during operation of the pre-transformed material conveyor system. The pre-transformed material may be re-conditioned prior to its entry into the bulk feed. Re conditioning may comprise physical and/or chemical re-conditioning. For example, removal of oxide surface layer(s), and/or size sorting (e.g., sieving). Pre-transformed material from the recycling system and/or from at least one component of the layer dispensing mechanism (e.g., leveler and/or material remover) may enter the bulk feed. At least one component of the material conveying system (e.g., FIG. 4) is under oxygen depleted, humidity depleted, and/or inert atmosphere (e.g., during operation of the material conveyance system). In some examples, the (e.g., entire) material conveying system is under oxygen depleted, humidity depleted, and/or inert atmosphere (e.g., during operation of the material conveyance system).

In some examples, the pre-transformed material conveying system (also herein "material conveyance system") comprises pneumatic conveyance of the pre-transformed material. The pre-transformed material may be conveyed from the pressure containers to the processing chamber. The conveying may include using dense phase conveying. In some examples, the dense phase conveying includes (i) inserting pre-transformed material into one or more pressure containers, (ii) inserting a (e.g., inert) gas, which gas comprises a pressure, which pressure forms a pressure gradient between the one or more containers and a target (e.g., an apparatus in the processing chamber), and (iii) as a result of the pressure gradient, the pre-transformed material from the pressure container to an apparatus in the processing chamber (e.g., material dispenser) is being conveyed across the pressure gradient. The pressure of gas (e.g., in the pressure container) can be at least about 5 pound-force per square inch (psi), 6 psi, 7 psi, 8 psi, 9 psi, 10 psi, 12 psi, 15 psi, 20 psi, 25 psi, 30 psi, 35 psi, 40 psi, 45 psi, 50 psi, 55 psi, 60 psi, 70 psi, 80 psi, 90 psi, or 100 psi. The pressure of gas (e.g. in the pressure container) can be between any of the afore-mentioned pressure values (e.g., from about 5 psi to about 100 psi, from about 5 psi to about 15 psi, from about 15 psi to about 25 psi, from about 25 psi to about 70 psi, or from about 70 psi to about 100 psi). The pressure in the processing chamber (e.g., in an apparatus in the processing chamber) may be ambient pressure.

In some embodiments, the conveyed pre-transformed material may be inserted into at least one (e.g., secondary) separator prior to being inserted to the bulk reservoir and/or material dispenser. The secondary separator may be a part of the processing chamber. The secondary separator may be operatively coupled to the processing chamber. The secondary separator may facilitate separation of the pre-transformed material from the (e.g., carrying) gas. The separator may recycle, sort and/or recondition the pre-transformed material. The conveyed pre-transformed material may be dispensed from a position above a platform (e.g., from the secondary separator) via at least one component of the layer dispenser (e.g., material dispenser), to form a material bed.

In some examples, the pre-transformed material may be conveyed from the pressure containers to the bulk reservoir (e.g., a doser). The doser may be a part of the ancillary chamber. The doser may be a part of the processing chamber. In some examples, the doser may be operatively coupled to the ancillary chamber, the processing chamber, and/or at least one component of the layer dispensing mechanism. The doser may convey the pre-transformed material to the layer dispensing mechanism, e.g., via a channel (e.g., that fluidly couples the doser with the layer dispenser). The channel may be stationary or translating (e.g., during at least a portion of the 3D printing). Examples of this channel can be found in Patent Application Serial Number PCT/US17/57340 that is incorporated herein it its entirety. For example, this channel may be a perforation in a translatable plate, or be a lateral gap between two adjacent plates. Translation of this channel (e.g., FIG. 7, 764) may facilitate closing and/or opening an exit opening of the doser, through which pre-transformed material flows to the material dispenser. Translation of this channel may facilitate closer and/or opening an entrance opening of the material dispenser, through which pre-transformed material flows from the doser. In some embodiments, the pre-transformed material flows from the pressure container to the material dispenser (e.g., without passing through one or more separators, and/or without passing through a bulk reservoir). In some embodiments, the material conveyance system excludes one or more separators, and/or a bulk reservoir. The layer dispensing mechanism may dispense the pre-transformed material above the platform to form the material bed. The conveyed pre-transformed material may be used for building at least a portion of the 3D object.

In some embodiments, conveying the pre-transformed material is done through the material conveying channel. Conveying may comprise forcing out (e.g., ejecting, extruding, thrusting, expelling, evicting, and/or throwing out) the material from the pressure container. Conveying may comprise flow (e.g., at a low velocity) of the pre-transformed material. Low velocity may be a velocity value of at least about 1 cm (centimeter)/sec(second), 2 cm/sec, 3 cm/sec, 5 cm/sec, 6 cm/sec, 7 cm/sec, 8 cm/sec, 9 cm/sec, 10 cm/sec, 30 cm/sec, 40 cm/sec, 50 cm/sec, 75 cm/sec or 100 cm/sec. Low velocity may be of a velocity value that is between any of the afore-mentioned values (e.g., from about 1 cm/sec to about 100 cm/sec, from about 5 cm/sec to about 25 cm/sec, or from about 25 cm/sec to about 100 cm/sec). Conveying may comprise suction of the pre-transformed material into the material conveying channel. The processing chamber, the layer dispensing mechanism, the ancillary chamber, the bulk reservoir (e.g., doser), and/or the (e.g., secondary) separator may comprise an ambient atmosphere. In some instances (e.g., during operation of the powder conveyance system) the material conveying channel and/or the pressure containers may comprise an ambient atmosphere. At times, the processing chamber, the layer dispensing mechanism, the ancillary chamber, the doser, the secondary separator, the material conveying channel and/or the pressure containers comprise an inert atmosphere (e.g., during operation of the powder conveyance system). At least two of the processing chamber, the layer dispensing mechanism, the ancillary chamber, the doser, the secondary separator, the material conveying channel and/or the pressure containers may have the same atmosphere (e.g., during at least a portion of the operation of the powder conveyance system). At least two of the processing chamber, the layer dispensing mechanism, the ancillary chamber, the doser, the secondary separator, the material conveying channel and/or the pressure containers may have a different atmosphere (e.g., during at least a portion of the operation of the powder conveyance system). At least two of the processing chamber, the layer dispensing mechanism, the ancillary chamber, the doser, the secondary separator, the material conveying channel and/or the pressure containers may have the same pressure (e.g., during at least a portion of the operation of the powder conveyance system). At least two of the processing chamber, the layer dispensing mechanism, the ancillary chamber, the doser, the secondary separator, the material conveying channel and/or the pressure containers may have a different pressure (e.g., during at least a portion of the operation of the powder conveyance system).

In some examples, the pre-transformed material is inserted into the one or more pressure containers from an external material source (e.g., a bulk feed). In some examples, the pre-transformed material may be conveyed from the processing chamber, build module, and/or layer dispensing mechanism to the one or more pressure containers. The conveying may include using dilute phase conveying. In some examples, the dilute phase conveying includes (i) inserting pre-transformed material into the material conveying channel from a portion of the processing chamber, (ii) inserting a (e.g., inert) gas, which gas comprises a conveying velocity, which conveying velocity is high enough to suspend at least a portion of pre-transformed material, and (iii) conveying the suspended pre-transformed material from the portion of the processing chamber to a pressure container. The pre-transformed material may be suspended in the gas during conveyance (e.g., from the processing chamber to the separator and/or the pressure container). For example, the pre-transformed material may be suspended in the gas (e.g., in a dilute conveying phase) during conveyance from the processing chamber to the cyclonic separator. Conveying may comprise continuous conveying. Conveying may comprise flowing of the pre-transformed material into the material conveying channel. Conveying may comprise maintaining the conveying velocity within the material conveying channel. Conveying may include maintaining suspension of the pre-transformed material within the material conveying channel. In some examples, a centrifugal force (e.g., a blower, fan, or a vacuum) may be used (e.g., to maintain conveyance and/or suspension of the pre-transformed material in the material conveying channel). At least one gas may be blown to the material conveying channel (e.g., to maintain suspension and/or flow of the pre-transformed material in the material conveying channel). The inserted gas to the material conveying channel may comprise a pressure. The pressure may be lower than a pressure used for dense phase conveying (e.g., used to convey pre-transformed material from the pressure container to the material dispenser and/or bulk reservoir). An excess amount of pre-transformed material from a portion of the processing chamber (e.g., FIG. 2, 226) and/or ancillary chamber (e.g., 240) may be collected into an overflow container and/or a recycling mechanism. The excess amount of pre-transformed material may be optionally conveyed to at least one (e.g., a first) separator. The first separator (e.g., FIG. 3, 345) may be operatively coupled between the processing chamber (e.g., 325) and the one or more pressure containers (e.g. 330). The first separator may separate the pre-transformed material from gas. The first separator may separate, sort, and/or recondition the pre-transformed material. The first separator may convey the pre-transformed material to a pressure container. In some examples, the pre-transformed material may be conveyed directly into the pressure container from the portion of the processing chamber, the overflow container, and/or the recycling mechanism. Conveying directly may include conveying via the material conveying channel.

In some examples, the pre-transformed material conveying system maintains a continuous (e.g., uninterrupted, looped, stable, or steady) flow of material. The continuous flow of material facilitates uninterrupted availability of pre-transformed material when building a 3D object. Continuous flow may include (e.g., simultaneously) conveying (i) pre-transformed material from one or more pressure containers to a portion of the processing chamber and (ii) pre-transformed material from the processing chamber into the one or more pressure containers. Simultaneously conveying may include alternating between a dense phase conveying and a dilute phase conveying. In some embodiments, a single pressure container is used in the material conveyance system. Simultaneously conveying with a single pressure container may include (i) performing a dense phase conveying to convey pre-transformed material from a pressure container to a portion of the processing chamber, (ii) optionally inserting the pre-transformed material from the processing chamber, into a buffer container, and (iii) on completion of the dense phase conveyance to the processing chamber, performing a dilute phase conveyance to convey the pre-transformed material from the processing chamber (or from the optional buffer container) to the pressure container. Simultaneous conveying may include performing operation (i) and optional operation (ii) in parallel. In some examples, the layer dispensing mechanism may not be dispensing pre-transformed material during operation (i) and/or operation (ii). In some examples, the layer dispensing mechanism may be dispensing pre-transformed material during operation (ii) and/or operation (iii). Operation (iii) may be performed in parallel with dispensing of material from the layer dispensing mechanism. At least two of operation (i), operation (ii), and operation (iii) may be performed simultaneously during printing of the 3D object. At least two of operation (i), operation (ii), and operation (iii) may be performed simultaneously before and/or after printing the 3D object. Simultaneously conveying may comprise using one or more sensors. The one or more sensors may detect a state of the pre-transformed material conveying system (e.g., material quantity and/or level within the container, state of a valve within the system, presence of a component within the system, and/or conveying state of a material conveying channel). Simultaneously conveying may comprise using one or more valves. The valves may be any valves described herein. The valves may be used to control one or more operations of alternating conveying.

Figure 5A:
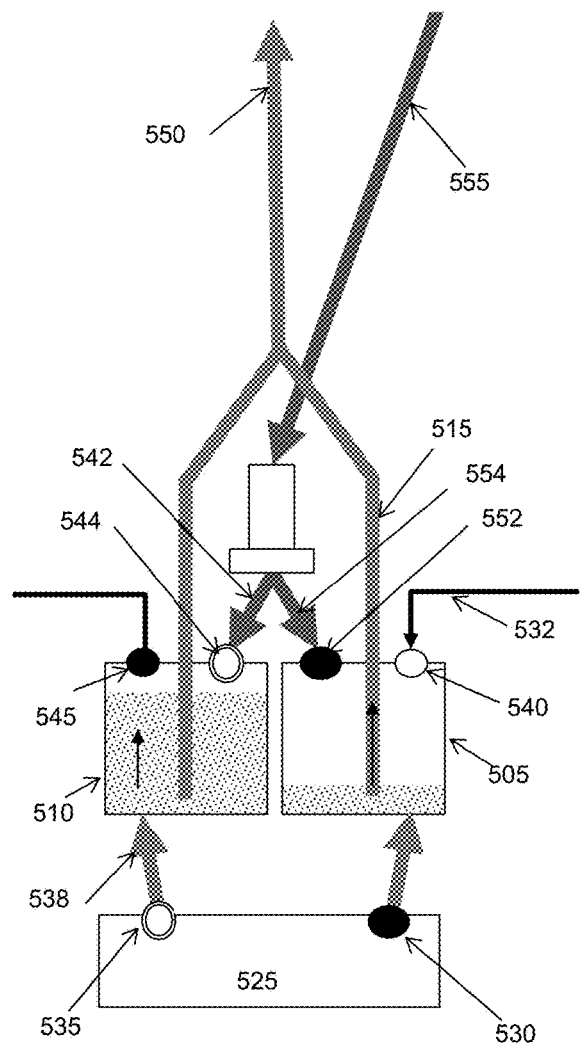
FIGS. 5A-5B schematically illustrate components of a 3D printing system.
Figure 5B:
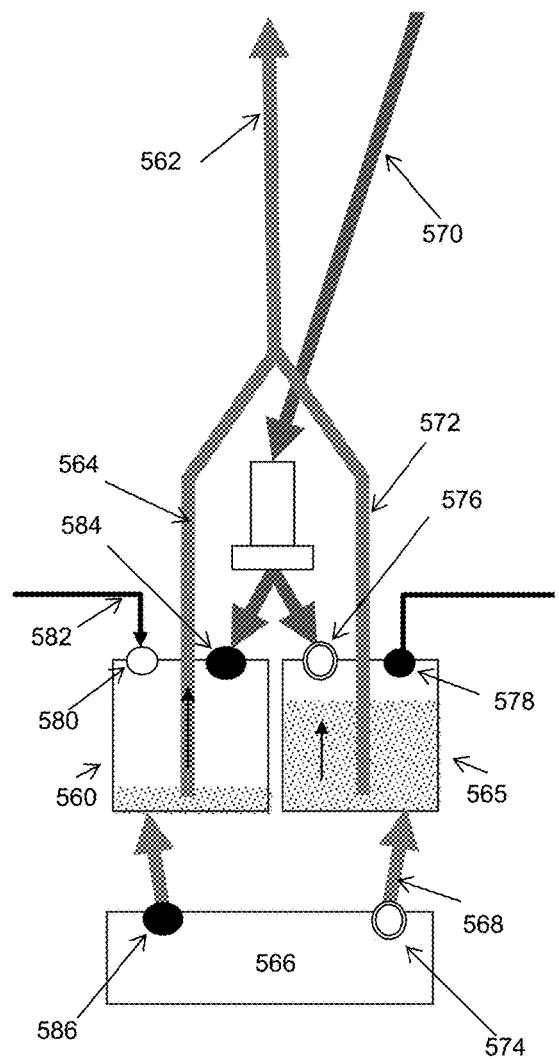

In some embodiments, maintaining (e.g., continuous) flow of pre-transformed material comprises alternating pre-transformed material conveying between multiple (e.g., two) pressure containers. The flow of pre-transformed material in the material conveying system may include (e.g., simultaneously) conveying (i) pre-transformed material from a first (e.g., set of) pressure container(s) to a portion of the processing chamber and (ii) pre-transformed material from the processing chamber into a second (e.g., set of) pressure container(s). The flow of pre-transformed material in the material conveying system may include (e.g., simultaneously) (i) evacuating pre-transformed material from a first (e.g., set of) pressure container(s) to a portion of the processing chamber and (ii) filling pre-transformed material from the processing chamber into a second (e.g., set of) pressure container(s). The flow of pre-transformed material in the material conveying system may be continuous or discontinuous. For example, the flow may be in packets of pre-transformed material. The continuity of the flow may be controlled and/or pre-determined. For example, the continuity of the flow may be altered during the 3D printing. The flow of pre-transformed material may allow continuous operation of the material dispenser. The flow may ensure that the powder dispenser does not wait for a supply of pre-transformed material to perform the material dispensing operation. The flow may ensure that the powder dispenser is not idle due to lack of pre-transformed material. Alternating conveyance may comprise (i) conveying pre-transformed material from a first pressure container into the portion of the processing chamber (e.g., doser), (ii) conveying pre-transformed material (e.g., excess amount of material) from the recycling mechanism and/or the portion of the processing chamber to a second pressure container, and (iii) alternatingly switch conveying from the first pressure container to the second pressure container and/or vice-versa (e.g., when the first pressure container and/or the second pressure container is depleted of pre-transformed material; and/or when the second pressure container and/or the first pressure container is filled with the pre-transformed material respectively). The alternating switch may be coupled to (e.g., coordinated with) the emptying of the first container and the filling of the second container. The alternating switch may be coupled to (e.g., coordinated with) the emptying of the second container and the filling of the first container. Conveying may include a dense phase conveying and/or a dilute phase conveying. For example, when performing operation (i), dense phase conveying may be performed. For example, when performing operation (ii) and/or operation (iii), dilute phase conveying may be performed. Operation (ii) may comprise filling up the second container with pre-transformed material. In some examples, the alternating conveying may additionally comprise (alternatively) filling the first and/or second pressure container with pre-transformed material from an external material source (e.g., a bulk feed). Filling from the external material source may be (e.g., controllably) performed before, during, and/or after at least one of operation (i), operation (ii) or operation (iii). The control may be manual and/or automatic (e.g., using a controller). The continuous flow of material into the portion of the processing chamber may be facilitated by alternatingly conveying from the first container and the second container. The first container may be refilled when the second container performs the conveying. The second container may be refilled when the first container performs conveying. Filling and/or refilling of the container may be during, before, and/or after the material conveying operation. Filling and/or refilling of the container may be during, before, and/or after at least a portion of 3D printing. Alternating conveying may comprise using one or more sensors. The one or more sensors may detect a state of the pre-transformed material conveying system (e.g., pressure within the pressure container, material quantity and/or level within the pressure container, state of a valve within the system (e.g., coupled to the pressure container), presence of a component within the system, and/or conveying state of a material conveying channel). The conveying state of a material conveying channel may comprise the (1) amount of material per unit time that is conveyed, (2) velocity of the material conveyed, density of the material conveyed, (3) pressure within the channel, (4) state of internal channel surface, or (5) a charge (e.g., electric, and/or magnetic) within the channel and/or internal channel surface. The alternating conveying operations may be manual and/or automated (e.g., controlled). Controlling may be using a processor. Controlling may include using one or more (e.g., controllable) valves. The valves may be any valves described herein. FIGS. 5A-5B show examples of alternating conveying operations. FIG. 5A shows an example of conveying pre-transformed material from a first pressure container (e.g., 505) to a destination outside of the pressure container (e.g., 550) via a first material conveying channel (e.g., 515), and (e.g., simultaneously) conveying pre-transformed material from an external material source (e.g., 525) into a second pressure container (e.g., 510) via a second material conveying channel (e.g., 538). The destination outside of the pressure chamber may be portion of the processing chamber. The external material source may be a bulk feed. The external material source may be adjacent to the pressure container(s). Adjacent may comprise beneath, above, or to the side of the pressure container(s). At times, the excess pre-transformed material from the processing chamber may be conveyed into (e.g., 555) the (e.g., second) pressure container (e.g., 510), (e.g., simultaneously) to removal of pre-transformed martial from the first pressure container (e.g., 505), via a third material conveying channel (e.g., 542). The pre-transformed material may be conveyed into the (e.g., second) pressure container using dilute phase conveying. Dilute phase conveying may comprise suspending the pre-transformed material within the second material conveying channel and/or the third material conveying channel. A valve (e.g., 535) may be opened to facilitate conveying pre-transformed material from the external material source to the (e.g., second) pressure container (e.g., 510). A valve (e.g., 544) may be opened to facilitate conveying (e.g., excess of) pre-transformed material from the processing chamber to the (e.g., second) pressure container. The valve may be closed when the (e.g., second) pressure container may be filled and/or reach a pre-determined level of pre-transformed material within the pressure container. The (e.g., second) pressure container may not comprise gas pressure insertion/extraction through the gas channel (e.g., since the valve 545 is shut). Example of an open valve may be denoted in FIG. 5A by a set of concentric circles (e.g., 544) or a white circle (e.g., 540). Example of a shut valve may be denoted in FIG. 5A by a black circle (e.g., 552). A shut valve may reduce and/or prevent conveying pre-transformed material (e.g., FIG. 5A, 554). The (e.g., second) pressure container may comprise a gas pressure insertion opening port comprising a valve. The gas pressure valve (e.g., 545) may be closed when conveying the pre-transformed material into the pressure container, for example, from the processing chamber and/or the external material source. The pre-transformed material may be conveyed from the (e.g., first) pressure container. The pre-transformed material conveyance may be using dense phase conveyance. Dense phase conveying may comprise inserting a pressurized gas into the first pressure container. The pressurized gas may be inserted from an external gas source (e.g., gas cylinder and/or compressor) via a first gas conveying channel (e.g., 532). The gas conveyance channel may be coupled to a pump. A gas conveying valve (e.g., 540) may be opened for conveying gas into the (e.g., first) pressure container. The material conveying valves (e.g., 552, 530) connected to the first pressure container may be closed. The insertion of pressurized gas into the first pressure container may create a pressure gradient between the pressure container and the target destination of the pre-transformed material, for example, between the pressure in the pressure container and the pressure in the processing chamber. The pressure gradient may facilitate conveying (e.g., by way of suction and/or pressure equilibration) of the pre-transformed material into the first material conveying channel (e.g., 515) and further to the portion of the target (e.g., processing chamber). The target may include the bulk reservoir, the material dispenser, the processing chamber, or any combination thereof. FIG. 5B shows an example of switching pressure containers for conveying pre-transformed material, and may follow FIG. 5A in operating sequence respectively. The switching may be performed (i) when at least a portion of the first pressure container may be depleted of pre-transformed material (e.g., according to a sensor), (ii) when at least a portion of the second container may be filled with pre-transformed material (e.g., according to a sensor), and/or (iii) after a predetermined amount of time. The pre-transformed material from the second pressure container (e.g., 560) may be conveyed to a target destination (e.g., 562) via the second material conveying channel (e.g., 564). The pre-transformed material from an external material source (e.g., 566) may be conveyed (e.g., simultaneously) into the first pressure container (e.g., 565) via third material conveying channel (e.g., 568). At times, the excess pre-transformed material from the processing chamber may be conveyed into (e.g., 570) the first pressure container simultaneously, via a first material conveying channel (e.g., 572). The pre-transformed material may be conveyed into the first pressure container using dilute phase conveying. Dilute phase conveying may comprise suspending the pre-transformed material within the first material conveying channel and/or the third material conveying channel, e.g., using at least one gas. A valve (e.g., 574) may be opened to facilitate conveying pre-transformed material from the external material source to the first pressure container (e.g., 565). A valve (e.g., 576) may be opened to facilitate conveying excess pre-transformed material from the processing chamber to the first pressure container. The valve may be closed when the first pressure container may be filled and/or reach a pre-determined level of pre-transformed material within the container. The first pressure container may not comprise gas pressure insertion/extraction through the gas channel (e.g., since the gas channel valve 578 is shut). The gas pressure valve (e.g., 578) may be closed when performing the pre-transformed material conveying from the processing chamber and/or the external material source. The pre-transformed material may be conveyed from the second pressure container to the target destination using dense phase conveying. The pressurized gas may be inserted from an external gas source via a second gas conveying channel (e.g., 582). A gas conveying valve (e.g., 580) may be opened for conveying gas into the second pressure container. Example of an open valve may be denoted in FIG. 5B by a set of concentric circles (e.g., 576) or a white circle (e.g., 580). Example of a shut valve may be denoted in FIG. 5B by a black circle (e.g., 584). The material conveying valves (e.g., 586, 584) connected to the second pressure container may be closed during the pressurizing process. The insertion of pressurized gas into the second pressure container may create a pressure gradient between the pressure container and the target destination. The pressure gradient may facilitate conveying (e.g., by way of suction and/or pressure) of the pre-transformed material into the second material conveying channel (e.g., 564) and further to the portion of the target destination (e.g., in the processing chamber).

In some embodiments, the material conveyance system comprises pneumatic conveyance. The conveyance system may convey pre-transformed material from a material source to a destination (e.g., target location). The conveyance may comprise conveying against gravity. The conveyance may comprise conveyance using one or more gasses. The gas may be pressurized. The conveyance may comprise conveying in the process of equilibrating a pressure gradient. The conveyance may comprise (e.g., artificially) forming a pressure gradient (e.g., between a position in the material conveyance system and the target destination), The position in the material conveyance system may comprise a pressurized container. The artificially induced pressure gradient comprises pressurizing a gas and/or reducing the pressure of a gas. The material conveyance system may transfer a pre-transformed material comprising powders, granules, or dry material. The material conveyance system may transfer a pre-transformed material comprising a liquid. The conveyance may be through conveying lines (e.g., channels). The channels may be vertical, horizontal, or at an angle with respect to the horizon. The material conveyance system may comprise a gas supplier and/or gas mover (e.g., gas pump, blower, or fan). The gas supplier and/or mover may be controlled (e.g., manually and/or automatically). The material conveyance system may environmentally exclude the pre-transformed material from the ambient environment (e.g., at least during the material conveying process). The material conveyance system may form an environment that is protected and/or excluded from the ambient environment (e.g., at least during the material conveying process). The material conveyance system may separate the pre-transformed material from the ambient environment (e.g., at least during the material conveying process). The material conveyance system may comprise mechanical conveyance (e.g., screw, chute, belt (e.g., magnetic belt), troughed, stepper, or bucket conveyor. The conveyor (e.g., channel) may vibrate (e.g., during the conveyance). The conveyor (e.g., channel) may be operatively coupled to one or more vibrators.

The material conveyance system may comprise dilute phase conveying or dense phase conveying. The conveying may comprise dense/dilute pressure conveying, or dense/dilute vacuum conveying. The dilute phase conveying (e.g., from the layer dispenser to the pressure container) may comprise pre-transformed material that is mostly (e.g., fully) suspended in the conveying gas. The dilute phase conveyance may include low pressure (as compared to the dense phase), small pressure gradient (as compared to the dense phase), low material density, and/or high velocity conveyance of the pre-transformed material through a channel (as compared to the dense phase). For example, the material density in the channel during the dilute phase conveying may be at most about 50 pounds per cubic feet (lb/ft$^3$), 55 lb/ft$^3$, 60 lb/ft$^3$, 65 lb/ft$^3$, 70 lb/ft$^3$, or 75 lb/ft$^3$. The material density in the channel may be any value within a range of the aforementioned values (e.g., at most about 50 lb/ft$^3$ to about 75 lb/ft$^3$, about 50 lb/ft$^3$ to about 65 lb/ft$^3$, or about 65 lb/ft$^3$ to about 75 lb/ft$^3$).The dense phase conveying may comprise pre-transformed material that is not suspended in the conveying gas, is transported at high pressure (as compared to the dilute phase), is transported along larger pressure gradient (as compared to the dilute phase), and/or low velocity conveyance (as compared to the dilute phase) through the material conveying channel. Material conveyed by this method is loaded into a pressure vessel (also called a blow pot or transporter), as shown in FIG. 1B. When the vessel is full, its material inlet valve and vent valve are closed and compressed air is metered into the vessel. The compressed air extrudes the material from the pressure vessel into the conveying line and to the destination. Once the vessel and conveying line are empty, the compressed air is turned off and the vessel is reloaded. This cycle continues until all of the materials required for the process have been transferred.

In some instances, resistance to the flow is formed in the material conveyance system. At times, the material conveyance channel comprises one or more gas inlets, through which gas is injected and/or removed to facilitate flow of the pre-transformed material to the target destination. The gas inlets may be gas boosters, or gas assists. The gas inlets along the channel may control (e.g., maintain) a material conveying velocity, and reduce plugging of the material conveyance channel. The gas inlets may facilitate removing pre-transformed material from the channel (e.g., after 3D printing), and/or maintenance of the material conveyance channel.

In some examples, the pre-transformed material conveyor system comprises one or more sensors. The sensors may be operatively coupled to one or more components of the pre-transformed material conveyor system. For example, the sensor may be coupled to at least one of a material conveying channel, the pressure containers, the processing chamber, the external material source, the separator (e.g., the first separator, the secondary separator), the bulk reservoir, the layer dispensing mechanism, the channel between the bulk reservoir and the layer dispensing mechanism, gas channel, and/or the buffer container. At least one sensor may be operatively coupled to at least one position between one or more components. At least one sensor may be disposed between one or more components. For example, a sensor may be coupled between a layer dispensing mechanism and a first separator. Examples of sensors include a level (guided, wave, and/or radar), pressure, flow, gas, pneumatic, physical, optical, and/or sound sensor.

In some examples, the pre-transformed material conveyor system comprises one or more valves (e.g., flow, pressure, stopper, and/or control valve). The valve may be operated manually and/or automated. The valves may be operatively coupled to one or more components of the pre-transformed material conveyor system. For example, the valve may be coupled to a material conveying channel, gas channel, pressure container, processing chamber, external material source (e.g., bulk feed), separator (e.g., first separator, and/or secondary separator), bulk reservoir, at least one component of the layer dispensing mechanism, channel between the bulk reservoir and the layer dispensing mechanism, buffer container, or any combination thereof. The valve may be operatively coupled to a position between one or more components. The valve may be disposed between one or more components. For example, a valve may be operatively coupled (e.g., physically coupled) between a pressure container and an external material source. Examples of valves include a pressure relief, pressure release, pressure safety, safety relief, pilot-operated relief, low pressure safety, vacuum pressure safety, low and vacuum pressure safety, pressure vacuum release, snap acting, pinch, metering, flapper, needle, check, control, solenoid, flow control, butterfly, ball, piston, plug, popping, rotary, manual, or modulating valve.

In some examples, the shaft is coupled to an actuator (e.g., FIG. 2, 252). The actuator may move the shaft. The actuator may move the shaft to convey the coupled layer dispensing mechanism adjacent to the build module. The actuator may move the shaft to retract the coupled layer dispensing mechanism into the ancillary chamber. Examples of an actuator include a linear motor, pneumatic motors, electric motors, solar motors, hydraulic motors, thermal motors, magnetic motors, or mechanical motors. The actuator may reside on a stage (e.g., FIG. 2, 258). The stage may be stationary. The stage may be movable (e.g., before, after, and/or during the 3D printing). The stage may comprise a rail system. The stage may allow smooth movement of the shaft. The shaft may be coupled to one or more bearings. The bearing may be a machine element that constrains relative motion to a desired motion. The bearing may be a machine element that reduces friction between moving components. For example, the bearing may allow a smooth movement of the shaft. The bearing may comprise elements that physically contact the shaft. For example, the bearing (e.g., ball bearing) may comprise balls that contact the shaft in one or more points. The bearing may not contact the shaft (e.g., gas bearing, or magnetic bearing). The bearings may facilitate a directional path for the shaft. The movable rear bearings may facilitate (e.g., a directional) movement of the shaft.

In some embodiments, the stage optionally comprises a stopper. The stopper may be a bearing, a valve, a plug, a pop-up stopper, a trip lever, or a plunger style stopper. The stopper may control the movable distance of the shaft (e.g., maximum, and/or minimum movement span).

In some embodiments, the ancillary chamber comprises a vibration mechanism. The vibration mechanism may include a motor. The motor may be any motor described herein. The motor may be a motor that exhibits linear motion. The motor exhibiting the linear motion may comprise a linear motor, a rotary motor (e.g., coupled to a conveyor or an escalator), an absolute encoder with motor, an incremental encoder with motor, or a stepper motor. The motor may comprise an electric motor, or a pneumatic motor. The motor may comprise an electro-mechanical motor. The vibration mechanism may include a mechanism that exhibits linear motion (e.g., a drive mechanism). The vibration mechanism may include any vibration mechanism used in 3D printing such as, for example, the ones disclosed in Patent Application serial number PCT/US17/57340, which is entirely incorporated herein by reference.

In some embodiments, the vibration mechanism is operatively coupled to a first controller. In some embodiments, the layer dispensing mechanism may be operatively coupled to a second controller. At times, a component of the layer dispensing mechanism may be operatively coupled to a third controller. At times, the first controller, second controller and the third controller may be the same controller. At times, the first controller, second controller and the third controller may be different controllers. At times, at least two of the (i) vibration mechanism, (ii) shaft, and (iii) at least one component of the layer dispensing mechanism, may be controlled by the same controller. At times, at least two of the (i) vibration mechanism, (ii) shaft, and (iii) at least one component of the layer dispensing mechanism, may be controlled by a different controller. The controller may control the operation of one or more components of the layer dispensing mechanism. For example, the controller may turn on a component of the layer dispensing mechanism (e.g., the material dispensing mechanism), for example, when the ancillary chamber is open. The controller may control the operation of the vibration mechanism. For example, the vibration mechanism may be turned on when the material dispensing system may be in operation, or when the material levelling system may be in operation. In some embodiments, the vibration mechanism is turned off when the material removal system may be in operation.

In some embodiments, the actuator is coupled to at least one controller (herein collectively "controller"). The controller may be coupled to a sensor (e.g., positional, optical, weight). The controller may control the starting of the actuator. The controller may control the stopping of the actuator. The controller may detect a position of the layer dispensing mechanism. The controller may dynamically (e.g. in real-time during the 3D printing) control the actuator to adjust the position of the layer dispensing mechanism. The controller may control the amount of movable distance of the shaft (e.g., by controlling the actuator). The controller may detect the need to perform dispensing and/or planarization of a pre-transformed material. The controller may activate the actuator to move the shaft and the coupled layer dispensing mechanism to a position adjacent to the platform. The controller may detect the completion of dispensing a layer adjacent to the platform (e.g., comprising a base FIG. 1, 102 and a substrate FIG. 1, 109). The controller may activate the actuator to move the shaft to retract the layer dispensing mechanism into the ancillary chamber.

Figure 8A:
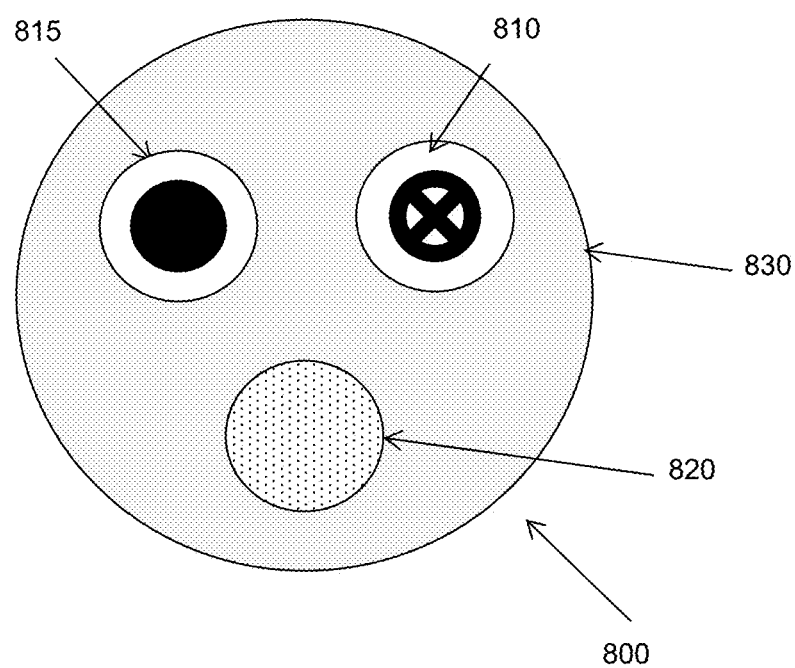
FIGS. 8A-8B schematically illustrates various views of a component of a 3D printing system.
Figure 8B:
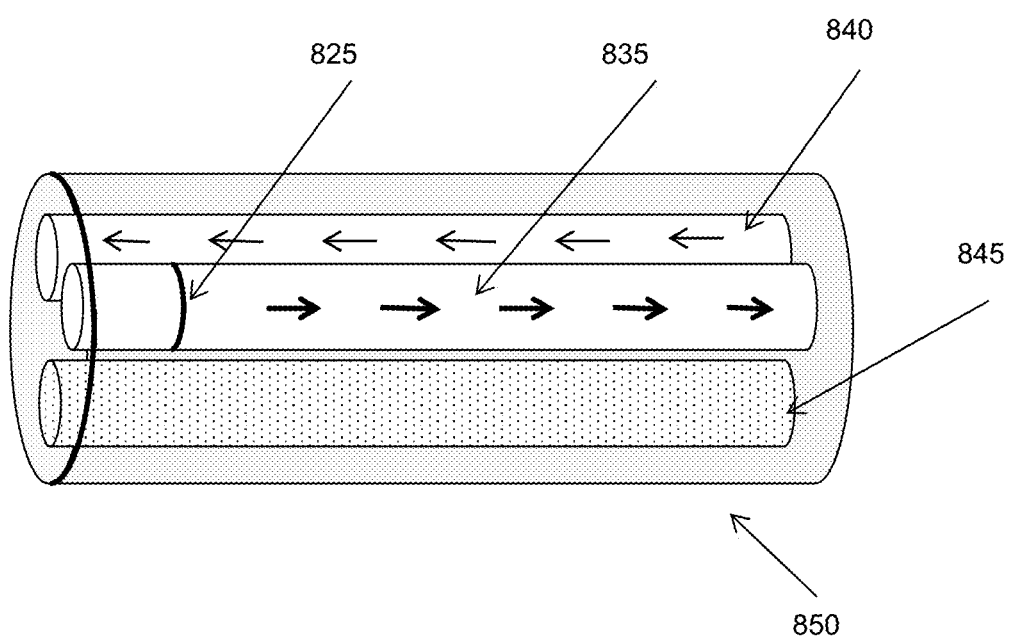
Figure 9:
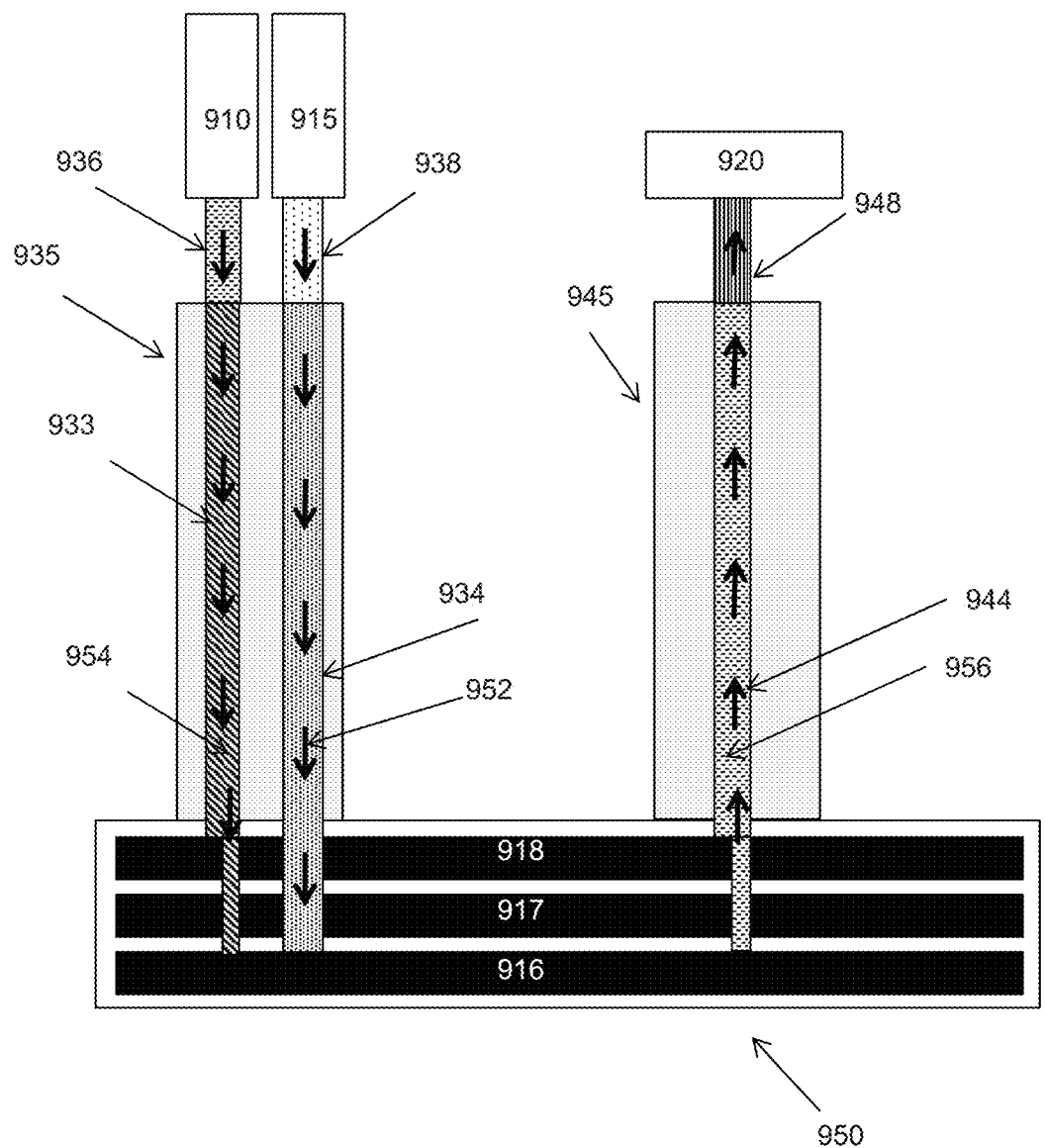
FIG. 9 schematically illustrates a top view of a component of a 3D printing system.

In some embodiments, the material dispensing mechanism is operatively coupled to one or more shafts. FIG. 9 shows an example of two shafts (e.g., 935, 945) coupled to the layer dispensing mechanism (e.g., 950). Each shaft may be coupled to an actuator. In some examples, at least two of the shafts have a common actuator. In some examples, at least two of the shafts each have their own (different) actuator. The actuator may reside on a stage. The shaft may be hollow (e.g., comprise one or more cavities). The shaft may facilitate suction of debris and/or pre-transformed material from the layer dispensing mechanism. The layer dispensing mechanism may include a material dispensing mechanism 916, a levelling mechanism 917 and a material removal mechanism 918. FIG. 8A shows an example of a vertical cross section of a shaft (e.g., 830). The shaft may comprise one or more channels (e.g., FIG. 8B, 835, 840, 845). FIG. 8B shows an example of a side view of the shaft. The shaft channel may include a valve. The valve may be located outside or inside the shaft. FIG. 8B shows an example of a valve 825 located in the shaft 850. The valve may control (e.g., regulate and/or direct) the flow of content included within the shaft channel. The valve may be a pneumatic, manual, solenoid, motor, hydraulic, a two-port, a three-port, or a four-port valve. The content of the channel may comprise debris, pre-transformed material, or gas. FIG. 8A shows an example of a vertical cross section of a shaft 800 comprising three shaft channels 810 (that transport a material, such as gas, inwards), 815 (that transport a material, such as gas, outwards), and 820 (that transport pre-transformed material). The one or more shaft channels may be operatively coupled (e.g., fluidly connected) to one or more material conveying channels within the pre-transformed material conveying system. For example, the pre-transformed material from one or more pressure containers may be conveyed into the layer dispensing mechanism via the one or more channels within the shaft. In some examples, the material conveying channel within the pre-transformed material and the channel within the shaft may be the same. In some examples, the material conveying channel within the pre-transformed material and the channel within the shaft may be different. The one or more shaft channels may be operatively coupled (e.g., fluidly connected) to one or more gas conveying channels within the pre-transformed material conveying system. For example, the gas from one or more components of the pre-transformed material conveyor system (e.g., separator, external gas source, and/or gas conveying channel) may be conveyed into the layer dispensing mechanism via the one or more channels within the shaft. In some examples, the gas conveying channel and the pre-transformed material conveying channel within the shaft may be the same. In some examples, the gas conveying channel and the channel conveying the pre-transformed material within the shaft may be different.

In some embodiments, a shaft comprises at least one transit system (e.g., a channel within the shaft). A portion of the shaft channel (e.g., FIG. 9, 933, 934, or 944) may reside within the shaft. A portion of the shaft channel (e.g., 936, 938, or 948) may be external to the shaft. The shaft channel may transport pre-transformed material (e.g., 952) into the layer dispensing mechanism (e.g., from the pressure container, e.g., through the material conveying channel). The shaft channel may transport (e.g., compressed) gas (e.g., 954) into the layer dispensing mechanism and/or material removal mechanism. The shaft channel may assist in removing pre-transformed material (e.g., 956) from the layer dispensing mechanism and/or material removal mechanism. Positive and/or negative pressure may be used to facilitate transport (e.g., of the pre-transformed material) in the shaft channel. The shaft channel (e.g., an external end thereof) may be (e.g., fluidly) connected to recycling system (e.g., 920), a reconditioning system, a bulk reservoir of pre-transformed material (e.g., 915), a pressure pump (e.g., 910), (e.g., a vacuum or gas pump). The shaft channel that transports pre-transformed material may be (e.g., fluidly) connected to the material dispensing mechanism (e.g., 916) of the layer dispensing mechanism (e.g., 950). The shaft channel that transports gas (e.g., air) may be connected to the material levelling mechanism (e.g., 917) or the material removal mechanism (e.g., 918) of the layer dispensing mechanism. The shaft channel that transports negative pressure (e.g., gas or air) may be connected to the material removal mechanism (e.g., 918) of the layer dispensing mechanism. Fluid connection as understood herein is a connection that allows material to be flowingly transferred. The material that is transferred can comprise solid, liquid or gas.

In some embodiments, the 3D printer comprises an ancillary chamber. FIG. 2 shows an example of an ancillary chamber 240 coupled to the processing chamber 226. In some embodiments, the layer dispensing mechanism (e.g., 234) is parked within the ancillary chamber, when the layer dispensing mechanism does not perform dispensing adjacent to a platform, which platform comprises a substrate 261 and a base 260. The layer dispensing mechanism may be conveyed to the processing chamber (e.g., FIG. 2, 226). When conveyed, the layer dispensing mechanism may move from a first position (e.g., a position within the ancillary chamber to a position adjacent to the build module). When conveyed, the one or more shafts may move from a first position (e.g., a position within the ancillary chamber) to a position adjacent to the processing chamber. When conveyed, the actuator may move from a first position (e.g., a position within the ancillary chamber) to a position adjacent to the build module. When conveyed, the layer dispensing mechanism may dispense a layer of pre-transformed material adjacent to the platform (e.g., FIG. 2, 204). The layer dispensing mechanism may park within the ancillary chamber. For example, the layer dispensing mechanism may part in the ancillary chamber when the layer dispensing mechanism is not performing a dispersion of a layer of pre-transformed material. For example, the layer dispensing mechanism may part in the ancillary chamber when the material dispenser does not dispense pre-transformed material. For example, the layer dispensing mechanism may part in the ancillary chamber when the leveling mechanism does not level (e.g., planarize) the material bed. For example, the layer dispensing mechanism may part in the ancillary chamber when the material removal mechanism does planarize the material bed. For example, the layer dispensing mechanism may part in the ancillary chamber when the material bed is exposed to an energy beam (e.g., FIG. 2, 201).

In some embodiments, the ancillary chamber (e.g., also referred to herein as "ancillary enclosure," e.g., 254) is dimensioned to accommodate the layer dispensing mechanism (e.g., FIG. 2, 240). The ancillary chamber may be dimensioned to enclose the layer dispensing mechanism, one or more bearings and at least a portion of the one or more shafts (e.g., FIG. 2, 236). The layer dispensing mechanism may comprise at least one of a material dispensing mechanism (e.g., FIG. 1, 116), leveling mechanism (e.g., FIG. 1, 117), and a material removal mechanism (e.g., FIG. 1, 118). The ancillary chamber may be separated from the processing chamber through a closable opening that comprises a closure (e.g., a shield, door, or window). The opening may comprise a closure (e.g., FIG. 2, 256). The closure may relocate to allow the layer dispensing mechanism to travel from the ancillary chamber to a position adjacent to (e.g., above) the material bed. The closure may open to allow the atmosphere of the ancillary chamber and the processing chamber to merge. The closure may open to allow debris from the processing chamber to enter the ancillary chamber. The closure may be (e.g., physically, and/or operatively) coupled to the layer dispensing mechanism. The closure may be coupled via a mechanical connector, a controlled sensor, a magnetic connector, an electromagnetic connector, or an electrical connector. The layer dispensing mechanism may push the closure open when conveyed adjacent to the material bed. The closure may slide, tilt, flap, roll, or be pushed to allow the layer dispensing mechanism to travel to and from the ancillary chamber. The closure may relocate to a position adjacent to the opening. Adjacent may be below, above, to the side, or distant from the opening. Distant from the opening may comprise in a position more distant from the ancillary chamber. The closure may at least partially (e.g., fully) open the opening (e.g., before, after, and/or during the 3D printing).

In some examples, the 3D printer comprises a layer dispensing mechanism. FIG. 2 shows an example of a layer dispensing mechanism (e.g., FIG. 2, 234) that can travel from a position in the ancillary chamber (e.g., FIG. 2, 240) to a position adjacent to the material bed (e.g., FIG. 2, 232). The separator (e.g., closure) may change its position to allow the movement of the layer dispensing mechanism to and/or from the ancillary chamber. The change of position may be by sliding, flapping, pushing, magnetic opening or rolling. For example, the separator may be a sliding, flapping, or rolling door. The separator may be operatively coupled to an actuator. The actuator may cause the separator to alter its position (e.g., as described herein). The actuator may cause the separator to slide, flap, or roll (e.g., in a direction). The direction may be up/down or sideways with respect to a prior position of the separator. The actuator may be controlled (e.g., by a controller and/or manually). Altering the position may be laterally, horizontally, or at an angle with respect to an exposed surface of the material bed and/or build platform. For example, the actuator may be controlled via at least one sensor (e.g., as disclosed herein). The sensor may comprise a position or motion sensor. The sensor may comprise an optical sensor. For example, the separator may be coupled to the layer dispensing mechanism. Coupling may be using mechanical, electrical, electro-magnetic, electrical, or magnetic connectors. The separator may slide, open or roll when pushed by the layer dispensing mechanism. The separator may slide, close or roll in place when the layer dispensing mechanism retracts into the ancillary chamber.

At times, the layer dispensing mechanism causes (e.g., directly, or indirectly) the closure to open and/or close the opening. Indirectly can be via at least one controller (e.g., comprising a sensor and/or actuator). Directly may comprise directly attached to the layer dispensing mechanism. FIG. 2 shows an example of an opening bordered by stoppers 267, which opening is closed by a shield type closure that is connected to the layer dispensing mechanism 234. In the example of FIG. 2, the layer dispensing opening causes the shield type closure to open the opening as the layer dispensing mechanism travels away from the ancillary chamber 240 toward a position adjacent to the platform (e.g., comprising the base 260). In the example of FIG. 2, the layer dispensing opening causes the shield type closure to close the opening as the layer dispensing mechanism travels into the ancillary chamber 240 (e.g., to park).

At times, a physical property (e.g., comprising velocity, speed, direction of movement, or acceleration) of one or more components of the layer dispensing mechanism is controlled. Controlling may include using at least one controller. Controlling may include modulation of the physical property (e.g., within a predetermined time frame). Controlling may include modulation of the physical property within a translation cycle of the layer dispensing mechanism. The translation cycle may comprise moving from one side of the material bed to the opposing side. The translation cycle may comprise moving from one side of the material bed, to the opposing side, and back to the one side. At times, one or more components (e.g., the material dispensing mechanism, the material leveling mechanism, and/or the material removal mechanism) of the layer dispensing mechanism may be controlled to operate at a (e.g., substantially) constant velocity (e.g., throughout the translation cycle, throughout a material dispensing cycle, throughout a material leveling cycle and/or throughout a material removal cycle). At times, one or more components may be controlled to operate at a variable velocity. At times, one or more components may be controlled to operate at variable velocity within a portion of time of the translation cycle. At times, the velocity of one or more components of the layer dispensing mechanism, within a first time portion of the translation cycle and a second time portion of the translation cycle may be same. At times, the velocity of one or more components of the layer dispensing mechanism, within a first time portion of the translation cycle and a second time portion of the translation cycle may be different. At times, within the translation cycle, the velocity of one or more components of the layer dispensing mechanism at a first position may be different than the velocity of the one or more components at a second position. At times, within the translation cycle, the velocity of one or more components of the layer dispensing mechanism at a first position may be the same as the velocity of the one or more components at a second position. At times, a component of the layer dispensing mechanism may be individually controlled. At times, at least two or more components of the layer dispensing mechanism may be collectively controlled. At times, at least two components of the layer dispensing mechanism may be controlled by the same controller. At times, at least two components of the layer dispensing mechanism may be controlled by a different controller.

Figure 7:
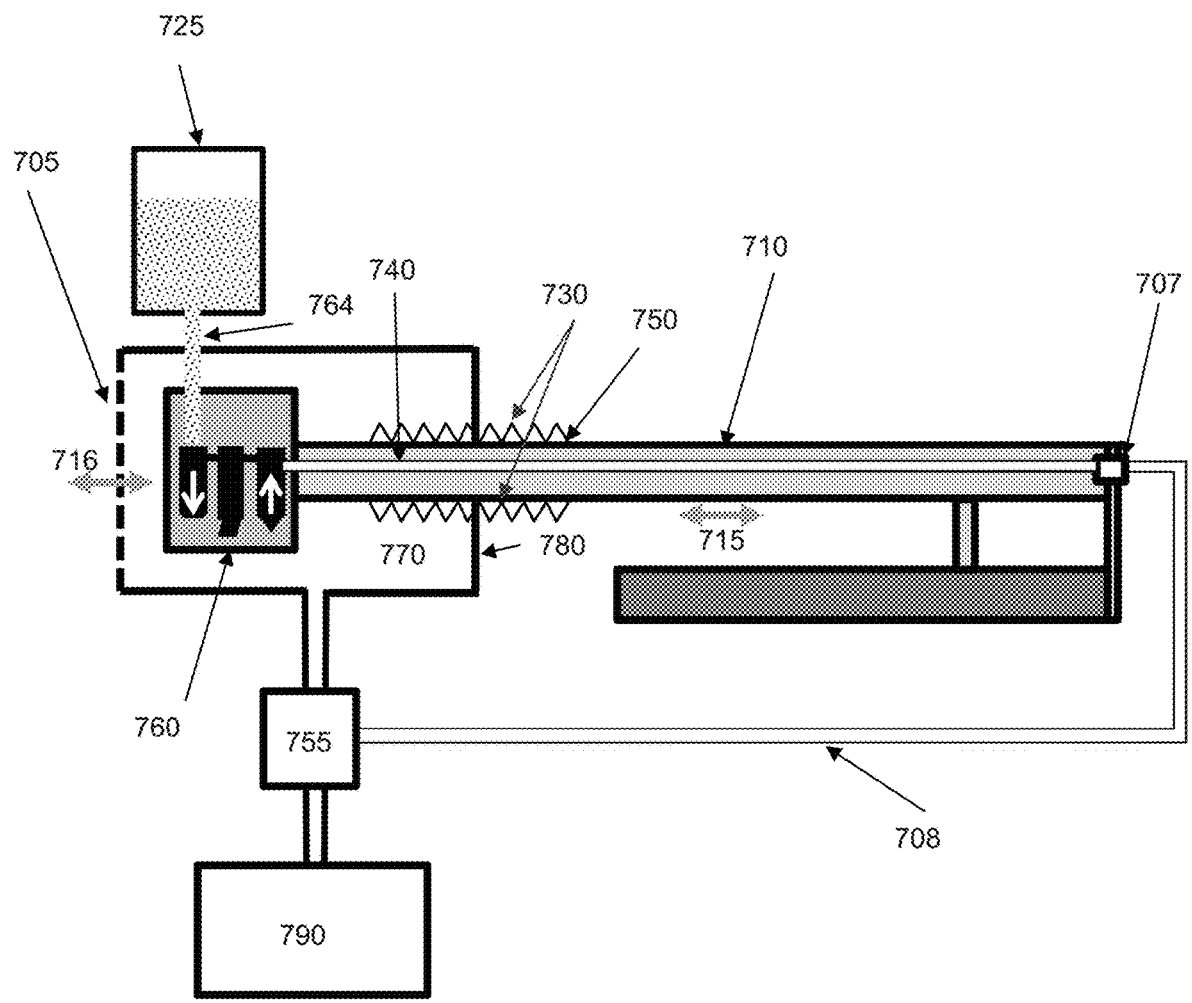
FIG. 7 schematically illustrates a vertical cross-sectional view of components in a 3D printing system.

In some configurations, the 3D printer comprises a bulk reservoir (e.g., FIG. 7, 725; FIG. 3, 310) (e.g., a tank, a pool, a tub, or a basin). The bulk reservoir may comprise pre-transformed material. The bulk reservoir may comprise a mechanism configured to deliver the pre-transformed material from the bulk reservoir to at least one component of the layer dispensing mechanism (e.g., material dispenser). The bulk reservoir can be connected or disconnected from the layer dispensing mechanism (e.g., from the material dispenser). FIG. 7 shows an example of a bulk reservoir 725, which is disconnected from the layer dispensing mechanism 740. The disconnected pre-transformed material dispenser can be located above, below or to the side of the material bed. The disconnected pre-transformed material dispenser can be located above the material bed, for example above the material entrance opening to the material dispenser within the layer dispensing mechanism. Above may be in a position away from the gravitational center.

The bulk reservoir may be connected to the material dispensing mechanism (e.g., FIG. 3, 310) that is a component of the layer dispensing mechanism. The bulk reservoir may be located above, below or to the side of the layer dispensing mechanism. The bulk reservoir may be connected to the material dispensing mechanism via a channel (e.g., FIG. 3, 315) The layer dispensing mechanism and/or the bulk reservoir have at least one opening port (e.g., for the pre-transformed material to move to and/or from). Pre-transformed material can be stored in the bulk reservoir. The bulk reservoir may hold at least an amount of material sufficient for one layer, or sufficient to build the entire 3D object. The bulk reservoir may hold at least about 200 grams (gr), 400 gr, 500 gr, 600 gr, 800 gr, 1 Kilogram (Kg), or 1.5 Kg of pre-transformed material. The bulk reservoir may hold at most 200 gr, 400 gr, 500 gr, 600 gr, 800 gr, 1 Kg, or 1.5 Kg of pre-transformed material. The bulk reservoir may hold an amount of material between any of the afore-mentioned amounts of bulk reservoir material (e.g., from about 200 gr to about 1.5 Kg, from about 200 gr to about 800 gr, or from about 700 gr to about 1.5 kg). Material from the bulk reservoir can travel to the layer dispensing mechanism via a force. The force can be natural (e.g., gravity), or artificial (e.g., using an actuator such as, for example, a pump). The force may comprise friction. The bulk reservoir may be any bulk reservoir disclosed in Patent Application Serial Number PCT/US15/36802 that is incorporated herein by reference in its entirety.

In some embodiments, the pre-transformed material dispenser (e.g., FIG. 3, 305) resides within the layer dispensing mechanism. The pre-transformed material dispenser may hold at least an amount of powder material sufficient for at least one, two, three, four or five layers. The pre-transformed material dispenser (e.g., an internal reservoir) may hold at least an amount of material sufficient for at most one, two, three, four or five layers. The pre-transformed material dispenser may hold an amount of material between any of the afore-mentioned amounts of material (e.g., sufficient to a number of layers from about one layer to about five layers). The pre-transformed material dispenser may hold at least about 20 grams (gr), 40 gr, 50 gr, 60 gr, 80 gr, 100 gr, 200 gr, 400 gr, 500 gr, or 600 gr of pre-transformed material. The pre-transformed material may hold at most about 20 gr, 40 gr, 50 gr, 60 gr, 80 gr, 100 gr, 200 gr, 400 gr, 500 gr, or 600 gr of pre-transformed material. The pre-transformed material dispenser may hold an amount of material between any of the afore-mentioned amounts of pre-transformed material dispenser reservoir material (e.g., from about 20 gr to about 600 gr, from about 20 gr to about 300 gr, or from about 200 gr to about 600 gr.). Pre-transformed material may be transferred from the bulk reservoir to the material dispenser by any analogous method described herein for exiting of pre-transformed material from the material dispenser. At times, the exit opening ports (e.g., holes) in the bulk reservoir exit opening may have a larger FLS relative to those of the pre-transformed material dispenser exit opening port. For example, the bulk reservoir may comprise an exit opening comprising a mesh or a surface comprising at least one hole. The mesh (or a surface comprising at least one hole) may comprise a hole with a fundamental length scale of at least about 0.25 mm, 0.5 mm, 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of at most about 0.25 mm, 0.5 mm, 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of any value between the afore-mentioned values (e.g., from about 0.25 mm to about 1 cm, from about 0.25 mm to about 5 mm, or from about 5 mm to about 1 cm). The bulk reservoir may comprise a plane that may have at least one edge that is translatable into or out of the bulk reservoir. The bulk reservoir may comprise a plane that may pivot into or out of the bulk reservoir (e.g., a flap door). Such translation may create an opening, which may allow pre-transformed material in the reservoir to flow out of the reservoir (e.g., using gravity).

At times, a controller is operatively coupled to the bulk reservoir. The controller may control the time (e.g., time period, duration, and/or an indication/signal received from a sensor) for filling the bulk reservoir. The controller may control the amount of pre-transformed material released from the bulk reservoir by controlling, for example, the amount of time the conditions for allowing pre-transformed material to exit the bulk reservoir are in effect. In some examples, the pre-transformed material dispenser dispenses an excess amount of powder that is retained within the pre-transformed material dispenser reservoir, prior to the loading of pre-transformed material from the bulk reservoir to the pre-transformed material dispenser reservoir. In some examples, the pre-transformed material dispenser does not dispense of any excess amount of pre-transformed material that is retained within the pre-transformed material dispenser reservoir, prior to loading of pre-transformed material from the bulk reservoir to the pre-transformed material dispenser reservoir. Pre-transformed material may be transferred from the bulk reservoir to the pre-transformed material dispenser using a scooping mechanism that scoops pre-transformed material from the bulk reservoir and transfers it to the pre-transformed material dispenser. The scooping mechanism may scoop a fixed or predetermined amount of material. The scooped amount may be adjustable. The scooping mechanism may pivot (e.g., rotate) in the direction perpendicular to the scooping direction. The bulk reservoir may be exchangeable, removable, non-removable, or non-exchangeable. The bulk reservoir may comprise exchangeable components. The layer dispensing mechanism and/or any of its components may be exchangeable, removable, non-removable, or non-exchangeable. The powder dispensing mechanism may comprise exchangeable components.

At times, the pre-transformed material in the bulk reservoir or in the material dispensing mechanism is preheated, cooled, is at an ambient temperature or maintained at a predetermined temperature. A leveling mechanism (e.g., FIG. 1, 117, comprising a rake, roll, brush, spatula, or blade) can be synchronized with the material dispensing mechanism to deliver and planarize the pre-transformed material to form the material bed. The leveling mechanism can planarize (e.g., level), distribute and/or spread the pre-transformed material on the platform (as the pre-transformed material is dispensed by the material dispensing mechanism). The leveling mechanism may push an excess of pre-transformed material and/or other debris to the ancillary chamber. The pre-transformed material and/or other debris that resides in the ancillary chamber may be evacuated via a closable opening port. The evacuation may be active (e.g., using an actuator activating a pump, scooper, blade, squeegee, brush, or broom). The evacuation may be passive (e.g., using gravitational force). For example, the floor of the ancillary chamber may be tilted towards the opening. The tilted floor may allow any pre-transformed material and/or other debris to slide towards the opening with or without any additional energy (e.g., a suction device, or any other energy activated device).

At times, the bulk reservoir is stationary. The bulk reservoir may be located at least partially within the ancillary chamber. The bulk reservoir may be located at least partially outside of the ancillary chamber. The bulk reservoir may be located at a position adjacent to (e.g., above) the layer dispensing mechanism, when the layer dispensing mechanism resides (e.g., parks) within the ancillary chamber. The bulk reservoir may be located at least partially within the processing chamber. The bulk reservoir may be located at least partially outside of the processing chamber. The bulk reservoir may comprise a top surface and a bottom surface. Bottom may be in a direction towards the gravitational center and/or the platform. ToQ may be in a direction opposite to the gravitational center and/or the platform. The top surface may have an entrance opening. The entrance opening may include a closure. The closure may be coupled to the top surface. The bulk reservoir may have a volume that is greater than the volume of the material dispensing mechanism within the layer dispensing mechanism. The bulk reservoir may be filled with pre-transformed material from the entrance opening. The bulk reservoir may be filled during, after or before 3D printing. At times, the bulk reservoir may be refilled during, after, or before a layer deposition cycle (e.g., after a plurality of translation cycles). At times, the entrance opening may be on a side surface of the reservoir. At times, the bulk reservoir may be operatively coupled to at least one sensor. The sensor may indicate the amount of material within the bulk reservoir. The sensor may be a positional sensor. The sensor may sense a position of the material dispenser (e.g., in the ancillary chamber). The sensor may sense an engagement of the material dispenser with the bulk reservoir. The bottom surface of the bulk reservoir may be optionally coupled (e.g., operatively, and/or physically) to a channel (e.g., FIG. 3, 315). Coupled may comprise fluidly (e.g., flowably) connected. The bottom surface may be optionally coupled to a plate (e.g., a flat surface). In some examples, the bottom surface may be coupled to more than one plates. The plate may facilitate a flow of pre-transformed material from the bulk reservoir to the material dispensing mechanism. The plate(s) may be translatable. The plate(s) may translate in a lateral direction (e.g., along the X-axis). The plate(s) may be located at a position between a bottom surface of the bulk reservoir and a top surface of the material dispensing mechanism. The plurality of plates may translate simultaneously. The movement of the plurality of plates may be synchronized. The plurality of plates may translate independently. The movement of the one or more plates may be controlled (e.g., manually and/or by a controller). At times, the plate may facilitate the closure of the bottom surface of the bulk reservoir. At times, the plate may facilitate the closure of the top surface of the material dispensing mechanism. At times, the plate may simultaneously facilitate the closure of the top surface of the material dispensing mechanism and the bottom surface of the bulk reservoir.

In some embodiments, the plate comprises a perforation. The perforation may be a lateral (e.g., horizontal) gap between two or more plates. The perforation may be an aperture within a single plate. The perforation may include any perforation used in 3D printing such as, for example, the ones disclosed in Patent Application serial number PCT/US17/57340, which is entirely incorporated herein by reference. The perforation may form a channel between the bulk reservoir and the material dispensing mechanism. The channel may include any channel used in 3D printing such as, for example, the ones disclosed in Patent Application serial number PCT/US17/57340, which is entirely incorporated herein by reference.

At times, the layer dispensing mechanism is parked in the ancillary chamber. The layer dispensing mechanism may comprise a material removal mechanism that may include pre-transformed material (e.g., powder) and/or other debris (e.g., soot, or other debris), collectively termed herein as "debris." The debris may be dispersed on the floor of the ancillary chamber when the layer dispensing mechanism may be parked in the ancillary chamber. The floor of the ancillary chamber may be coupled to a recycling system. The floor of the ancillary chamber may be optionally coupled to the recycling system via a vacuum. The floor of the ancillary chamber may be optionally coupled to a reconditioning system. The recycling and/or reconditioning system may comprise a sieve. The recycling system may comprise a reservoir that holds the recycled material. The recycled material may be reconditioned (e.g., having reduced reactive species such as oxygen, or water). The recycled material may be sieved through the sieving system. In some examples, material may not be reconditioned. The material may be sucked by a vacuum (e.g., from the floor of the ancillary chamber). The floor of the ancillary chamber may be tilted. The floor of the ancillary chamber may be sloped at an angle. The floor of the ancillary chamber may be built to assist removal of the material by way of gravity. The debris on the floor of the ancillary chamber may be transported away from the ancillary chamber (e.g., into the recycling system). Transportation may be via the opening port. Transportation may be via a pipe, hole, channel, or a conveyor system.

Figure 10A:
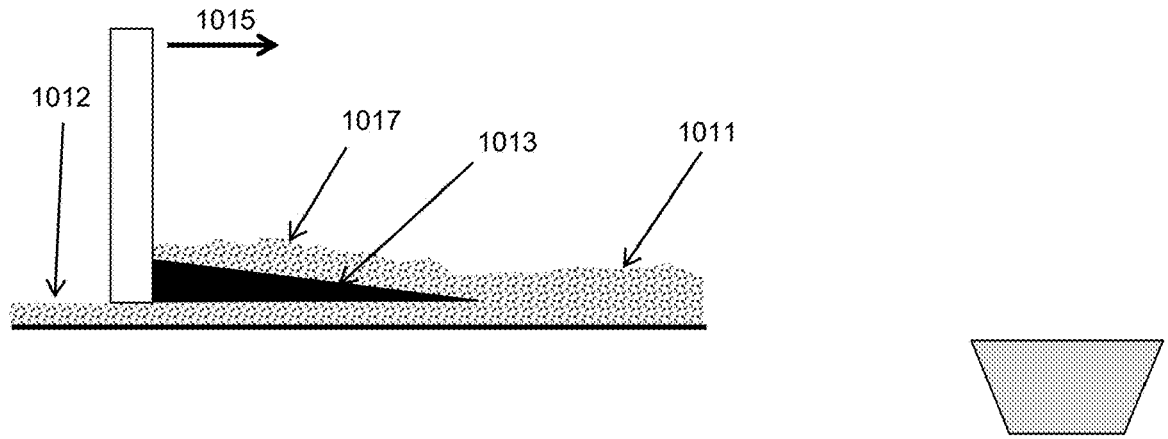
FIGS. 10A-10C schematically illustrates various components of a 3D printing system.
Figure 10B:
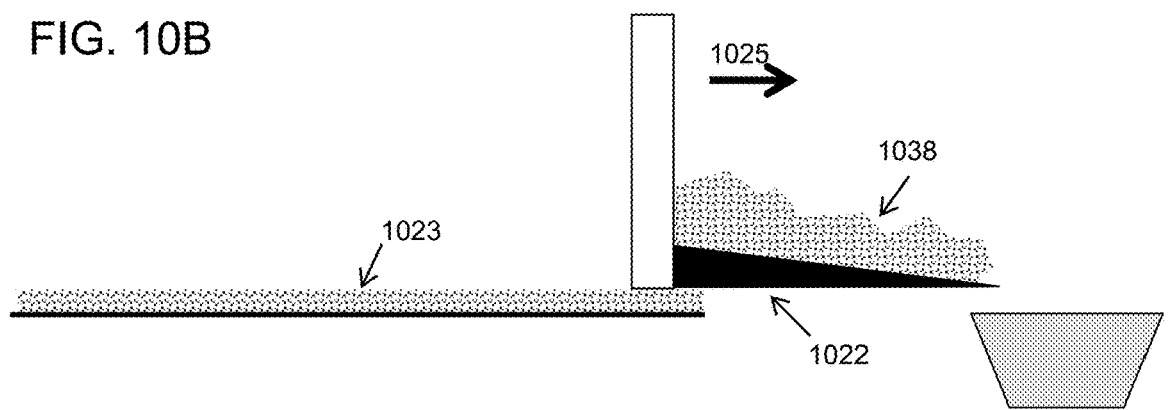
Figure 10C:
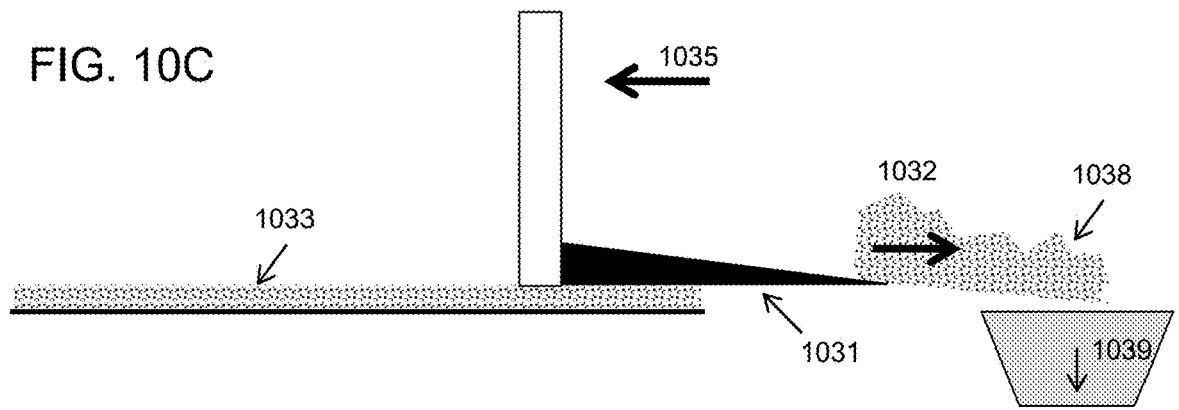

In some embodiments, a portion of the material leveling mechanism (e.g., a blade portion) collects an excess amount of pre-transformed material, as it levels the dispensed material. FIGS. 10A-10C show examples of planarizing an exposed surface of a material bed. FIG. 10A shows a leveling mechanism comprising a blade 1013 that translate in a direction 1015, and shears the material bed having an exposed surface 1011, to form a planar exposed surface 1012. In the example shown in FIG. 10A, pre-transformed material from the material bed accumulates 1017 on the blade 1013 as it translates 1015. In some embodiments, as the leveling mechanism reaches the end of the material bed, the leveling mechanism stops abruptly or reverses its direction of movement abruptly, resulting in a continued motion (e.g., inertial movement) of the accumulated excess material forward. In some embodiments, as the leveling mechanism reaches the end of the material bed, the leveling mechanism accelerates and stops abruptly or reverses its direction of movement abruptly, resulting in a continued motion (e.g., inertial movement) of the accumulated excess material forward. The forward moving excess pre-transformed material may be accumulated and/or sucked into a container (e.g., of the recycling system). FIG. 10B shows an example where the blade 1022 of the leveling mechanism accumulates material and moves and/or accelerates forward 1025, which movement moves the accumulated material 1038 forward. The movement of the leveling mechanism may result in a (e.g., substantially) planarized exposed surface (e.g., FIG. 10B, 1023). FIG. 10C shows an example where the blade of the leveling mechanism 1031 reverses its direction abruptly to move along 1035, resulting in a continuous movement of the excess accumulate pre-transformed material 1038 in a direction 1032. The (e.g., returning) movement of the blade may be over the exposed surface such that the (e.g., planarized) exposed surface (FIG. 10B, 1033) is not (e.g., substantially) disturbed. At the end of a translation cycle (e.g., of the material leveling mechanism), the excess pre-transformed material may be transferred and/or collected into an overflow mechanism and/or a recycling mechanism. FIG. 10C show an example of excess pre-transformed material 1038 on its way to a collection system 1039. The overflow mechanism may be a container that collects excess pre-transformed material. The pre-transformed material from the overflow mechanism may be transferred to a recycling mechanism and/or a material dispensing mechanism. At times, the processing chamber and/or enclosure may have an opening to facilitate the transfer of the excess pre-transformed material. The opening may be adjacent to the material bed (e.g., at a boundary of the material bed). At times, the vibration mechanism may facilitate the transfer of the excess pre-transformed material. In some examples, the excess pre-transformed material may be transferred into the pre-transformed material conveyor system. Transfer may comprise performing dilute phase conveying. Transfer may include transferring via the material conveying channel. Transfer may comprise transferring on completion of a translation cycle. In some examples, transferring may be performed on completion of a plurality of translation cycles. Transferring may be performed before, after, and/or during 3D printing. Transferring may be performed before, after, and/or during operation of the pre-transformed material conveying system.

At times, the layer dispensing mechanism is disposed within the ancillary chamber (e.g., when it does not perform an operation adjacent to the build platform and/or that affects the build module). The layer dispensing mechanism may slide in and out of the side chamber through a position which the separator previously occupied. The separator may be actuated by at least one sensor and/or controller.

In some embodiments, when there is a need to perform dispensing and/or leveling adjacent to the build platform (e.g., material dispensing to the material bed, and/or leveling of the material bed), the layer dispensing mechanism slides out of the side chamber (e.g., FIG. 2, 240) via a sliding mechanism. The sliding mechanism may include any sliding mechanism used in 3D printing such as, for example, the ones disclosed in Patent Application serial number PCT/US17/57340, which is entirely incorporated herein by reference.

The systems and/or apparatuses disclosed herein may comprise one or more motors. The motors may comprise servomotors. The servomotors may comprise actuated linear lead screw drive motors. The motors may comprise belt drive motors. The motors may comprise stepper motors. The motors may comprise rotary encoders. The encoder may comprise an absolute encoder. The encoder may comprise an incremental encoder. The apparatuses and/or systems may comprise switches. The switches may comprise homing or limit switches. The motors may comprise actuators. The motors may comprise linear actuators. The motors may comprise belt driven actuators. The motors may comprise lead screw driven actuators. The actuators may comprise linear actuators.

At times, the ancillary chamber comprises one or more bearings. The bearings may allow smooth movement of the shaft. The bearings may include any bearings used in 3D printing such as, for example, the ones disclosed in Patent Application serial number PCT/US17/57340, which is entirely incorporated by reference herein.

In some examples, a portion of the shaft (e.g., FIG. 7, 710) is engulfed by a seal (e.g., FIG. 7, 730). In some examples, the seal may engulf the circumference of a vertical cross section of the shaft (e.g., cylindric section of a cylindrical shaft). The seal may comprise at least one elastic vessel. The seal can be compressed (e.g., when pressure is applied), or extended (e.g., under vacuum). The seal can be a metal (e.g., comprising elemental metal or metal alloy) seal. The seal may comprise a bellow, bearing, gas flow, diaphragm, cloth, or mesh. The seal may extend and/or contract as a consequence of the operation of the actuator, and/or movement of the shaft. For example, the seal may comprise a plurality of bellows. The seal may be situated at or adjacent to a partition hole. The shaft may travel through the hole. The shaft may be disposed in the hole. In some examples, a first bellow may be disposed in front of the hole (e.g., in the ancillary chamber 770), and a second bellow may be disposed behind the hole (e.g., 780). In some examples, the bellow may extend through the hole. In some examples, the bellow may reside in one side of the hole (e.g., in the ancillary chamber, e.g., 770; or outside of the ancillary chamber, e.g., 780). The seal may comprise a bellow. The bellow may comprise formed (e.g., cold formed, or hydroformed), welded (e.g., edge-welded, or diaphragm) or electroformed bellow. The bellow may be a mechanical bellow. The material of the bellow may comprise a metal, rubber, polymeric, plastic, latex, silicon, composite material, or fiber-glass. The material of the bellow may be any material mentioned herein (e.g., comprising stainless steel, titanium, nickel, or copper). The material may have high plastic elongation characteristics, high-strength, and/or be resistant to corrosion. The seal may comprise a flexible element (e.g., a spring, wire, tube, or diaphragm). The seal may be (e.g., controllably) expandable and/or contractible. The control may be before, during, and/or after operation of the shaft and/or layer dispensing mechanism. The control may be manual and/or automatic (e.g., using at least one controller). The seal may be elastic. The seal may be extendable and/or compressible (e.g., on pressure, or as a result of the elevator operation). The seal may comprise pneumatic, electric, and/or magnetic elements. The seal may comprise gas that can be compressed and/or expanded. The seal may be extensible. The seal may return to its original shape and/or size when released (e.g., from positive pressure, or vacuum). The seal may compress and/or expand relative (e.g., proportionally) to the amount of translation of the layer dispensing mechanism (e.g., translation via the shaft). The seal may compress and/or expand relative to the amount of pressure applied (e.g., within the build module). The seal may reduce (e.g., prevent) permeation of particulate material from one end of the seal (e.g., 740) to its opposite end (e.g., 750). The seal may protect the actuator(s) and/or guides (e.g., railings), by reducing (e.g., blocking) permeation of the particulate material. FIG. 7 shows an example of a vertical cross section of a layer dispensing mechanism 760 that is operatively coupled to a shaft 710, which shaft can move back and/or forth 715, which material dispensing mechanism is able to move back and/or forth 716 and enter and/or exit the ancillary chamber 770 through a closable opening 705. In the example shown in FIG. 7, a shaft 710 is engulfed by at least one bellow (shown as a vertical cross section, comprising 730). The seal (e.g., 730) may reduce (e.g., prevent) migration of a pre-transformed (or transformed) material and/or debris through a partition (e.g., wall) that separates the ancillary chamber (e.g., 770) from the actuator (e.g., motor) of the shaft and/or layer dispensing mechanism (e.g., 707) and/or its railing (e.g., 708). The seal (e.g., 730) may reduce (e.g., hinder) migration of a pre-transformed (or transformed) material and/or debris from the ancillary chamber (e.g., 770) towards the actuator (e.g., motor) of the shaft and/or layer dispensing mechanism (e.g., 707) and/or its railing (e.g., 708). The seal (e.g., 730) may facilitate confinement of pre-transformed (or transformed) material and/or debris in the ancillary chamber (e.g., 770). The seal (e.g., 730) may facilitate separation between the pre-transformed (or transformed) material and/or debris and the actuator and/or railing that facilitates movement of the layer dispensing mechanism. The seal (e.g., 730) may facilitate proper operation of the actuator and/or railing, by reducing the amount of (e.g., preventing) pre-transformed (or transformed) material and/or debris from reaching (e.g., and clogging) them. The seal (e.g., 730) may reduce an amount of (e.g., prevent) pre-transformed (or transformed) material and/or debris from crossing the partition (e.g., wall) of the ancillary chamber (e.g., 770) to the side that faces the railing and/or shaft actuator. The seal may facilitate cleaning the shaft from pre-transformed material and/or debris.

At times, the platform (also herein, "printing platform" or "building platform") is disposed in the enclosure (e.g., in the build module and/or processing chamber). The platform may comprise a substrate or a base. The substrate and/or the base may be removable or non-removable. The building platform may be (e.g., substantially) horizontal, (e.g., substantially) planar, or non-planar. The platform may have a surface that points towards the deposited pre-transformed material (e.g., powder material), which at times may point towards the top of the enclosure (e.g., away from the center of gravity). The platform may have a surface that points away from the deposited pre-transformed material (e.g., towards the center of gravity), which at times may point towards the bottom of the container. The platform may have a surface that is (e.g., substantially) flat and/or planar. The platform may have a surface that is not flat and/or not planar. The platform may have a surface that comprises protrusions or indentations. The platform may have a surface that comprises embossing. The platform may have a surface that comprises supporting features (e.g., auxiliary support). The platform may have a surface that comprises a mold. The platform may have a surface that comprises a wave formation. The surface may point towards the layer of pre-transformed material within the material bed. The wave may have an amplitude (e.g., vertical amplitude or at an angle). The platform (e.g., base) may comprise a mesh through which the pre-transformed material (e.g., the remainder) is able to flow through. The platform may comprise a motor. The platform (e.g., substrate and/or base) may be fastened to the container. The platform (or any of its components) may be transportable. The transportation of the platform may be controlled and/or regulated by a controller (e.g., control system). The platform may be transportable horizontally, vertically, or at an angle (e.g., planar or compound).

At times, the platform is vertically transferable, for example using an actuator. The actuator may cause a vertical translation (e.g., an elevator). An actuator causing a vertical translation (e.g., an elevation mechanism) is shown as an example in FIG. 1, 105. The up and down arrow next to the elevation mechanism 105 signifies a possible direction of movement of the elevation mechanism, or a possible direction of movement effectuated by the elevation mechanism.

In some cases, auxiliary support(s) adheres to the upper surface of the platform. In some examples, the auxiliary supports of the printed 3D object may touch the platform (e.g., the bottom of the enclosure, the substrate, or the base). Sometimes, the auxiliary support may adhere to the platform. In some embodiments, the auxiliary supports are an integral part of the platform. At times, auxiliary support(s) of the printed 3D object, do not touch the platform. In any of the methods described herein, the printed 3D object may be supported only by the pre-transformed material within the material bed (e.g., powder bed, FIG. 1, 104). Any auxiliary support(s) of the printed 3D object, if present, may be suspended adjacent to the platform. Occasionally, the platform may have a pre-hardened (e.g., pre-solidified) amount of material. Such pre-solidified material may provide support to the printed 3D object. At times, the platform may provide adherence to the material. At times, the platform does not provide adherence to the material. The platform may comprise elemental metal, metal alloy, elemental carbon, or ceramic. The platform may comprise a composite material (e.g., as disclosed herein). The platform may comprise glass, stone, zeolite, or a polymeric material. The polymeric material may include a hydrocarbon or fluorocarbon. The platform (e.g., base) may include Teflon. The platform may include compartments for printing small objects. Small may be relative to the size of the enclosure. The compartments may form a smaller compartment within the enclosure, which may accommodate a layer of pre-transformed material.

At times, the energy beam projects energy to the material bed. The apparatuses, systems, and/or methods described herein can comprise at least one energy beam. In some cases, the apparatuses, systems, and/or methods described can comprise two, three, four, five, or more energy beams. The energy beam may include radiation comprising electromagnetic, electron, positron, proton, plasma, or ionic radiation. The electromagnetic beam may comprise microwave, infrared, ultraviolet, or visible radiation. The ion beam may include a cation or an anion. The electromagnetic beam may comprise a laser beam. The energy beam may derive from a laser source. The energy source may be a laser source. The laser may comprise a fiber laser, a solid-state laser, or a diode laser. The laser source may comprise a Nd: YAG, Neodymium (e.g., neodymium-glass), or an Ytterbium laser. The laser may comprise a carbon dioxide laser ($CO_2$ laser). The laser may be a fiber laser. The laser may be a solid-state laser. The laser can be a diode laser. The energy source may comprise a diode array. The energy source may comprise a diode array laser. The laser may be a laser used for micro laser sintering. The energy beam may be any energy beam disclosed in Patent Application serial number PCT/US15/36802 that is incorporated herein by reference in its entirety.

At times, the energy beam (e.g., transforming energy beam) comprises a Gaussian energy beam. The energy beam may have any cross-sectional shape comprising an ellipse (e.g., circle), or a polygon (e.g., as disclosed herein). The energy beam may have a cross section with a FLS (e.g., diameter) of at least about 50 micrometers (μm), 100 μm, 150 μm, 200 μm, or 250 μm. The energy beam may have a cross section with a FLS of at most about 60 micrometers (μm), 100 μm, 150 μm, 200 μm, or 250 μm. The energy beam may have a cross section with a FLS of any value between the afore-mentioned values (e.g., from about 50 μm to about 250 μm, from about 50 μm to about 150 μm, or from about 150 μm to about 250 μm). The power per unit area of the energy beam may be at least about 100 Watt per millimeter square ($W/mm^2$), 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 W/mm2, 7000 $W/mm^2$, or 10000 $W/mm^2$. The power per unit area of the tiling energy flux may be at most about 110 $W/mm^2$, 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 $W/mm^2$, 7000 $W/mm^2$, or 10000 $W/mm^2$. The power per unit area of the energy beam may be any value between the afore-mentioned values (e.g., from about 100 $W/mm^2$ to about 3000 $W/mm^2$, from about 100 $W/mm^2$ to about 5000 $W/mm^2$, from about 100 $W/mm^2$ to about 10000 $W/mm^2$, from about 100 $W/mm^2$ to about 500 $W/mm^2$, from about 1000 $W/mm^2$ to about 3000 $W/mm^2$, from about 1000 $W/mm^2$ to about 3000 $W/mm^2$, or from about 500 $W/mm^2$ to about 1000 $W/mm^2$). The scanning speed of the energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The energy beam may be continuous or non-continuous (e.g., pulsing). The energy beam may be modulated before and/or during the formation of a transformed material as part of the 3D object. The energy beam may be modulated before and/or during the 3D printing process.

In some embodiments, the energy source (e.g., laser) has a power of at least about 10 Watt (W), 30 W, 50 W, 80 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy source may have a power of at most about 10 W, 30 W, 50 W, 80 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy source may have a power between any of the afore-mentioned energy beam power values (e.g., from about 10 W to about 100 W, from about 100 W to about 1000 W, or from about 1000 W to about 4000 W). The energy beam may derive from an electron gun. The energy beam may include a pulsed energy beam, a continuous wave energy beam, or a quasi-continuous wave energy beam. The pulse energy beam may have a repetition frequency of at least about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency of at most about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency between any of the afore-mentioned repetition frequencies (e.g., from about 1 KHz to about 5 MHz, from about 1 KHz to about 1 MHz, or from about 1 MHz to about 5 MHz).

In some embodiments, the methods, apparatuses and/or systems disclosed herein comprise Q-switching, mode coupling or mode locking to effectuate the pulsing energy beam. The apparatus or systems disclosed herein may comprise an on/off switch, a modulator, or a chopper to effectuate the pulsing energy beam. The on/off switch can be manually or automatically controlled. The switch may be controlled by the control system. The switch may alter the "pumping power" of the energy beam. The energy beam may be at times focused, non-focused, or defocused. In some instances, the defocus is substantially zero (e.g., the beam is non-focused).

In some embodiments, the energy source(s) projects energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The energy source(s) can be modulated. The energy beam(s) emitted by the energy source(s) can be modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an aucusto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

In some embodiments, the energy beam(s), energy source(s), and/or the platform of the energy beam array are moved via a galvanometer scanner, a polygon, a mechanical stage (e.g., X-Y stage), a piezoelectric device, gimbal, or any combination of thereof. The galvanometer may comprise a mirror. The galvanometer scanner may comprise a two-axis galvanometer scanner. The scanner may comprise a modulator (e.g., as described herein). The scanner may comprise a polygonal mirror. The scanner can be the same scanner for two or more energy sources and/or beams. At least two (e.g., each) energy source and/or beam may have a separate scanner. The energy sources can be translated independently of each other. In some cases, at least two energy sources and/or beams can be translated at different rates, and/or along different paths. For example, the movement of a first energy source may be faster as compared to the movement of a second energy source. The systems and/or apparatuses disclosed herein may comprise one or more shutters (e.g., safety shutters), on/off switches, or apertures.

In some embodiments, the energy beam (e.g., laser) has a FLS (e.g., a diameter) of its footprint on the on the exposed surface of the material bed of at least about 1 micrometer (μm), 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the layer of it footprint on the exposed surface of the material bed of at most about 1 μm, 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the exposed surface of the material bed between any of the afore-mentioned energy beam FLS values (e.g., from about 5 μm to about 500 μm, from about 5 μm to about 50 μm, or from about 50 μm to about 500 μm). The beam may be a focused beam. The beam may be a dispersed beam. The beam may be an aligned beam. The apparatus and/or systems described herein may further comprise a focusing coil, a deflection coil, or an energy beam power supply. The defocused energy beam may have a FLS of at least about 1 mm, 5 mm, 10 mm, 20 mm, 30 mm, 40 mm, 50 mm, or 100 mm. The defocused energy beam may have a FLS of at most about 1 mm, 5 mm, 10 mm, 20 mm, 30 mm, 40 mm, 50 mm, or 100 mm. The energy beam may have a defocused cross-sectional FLS on the layer of pre-transformed material between any of the afore-mentioned energy beam FLS values (e.g., from about 5 mm to about 100 mm, from about 5 mm to about 50 mm, or from about 50 mm to about 100 mm).

The power supply to any of the components described herein can be supplied by a grid, generator, local, or any combination thereof. The power supply can be from renewable or non-renewable sources. The renewable sources may comprise solar, wind, hydroelectric, or biofuel. The powder supply can comprise rechargeable batteries.

In some embodiments, the exposure time of the energy beam is at least 1 microsecond (μs), 5 μs, 10 μs, 20 μs, 30 μs, 40 μs, 50 μs, 60 μs, 70 μs, 80 μs, 90 μs, 100 μs, 200 μs, 300 μs, 400 μs, 500 μs, 800 μs, or 1000 μs. The exposure time of the energy beam may be most about 1 μs, 5 μs, 10 μs, 20 μs, 30 μs, 40 μs, 50 μs, 60 μs, 70 μs, 80 μs, 90 μs, 100 μs, 200 μs, 300 μs, 400 μs, 500 μs, 800 μs, or 1000 μs. The exposure time of the energy beam may be any value between the afore-mentioned exposure time values (e.g., from about 1 μs to about 1000 μs, from about 1 μs to about 200 μs, from about 1 μs to about 500 μs, from about 200 μs to about 500 μs, or from about 500 μs to about 1000 μs).

At times, the controller controls one or more characteristics of the energy beam (e.g., variable characteristics). The control of the energy beam may allow a low degree of material evaporation during the 3D printing process. For example, controlling one or more energy beam characteristics may (e.g., substantially) reduce the amount of spatter generated during the 3D printing process. The low degree of material evaporation may be measured in grams of evaporated material and compared to a Kilogram of hardened material formed as part of the 3D object. The low degree of material evaporation may be evaporation of at most about 0.25 grams (gr.), 0.5 gr, 1 gr, 2 gr, 5 gr, 10 gr, 15 gr, 20 gr, 30 gr, or 50 gr per every Kilogram of hardened material formed as part of the 3D object. The low degree of material evaporation per every Kilogram of hardened material formed as part of the 3D object may be any value between the afore-mentioned values (e.g., from about 0.25 gr to about 50 gr, from about 0.25 gr to about 30 gr, from about 0.25 gr to about 10 gr, from about 0.25 gr to about 5 gr, or from about 0.25 gr to about 2 gr).

In some embodiments, the methods, systems, and/or the apparatus described herein further comprise at least one energy source. In some cases, the system can comprise two, three, four, five, or more energy sources. An energy source can be a source configured to deliver energy to an area (e.g., a confined area). An energy source can deliver energy to the confined area through radiative heat transfer.

In some embodiments, the energy source supplies any of the energies described herein (e.g., energy beams). The energy source may deliver energy to a point or to an area. The energy source may include an electron gun source. The energy source may include a laser source. The energy source may comprise an array of lasers. In an example, a laser can provide light energy at a peak wavelength of at least about 100 nanometer (nm), 500 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 100 nanometer (nm), 500 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength between the afore-mentioned peak wavelengths (e.g., from 100 nm to 2000 nm, from 100 nm to 1100 nm, or from 1000 nm to 2000 nm). The energy beam can be incident on the top surface of the material bed. The energy beam can be incident on, or be directed to, a specified area of the material bed over a specified time period. The energy beam can be substantially perpendicular to the top (e.g., exposed) surface of the material bed. The material bed can absorb the energy from the energy beam (e.g., incident energy beam) and, as a result, a localized region of the material in the material bed can increase in temperature. The increase in temperature may transform the material within the material bed. The increase in temperature may heat and transform the material within the material bed. In some embodiments, the increase in temperature may heat and not transform the material within the material bed. The increase in temperature may heat the material within the material bed.

In some embodiments, the energy beam and/or source is moveable such that it can translate relative to the material bed. The energy beam and/or source can be moved by a scanner. The movement of the energy beam and/or source can comprise utilization of a scanner.

In some embodiments, at one point in time, and/or (e.g., substantially) during the entire build of the 3D object: At least two of the energy beams and/or sources are translated independently of each other or in concert with each other. At least two of the multiplicity of energy beams can be translated independently of each other or in concert with each other. In some cases, at least two of the energy beams can be translated at different rates such that the movement of the one is faster compared to the movement of at least one other energy beam. In some cases, at least two of the energy sources can be translated at different rates such that the movement of the one energy source is faster compared to the movement of at least another energy source. In some cases, at least two of the energy sources (e.g., all of the energy sources) can be translated at different paths. In some cases, at least two of the energy sources can be translated at substantially identical paths. In some cases, at least two of the energy sources can follow one another in time and/or space. In some cases, at least two of the energy sources translate substantially parallel to each other in time and/or space. The power per unit area of at least two of the energy beam may be (e.g., substantially) identical. The power per unit area of at least one of the energy beams may be varied (e.g., during the formation of the 3D object). The power per unit area of at least one of the energy beams may be different. The power per unit area of at least one of the energy beams may be different. The power per unit area of one energy beam may be greater than the power per unit area of a second energy beam. The energy beams may have the same or different wavelengths. A first energy beam may have a wavelength that is smaller or larger than the wavelength of a second energy beam. The energy beams can derive from the same energy source. At least one of the energy beams can derive from different energy sources. The energy beams can derive from different energy sources. At least two of the energy beams may have the same power (e.g., at one point in time, and/or (e.g., substantially) during the entire build of the 3D object). At least one of the beams may have a different power (e.g., at one point in time, and/or substantially during the entire build of the 3D object). The beams may have different powers (e.g., at one point in time, and/or (e.g., substantially) during the entire build of the 3D object). At least two of the energy beams may travel at (e.g., substantially) the same velocity. At least one of the energy beams may travel at different velocities. The velocity of travel (e.g., speed) of at least two energy beams may be (e.g., substantially) constant. The velocity of travel of at least two energy beams may be varied (e.g., during the formation of the 3D object or a portion thereof). The travel may refer to a travel relative to (e.g., on) the exposed surface of the material bed (e.g., powder material). The travel may refer to a travel close to the exposed surface of the material bed. The travel may be within the material bed. The at least one energy beam and/or source may travel relative to the material bed.

Figure 12:
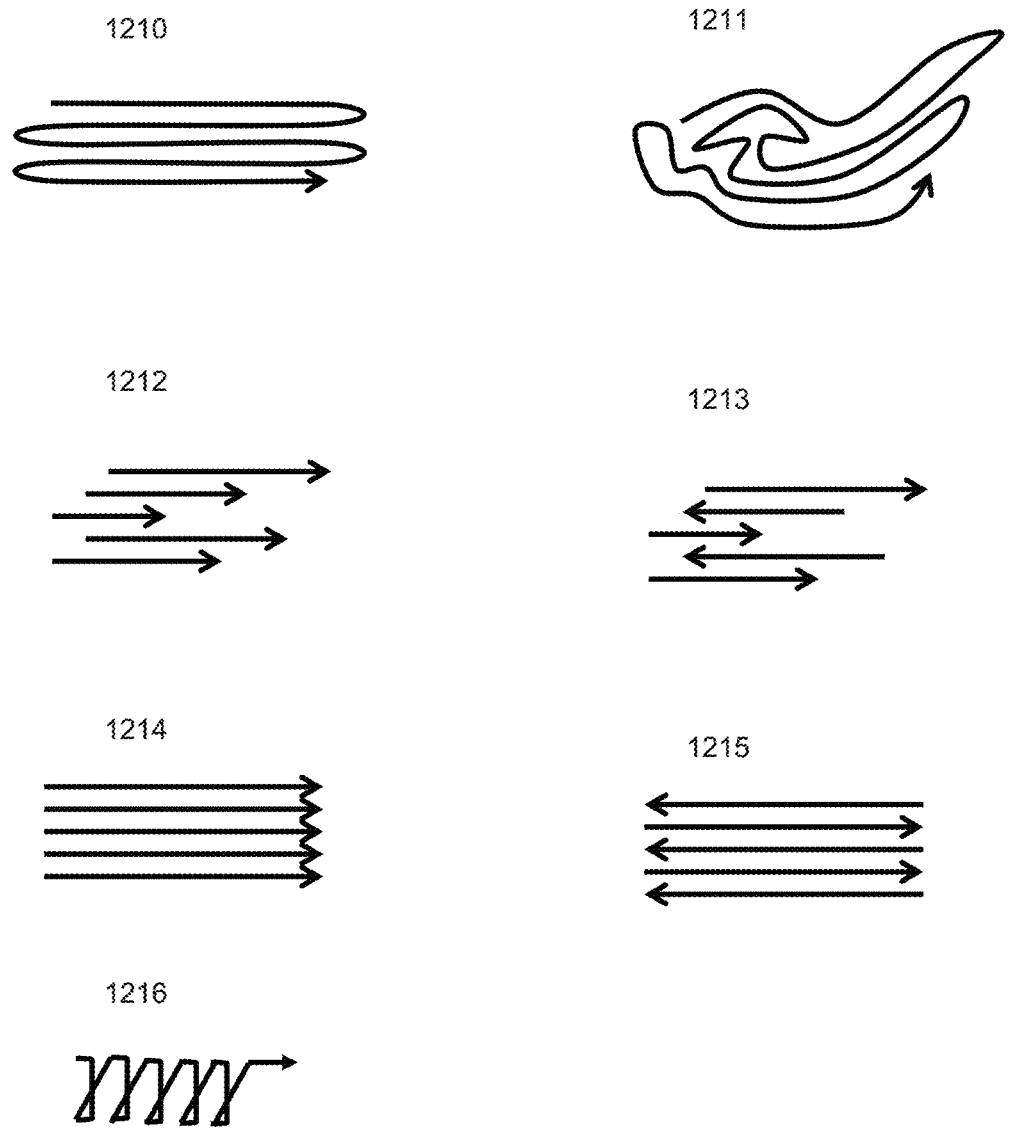
FIG. 12 illustrates various paths.

At times, the energy (e.g., energy beam) travels in a path. The path may comprise a hatch. The path of the energy beam may comprise repeating a path. For example, the first energy may repeat its own path. The second energy may repeat its own path, or the path of the first energy. The repetition may comprise a repetition of 1, 2, 3, 4, 5, 6, 7, 8, 9, 10 times or more. The energy may follow a path comprising parallel lines. For example, FIG. 12, 1215 or 1214 show paths that comprise parallel lines. The lines may be hatch lines. The distance between each of the parallel lines or hatch lines, may be at least about 1 µm, 5 µm, 10 µm, 20 µm, 30 µm, 40 µm, 50 µm, 60 µm, 70 µm, 80 µm, 90 µm, or more. The distance between each of the parallel lines or hatch lines, may be at most about 1 µm, 5 µm, 10 µm, 20 µm, 30 µm, 40 µm, 50 µm, 60 µm, 70 µm, 80 µm, 90 µm, or less. The distance between each of the parallel lines or hatch lines may be any value between any of the afore-mentioned distance values (e.g., from about 1 µm to about 90 µm, from about 1 µm to about 50 µm, or from about 40 µm to about 90 µm). The distance between the parallel or parallel lines or hatch lines may be substantially the same in every layer (e.g., plane) of transformed material. The distance between the parallel lines or hatch lines in one layer (e.g., plane) of transformed material may be different than the distance between the parallel lines or hatch lines respectively in another layer (e.g., plane) of transformed material within the 3D object. The distance between the parallel lines or hatch lines portions within a layer (e.g., plane) of transformed material may be substantially constant. The distance between the parallel lines or hatch lines within a layer (e.g., plane) of transformed material may be varied. The distance between a first pair of parallel lines or hatch lines within a layer (e.g., plane) of transformed material may be different than the distance between a second pair of parallel lines or hatch lines within a layer (e.g., plane) of transformed material respectively. The first energy beam may follow a path comprising two hatch lines or paths that cross in at least one point. The hatch lines or paths may be straight or curved. The hatch lines or paths may be winding. FIG. 12, 1210 or 1211 show examples of winding paths. The first energy beam may follow a hatch line or path comprising a U-shaped turn (e.g., FIG. 12, 1210). The first energy beam may follow a hatch line or path devoid of U shaped turns (e.g., FIG. 12, 1212). The hatch line may have varied length (e.g., 1212 or 1213). The path may be overlapping (e.g., FIG. 12, 1216) or non-overlapping. The path may comprise at least one overlap. The path may be substantially devoid of overlap (e.g., FIG. 12, 1210).

In some embodiments, the formation of the 3D object includes transforming (e.g., fusing, binding, or connecting) the pre-transformed material (e.g., powder material) using an energy beam. The energy beam may be projected on to a particular area of the material bed, thus causing the pre-transformed material to transform. The energy beam may cause at least a portion of the pre-transformed material to transform from its present state of matter to a different state of matter. For example, the pre-transformed material may transform at least in part (e.g., completely) from a solid to a liquid state. The energy beam may cause at least a portion of the pre-transformed material to chemically transform. For example, the energy beam may cause chemical bonds to form or break. The chemical transformation may be an isomeric transformation. The transformation may comprise a magnetic transformation or an electronic transformation. The transformation may comprise coagulation of the material, cohesion of the material, or accumulation of the material.

In some embodiments, the methods described herein further comprises repeating the operations of material deposition and material transformation operations to produce a 3D object (or a portion thereof) by at least one 3D printing (e.g., additive manufacturing) method. For example, the methods described herein may further comprise repeating the operations of depositing a layer of pre-transformed material and transforming at least a portion of the pre-transformed material to connect to the previously formed 3D object portion (e.g., repeating the 3D printing cycle), thus forming at least a portion of a 3D object. The transforming operation may comprise utilizing an energy beam to transform the material. In some instances, the energy beam is utilized to transform at least a portion of the material bed (e.g., utilizing any of the methods described herein).

In some embodiments, the transforming energy is provided by an energy source. The transforming energy may comprise an energy beam. The energy source can produce an energy beam. The energy beam may include a radiation comprising electromagnetic, electron, positron, proton, plasma, or ionic radiation. The electromagnetic beam may comprise microwave, infrared, ultraviolet, or visible radiation. The ion beam may include a charged particle beam. The ion beam may include a cation, or an anion. The electromagnetic beam may comprise a laser beam. The laser may comprise a fiber, or a solid-state laser beam. The energy source may include a laser. The energy source may include an electron gun. The energy depletion may comprise heat depletion. The energy depletion may comprise cooling. The energy may comprise an energy flux (e.g., energy beam. E.g., radiated energy). The energy may comprise an energy beam. The energy may be the transforming energy. The energy may be a warming energy that is not able to transform the deposited pre-transformed material (e.g., in the material bed). The warming energy may be able to raise the temperature of the deposited pre-transformed material. The energy beam may comprise energy provided at a (e.g., substantially) constant or varied energy beam characteristics. The energy beam may comprise energy provided at (e.g., substantially) constant or varied energy beam characteristics, depending on the position of the generated hardened material within the 3D object. The varied energy beam characteristics may comprise energy flux, rate, intensity, wavelength, amplitude, power, cross-section, or time exerted for the energy process (e.g., transforming or heating). The energy beam cross-section may be the average (or mean) FLS of the cross section of the energy beam on the layer of material (e.g., powder). The FLS may be a diameter, a spherical equivalent diameter, a length, a height, a width, or diameter of a bounding circle. The FLS may be the larger of a length, a height, and a width of a 3D form. The FLS may be the larger of a length and a width of a substantially two-dimensional (2D) form (e.g., wire, or 3D surface).

Figure 11:
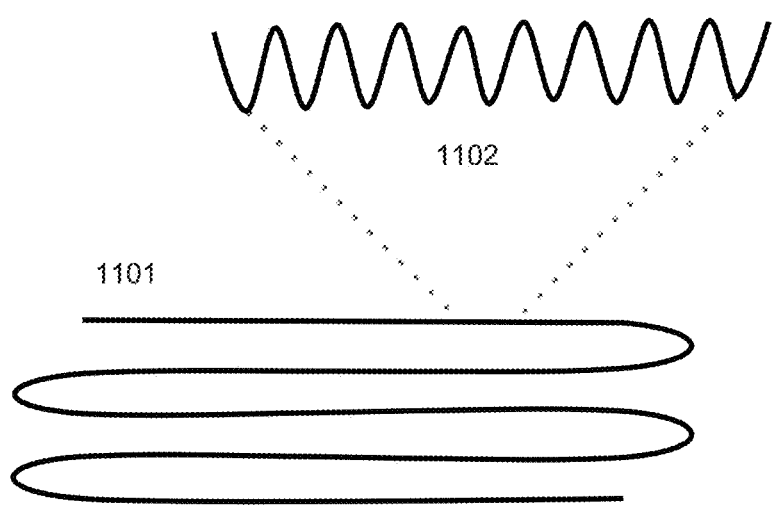
FIG. 11 illustrates a path.

At times, the energy beam follows a path. The path of the energy beam may be a vector. The path of the energy beam may comprise a raster, a vector, or any combination thereof. The path of the energy beam may comprise an oscillating pattern. The path of the energy beam may comprise a zigzag, wave (e.g., curved, triangular, or square), or curve pattern. The curved wave may comprise a sine or cosine wave. The path of the energy beam may comprise a sub-pattern. The path of the energy beam may comprise an oscillating (e.g., zigzag), wave (e.g., curved, triangular, or square), and/or curved sub-pattern. The curved wave may comprise a sine or cosine wave. FIG. 11 shows an example of a path 1101 of an energy beam comprising a zigzag sub-pattern (e.g., 1102 shown as an expansion (e.g., blow-up) of a portion of the path 1101). The sub-path of the energy beam may comprise a wave (e.g., sine or cosine wave) pattern. The sub-path may be a small path that forms the large path. The sub-path may be a component (e.g., a portion) of the large path. The path that the energy beam follows may be a predetermined path. A model may predetermine the path by utilizing a controller or an individual (e.g., human). The controller may comprise a processor. The processor may comprise a computer, computer program, drawing or drawing data, statue or statue data, or any combination thereof.

At times, the path comprises successive lines. The successive lines may touch each other. The successive lines may overlap each other in at least one point. The successive lines may substantially overlap each other. The successive lines may be spaced by a first distance (e.g., hatch spacing). FIG. 12 shows an example of a path 1214 that includes five hatches wherein each two immediately adjacent hatches are separated by a spacing distance. The hatch spacing may be any hatch spacing disclosed in patent application Ser. No. 15/374,318 that is entirely incorporated herein by reference.

The term "auxiliary support," as used herein, generally refers to at least one feature that is a part of a printed 3D object, but not part of the desired, intended, designed, ordered, and/or final 3D object. Auxiliary support may provide structural support during and/or after the formation of the 3D object. The auxiliary support may be anchored to the enclosure. For example, an auxiliary support may be anchored to the platform (e.g., building platform), to the side walls of the material bed, to a wall of the enclosure, to an object (e.g., stationary, or semi-stationary) within the enclosure, or any combination thereof. The auxiliary support may be the platform (e.g., the base, the substrate, or the bottom of the enclosure). The auxiliary support may enable the removal or energy from the 3D object (e.g., or a portion thereof) that is being formed. The removal of energy (e.g., heat) may be during and/or after the formation of the 3D object. Examples of auxiliary support comprise a fin (e.g., heat fin), anchor, handle, pillar, column, frame, footing, wall, platform, or another stabilization feature. In some instances, the auxiliary support may be mounted, clamped, or situated on the platform. The auxiliary support can be anchored to the building platform, to the sides (e.g., walls) of the building platform, to the enclosure, to an object (stationary or semi-stationary) within the enclosure, or any combination thereof.

In some examples, the generated 3D object is printed without auxiliary support. In some examples, overhanging feature of the generated 3D object can be printed without (e.g., without any) auxiliary support. The generated object can be devoid of auxiliary supports. The generated object may be suspended (e.g., float anchorlessly) in the material bed (e.g., powder bed). The term "anchorlessly," as used herein, generally refers to without or in the absence of an anchor. In some examples, an object is suspended in a powder bed anchorlessly without attachment to a support. For example, the object floats in the powder bed. The generated 3D object may be suspended in the layer of pre-transformed material (e.g., powder material). The pre-transformed material (e.g., powder material) can offer support to the printed 3D object (or the object during its generation). Sometimes, the generated 3D object may comprise one or more auxiliary supports. The auxiliary support may be suspended in the pre-transformed material (e.g., powder material). The auxiliary support may provide weights or stabilizers. The auxiliary support can be suspended in the material bed within the layer of pre-transformed material in which the 3D object (or a portion thereof) has been formed. The auxiliary support (e.g., one or more auxiliary supports) can be suspended in the pre-transformed material within a layer of pre-transformed material other than the one in which the 3D object (or a portion thereof) has been formed (e.g., a previously deposited layer of (e.g., powder) material). The auxiliary support may touch the platform. The auxiliary support may be suspended in the material bed (e.g., powder material) and not touch the platform. The auxiliary support may be anchored to the platform. The distance between any two auxiliary supports can be at least about 1 millimeter, 1.3 millimeters (mm), 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be at most 1 millimeter, 1.3 mm, 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be any value in between the afore-mentioned distances (e.g., from about 1 mm to about 45 mm, from about 1 mm to about 11 mm, from about 2.2 mm to about 15 mm, or from about 10 mm to about 45 mm). At times, a sphere intersecting an exposed surface of the 3D object may be devoid of auxiliary support. The sphere may have a radius XY that is equal to the distance between any two auxiliary supports mentioned herein. FIG. 7 shows an example of a top view of a 3D object that has an exposed surface. The exposed surface includes an intersection area of a sphere having a radius XY, which intersection area is devoid of auxiliary support.

In some examples, the diminished number of auxiliary supports or lack of auxiliary support, facilitates a 3D printing process that requires a smaller amount of material, produces a smaller amount of material waste, and/or requires smaller energy as compared to commercially available 3D printing processes. The reduced number of auxiliary supports can be smaller by at least about 1.1, 1.3, 1.5, 2, 3, 4, 5, 6, 7, 8, 9, or 10 as compared to conventional 3D printing. The smaller amount may be smaller by any value between the aforesaid values (e.g., from about 1.1 to about 10, or from about 1.5 to about 5) as compared to conventional 3D printing.

In some embodiments, the generated 3D object has a surface roughness profile. The generated 3D object can have various surface roughness profiles, which may be suitable for various applications. The surface roughness may be the deviations in the direction of the normal vector of a real surface from its ideal form. The generated 3D object can have a Ra value of as disclosed herein.

At times, the generated 3D object (e.g., the hardened cover) is substantially smooth. The generated 3D object may have a deviation from an ideal planar surface (e.g., atomically flat or molecularly flat) of at most about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, 500 μm, or less. The generated 3D object may have a deviation from an ideal planar surface of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, 500 μm, or more. The generated 3D object may have a deviation from an ideal planar surface between any of the afore-mentioned deviation values. The generated 3D object may comprise a pore. The generated 3D object may comprise pores. The pores may be of an average FLS (diameter or diameter equivalent in case the pores are not spherical) of at most about 1.5 nanometers (nm), 2 nm, 3 nm, 4 nm, 5 nm, 10 nm, 15 nm, 20 nm, 25 nm, 30 nm 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, or 500 μm. The pores may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, or 500 μm. The pores may be of an average FLS between any of the afore-mentioned FLS values (e.g., from about 1 nm to about 500 μm, or from about 20 μm, to about 300 μm). The 3D object (or at least a layer thereof) may have a porosity of at most about 0.05 percent (%), 0.1% 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have a porosity of at least about 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have porosity between any of the afore-mentioned porosity percentages (e.g., from about 0.05% to about 80%, from about 0.05% to about 40%, from about 10% to about 40%, or from about 40% to about 90%). In some instances, a pore may traverse the generated 3D object. For example, the pore may start at a face of the 3D object and end at the opposing face of the 3D object. The pore may comprise a passageway extending from one face of the 3D object and ending on the opposing face of that 3D object. In some instances, the pore may not traverse the generated 3D object. The pore may form a cavity in the generated 3D object. The pore may form a cavity on a face of the generated 3D object. For example, pore may start on a face of the plane and not extend to the opposing face of that 3D object.

At times, the formed plane comprises a protrusion. The protrusion can be a grain, a bulge, a bump, a ridge, or an elevation. The generated 3D object may comprise protrusions. The protrusions may be of an average FLS of at most about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, 500 μm, or less. The protrusions may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, 500 μm, or more. The protrusions may be of an average FLS between any of the afore-mentioned FLS values. The protrusions may constitute at most about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the generated 3D object. The protrusions may constitute at least about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the 3D object. The protrusions may constitute a percentage of an area of the 3D object that is between the afore-mentioned percentages of 3D object area. The protrusion may reside on any surface of the 3D object. For example, the protrusions may reside on an external surface of a 3D object. The protrusions may reside on an internal surface (e.g., a cavity) of a 3D object. At times, the average size of the protrusions and/or of the holes may determine the resolution of the printed (e.g., generated) 3D object. The resolution of the printed 3D object may be at least about 1 micrometer, 1.3 micrometers ($\mu m$), 1.5 $\mu m$, 1.8 $\mu m$, 1.9 $\mu m$, 2.0 $\mu m$, 2.2 $\mu m$, 2.4 $\mu m$, 2.5 $\mu m$, 2.6 $\mu m$, 2.7 $\mu m$, 3 $\mu m$, 4 $\mu m$, 5 $\mu m$, 10 $\mu m$, 20 $\mu m$, 30 $\mu m$, 40 $\mu m$, 50 $\mu m$, 60 $\mu m$, 70 $\mu m$, 80 $\mu m$, 90 $\mu m$, 100 $\mu m$, 200 $\mu m$, or more. The resolution of the printed 3D object may be at most about 1 micrometer, 1.3 micrometers ($\mu m$), 1.5 $\mu m$, 1.8 $\mu m$, 1.9 $\mu m$, 2.0 $\mu m$, 2.2 $\mu m$, 2.4 $\mu m$, 2.5 $\mu m$, 2.6 $\mu m$, 2.7 $\mu m$, 3 $\mu m$, 4 $\mu m$, 5 $\mu m$, 10 $\mu m$, 20 $\mu m$, 30 $\mu m$, 40 $\mu m$, 50 $\mu m$, 60 $\mu m$, 70 $\mu m$, 80 $\mu m$, 90 $\mu m$, 100 $\mu m$, 200 $\mu m$, or less. The resolution of the printed 3D object may be any value between the above-mentioned resolution values. At times, the 3D object may have a material density of at least about 99.9%, 99.8%, 99.7%, 99.6%, 99.5%, 99.4%, 99.3%, 99.2% 99.1%, 99%, 98%, 96%, 95%, 94%, 93%, 92%, 91%, 90%, 8%, or 70%. At times, the 3D object may have a material density of at most about 99.5%, 99%, 98%, 96%, 95%, 94%, 93%, 92%, 91%, 90%, 8%, or 70%. At times, the 3D object may have a material density between the afore-mentioned material densities. The resolution of the 3D object may be at least about 100 dots per inch (dpi), 300 dpi, 600 dpi, 1200 dpi, 2400 dpi, 3600 dpi, or 4800 dpi. The resolution of the 3D object may be at most about 100 dpi, 300 dpi, 600 dpi, 1200 dpi, 2400 dpi, 3600 dpi, or 4800 dip. The resolution of the 3D object may be any value between the afore-mentioned values (e.g., from 100 dpi to 4800 dpi, from 300 dpi to 2400 dpi, or from 600 dpi to 4800 dpi). The height uniformity (e.g., deviation from average surface height) of a planar surface of the 3D object may be at least about 100 $\mu m$, 90 $\mu m$, 80 $\mu m$, 70 $\mu m$, 60 $\mu m$, 50 $\mu m$, 40 $\mu m$, 30 $\mu m$, 20 $\mu m$, 10 $\mu m$, or 5 $\mu m$. The height uniformity of the planar surface may be at most about 100 $\mu m$, 90 $\mu m$, 80, 70 $\mu m$, 60 $\mu m$, 50 $\mu m$, 40 $\mu m$, 30 $\mu m$, 20 $\mu m$, 10 $\mu m$, or 5 $\mu m$. The height uniformity of the planar surface of the 3D object may be any value between the afore-mentioned height deviation values (e.g., from about 100 $\mu m$ to about 5 $\mu m$, from about 50 $\mu m$ to about 5 $\mu m$, from about 30 $\mu m$ to about 5 $\mu m$, or from about 20 $\mu m$ to about 5 $\mu m$). The height uniformity may comprise high precision uniformity.

In some embodiments, a newly formed layer of material (e.g., comprising transformed material) reduces in volume during its hardening (e.g., by cooling). Such reduction in volume (e.g., shrinkage) may cause a deformation in the desired 3D object. The deformation may include cracks, and/or tears in the newly formed layer and/or in other (e.g., adjacent) layers. The deformation may include geometric deformation of the 3D object or at least a portion thereof. The newly formed layer can be a portion of a 3D object. The one or more layers that form the 3D printed object (e.g., sequentially) may be (e.g., substantially) parallel to the building platform. An angle may be formed between a layer of hardened material of the 3D printed object and the platform. The angle may be measured relative to the average layering plane of the layer of hardened material. The platform (e.g., building platform) may include the base, substrate, or bottom of the enclosure. The building platform may be a carrier plate.

In an aspect provided herein is a 3D object comprising a layer of hardened material generated by at least one 3D printing method described herein, wherein the layer of material (e.g., hardened) is different from a corresponding cross section of a model of the 3D object. For example, the generated layers differ from the proposed slices. The layer of material within a 3D object can be indicated by the microstructure of the material. The material microstructures may be those disclosed in Patent Application serial number PCT/US15/36802 that is incorporated herein by reference in its entirety.

Energy (e.g., heat) can be transferred from the material bed to the cooling member (e.g., heat sink) through any one or combination of heat transfer mechanisms. FIG. 1, 113 shows an example of a cooling member. The heat transfer mechanism may comprise conduction, radiation, or convection. The convection may comprise natural or forced convection. The cooling member can be solid, liquid, gas, or semi-solid. In some examples, the cooling member (e.g., heat sink) is solid. The cooling member may be located above, below, or to the side of the material layer. The cooling member may comprise an energy conductive material. The cooling member may comprise an active energy transfer or a passive energy transfer. The cooling member may comprise a cooling liquid (e.g., aqueous or oil), cooling gas, or cooling solid. The cooling member may be further connected to a cooler and/or a thermostat. The gas, semi-solid, or liquid comprised in the cooling member may be stationary or circulating. The cooling member may comprise a material that conducts heat efficiently. The heat (thermal) conductivity of the cooling member may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may be at most about 20 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may be any value between the afore-mentioned heat conductivity values. The heat (thermal) conductivity of the cooling member may be measured at ambient temperature (e.g., room temperature) and/or pressure. For example, the heat conductivity may be measured at about 20° C. and a pressure of 1 atmosphere. The heat sink can be separated from the powder bed or powder layer by a gap. The gap can be filled with a gas. The cooling member may be any cooling member (e.g., that is used in 3D printing) such as, for example, the ones described in Patent Application serial number PCT/US15/36802, or in patent application Ser. No. 15/435,065, both of which are entirely incorporated herein by references.

When the energy source is in operation, the material bed can reach a certain (e.g., average) temperature. The average temperature of the material bed can be an ambient temperature or "room temperature." The average temperature of the material bed can have an average temperature during the operation of the energy (e.g., beam). The average temperature of the material bed can be an average temperature during the formation of the transformed material, the formation of the hardened material, or the generation of the 3D object. The average temperature can be below or just below the transforming temperature of the material. Just below can refer to a temperature that is at most about 1° C., 2° C., 3° C., 4° C., 5° C., 6° C., 7° C., 8° C., 9° C., 10° C., 15° C., or 20° C. below the transforming temperature. The average temperature of the material bed (e.g., pre-transformed material) can be at most about 10° C. (degrees Celsius), 20° C., 25° C., 30° C., 40° C., 50° C., 60° C., 70° C., 80° C., 90° C., 100° C., 120° C., 140° C., 150° C., 160° C., 180° C., 200° C., 250° C., 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be at least about 10° C., 20° C., 25° C., 30° C., 40° C., 50° C., 60° C., 70° C., 80° C., 90° C., 100° C., 120° C., 140° C., 150° C., 160° C., 180° C., 200° C., 250° C., 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be any temperature between the afore-mentioned material average temperatures. The average temperature of the material bed (e.g., pre-transformed material) may refer to the average temperature during the 3D printing. The pre-transformed material can be the material within the material bed that has not been transformed and generated at least a portion of the 3D object (e.g., the remainder). The material bed can be heated or cooled before, during, or after forming the 3D object (e.g., hardened material). Bulk heaters can heat the material bed. The bulk heaters can be situated adjacent to (e.g., above, below, or to the side of) the material bed, or within a material dispensing system. For example, the material can be heated using radiators (e.g., quartz radiators, or infrared emitters). The material bed temperature can be substantially maintained at a predetermined value. The temperature of the material bed can be monitored. The material temperature can be controlled manually and/or by a control system.

In some embodiments, the pre-transformed material within the material bed is heated by a first energy source such that the heating will transform the pre-transformed material. The remainder of the material that did not transform to generate at least a portion of the 3D object (e.g., the remainder) can be heated by a second energy source. The remainder can be at an average temperature that is less than the liquefying temperature of the material (e.g., during the 3D printing). The maximum temperature of the transformed portion of the material bed and the average temperature of the remainder of the material bed can be different. The solidus temperature of the material can be a temperature wherein the material is in a solid state at a given pressure (e.g., ambient pressure). Ambient may refer to the surrounding. After the portion of the material bed is heated to the temperature that is at least a liquefying temperature of the material by the first energy source, that portion of the material may be cooled to allow the transformed (e.g., liquefied) material portion to harden (e.g., solidify). In some cases, the liquefying temperature can be at least about 100° C., 200° C., 300° C., 400° C., or 500° C., and the solidus temperature can be at most about 500° C., 400° C., 300° C., 200° C., or 100° C. For example, the liquefying temperature is at least about 300° C. and the solidus temperature is less than about 300° C. In another example, the liquefying temperature is at least about 400° C. and the solidus temperature is less than about 400° C. The liquefying temperature may be different from the solidus temperature. In some instances, the temperature of the pre-transformed material is maintained above the solidus temperature of the material and below its liquefying temperature. In some examples, the material from which the pre-transformed material is composed has a super cooling temperature (or super cooling temperature regime). In some examples, as the first energy source heats up the pre-transformed material to cause at least a portion of it to melt, the molten material will remain molten as the material bed is held at or above the material super cooling temperature of the material, but below its melting point. When two or more materials make up the material layer at a specific ratio, the materials may form a eutectic material on transformation of the material. The liquefying temperature of the formed eutectic material may be the temperature at the eutectic point, close to the eutectic point, or far from the eutectic point. Close to the eutectic point may designate a temperature that is different from the eutectic temperature (i.e., temperature at the eutectic point) by at most about 0.1° C., 0.5° C., 1° C., 2° C., 4° C., 5° C., 6° C., 8° C., 10° C., or 15° C. A temperature that is farther from the eutectic point than the temperature close to the eutectic point is designated herein as a temperature far from the eutectic Point. The process of liquefying and solidifying a portion of the material can be repeated until the entire object has been formed. At the completion of the generated 3D object, it can be removed from the remainder of material in the container. The remaining material can be separated from the portion at the generated 3D object. The generated 3D object can be hardened and removed from the container (e.g., from the substrate or from the base).

At times, the methods described herein further comprise stabilizing the temperature within the enclosure. For example, stabilizing the temperature of the atmosphere or the pre-transformed material (e.g., within the material bed). Stabilization of the temperature may be to a predetermined temperature value. The methods described herein may further comprise altering the temperature within at least one portion of the container. Alteration of the temperature may be to a predetermined temperature. Alteration of the temperature may comprise heating and/or cooling the material bed. Elevating the temperature (e.g., of the material bed) may be to a temperature below the temperature at which the pre-transformed material fuses (e.g., melts or sinters), connects, or bonds.

In some embodiments, the apparatus and/or systems described herein comprise an optical system. The optical components may be controlled manually and/or via a control system (e.g., a controller). The optical system may be configured to direct at least one energy beam from the at least one energy source to a position on the material bed within the enclosure (e.g., a predetermined position). A scanner can be included in the optical system. The printing system may comprise a processor (e.g., a central processing unit). The processor can be programmed to control a trajectory of the at least one energy beam and/or energy source with the aid of the optical system. The systems and/or the apparatus described herein can further comprise a control system in communication with the at least one energy source and/or energy beam. The control system can regulate a supply of energy from the at least one energy source to the material in the container. The control system may control the various components of the optical system. The various components of the optical system may include optical components comprising a mirror, a lens (e.g., concave or convex), a fiber, a beam guide, a rotating polygon, or a prism. The lens may be a focusing or a dispersing lens. The lens may be a diverging or converging lens. The mirror can be a deflection mirror. The optical components may be tiltable and/or rotatable. The optical components may be tilted and/or rotated. The mirror may be a deflection mirror. The optical components may comprise an aperture. The aperture may be mechanical. The optical system may comprise a variable focusing device. The variable focusing device may be connected to the control system. The variable focusing device may be controlled by the control system and/or manually. The variable focusing device may comprise a modulator. The modulator may comprise an acousto-optical modulator, mechanical modulator, or an electro optical modulator. The focusing device may comprise an aperture (e.g., a diaphragm aperture).

In some embodiments, the container described herein comprises at least one sensor. The sensor may be connected and/or controlled by the control system (e.g., computer control system, or controller). The control system may be able to receive signals from the at least one sensor. The control system may act upon at least one signal received from the at least one sensor. The control may rely on feedback and/or feed forward mechanisms that has been pre-programmed. The feedback and/or feed forward mechanisms may rely on input from at least one sensor that is connected to the control unit.

In some embodiments, the sensor detects the amount of material (e.g., pre-transformed material) in the enclosure. The controller may monitor the amount of material in the enclosure (e.g., within the material bed). The systems and/or the apparatus described herein can include a pressure sensor. The pressure sensor may measure the pressure of the chamber (e.g., pressure of the chamber atmosphere). The pressure sensor can be coupled to a control system. The pressure can be electronically and/or manually controlled. The controller may regulate the pressure (e.g., with the aid of one or more vacuum pumps) according to input from at least one pressure sensor. The sensor may comprise light sensor, image sensor, acoustic sensor, vibration sensor, chemical sensor, electrical sensor, magnetic sensor, fluidity sensor, movement sensor, speed sensor, position sensor, pressure sensor, force sensor, density sensor, metrology sensor, sonic sensor (e.g., ultrasonic sensor), or proximity sensor. The metrology sensor may comprise measurement sensor (e.g., height, length, width, angle, and/or volume). The metrology sensor may comprise a magnetic, acceleration, orientation, or optical sensor. The optical sensor may comprise a camera (e.g., IR camera, or CCD camera (e.g., single line CCD camera)), or CCD camera (e.g., single line CCD camera). The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure the tile. The metrology sensor may measure the gap. The metrology sensor may measure at least a portion of the layer of material (e.g., pre-transformed, transformed, and/or hardened). The layer of material may be a pre-transformed material (e.g., powder), transformed material, or hardened material. The metrology sensor may measure at least a portion of the 3D object. The sensor may comprise a temperature sensor, weight sensor, powder level sensor, gas sensor, or humidity sensor. The gas sensor may sense any gas enumerated herein. The temperature sensor may comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer, Pyrometer, IR camera, or CCD camera (e.g., single line CCD camera). The temperature sensor may measure the temperature without contacting the material bed (e.g., non-contact measurements). The pyrometer may comprise a point pyrometer, or a multi-point pyrometer. The Infrared (IR) thermometer may comprise an IR camera. The pressure sensor may comprise Barograph, Barometer, Boost gauge, Bourdon gauge, hot filament ionization gauge, Ionization gauge, McLeod gauge, Oscillating U-tube, Permanent Downhole Gauge, Piezometer, Pirani gauge, Pressure sensor, Pressure gauge, tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode as light sensor, Light-addressable potentiometric sensor, Nichols radiometer, Fiber optic sensors, optical position sensor, photo detector, photodiode, photomultiplier tubes, phototransistor, photoelectric sensor, photoionization detector, photomultiplier, photo resistor, photo switch, phototube, scintillometer, Shack-Hartmann, single-photon avalanche diode, superconducting nanowire single-photon detector, transition edge sensor, visible light photon counter, or wave front sensor. The weight of the enclosure (e.g., container), or any components within the enclosure can be monitored by at least one weight sensor in or adjacent to the material. For example, a weight sensor can be situated at the bottom of the enclosure. The weight sensor can be situated between the bottom of the enclosure and the substrate. The weight sensor can be situated between the substrate and the base. The weight sensor can be situated between the bottom of the container and the base. The weight sensor can be situated between the bottom of the container and the top of the material bed. The weight sensor can comprise a pressure sensor. The weight sensor may comprise a spring scale, a hydraulic scale, a pneumatic scale, or a balance. At least a portion of the pressure sensor can be exposed on a bottom of the container. In some cases, the at least one weight sensor can comprise a button load cell. Alternatively, or additionally a sensor can be configured to monitor the weight of the material by monitoring a weight of a structure that contains the material (e.g., a material bed). One or more position sensors (e.g., height sensors) can measure the height of the material bed relative to the substrate. The position sensors can be optical sensors. The position sensors can determine a distance between one or more energy sources and a surface of the material bed. The surface of the material bed can be the upper surface of the material bed. For example, FIG. 1, 131 shows an example of an upper (e.g., exposed) surface of the material bed 104.

At times, a 3D printing process comprises a sieve that provides pre-transformed material having maximal FLS. Following sieving the particulate material may have a FLS that is at most the size of the holes of the sieve. Following sieving the particulate (e.g., powder) material can comprise particles of average FLS of at most about 1000 micrometers (μm), 500 μm, 100 μm, 50 μm, 45 μm, 40 μm, 35 μm, 30 μm, 25 μm, 20 μm, 15 μm, or 10 μm. The material can comprise particles of an average FLS of any value within a range of the aforementioned values (e.g., from at most about 1000 μm to about 10 μm, from about 1000 μm to about 500 μm, or from about 500 μm to about 10 μm). The pre-transformed material may be used as a starting material in the 3D printing process. The maximal FLS may correspond with a size of the pre-transformed material (e.g., powder). A pre-transformed material that has a maximal FLS may contribute to (e.g., improved) transformation into a transformed material (e.g., at least a portion of a 3D object) during 3D printing. For example, a pre-transformed material having a maximal FLS may prevent formation of (e.g., material and/or structural) defects during 3D printing. A pre-transformed material that has a maximal FLS may contribute to a smooth flowability of the pre-transformed material in the material conveyance system. The smooth flowability may comprise a constant velocity, non-interrupted, continuous, or flow having minimal clogging, during the 3D printing cycle. The smooth flowability may be improved relative to a pre-transformed material that (e.g., substantially) comprises particles having also a larger FLS than the maximal FLS (e.g., arising from agglomerated particles). The particles having larger FLS may refer to a range of particle sizes (e.g., a distribution) that spans at least 200 microns from an average particle size of the pre-transformed material. The pre-transformed material may comprise particulate material (e.g., vesicles, beads, or powder). In some embodiments, pre-transformed (e.g., particulate) material is passed through the sieve to provide the maximal FLS particulate material. The sieve may comprise one or more holes. The sieve can comprise a mesh (e.g., a screen). The sieve can have a pore size that defines a (e.g., maximum) particle size that passes therethrough. The mesh may be formed of a durable material (e.g., durable with regard to passing the particulate material during at least one 3D printing cycle). For example, the durable material may have an operating lifetime (e.g., before replacement) that facilitates filtering at least about: 4 liters of material filtered per square centimeter of filter material (L/cm$^2$), 5 L/cm$^2$, 6 L/cm$^2$, 7 L/cm$^2$, 10 L/cm$^2$, or 15 L/cm$^2$. The operating lifetime of the durable material may be any value within a range of the aforementioned values (e.g., from about 4 L/cm$^2$ to about 15 L/cm$^2$, from about 4 L/cm$^2$ to about 10 L/cm$^2$, or from about 10 L/cm$^2$ to about 15 L/cm$^2$). The filter material may be the sieve. For example, the mesh may be formed of stainless steel or brass. The mesh may be formed from any material disclosed herein. Durable may be with respect to operation of a 3D printing system. For example, durable may refer to a volume of material that is passed through the mesh prior to a failure condition of the mesh. A failure condition may alter at least one aspect of the sieve. For example, an aspect of the sieve may be a rate at which the sieve passes material therethrough (e.g., a sieving rate). In some embodiments, a nominal (e.g., typical operation) sieve rate is at least about: 1 milliliter/(centimeter squared*minute) (mL/(cm$^2$*min)) (where '*' denotes the mathematical multiplication operation), 1.5 mL/(cm$^2$*min), 2 mL/(cm$^2$*min), 3 mL/(cm$^2$*min), 4 mL/(cm$^2$*min), 5 mL/(cm$^2$*min) or 6 mL/(cm$^2$*min). The nominal sieve rate may be any value within a range of the aforementioned rates (e.g., from about 1 mL/(cm$^2$*min) to about 6 mL/(cm$^2$*min), from about 1 mL/(cm$^2$*min) to about 4 mL/(cm$^2$*min), or from about 4 mL/(cm$^2$*min) to about 6 mL/(cm$^2$*min)). A failure condition may correspond to a (e.g., detected) change in a sieve rate. A change in the sieve rate may be caused by at least one puncture in the mesh, at least one blockage in the mesh, and/or a de-coupling of the mesh with a surrounding element (e.g., a sieve cartridge frame). A volume of material may correspond with a number of layers deposited by a layer dispenser of the 3D printing system. The number of layers deposited corresponding to a durable mesh may be at least about: 10000 layers, 20000 layers, 25000 layers, 30000 layers, or 35000 layers. The number of layers deposited corresponding to a durable mesh may be any number of layers within a range of the aforementioned layers (e.g., from about 10000 layers to about 35000 layers, from about 10000 layers to about 25000 layers, or from about 25000 layers to about 35000 layers). For example, the sieve can have a pore size that is at least about 30 micrometers (μm), 40 μm, 60 μm, 80 μm, 100 μm, 500 μm or 1000 μm. The pore size of the sieve may be variable (e.g., the sieve having a range of pore sizes across the sieve). The pore size of the sieve may be (e.g., substantially) constant (e.g., during sieving). A fundamental length scale (FLS) of the particulate material may be at most about 100 μm, 80 μm, 40 μm, 20 μm, 10 μm or 1 μm in size.

In some embodiments, the agitator causes the sieve (e.g., via a frame) to move. The movement may comprise a translation (e.g., along an x-axis, along a y-axis, along a z-axis, or any combination thereof). The movement may comprise a vibration. The movement may comprise a rotation (e.g., about an x-axis, about a y-axis, about a z-axis, or a combination thereof). The agitator may be configured to induce mechanical agitation. Mechanical agitation may comprise movement of the sieve that is at most about 1 millimeter (mm), 2 mm, 5 mm, 10 mm, or 20 mm. Mechanical agitation may comprise movement of any distance within a range of the aforementioned distances (e.g., about 1 mm to about 20 mm, about 10 mm to about 20 mm, or about 1 mm to about 10 mm). Mechanical agitation may comprise vibration. Vibration may comprise de-blinding of the sieve (e.g., mesh). De-blinding may comprise causing clogged hole(s) in the sieve to open and allow flow of particulates therethrough. Vibration may comprise movement that is at least about 10 μm, 50 μm, 100 μm, 500 μm or 1000 μm. Vibration may comprise movement within any of the aforementioned values (e.g., from about 10 μm to about 1000 μm, from about 500 μm to about 1000 μm, from about 10 μm to about 500 μm). The agitator may comprise a motor coupled to a shaft, a cam, and/or a transducer (e.g., an ultrasonic transducer). In some embodiments the agitator comprises a controller operable to control one or more movement parameters. The movement parameters can comprise an amplitude of movement, a direction of movement, or a frequency of movement. The control may comprise control of an output power (e.g., amplitude and/or frequency) of the agitator. The controller may adjust the output power to maintain one or more values of one or more movement parameters. For example, the controller may adjust an output power to maintain an amplitude and/or frequency of agitator movement. For example, a power output may vary to maintain a given agitator movement amplitude and/or frequency as an inertial mass of the sieve (e.g., cartridge) changes. The amplitude may be an amplitude in a direction (e.g., X, Y or Z). The controller may adjust an output power to maintain a plurality of amplitudes and/or frequencies of agitator movement (e.g., each having another directional component, e.g., from X, Y and Z). An inertial mass of the sieve cartridge may change due to material buildup or removal (e.g., during filtering). In some embodiments, an output power of a transducer may be from about 50 W to about 600 W. The control may comprise a booster (e.g., an attenuator) that is operable to adjust the output power by a factor. The factor may be greater than or less than 1. For example, the factor may be about 1.5, about 3, about 5, or about 10. The factor may be any value within a range of the aforementioned values (e.g., from about 1.5 to about 10, from about 1.5 to about 5, from about 5 to about 10). For example, the factor may be about 0.25, about 0.5, about 0.75, or about 0.9. The factor may be any value within a range of the aforementioned values (e.g., from about 0.25 to about 0.9, from about 0.25 to about 0.5, from about 0.5 to about 0.9).

In some embodiments, the sieve is a part of a sieve assembly. A sieve assembly may comprise several portions. For example, a sieve assembly may comprise (i) a portion for receiving pre-transformed material (e.g., new and/or recycled), (ii) a portion for separating larger particles from those having the maximal FLS, (iii) a portion for receiving the sieved particles to provide to a material conveyance system (e.g., directly or via at least one container), (iv) a portion for receiving (e.g., discarding) the material (e.g., particles or agglomerates) having a FLS larger than the requested maximal FLS, (v) a portion for securing at least one sieve screen, (vi) a portion for coupling with at least one agitator (e.g., device for translating one or more sieve screens), or (vii) a portion for detection and/or monitoring performance of a sieve operation of the sieve. In some embodiments, at least two of portions (i)-(vii) are included in the same portion of the sieve assembly. In some embodiments, at least two of portions (i)-(vii) are included in different portions of the sieve assembly. In some embodiments, the sieve assembly comprises at least two of a given portion (e.g., at least two sieve portions, (ii)). In some embodiments, the pre-transformed material is sieved through a plurality of sieving assemblies are arranged in parallel (e.g., to facilitate continuous sieving, e.g., in case at least one sieving assembly of the plurality is not operational and at least one other sieving assembly of the plurality is operational). In some embodiments, a sieving assembly may comprise a plurality of sieves that are arranged sequentially, to facilitate quicker sieving. In the plurality of sieves, a given sieve has an average hole size that is larger than a sieve arranged subsequent thereto. In some embodiments at least two of the plurality of sieves are agitated by the same agitator. In some embodiments at least two of the plurality of sieves are each agitated by a different agitator.

At times, the sieve screen forms a part (e.g., portion) of a sieve cartridge. The sieve cartridge may comprise a cartridge frame. The cartridge frame may surround and/or support the sieve screen. The cartridge frame may surround the sieve screen at least in part (e.g., around a circumference of the screen). The cartridge frame may be configured to couple with an (e.g., at least one) agitator. In some embodiments, (e.g., at least one of) the agitator or the cartridge frame comprises an agitation shaft that passes through at least a portion of a securing portion (e.g., portion (v)) to form the coupling. An agitator may cause the sieve to move (e.g., directly by moving the sieve, and/or indirectly by moving the cartridge frame). The movement may comprise a translation (e.g., along an x-axis, along a y-axis, along a z-axis, or any combination thereof). The movement may comprise a vibration. The movement may comprise a rotation (e.g., about an x-axis, about a y-axis, about a z-axis, or any combination thereof). Coupling may be via at least one: threaded fastener, snap-fit fastener, press fit, and/or compression fit. In some embodiments, a perimeter of the cartridge frame is drafted (e.g., having a smaller width at one side compared to a width at an opposing side). A drafted cartridge frame may facilitate (e.g., reversible) coupling with a sieve assembly body. Reversible coupling may comprise retractable coupling (e.g., insertion and removal).

At times, at least a portion of the sieve assembly is formed for isolation (e.g., mechanical decoupling) from another (e.g., remaining) portion(s) of a sieve assembly. For example, the sieve cartridge may be (e.g., mechanically) isolated from a remainder of the sieve assembly. Isolation of the portion (e.g., the sieve cartridge) from a remainder of the sieve assembly may reduce energy transmission from the sieve cartridge (e.g., as it is agitated) to the remainder of the sieve assembly. For example, isolation may reduce the heat generated or transferred to the remaining portions of the sieve assembly (e.g., from the moving sieve cartridge). For example, isolation may reduce the sound generated by the sieve assembly (e.g., reduce compared to non-isolated sieve cartridge movement). For example, isolation may reduce vibration generated or transferred to the remaining portions of the sieve assembly (e.g., from the moving sieve cartridge). In some embodiments, isolation is produced by one or more isolation elements coupled to the at least the portion of the sieve assembly formed for isolation. The one or more isolation elements may be configured to absorb energy (e.g., mechanical, thermal, or acoustic). The one or more isolation elements may be configured to absorb vibrations, heat, and/or sound. The one or more isolation elements may comprise a gasket, bumper, spring, sponge, bellow, cloth, cork, and/or a membrane. An isolation element may be a (substantially) inelastic material that is formed in a conformation to behave as a spring (e.g., in a coil, in a wave). An isolation element may be formed of a flexible material. For example, an isolation element may absorb vibrations (e.g., in like manner to a dampened spring, felt, and/or a sponge). The flexible material may be an elastic material (e.g., comprising natural rubber, synthetic rubber, fluoropolymer elastomer, or silicone). The flexible material may be elastic (e.g., an elastomer). The flexible material may comprise an organic or silicon-based material (e.g., polymer or resin).

In some embodiments, the cartridge frame is (e.g., substantially) isolated from a remainder of the sieve assembly. Isolation may be mechanically, thermally, and/or acoustically (e.g., isolation inter terms of vibration, heat, and/or sounds). The cartridge frame may comprise (e.g., at least one) isolation element coupled with (e.g., at least one) external face of the cartridge frame. In some embodiments the isolation element surrounds an (e.g., at least a portion of the) external face of the cartridge frame. The isolation element may facilitate placement of the cartridge frame into its proper position within a sieve assembly. The isolation element may (e.g., substantially) prevent transmission of un-sieved particles to the material conveyance system. The cartridge frame may comprise at least one isolation element (e.g., bumper) disposed for the sieve cartridge to rest upon. For example, the bumper may comprise an O-ring or a plug.

At times, the sieve assembly is configured to facilitate atmospheric isolation on an interior volume of the sieve assembly. In some embodiments the sieve assembly is configured to be reversibly (e.g., substantially) sealed from an external environment (e.g., atmosphere). At times, the sieve assembly atmosphere is the same as the atmosphere in a remainder of the material conveyor system. For example, the atmosphere may be a non-reactive and/or inert atmosphere. Non-reactive may be with the pre-transformed material and/or with the transformed material (e.g., before, after and/or during printing). At times, the sieve assembly atmosphere is different than the atmosphere in a remainder of the material conveyor system. For example, the sieve assembly may comprise one or more valves for selective opening and closing of material and/or gas flow channels from the sieve assembly to other portions of the material conveyor system. The valves may be controlled manually and/or automatically (e.g., using at least one controller). For example, valves may be located above and/or below the sieve assembly (e.g., where above and below are with respect to a direction of material and/or gas flow). For example, one or more valves may be disposed upstream of one or more separating units (e.g., cyclones) that input material into the sieve assembly inlet(s) for filtering. At least two separating units that input material into the sieve assembly may be disposed in parallel and/or in series. For example, a valve may be disposed at an opening of (e.g., pressurized) container for storing filtered (e.g., sieved) particles having the maximal FLS (e.g., filtered pre-transformed material). For example, a valve may be disposed along a channel. The channel may be configured for movement of a gas within the channel. The channel may be one that connects the material conveyance system to the sieve assembly. The channel may be configured to transmit material to the sieve and/or from the sieve assembly. The valve may be disposed along the channel, at an opening of the channel, and/or at the connection of the channel with the sieving assembly. An inert atmosphere may be maintained in the (e.g., pressurized) container by closing the container valve prior to exposing any portion of the sieve assembly to external atmosphere. During operation, the atmosphere in the sieving assembly may be at or above atmospheric pressure. Atmospheric isolation of the sieve assembly may enable one or more (e.g., maintenance) operations to be performed on the sieve assembly without affecting an atmosphere in another (e.g., remaining) portion of the material conveyor system. For example, a maintenance operation may comprise a sieve cartridge insertion or removal (e.g., a sieve cartridge swap). The sieve assembly may comprise a (e.g., at least one) gas inlet channel for receiving a (e.g., inert) gas. The gas inlet channel may comprise a valve. An atmosphere of the sieve assembly may be purged following an opening and/or closure of one or more (e.g., material and/or gas channel) valves. Purging the internal atmosphere of the sieve assembly may facilitate exchange of the gaseous content of the atmosphere (e.g., from ambient atmosphere to insert atmosphere). The sieve assembly may be configured to hold a pressure above atmospheric pressure during the sieving. For example, the sieve assembly may be hermetically sealed. The sieving assembly may comprise a closable opening that is gas tight (e.g., upon closure). Gas tight may be at least during a duration of uninterrupted operation of the sieve assembly.

At times, performance of the filtering is monitored to assess one or more characteristics of the material conveyor system operation. For example, the material conveyor system characteristics may comprise (a) a rate at which a sieve assembly is filtering newly introduced and/or recycled material, (b) a rate at which discarded material is accumulating (e.g., in a removal container), (c) a rate at which filtered material is accumulating (e.g., in a storage container), or (d) a performance parameter of an agitator coupled with a sieve cartridge. The performance parameter may comprise power output from the agitator. Monitoring may include (e.g., human) inspection and/or one or more measurements by a monitoring device. The inspection can be manual and/or using a detector. The detector may comprise a sensor. The sensor may comprise a material sensor, flow sensor, or optical sensor (e.g., optical density sensor). The inspection may be facilitated using a window coupled to the sieve assembly. The window may facilitate detecting (e.g., viewing) the sieve. Filtering (e.g., sieving) performance may be considered to assess a (e.g., operating) condition of one or more components of the sieve assembly. For example, a condition of a sieve screen, an agitator, a sieve cartridge-agitator coupling, a material removal container (e.g., a trash can), a (e.g., sieved particles) material storage (e.g., pressure) container, and/or a material conveyance channel may be assessed.

At times, data regarding the filtering performance are gathered by one or more sensors. The sensor may be disposed within or outside of (e.g., adjacent to) the sieve assembly. The sensor(s) may be integrated in one or more walls of the sieve assembly. The one or more sensors may detect a material level (e.g., a fill level), a volume of material, a rate at which a material moves (e.g., is filtered and/or removed), and/or a material type. The one or more sensors may comprise a flow sensor, a distance sensor (e.g., an optical, interferometric, laser, inductance and/or capacitance), or an optical path density detector (e.g., an optical flow sensor). The one or more sensors may comprise an oxygen and/or humidity sensor. The one or more sensors may be disposed at one or more locations within a material conveyor system. For example, one or more sensors may be disposed before and/or after a sieve cartridge (e.g., with respect to the direction of a material flow). For example, the one or more sensors may be disposed in a channel, a chamber, or an opening (e.g., formed in a wall) of one or more components of the material conveyor system. For example, one or more sensors may be disposed in a chamber of the sieve assembly above a sieve cartridge and/or in a chamber below the sieve cartridge. The one or more sensors may be disposed to monitor (i) a filtered material (e.g., particles having the maximal FLS) container, (ii) a (debris and/or detritus) material removal container, and/or (iii) a sieve assembly (e.g., chamber). In some embodiments a sensor comprises a monitor of a power output of an agitator (e.g., a transducer).

Figure 15A:
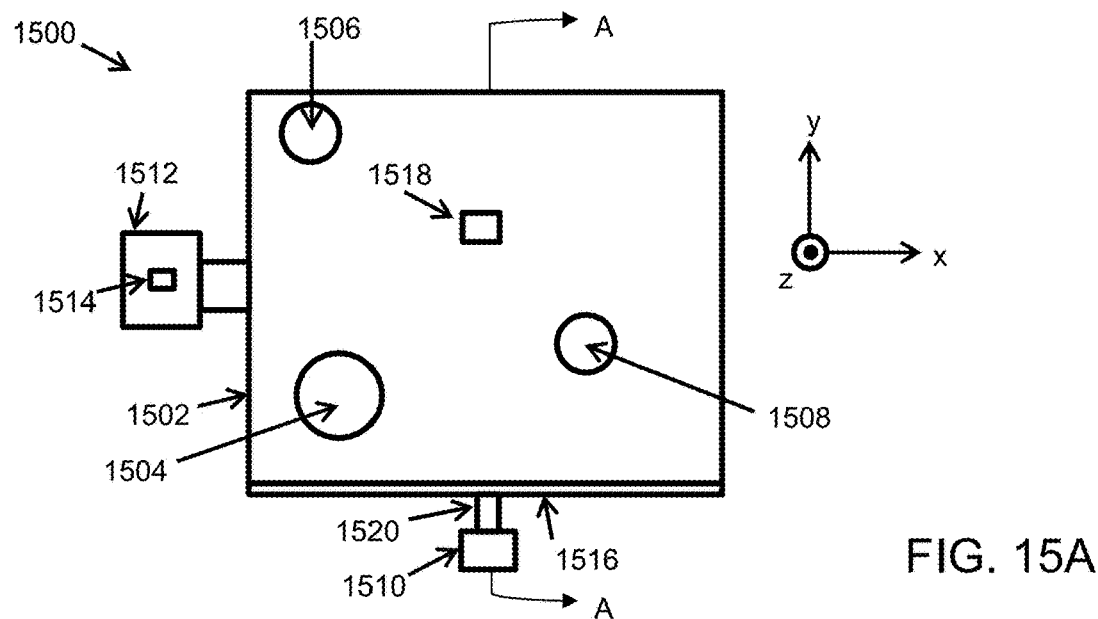
FIG. 15A schematically illustrates a top view of a component of a 3D printing system, and FIG. 15B schematically illustrates a sectional view thereof.
Figure 15B:
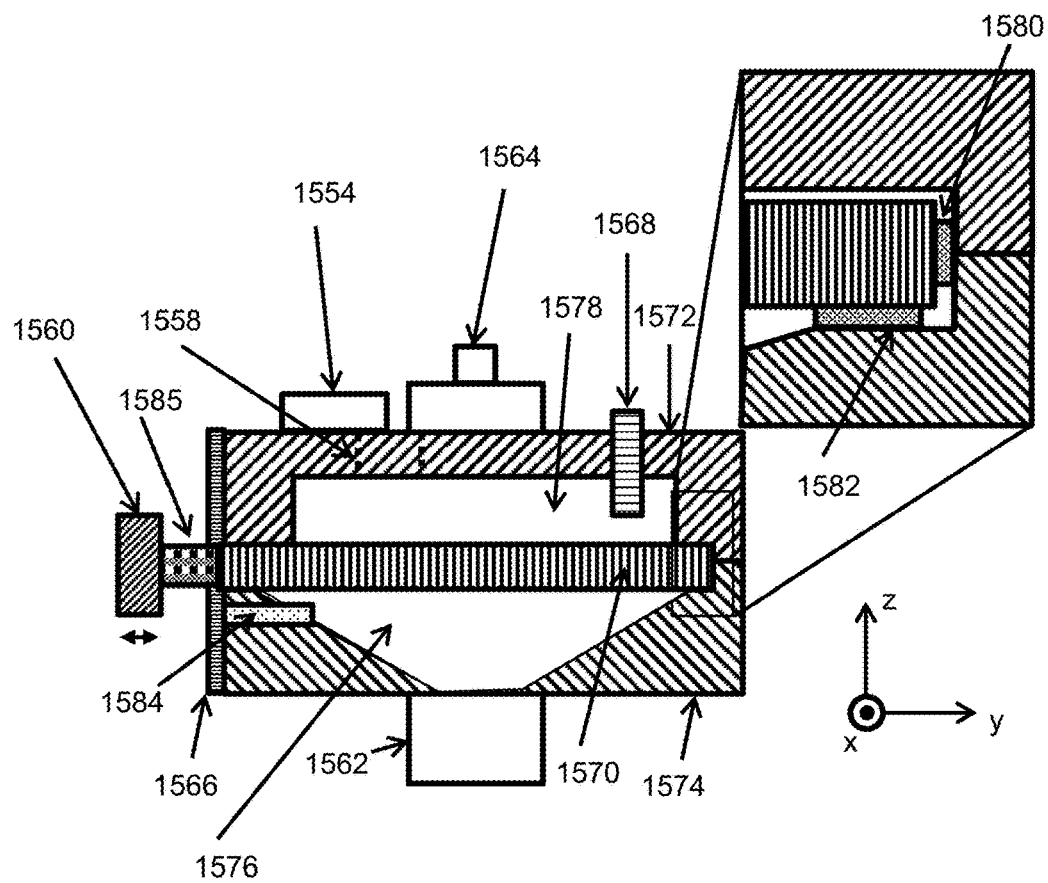

FIG. 15A depicts an example of a sieve assembly 1500 (also referred to herein as "filtering enclosure"). In the example of FIG. 15A, a first (e.g., top) portion 1502 of the sieve assembly comprises (e.g., inlet and/or fill) ports 1506 and 1508 for receiving material. The material receiving port may be elliptical or rectangular. The material receiving port may be round or elongated (e.g., along at least a portion of a face of the screen). The material received may be (e.g., newly introduced) pre-transformed material. The material received may be from another portion of the 3D printing system (e.g., from a processing chamber, e.g., from the material remover). For example, the material received may be from a separating unit (e.g., at least one cyclone) that conveys material as part of a gas flow. The material received may comprise a combination (e.g., mixture) of pre-transformed material and debris (e.g., detritus). The debris may be generated during a transformation process of the 3D printing. The pre-transformed material and/or debris may comprise inhomogeneous particle sizes. Particles above the maximal FLS may be separated by the sieve assembly and removed (e.g., to a removal container, e.g., trash can). In the example of FIG. 15A, a removal container 1512 is disposed adjacent to the (e.g., first portion of) the sieve assembly. In some embodiments the (e.g., sieve channel to the) removal container and the inlet port(s) are arranged to maximize a travel distance of the material across the sieve screen. The example of FIG. 15A depicts a removable (e.g., faceplate) portion 1516 coupled with the first portion of the sieve assembly, and an agitator 1510 coupled with the portion 1516 (e.g., via an agitator shaft 1520). In some embodiments the faceplate secures a sieve screen (e.g., cartridge) of the sieve assembly. In some embodiments the sieve cartridge is coupled with the agitator through at least a portion of the faceplate. In the example of FIG. 15A, sieve performance monitoring portions 1504 and 1518 are coupled with the first portion of the sieve assembly, and sieve performance monitoring portion 1514 is coupled with the removal container. The sieve performance monitoring portions may be configured for manual inspection (e.g., a viewing window, 1504). The sieve performance monitoring portions may comprise one or more sensors (e.g., 1518). In the example of FIG. 15B a first portion 1572 is disposed adjacent to (e.g., above) a second (e.g., bottom) portion 1574, and a separating portion (e.g., sieve cartridge) 1570 is disposed therebetween. In the example of FIG. 15B, the separating portion is coupled with an agitator 1560 via an agitator shaft 1585, which agitator shaft is operable for movement. In the example of FIG. 15B, a portion 1578 for receiving (e.g., inhomogeneous) material within the sieve assembly is formed by a region (e.g., volume) between the top portion and the sieve cartridge. The material may be introduced (e.g., fed) via one or more inlet ports (e.g., via inlet port 1558, in dashed line). FIG. 15B depicts an example of a removal container 1562 coupled with the sieve assembly. In the example of FIG. 15B, a portion 1576 for receiving sieved (e.g., particles having the maximal FLS) material within the sieve assembly is formed by a region (e.g., volume) between the bottom portion and the sieve cartridge. The portion for receiving the sieved material may comprise at least one slanted surface that facilitates translation of the sieved material to the removal container (e.g., using gravity), which slanted surface is slanted towards an opening that fluidly couples the portion for receiving the sieved material with the removal container. In some embodiments, fluid coupling refers to a connection that facilitates flow (e.g., of the pre-transformed material). FIG. 15B depicts an example of a sieve performance monitoring portion 1554 coupled with the first portion of the sieve assembly, a sieve performance monitoring portion 1568 disposed to penetrate through (e.g., a top surface) of the first portion, a sieve performance monitoring portion 1584 disposed within (e.g., to penetrate through an inner wall) of the portion for receiving the sieved material, and a sieve performance monitoring portion 1564 coupled with the removal container. In an inset, the example of FIG. 15B depicts the sieve cartridge comprising isolation elements 1580 and 1582. The isolation elements may be any isolation element as described herein. The isolation elements may be disposed on and/or in one or more faces of the sieve cartridge. The isolation elements may be in contact with the top portion of the sieve assembly, the bottom portion of the sieve assembly, the faceplate, or a combination thereof.

In some embodiments, the filtering enclosure (also referred to herein as "sieve assembly") comprises a closure (e.g., door or window) that closes the cartridge opening. In some embodiments, the filtering enclosure and the cartridge opening door engage and/or disengage (e.g., reversibly engageable and separable). In some embodiments, the door is fastened to the filtering enclosure (e.g., by a hinge or hook). In some embodiments, the apparatus further comprises a closure that is configured to close the opening. In some embodiments, the closure reduces an exposure of the mechanism housed in the ancillary chamber from a reactive agent in the ambient (e.g., external) environment. The reactive agent may comprise oxygen, or water. The reactive agent may react with the reactant (e.g., pre-transformed material) or product (e.g., transformed material) of the printing, e.g., during, before, and/or after the printing. In some embodiments, the closure comprises a flapping, rolling, sliding door, or revolving door. In some embodiments, the closure is gas tight. In some embodiments the closure and/or filtering enclosure is made of any material disclosed herein (e.g., elemental metal or metal alloy). The closure and/or filtering enclosure may be opaque (e.g., non-transparent). The closure and/or filtering enclosure may comprise at least one section that is transparent section (e.g., comprising glass or a polymer). In some embodiments, the closure is a physical barrier. In some embodiments, the closure comprises a compressible and/or elastic material that seals the closure upon the cartridge opening by pressure. The pressure is formed by a closure of at least one hinge, level, and/or screw. The pressure may be by a pressing mechanism. The pressure may be by a fastener. In some embodiments, the closure is configured to disengage from the filtering enclosure during printing of the at least one three-dimensional object. In some embodiments, the closure is configured to engage and/or disengage from the filtering enclosure during printing of the at least one three-dimensional object without (e.g., substantially) disrupting the printing. The elastic material may comprise a polymer or resin. For example, the elastic material may comprise Teflon, rubber, or latex.

Figure 16A:
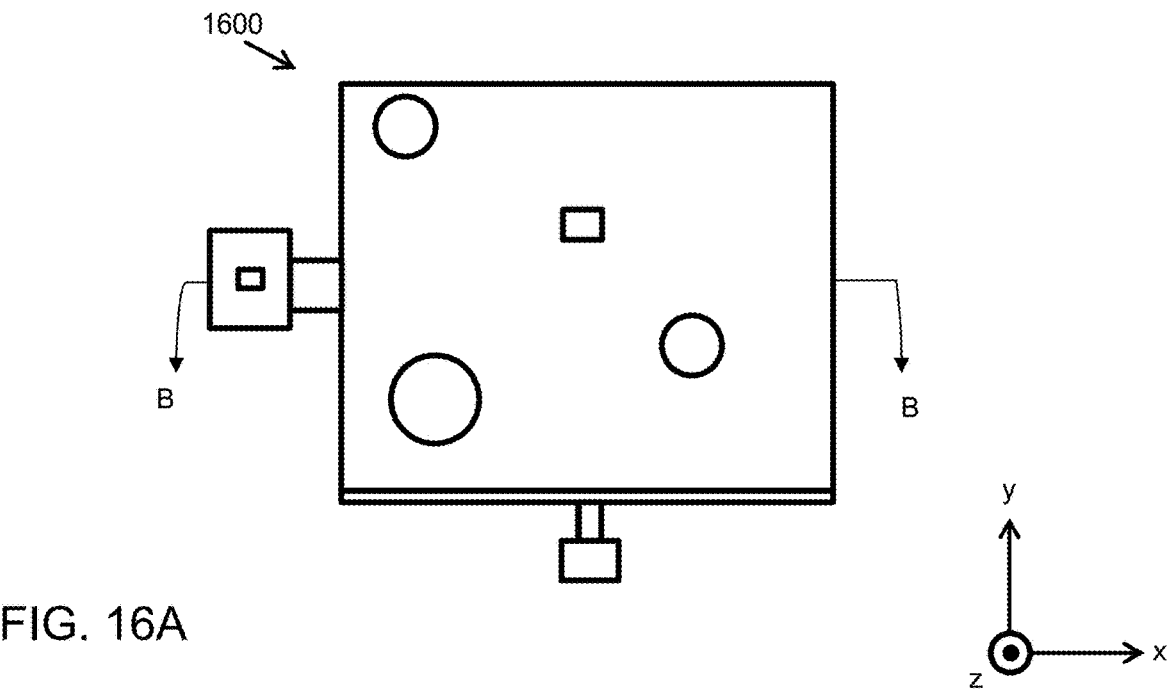
FIG. 16A schematically illustrates a top view of a component of a 3D printing system, and FIG. 16B schematically illustrates a sectional view thereof.
Figure 16B:
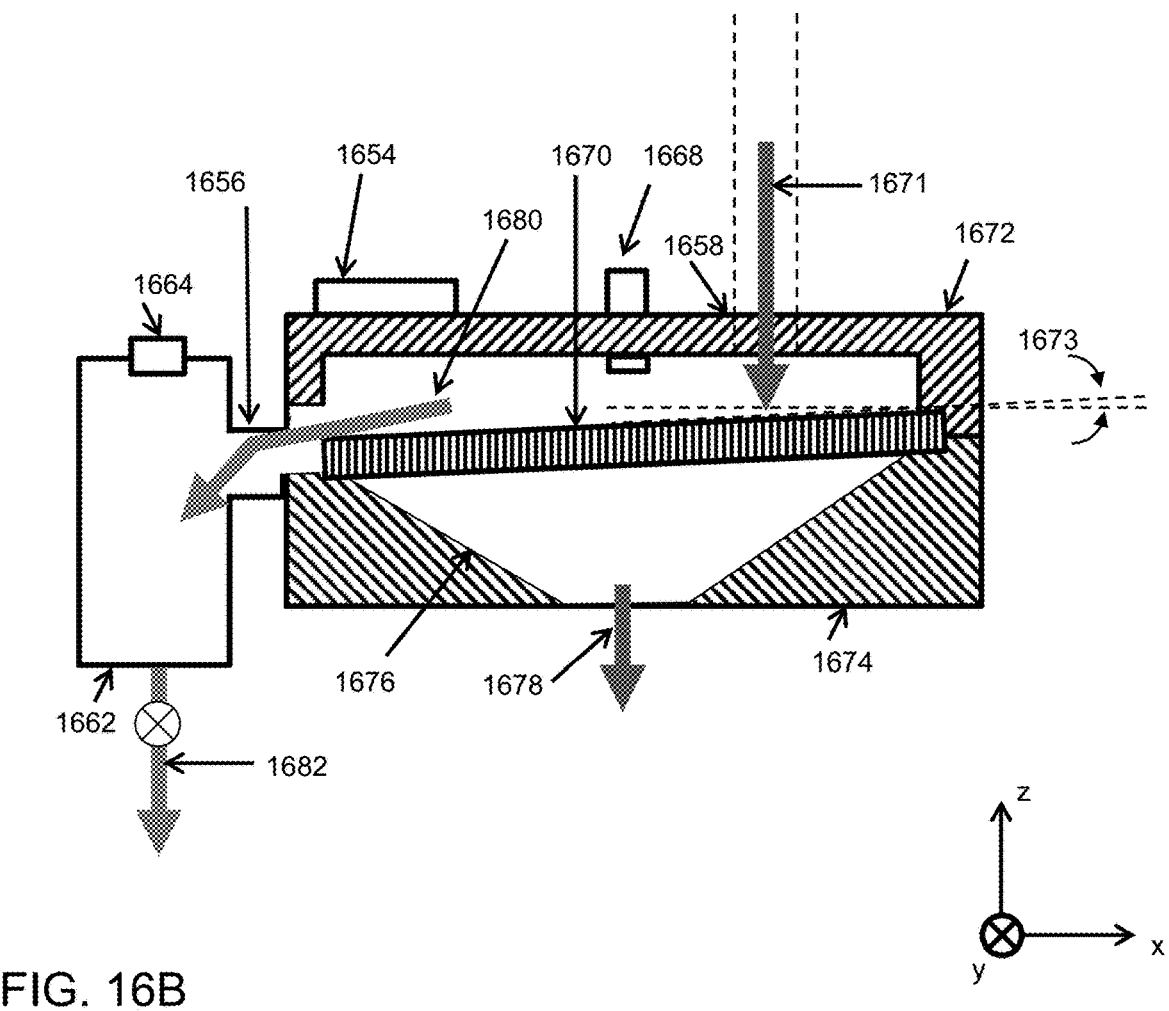

FIG. 16A depicts an example of a horizontal view of a sieve assembly 1600. FIG. 16B depicts an example of a vertical cross section of the sieve assembly depicted in FIG. 16A. The sieve assembly shown in the example of FIG. 16B, comprises a top portion 1672, a bottom portion 1674, a sieve cartridge 1670, and a removal container 1662. Bottom is in a direction of a gravitational field vector. Top is in the direction opposite to the direction of the gravitational field vector. FIG. 16B depicts an example of a material introduction path 1671 along which enters into the sieve assembly (e.g., via inlet port 1658). FIG. 16B depicts an example of a removal path 1680 from a (e.g., top) sieve cartridge surface to an interior of the removal container. In the example of FIG. 16B, an optional channel element 1656 is formed between the (e.g., body of the) sieve assembly and the removal container. In some embodiments, a removal path from the sieve assembly to the removal container is defined by one or more openings in walls between the sieve assembly and the removal container (e.g., with no channel element intervening). In some embodiments a removal path from the sieve assembly to the removal container comprises a valve that is controllably opened to receive material at the removal container, and/or controllably closed to isolate the interior of the sieve assembly. FIG. 16B depicts an example of a (e.g., debris, detritus) removal path 1682 along which discarded material is removed from the removal container. In some embodiments, the removal path comprises a valve operable for maintaining a selected atmosphere in the removal container. In some embodiments a removal container valve may be selectively (e.g., controllably) opened for removing material from the removal container. FIG. 16B depicts an example of a (e.g., sloped and/or conical) surface 1676 for receiving separated (e.g., sieved) material. For example, the lower portion of the sieve assembly may funnel filtered (e.g., particles having the maximal FLS) material toward a (e.g., pressure) container of the material conveyor system. FIG. 16B depicts an example of a material conveyance path 1678 along which separated (e.g., particles having the maximal FLS) material is removed from the sieve assembly toward (e.g., a container of) a material conveyor system. FIG. 16B depicts an example of the sieve cartridge disposed at an angle 1673. The sieve cartridge may be angled within the sieve assembly such that a portion of the sieve cartridge that is adjacent to the removal container is lower than a (e.g., remaining) portion of the sieve cartridge that is distal from the removal container. In the example of FIG. 16B, the sieve cartridge is tilted about the y-axis such that a z height of a top surface of the sieve cartridge adjacent to the removal container is lower than a z height of the top surface of the sieve cartridge that is distal from the removal container.

At times, the particles having an FLS larger than the maximal FLS comprise debris. The debris may comprise fused particles or spatter from the transformation process of the 3D printing system. Fuse may comprise molten or sintered. A removal time of the debris may comprise a period that is initiated when the debris enters the sieving assembly, or when the debris contacts the sieve screen; and is terminated when the debris is removed off the sieve screen toward the removal container (e.g., trash can). In some embodiments, the removal of larger particle sizes from atop the sieve screen may occur within at most about 5 seconds (sec), 10 sec, 30 sec, 60 sec, 2 minutes (min), or 5 min. Removal of larger particles may occur at any time within a range of the aforementioned times (e.g., at most about 5 sec to about 5 min, at most about 5 sec to about 2 min, or at most about 2 min to about 5 min). In some embodiments at least about 80%, 90%, 95% or 99% of the larger than maximal FLS particles are removed to the trash container. In some embodiments, (e.g., inadvertent) removal of (e.g., non-debris) particles having at most the maximal FLS (e.g., pre-transformed material) to the trash container is minimal. For example, a percentage of non-debris particles inadvertently removed to the trash container may be limited to at most about 0.01%, 0.05%, 0.1%, 0.3%, or 0.5% of the total volume removed. The percentage of non-debris particles inadvertently removed may be any value within a range of the aforementioned values (e.g., from about 0.01% to about 0.5%, from about 0.01% to about 0.3%, or from about 0.3% to about 0.5%). The percentage may be a volume per volume percentage.

In some embodiments, the sieve cartridge is angled (e.g., pitched) such that a region of a top surface of the sieve cartridge onto which material is input is higher than a region of the top surface of the sieve cartridge that is adjacent to the removal container. At times, a sieve cartridge disposed at an angle (e.g., tilted) increases a sieve surface area over which material is filtered, and/or facilitates self-removal of debris from the sieve. The angle may be with respect to a direction normal to the gravitational field. The angle may be with respect to the horizon. Filtering a given volume of material over an increased surface area of the sieve may increase an operating lifetime of the sieve. Material that contacts (e.g., travels across) an increased surface area of the sieve may be filtered at a faster rate by the sieve. A faster rate may be relative to a rate of material filtering for a sieve cartridge that is not tilted (e.g., upon which material impinges in a normally incident manner). For example, the sieve cartridge may be angled such that it facilitates filtering (e.g., sieving) of material to provide particle sizes having the maximal FLS, and removal of larger particle sizes (e.g., those larger than the maximal FLS). At times (e.g., debris) particles having a size larger than a fundamental length scale (FLS) of a sieve screen pore may be retained by the sieve screen (e.g., without removal therefrom). For example, the debris particles may oscillate (e.g., bounce) and/or translate (e.g., roll) within a region of the sieve screen, without being removed (e.g., to the trash can). For example, the oscillating and/or translational movement of the debris particles may comprise a component (e.g., substantially) along one axis (e.g., a vertical, or z-axis). Vertical may be parallel to a gravitational field vector. The oscillating and/or translational movement may comprise a lateral (e.g., a horizontal) component. The (e.g., retained) debris particles may cause (e.g., at least a portion of) the particles having the maximal FLS to remain above the sieve screen. For example, the debris particles may obstruct at least some of the sieve screen pores. A tilted (e.g., vibrating) surface may facilitate filtering (e.g., sieving) of the particles having the maximal FLS. A tilted vibrating surface may facilitate movement of the debris particles along a given (e.g., horizontal) axis. The tilt may be with respect to the vertical or z-axis. The tilt may be with respect to the horizontal (e.g., X or Y axis). For example, a tilted vibrating surface may impart a force to the debris particles along the given axis. The force may facilitate movement of material along to the sieve screen. For example, the tilt may increase an area (e.g., of the sieve screen) over which material is filtered. For example, the tilt may facilitate movement of the debris particles toward the trash can. The force(s) imparted to the debris particles may depend upon an angle at which the sieve screen is tilted. The angle may be selected such that the filtering (e.g., of the maximal FLS particles) and removal (e.g., of the debris particles) occur (e.g., substantially) simultaneously. For example, the angle may be at least about 0.5 degrees (deg.), 1 deg., 1.5 deg., 2 deg., 3 deg., 5 deg., or 10 deg. with respect to a direction normal to the gravitational field (e.g. a horizontal direction). The angle may be any angle within the aforementioned angles (e.g., from at least about 0.5 deg. to about 10 deg., about 0.5 deg. to about 5 deg., or about 5 deg. to about 10 deg.). In some embodiments, the angle of the sieve cartridge is variable (e.g., before, after, and/or during sieving). In some embodiments, the (e.g., variable) angle is selected according to a relationship between the retained (e.g., filtered, sieved) particle size(s) and the larger (e.g., debris, detritus) particles sizes. For example, the relationship may be a ratio of (e.g., the fundamental length scale, FLS) of the (e.g., respective) particle sizes.

At times, a variable sieve cartridge angle is achieved by one or more elements coupled with or disposed adjacent to the sieve cartridge. For example, at least one pin, screw, threaded fastener, expandable membrane (e.g., bladder), bellow, gear, and/or actuator may be adjusted to cause the angle of the sieve cartridge to vary. For example, a bladder may be disposed below (e.g., a perimeter) of the sieve cartridge, wherein an expansion of one or more portions of the bladder causes the sieve cartridge to tilt (e.g., pitch) in a selected direction and magnitude. The variable angle of the sieve cartridge may be controlled (e.g., before, after, and/or during sieving). The controlling may be done manually and/or automatically. The controlling may be performed before, after, and/or during at least a portion of the 3D printing. The controlling may be performed before, after, and/or during the operation of the pre-transformed material conveyor system.

At times, one or more controllers are configured to control (e.g., direct) one or more apparatuses and/or operations. Control may comprise regulate, modulate, adjust, maintain, alter, change, govern, manage, restrain, restrict, direct guide, oversee, manage, preserve, sustain, restrain, temper, or vary. The control configuration (e.g., "configured to") may comprise programming. The configuration may comprise facilitating (e.g., and directing) an action or a force. The force may be magnetic, electric, pneumatic, hydraulic, and/or mechanic. Facilitating may comprise allowing use of ambient (e.g., external) forces (e.g., gravity). Facilitating may comprise alerting to and/or allowing: usage of a manual force and/or action. Alerting may comprise signaling (e.g., directing a signal) comprising a visual, auditory, olfactory, or a tactile signal.

In some embodiments, at least a portion of the sieve assembly is formed to be reversibly retractable within the 3D printing system. For example, the sieve cartridge may be reversibly retractable. For example, the sieve may be included in a retractable cassette. A reversibly retractable sieve cartridge may enable a replacement of a sieve cartridge in the sieve assembly (e.g., in real time during printing and/or during operation of the material conveyance system). The replacement may be in response to a (e.g., detected) failure condition and/or at a predetermined time. In some embodiments, a replacement may comprise a swap operation. A swap operation may be performed while maintaining an inert atmosphere in a remainder of the material conveyor system and/or the 3D printing system. A swap operation may comprise the following operations: (i) closure of gas and/or material channel valve(s) that are upstream and downstream of the sieve cartridge chamber (e.g., isolation of sieve cartridge chamber from a remainder of material conveyor system); (ii) de-coupling and removal of the agitator; (iii) removal of the faceplate; (iv) removal and replacement of a (e.g., at least one) sieve cartridge from the sieve cartridge chamber; (v) replacement of the faceplate; (vi) coupling and replacement of the agitator; and (vii) opening of the gas and/or material channel valves coupled with the sieve cartridge chamber.

Figure 22A:
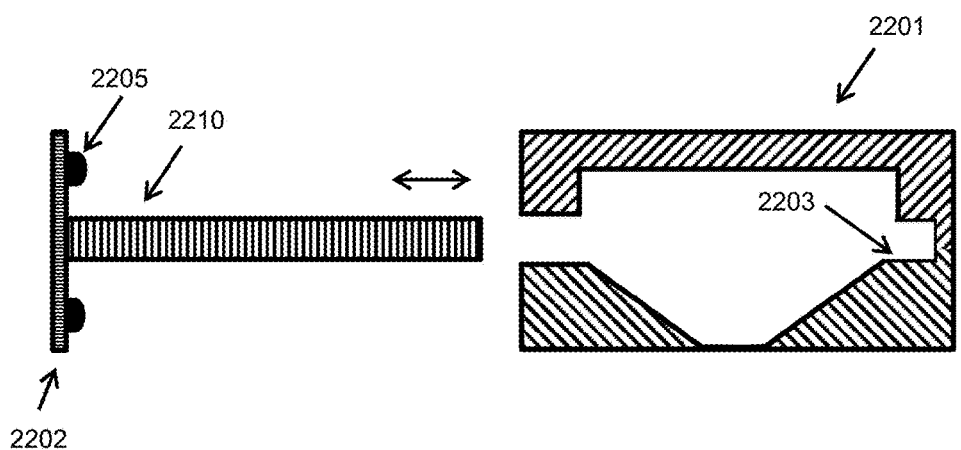
FIGS. 22A-22C schematically illustrate variations of a component of a 3D printing system.
Figure 22B:
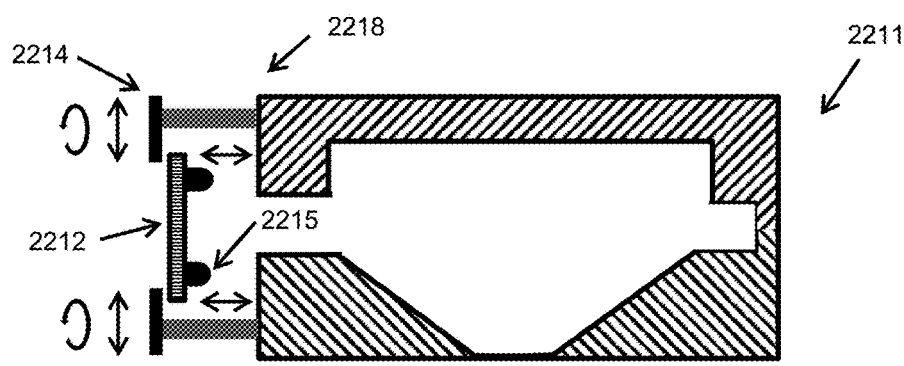
Figure 22C:
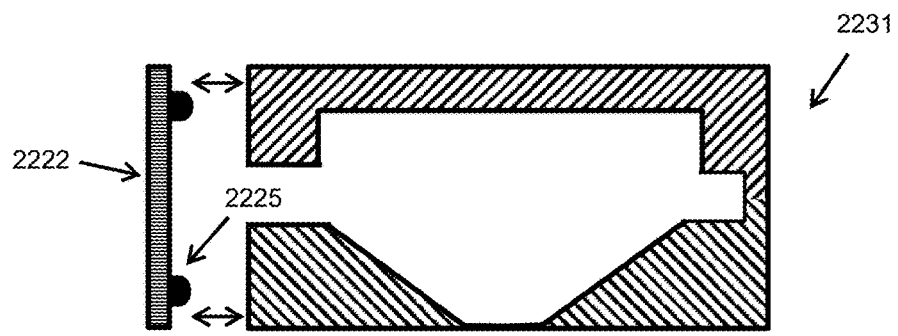

FIGS. 22A-22B depicts examples of a sealing a sieve assembly internal volume with a faceplate. In some embodiments the faceplate is adapted to hermetically seal an internal volume of the sieve assembly (e.g., by one or more seals). In some embodiments a sieving cartridge is operable for reversible insertion (e.g., engagement) within the internal volume of the sieve assembly. In some embodiments a faceplate (e.g., portion) is configured for reversible coupling with the sieve assembly. In some embodiments, the faceplate is sized to be larger than (e.g., to fully cover) a sieve cartridge opening in a face of the sieve assembly. The faceplate may be sized to be (e.g., substantially) a same size, to be larger than, or to be smaller than, the size of a face of the sieve assembly to which it couples. The reversible coupling may comprise (e.g., hermetically) sealing (e.g., when the faceplate is fully coupled and/or engaged with the sieve assembly). FIG. 22A depicts an example of a sieve assembly enclosure 2201 having a surface (e.g., a ledge) 2203 configured for securing a (e.g., inserted) sieve cartridge (e.g., 2210). The example sieve cartridge 2210 comprises a seal 2205 and a faceplate portion 2202, integrally formed with the sieve cartridge. The sieve cartridge may be reversibly engageable with the sieve assembly (e.g., FIG. 22A, double-headed arrow). In the example of FIG. 22A the sieve cartridge, upon (e.g., complete) insertion into the sieve assembly enclosure, In some embodiments, the faceplate forms a separate portion from the sieve assembly and/or the sieve cartridge. In some embodiments, the faceplate portion may be controlled to couple and to de-couple (e.g., detach) from the sieve assembly. One or more coupling members may be disposed on the sieve assembly and/or the faceplate, the coupling members configured to reversibly secure the faceplate to the sieve assembly. The coupling members may comprise a lever, a pin, a threaded fastener, a flap, a button, a valve, or a spring. To reversibly secure may comprise, (i) in a secured position, mating a face of the faceplate with a (e.g., corresponding) face of a sieve assembly to seal the sieve assembly, and (ii) in an open (e.g., released) position, freeing the faceplate from the sieve assembly. In some embodiments, the freeing comprises maintaining at least one coupling between the faceplate and the sieve assembly. In some embodiments, the freeing comprises removal of the faceplate from the sieve assembly. Control may be manual and/or automatic. Control may be by at least one controller. Control may comprise manipulation of at least one coupling member by a control member (e.g., comprising an actuator, a motor, a drive, or a pump). FIG. 22B depicts an example of a sieve assembly 2211 having a reversibly attachable (e.g., coupled) faceplate 2212, the faceplate having one or more seals 2215. In the example of FIG. 22B a coupling member 2214 is attached to the sieve assembly, and to a control member 2218. The control member may be operable to cause the coupling member to move to (e.g., controllably) adjust a position of the faceplate. To move may comprise to turn (e.g., FIG. 22B, semi-circular arrows), extend, retract, flex, or translate (e.g., FIG. 22B, vertical double-headed arrows). FIG. 22C depicts an example of a sieve assembly 2231 with a faceplate 2222 comprising seals 2225. In the example of FIG. 22C the faceplate is sized to be (e.g., substantially) the same size as the face of the sieve assembly.

At times, a swap operation comprises removal of (e.g., at least a first) sieve cartridge and replacement with (e.g., at least a second) sieve cartridge. The sieve cartridge may be one of at least two sieve cartridges of a sieve assembly. The at least two cartridges may comprise an arrangement that is in series. In some embodiments, at least one sieve cartridge continues to operate during a swap of a (e.g., at least one) parallel sieve cartridge. For example, a parallel sieve cartridge may be disposed within a parallel chamber of the sieve assembly. At least two parallel chambers of the sieve assembly may be configured to be isolated (e.g., atmospherically) from one another and from a remainder of the material conveyor system. In some embodiments, at least two (e.g., parallel and/or serial) sieve cartridges are replaced during a swap operation.

At times, a swap operation is performed in a (e.g., relatively) short time period. For example, a short time period may be at most about 20 minutes, 15 minutes, 10 minutes, or 5 minutes from the initiation of the swap to termination of the swap. Termination of the swap may be when the sieve assembly initiates sieving. The initiation of the swap may be when an exchange is determined (e.g., when a fault in the sieving is detected, and/or when the swap is scheduled). A short time period for a sieve cartridge swap operation may be any value of the aforementioned values (e.g., from about 20 minutes to about 5 minutes, from about 20 minutes to about 10 minutes, or from about 10 minutes to about 5 minutes). In some embodiments, the sieve screen is removable from the sieve cartridge frame. For example, the sieve screen and/or cartridge may be a consumable of the 3D printing system. The sieve screen may be coupled with the sieve cartridge frame via a glue, a (e.g., at least one) fastener, and/or by press fit (e.g., snap fit). In some embodiments, a swap operation comprises removal of a (e.g., first) sieve screen coupled with a sieve cartridge, and replacement with a (e.g., second) sieve screen.

At times, the sieve cartridge comprises one or more elements to reduce (e.g., prevent) sag of a sieve screen (e.g., during sieving). In some embodiments, the one or more elements comprise support structures coupled to the sieve screen and/or to the cartridge frame. The support structure(s) may support the sieve screen (e.g., during sieving). The support structures may be located at one or more portions of the sieve screen that correspond to one or more material inlets. For example, the support structures may be disposed (e.g., directly) below inlet ports of an upper portion of the sieve assembly when the sieve cartridge is inserted in the sieve assembly. The support structures may comprise a bar or a frame. The support structures may comprise a durable material (e.g., durable for filtering metallic particles). The support structures may be affixed to a surrounding frame and/or to the sieve mesh.

Figure 17A:
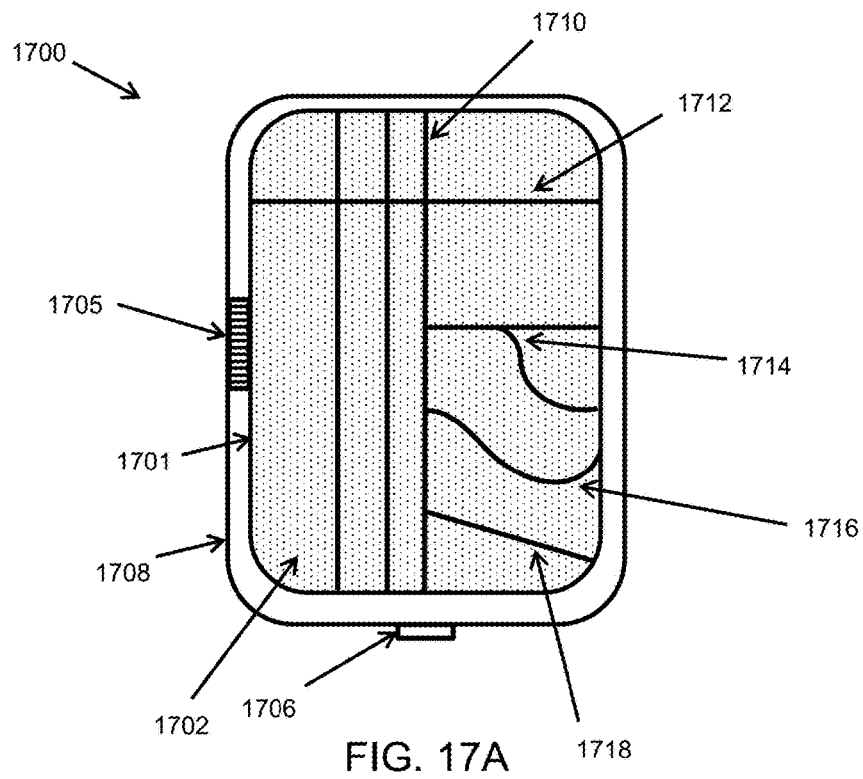
FIGS. 17A-17D schematically illustrate variations of a component of a 3D printing system.
Figure 17B:
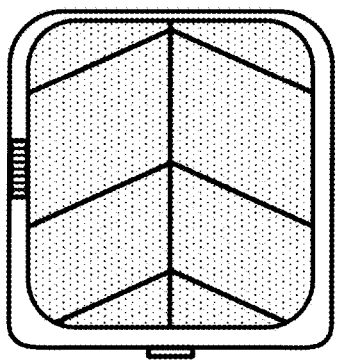
Figure 17C:
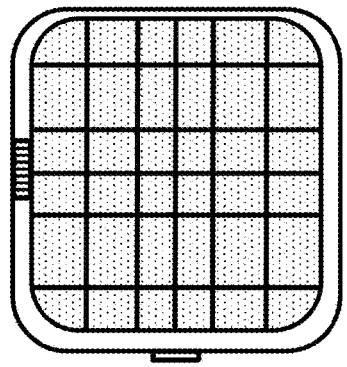
Figure 17D:
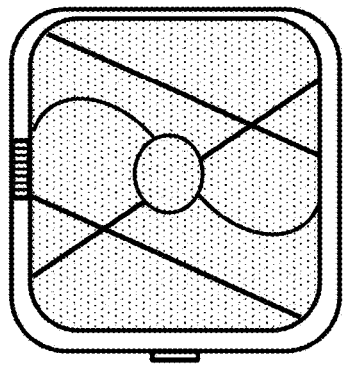

FIG. 17A depicts an example of horizontal view of a sieve cartridge 1700 comprising a mesh 1701 disposed within a surrounding frame 1708. In the example of FIG. 17A the sieve cartridge comprises: a portion 1705 that is configured for (e.g., debris, or detritus) material removal (e.g., toward a removal container); a portion 1706 that is configured for coupling with an agitator (e.g., agitator shaft); a region 1702 of the sieve mesh that is devoid of support structures; and a plurality of support structures disposed across the sieve mesh (e.g., 1710, 1712, 1714, 1716, and 1718). The support structure(s) may span a (e.g., an entire) long axis of a sieve mesh (e.g., 1710). The support structure(s) may span a (e.g., an entire) short axis of a sieve mesh (e.g., 1712). The support structure(s) may span a portion of a sieve mesh and/or form a junction with one or more other support structures (e.g., 1714). The support structure may comprise a (e.g., substantially) straight structure. The support structure may comprise a curve (e.g., 1716). The support structure may be disposed at an angle to another support structure (e.g., 1718) and/or frame face. In some embodiments, a plurality of support structures is disposed across the sieve mesh. The plurality of support structures may be (substantially) evenly distributed. The plurality of support structures may be unevenly (e.g., sparsely) distributed. In some embodiments, a larger number of support structures are disposed in a region of the sieve cartridge that is distal from the removal region (e.g., distal from 1705). At least one support structure may be disposed below an entry opening of the material (e.g., to reduce impact of the sieve by the incoming material). FIGS. 17B-17D depict examples of various support structure arrangements of sieve cartridges. The support structure may resemble a rib cage. The support structure may form an (e.g., organized) array and/or pattern. At least two of the support structures may be evenly distributed. At least two of the support structures may be parallel to each other. At least two of the support structures may form an angle (e.g., right angle).

In some embodiments, filtering comprises monitoring the flow of the sieved or incoming material. The filtering performance monitoring may comprise a feedback in a filtering control system (e.g., to a controller). For example, a filtering controller may comprise control of (a) the agitator that is operable to move the sieve cartridge, (b) a variable angle of a sieve cartridge, (c) an insertion/removal (e.g., swap) operation of a sieve cartridge, (d) a (e.g., debris) removal operation from the removal container, or (e) an atmospheric purge (e.g., to provide an inert atmosphere) of the sieve assembly.

Figure 18:
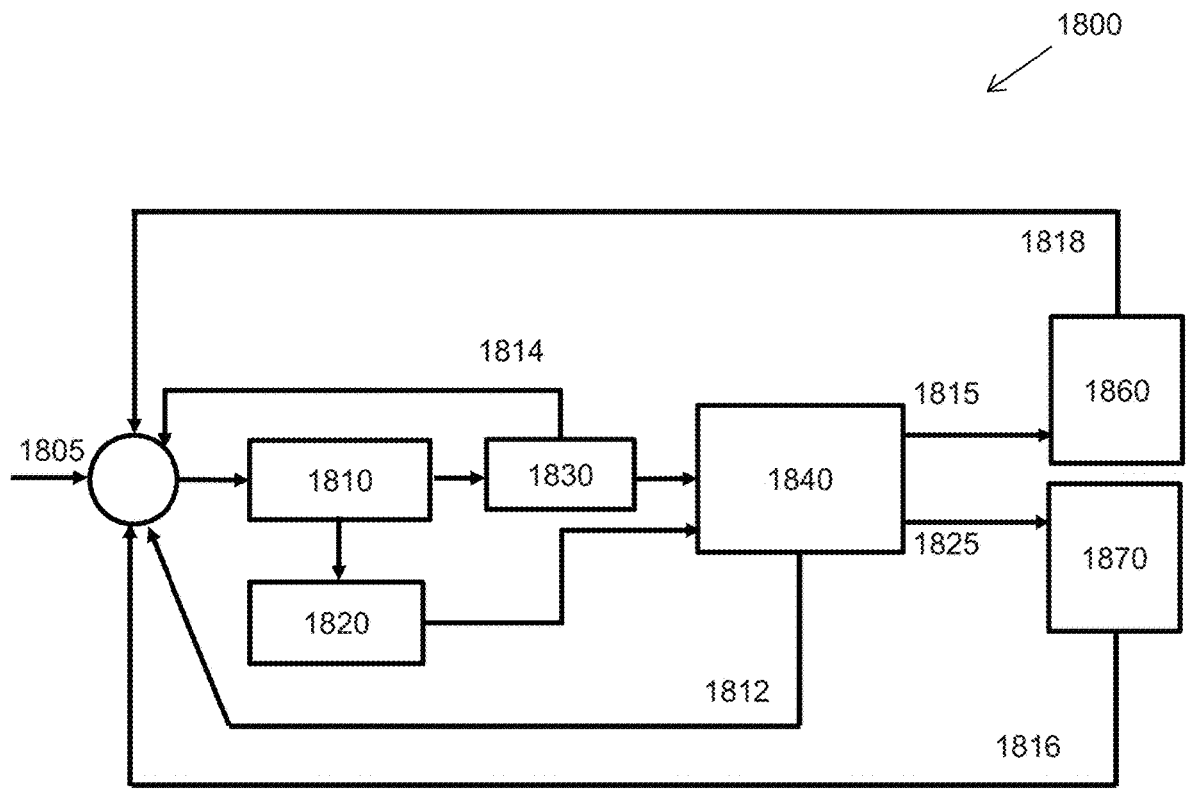
FIG. 18 schematically illustrates a control scheme of a 3D printing system.

FIG. 18 depicts an example of a sieve assembly control system 1800. The control system may comprise (e.g., at least one) controller. The controller may comprise electrical circuitry and/or a connection to electrical power. The controller may be programmed to implement methods of the disclosure. In the example of FIG. 18 a controller 1810 receives instructions 1805 regarding operation of the sieve assembly system. For example, the instructions may comprise activation and/or deactivation of the agitator and/or of one or more valves in the sieve assembly system. In the example of FIG. 18, the controller is operatively coupled with an agitator 1830, a sieve cartridge changeover (e.g., swap) unit 1820, a sieve assembly 1840, a (e.g., debris) removal container 1860 (e.g., a trash can), and a (e.g., sieved) material container 1870. The cartridge exchange may be manual and/or automatic. For example, the sieve cartridge swap unit may comprise a robotic arm. Considering the received instructions, the controller may cause (I) the agitator to move at a selected amplitude and/or frequency (e.g., of oscillation), and/or (II) one or more valves to open and/or close. The one or more valves may be operable to introduce and/or prevent a flow of (e.g., inert) gas and/or a (e.g., unfiltered) material. For example, the controller may command the agitator to output power of a selected magnitude and/or frequency to move at the selected amplitude and/or frequency. The agitator may be operatively coupled with at least a portion of the sieve assembly (e.g., the sieve cartridge). For example, the controller may command a material inlet valve (e.g., to the sieve assembly), a material removal valve, and a material outlet valve (e.g., to a storage container) to open and/or close. In the example of FIG. 18, instructions 1815 control operation of a (e.g., at least one) valve disposed within a channel between from the sieve assembly to the trash can. In the example of FIG. 18, instructions 1825 control operation of a (e.g., at least one) valve disposed within a channel from the sieve assembly to a (e.g., sieved) material container. The sieve assembly control may comprise feedback from one or more sensors disposed within or adjacent to one or more components of the sieve assembly system. For example, a sensor may be a material level sensor, a material (e.g., flow) rate sensor, and/or a power (e.g., output) sensor. In the example of FIG. 18 feedback data 1812 comprise information regarding (a) a material level at a top surface of a sieve cartridge, (b) a material flow (e.g., flux) through the sieve cartridge, and/or (c) a sieve cartridge movement amplitude and/or frequency. In the example of FIG. 18 feedback data 1814 comprise information regarding an agitator output power parameter (e.g., wattage, voltage, and/or current) for moving the sieve cartridge at the selected amplitude and/or frequency. For example, the agitator output power to maintain a given sieve cartridge movement may vary according to a varying (e.g., inertial mass) condition of the sieve cartridge. A varying inertial mass of the sieve cartridge may be due to a material buildup on (e.g., a top surface of) the sieve cartridge, and/or within (e.g., pores of) the sieve cartridge. In the example of FIG. 18, feedback data 1816 comprise information regarding a material level within and/or a material flux into the (e.g., sieved) material container; and feedback data 1818 comprise information regarding a material level within and/or a material flux into the removal container.

At times, the controller is configured to detect an operating state of the sieve assembly. For example, the operating state may be determined considering feedback from the one or more sensors. The operating state may be: (A) a nominal condition; or (B) a failure condition. The failure condition may comprise (i) an obstructed sieve screen, (ii) a punctured sieve screen, and/or (iii) a de-coupling of the sieve screen and the agitator (e.g., shaft). The material level and/or material flux (e.g., flow rate) at or into respective portions of the sieve assembly may comprise (e.g., characteristic) threshold values. The threshold values may be indicative of operation in a nominal condition. A high or low value may be determined considering a comparison to a given threshold value (e.g., at a respective sieve assembly portion). For example, an obstructed sieve screen condition may be detected based on feedback indicative of (a) a high material level in the top portion of the sieve assembly, (b) a low material flow rate into the bottom portion of the sieve assembly, (c) a high material flow rate into the removal container, and/or (d) an increased power output required by the agitator to maintain a given amplitude of movement. For example, a punctured sieve screen condition may be detected based on feedback indicative of (e) a high material flow rate into the bottom portion of the sieve assembly, (f) a high material flow rate into the (e.g., sieved) material container), and/or (g) a decreased power output required by the agitator to maintain a given amplitude of movement. For example, a de-coupling (e.g., de-coupled) sieve screen from an agitator condition may be detected based on feedback indicative (h) a decreased power output required by the agitator to maintain a given amplitude of movement. In some embodiments, an operating state is determined considering feedback from a combination of sensors. For example, feedback from at least two sensors of a plurality of sensors may be considered in the determination of the operating state. For example, feedback from at least two portions of the sieve assembly is considered in the determination of the operating state.

In some embodiments, the controller is a part of a (e.g., high-speed) computing environment. The computing environment may be any computing environment described herein. The computing environment may be any computer and/or processor described herein. The controller may control (e.g., alter, adjust) the parameters of the components of the 3D printer (e.g., before, after, and/or during at least a portion of the 3D printing). The control (e.g., open loop control) may comprise a calculation. The control may comprise a feedback loop control scheme. In some examples, the control scheme may comprise at least two of (i) open loop (e.g., empirical calculations), and (ii) closed loop (e.g., feed forward and/or feedback loop) control scheme. In some examples, the feedback loop(s) control scheme comprises one or more comparisons with an input parameter and/or threshold. The threshold may be a value, or a relationship (e.g., curve, e.g., function). The threshold may comprise a calculated (e.g., predicted) threshold (e.g., setpoint) value. The threshold may comprise adjustment according to the closed loop and/or feedback control. The controller may use a material level and/or a material flow rate measurement of at least one portion of the sieve assembly. The controller may direct adjustment of one or more systems and/or apparatuses in the 3D printing system. For example, the controller may direct adjustment of an angle at which a sieve cartridge is tilted within a sieve assembly, a flow rate of the material into the sieve assembly, and/or an agitator parameter. The agitation parameter may comprise frequency or amplitude of the agitation. For example, the controller may direct adjustment of (e.g., an amplitude and/or a frequency of) a sieve cartridge movement.

At times, the controller is configured to adjust one or more components and/or parameters of the sieve assembly in response to a detected condition. The adjustment may be performed in real time (e.g., before, during, and/or following at least a portion of the 3D printing). In some embodiments, in response to a detected sieve screen obstruction, the controller may be configured to (I) adjust an angle (e.g., tilt) at which the sieve cartridge is disposed within the sieve assembly, (II) adjust an agitator parameter (e.g., power output) to alter a sieve cartridge movement amplitude, and/or (III) initiate a sieve cartridge swap operation. In some embodiments, in response to a detected sieve puncture the controller may be configured to initiate a sieve cartridge swap operation. A sieve cartridge swap operation may be manual and/or automatic. For example, a sieve cartridge swap operation may be facilitated by a robot (e.g., robotic arm). In some embodiments, in response to a detected de-coupling of the sieve cartridge and the agitator the controller may be configured to initiate a maintenance operation. The maintenance operation may comprise coupling (e.g., re-coupling) the agitator (e.g., shaft) and the sieve cartridge. The maintenance operation may be manual and/or automatic.

At times, a build module of a 3D printing system is configured for operational coupling (e.g., engagement) with an unpacking station. The unpacking station may be any unpacking station that is disclosed in Patent Application Serial Number PCT/US17/39422, titled "THREE-DIMENSIONAL PRINTING AND THREE-DIMENSIONAL PRINTERS," filed on Jun. 27, 2017, which is incorporated herein by reference in its entirety. The unpacking station may be configured to engage with at least one build module (e.g., FIG. 19, 1930). The unpacking station may be configured to manipulate (e.g., insert and/or remove) at least one build module to an unpacking chamber. The build module may comprise a platform upon which a 3D object (e.g., FIG. 19, 1906) formed by the 3D printing rests and/or is attached. The build module may comprise (e.g., un-transformed) pre-transformed material disposed surrounding the formed 3D object (e.g., a material collection, FIG. 19, 1908). The unpacking station may be configured to remove (e.g., separate) a formed 3D object from a build plate (e.g., of the build module). The unpacking station may be configured to remove (e.g., recycle) at least some of the pre-transformed material from the build module. The unpacking may comprise a manipulator arm that is configured to grasp and to move a 3D object formed by the 3D printing and/or a build module. The unpacking may be a glove box that is configured to allow an operator in an ambient environment to grasp and to move a 3D object located in an environment different from ambient (e.g., an inert environment). The unpacking station may comprise a gas conveyor system. The unpacking station may comprise an unpacking material conveyor system. The gas and/or material conveyor systems may comprise at least one compressor, at least one blower, or at least one valve. In some embodiments, the unpacking material conveyor system forms a part of a material conveyor system of a coupled 3D printing system. In some embodiments, the unpacking material conveyor system is separate (e.g., distinct) from a material conveyor system of a coupled 3D printing system. The unpacking material conveyor system may comprise any of the components and/or any of the component arrangements of the 3D printing system material conveyor system(s) described herein.

Figure 19:
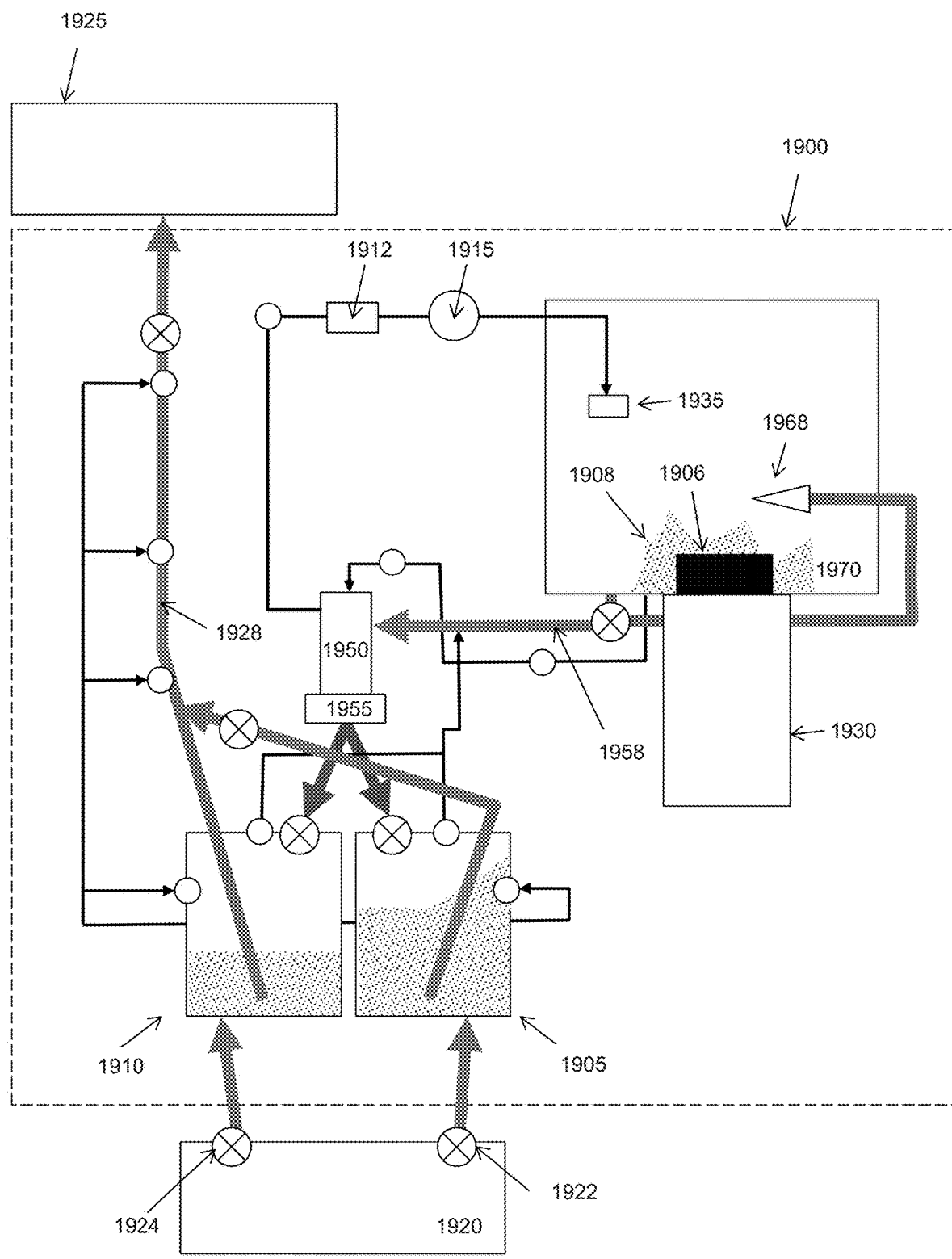
FIG. 19 schematically illustrates components of a 3D printing system.

FIG. 19 depicts an example of a (e.g., pre-transformed) material conveyor system coupled to an unpacking chamber (e.g., 1970) of an unpacking station 1900. The material conveyor system may comprise at least one pressure container. The example of FIG. 19 depicts two pressure containers (e.g., 1905 and 1910). At least one pressure container may contain pre-transformed material (e.g., during operation of the material conveyor). At least one pressure container may contain a low amount of pre-transformed material (e.g., no pre-transformed material) during operation of the material conveyor. The pre-transformed material may be inserted into the two pressure containers from an external material source (e.g., a bulk feed 1920) and/or from at least one (e.g., sieve assembly) separator (e.g., 1955). A bulk feed reservoir may provide material to the pressure container(s) via a coupling with a separator (e.g., cyclonic) and/or the unpacking chamber (e.g., via the vacuum wand). The pre-transformed material may be inserted into at least two pressure containers (e.g., substantially) simultaneously. The pre-transformed material may be inserted into at least two pressure containers alternatingly. The pre-transformed material may be inserted into at least two pressure containers in a (e.g., predetermined) sequence. The insertion of the pre-transformed material into the pressure container may be controlled. Control may comprise using one or more valves (e.g., 1922, and/or 1924). The valves may be any valve described herein. In some examples, the unpacking station material conveyor system may comprise a plurality of gas conveying channels. At least two of the plurality of gas conveying channels may have at least one channel characteristic that is (e.g., substantially) the same. At least two of the plurality of gas conveying channels may have at least one channel characteristic that is different. The gas conveying channel may convey gas to one or more components of the unpacking station material conveyor system. The gas may comprise a pressure. The gas conveying channel may equilibrate pressure and/or content within one or more components of the unpacking station material conveyor system. For example, a gas conveying channel may equilibrate a first atmosphere within an unpacking chamber with a second atmosphere (e.g., of the bulk reservoir and/or of the pressure container(s)). The first atmosphere and/or second atmosphere may be a (e.g., substantially) inert atmosphere. The gas conveying channel may be operatively coupled (e.g., fluidly connected) to at least one of the material conveying channel(s), the pressure container(s), the unpacking chamber, the cyclone separator, the sieve assembly, the trash container, and/or the bulk reservoir.

In the example of FIG. 19a suction mechanism 1968 (e.g., vacuum wand) is configured to remove material from a material collection 1908 within the unpacking chamber. The suction mechanism may be operatively (e.g., fluidly) coupled with at least one accelerated gas mechanism (e.g., a blower, a fan, or a pump). A fluid coupling may comprise a coupling that facilitates a flow therethrough of (i) a fluid, (ii) a gas, (iii) a plasma, or (iv) any combination thereof. A fluid may comprise a mixture of a solid (e.g., phase) material and a liquid or a gas. The accelerated gas mechanism may be operable to establish a pressure gradient within a channel (e.g., a gas conveyor channel and/or a material conveyor channel). A pressure gradient may facilitate movement of a gas and/or a material in the channel. The material may be removed from around (e.g., surrounding) a formed object coupled with the build module. The material may be removed from a surface of the unpacking chamber (e.g., a bottom surface, where bottom is with respect to a gravitational field vector). The removed material may be conveyed to a separator by a channel (e.g., 1958). The material collection may comprise pre-transformed material (e.g., that surrounds a formed 3D object), debris, and/or soot. The material collection 1908 may be coupled with and/or deposited by a build module engaged with the unpacking station. In some embodiments, one or more mechanisms may be used to facilitate material removal from (e.g., a surrounding of) the formed 3D object within the unpacking chamber. The unpacking station may be operatively coupled to an accelerated gas mechanism (e.g., a blower, a fan, or a pump). The accelerated gas mechanism may intake a gas from one of its sides (e.g., suck the gas), and eject the gas from another of its sides (e.g., blow the gas out). The other side may oppose the first side. In the example of FIG. 19 an accelerated gas mechanism 1935 (e.g., a blow-off wand) is disposed to direct a positively pressurized gas toward a 3D object to separate (e.g., loosen) material surrounding the 3D object. In some embodiments, the removed material is provided to a (e.g., first) separator 1950 (e.g., a cyclone separator). In some embodiments, a (e.g., cyclonic) separator is fluidly coupled with the blow-off wand. For example, a blower may be disposed in a channel between the cyclone separator and the blow-off wand. The channel may comprise one or more valves. The channel may comprise one or more filters. In the example of FIG. 19 a filter 1912 is disposed between the separator and a blower 1915. The one or more filters may filter any materials (e.g., soot) remaining in the gas following separation by the first (e.g., cyclonic) separator. In some embodiments, the material conveyor comprises at least two cyclone separators. The at least two cyclones may be coupled in parallel and/or in series. In the example of FIG. 19 a (e.g., second) separator 1955 (e.g., a sieve assembly) is coupled with the separator 1950. In some embodiments, the material conveyor system comprises at least two sieve assemblies. The at least two sieve assemblies may be coupled in parallel and/or in series. A sieve assembly may be coupled with a material removal (e.g., trash) container. The sieve assembly may be configured to remove debris from the (e.g., pre-transformed) material (e.g., to the trash container). The sieve assembly may provide (e.g., filtered) sieved material to the pressure container(s).

In some embodiments, a pressure container contains one or more sensors configured to detect a material level within and/or a material flux into the pressure container. The one or more sensors can be any sensor as described herein. In response to a (e.g., detected) filled condition of a pressure container, the unpacking station may be configured to remove at least a portion of the material from the pressure container. The pressure container may be (e.g., fluidly) coupled with a removal channel (e.g., FIG. 19, 1928). The removal channel may reversibly engage with at least a second (e.g., pressure) container (e.g., FIG. 19, 1925). The second container may be internal and/or external to the unpacking station. The second container may comprise (i) a second pressure container, and/or (ii) a material reservoir (e.g., of a 3D printing system). The second pressure container may be disposed (a) within the unpacking station, (b) within a 3D printing system, and/or (c) on a portable vessel. The removal channel may facilitate removal of the material from the filled pressure container to the second pressure container and/or the material reservoir. In some embodiments, the removal channel is coupled with the portable vessel. The portable vessel removal channel (e.g., umbilical channel) may be used to facilitate a first transfer of material from a first (e.g., filled) pressure container, and a second transfer of material to a second pressure container.

In some embodiments, an amount of material recycled by a recycling system (e.g., and by any of its components) is greater than an amount of material that remains in the material bed. The material that remains in the material bed may be that which remains following removal of excess material after dispensing the material. The material recycled may be excess material. The excess material may be removed (e.g., following a dispensing operation) to the recycling system by a leveling mechanism (e.g., a blade and/or a vacuum). For example, the amount of material recycled for a given deposited material layer may be greater than the amount of material that forms the given layer (e.g., that remains in the material bed). For example, the amount of material recycled (e.g., by the recycling system or any of its components) during formation of a 3D object may be greater than the amount of material deposited within a material bed during the formation of the 3D object. In some embodiments, the amount of material recycled by the recycling system (e.g., and by any of its components) may be a majority of the material dispensed (e.g., by a material dispenser). For example, the amount of material recycled may be at least about 51%, 60%, 70%, 80%, 85%, 90%, 95%, or 98% of the material dispensed by the material dispenser. The amount of material recycled may be any value within a range of the aforementioned values (e.g., from 51% to 98%, from 51% to 70%, or from 70% to 98%). The aforementioned (e.g., percentage) amount of recycled material may refer to a volume of material. The aforementioned (e.g., percentage) amount of recycled material may refer to a relative height of material (e.g., on the material bed). The recycling system may be configured to recycle at least 50 kilograms (kg), 100 kg, 200 kg, 500 kg, 1000 kg, 5000 kg, or 10000 kg of material during the printing and/or before the cartridge requires a change (e.g., without exchanging the filter). The recycling system (e.g., and by any of its components) may be configured to support these recycling characteristics.

Figure 20A:
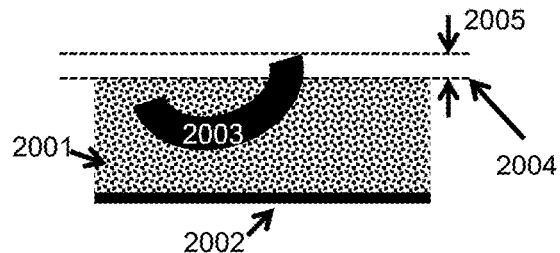
FIGS. 20A-20D schematically illustrate operations in forming a 3D object.
Figure 20B:
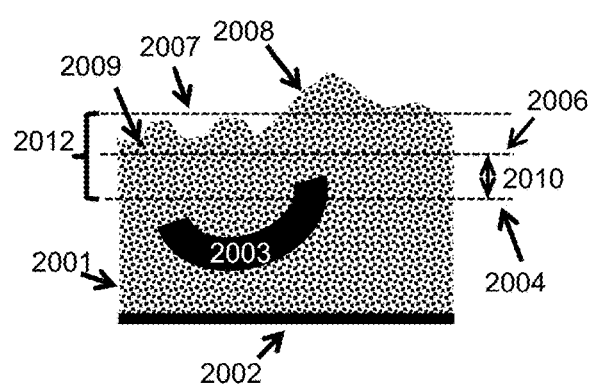

At times, the height of material is with respect to a height over a prior-formed material layer (e.g., having an exposed surface such as in FIG. 20A, 2004). For example, material (e.g., FIG. 20B, 2008) may be deposited (e.g., by the dispenser) to have an average height of at least about 750 µm, 850 µm, 950 µm or 1000 µm above a prior-formed material layer. FIG. 20B depicts an example of a plane 2007 that is situated at the average height 2012 of the material that is deposited above the prior-formed material layer plane 2004. The material may be deposited to have an average height of any value within a range of the aforementioned values (e.g. from about 750 µm to about 1000 µm, from about 750 µm to about 850 µm, or from 850 µm to about 1000 µm). The material recycling may be such as to have a remaining material height (e.g., FIG. 20D, 2013) above the prior-formed layer of at least about 30 µm, 40 µm, 50 µm, 60 µm, 70 µm, or 80 µm. The remaining height above the prior-formed layer may be any value within a range of the aforementioned values (e.g., from about 30 µm to about 80 µm, from about 30 µm to about 50 µm, or from about 50 µm to about 80 µm). In some embodiments, the volume of (e.g., excess) material recycled is at least about a factor of about 5, 8, 10, 15, 20, or 25 times greater than a volume of material that remains in the material bed (e.g., that forms material layers in the material bed). The volume of recycled material may be any value within a range of the aforementioned values (e.g., from 5 to 25, from 5 to 15, or from 15 to 25). The recycling system may recycle the material continuously. The recycling system may recycle the material periodically (e.g., at predetermined times).

Figure 20C:
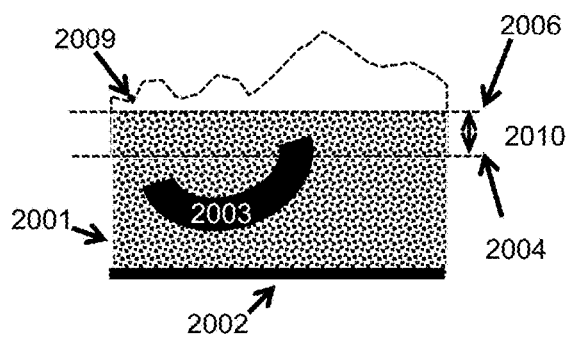
Figure 20D:
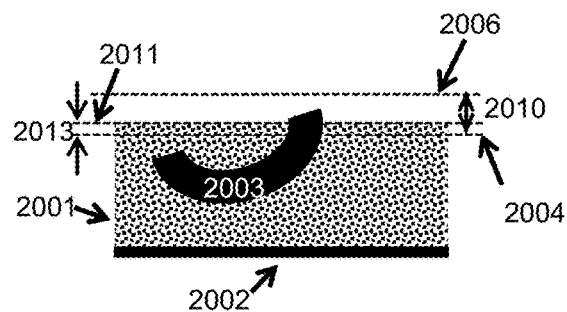

FIGS. 20A-D show examples of various stages of a layering method described herein. FIG. 20A shows a powder bed 2001 in which a (bent) 3D object 2003 is suspended in the powder bed and is protruding from the exposed (top) surface of the powder bed by a distance 2005. The exposed surface of the powder bed can be leveled (e.g., as shown in FIG. 20A, having a leveled plane 2004), or not leveled. FIG. 20B shows a succeeding operation where a layer is deposited in the powder bed (e.g., above the plane 2004). The newly deposited layer may not have a planarized (e.g., leveled) top surface (e.g., 2008). The non-planar top (e.g., exposed) surface 2008 includes a lowest vertical point 2009. The plane 2006 is a plane that is situated at or below the lowest vertical point of the non-planar surface, and at or above the protruding height 2005. The plane 2006 is located higher than the top surface 2004 by a height 2010. FIG. 20C shows a succeeding operation where the layer is leveled to the vertical position of the plane 2006 by a leveling mechanism (e.g., FIG. 1, 117). That planarization can comprise shearing of the powder material. That planarization may not displace the excess of powder material to a different position in the powder bed. FIG. 20D shows a succeeding operation where the planar layer is leveled to a lower vertical plane level that is above 2004 and below 2006, and is designated as 2011. This second planarization operation may be conducted by the powder removal mechanism (e.g., FIG. 1, 118), which may or may not contact the exposed layer of the powder bed. This second planarization operation may or may not expose the protruding object. This second planarization operation may be a higher fidelity planarization operation. The average vertical distance from the first top surface to the second planar surface can be at least about 5 µm, 10 µm, 50 µm, 100 µm, 150 µm, 200 µm, 250 µm, 300 µm, 350 µm, 400 µm, 450 µm, or 500 µm. The average vertical distance from the first top surface to the second planar surface can be at most about 700 µm, 500 µm, 450 µm, 400 µm, 350 µm, 300 µm, 250 µm, 200 µm, 150 µm, 100 µm, 50 µm, 10 µm, or 5 µm. The average vertical distance from the first top surface to the second planar surface can be any of the afore-mentioned average vertical distance values. The average vertical distance from the first top surface to the second planar surface can be from about 5 µm to about 500 µm, from about 10 µm to about 100 µm, from about 20 µm to about 300 µm, or from about 25 µm to about 250 µm.

The average vertical distance from the first top surface to the second top surface can be at least about 5 µm, 10 µm, 50 µm, 100 µm, 150 µm, 200 µm, 250 µm, 300 µm, 350 µm, 400 µm, 450 µm, 500 µm, 1000 µm, or 1500 µm. The average vertical distance from the first top surface to the second top surface can be at most about 2000 µm, 1500 µm, 1000 µm, 700 µm, 500 µm, 450 µm, 400 µm, 350 µm, 300 µm, 250 µm, 200 µm, 150 µm, 100 µm, 50 µm, 10 µm, or 5 µm. The average vertical distance from the first top surface to the second top surface can be any of the afore-mentioned average vertical distance values. For example, the average vertical distance from the first top surface to the second top surface can be from about 5 µm to about 2000 µm, from about 50 µm to about 1500 µm, from about 100 µm to about 1000 µm, or from about 200 µm to about 500 µm.

At times, the material conveyor system comprises a gas that carries material to a (e.g., cyclonic) separator. The separator may separate the gas from a material, e.g., a solid material and/or a particulate material. The material carried by the gas may be transported via a channel (e.g., in a dilute conveyance phase). The material may comprise pre-transformed material and/or debris (e.g., fused particles, spatter and/or soot). The cyclonic separator may be configured to separate (e.g., at least a portion of) the material from the gas. For example, a cyclonic separator may be configured to separate (e.g., remove) material having at least a characteristic (e.g., separation) size. In some embodiments, particles of material having at least a characteristic (e.g., separation) FLS are removed from the incoming gas flow within the cyclonic separator. For example, a characteristic separation FLS for a particle of material to be separated from the gas flow within a cyclonic separator may be at least about 10 micron (µm), 15 µm, 20 µm, 50 µm, 100 µm, or 500 µm. The characteristic separation FLS for a cyclonic separator may be any value within a range of the aforementioned values (e.g., from about 10 µm to about 500 µm, from about 10 µm to about 100 µm, or from about 100 µm to about 500 µm). In some embodiments, a plurality of (e.g., cyclone) separators may separate the material from the gas. For example, the first separator may separate bulkier material (having a first maximal or average FLS), and the second separator may separate the final material (having a second maximal or average FLS that is smaller than the first maximal or average FLS respectively).

At times, a gas flow exiting the cyclonic separator comprises remaining material (e.g., that was not removed). For example, soot particles may remain in the gas flow following the (e.g., first) separation of the material from the gas flow. The exiting gas may comprise a remaining material including particles of a fundamental length scale (FLS) of at most about 0.1 µm, 0.5 µm, 1 µm, 2 µm, 5 µm, 8 µm or 10 µm. The remaining material particle FLS may be any value within a range of the aforementioned values (e.g., from about 0.1 µm to about 10 µm, from about 0.1 µm to about 5 µm, or from 5 µm to about 10 µm). The gas exiting the cyclonic separator may undergo a second cyclonic separation. The gas exiting the (e.g., first and/or second) cyclonic separator may be passed through a filter (e.g., scrubbed) to remove any remaining (e.g., fine) material. The filter may be a ventilation filter. The ventilation filter may capture fine particles (e.g., soot and/or powder) from the 3D printing system. The filter may comprise a paper, glass (e.g., fiber), carbon (e.g., fiber), metal (e.g., fiber), High Density Polyethylene, or polyethersulfone (PES) filter. The filter may be a membrane filter. The filter may comprise a high-efficiency particulate arrestance (HEPA) filter (a.k.a., high-efficiency particulate arresting or high-efficiency particulate air filter). The gas exiting the cyclonic separator may be provided (i) to another portion of the 3D printing system (e.g., to the processing chamber, to a pressure container), and/or (ii) to an unpacking station (e.g., unpacking chamber).

In some embodiments, an operation of the separator comprises a vortex separation (e.g., using a cyclone). For example, the operation of the cyclonic separator can comprise a centrifugal separation (e.g., using a cyclone). In some embodiments, an internal compartment of a separator comprises a cyclone. The operation of the cyclonic separator can comprise gravitational separation. The operation of the cyclonic separator can comprise rotation of the (e.g., pre-transformed) material and/or debris (e.g., in the internal compartment of the separator). The separator may be configured to separate gas borne particulates based on their (e.g., average) FLS. In some embodiments, particles of the material having the separation FLS are attracted to and/or thrusted to a wall of the cyclonic separator. The particles attracted to, and/or thrusted to the wall may be removed from the flow of gas that carried the material into the cyclonic separator (e.g., via a removal mechanism). The particles removed from the flow of gas may rest at a position configured to collect the particulate material upon separation, e.g., (i) a depression (e.g., crevice) at a wall of the separator or (ii) the bottom of the internal compartment of the cyclonic separator. Bottom may be towards the gravitational center, and/or towards a target surface. In some embodiments, the removed particles of material may be provided to (e.g., an inlet of) a further separation assembly (e.g., a sieve assembly).

In some embodiments, the flow of gas for carrying the material into the cyclonic separator is generated by a force source (e.g., a vacuum source, a pump, and/or a blower such as a fan). The material carried by the flow of gas may be transported into the internal compartment of the cyclonic separator from: (i) a material bed (e.g., of the processing chamber), (ii) a pressure container, (iii) an unpacking chamber, and/or (iv) a source of new (e.g., pre-transformed) material. The force source may be (e.g., fluidly) coupled with the internal compartment of the cyclonic separator and/or sieve. The gas(es) forced with the carried material into the internal compartment of the cyclonic separator may rotate within at a rotational speed to form a cyclone. The internal compartment may comprise a cone having its long axis perpendicular to the target surface and/or its narrow end pointing towards the target surface. The internal compartment may comprise a cone having its long axis perpendicular to a gravitational field vector and/or its narrow end pointing towards a gravitational field vector. Alternatively, the internal compartment may comprise a cone having its long axis parallel to the target surface and/or the gravitational field vector, and/or its narrow end pointing towards a side wall of the enclosure. The gas may flow in the internal compartment in a helical pattern along the long axis of the cyclone. During an operation of the cyclonic separator, the material moved into the cyclone may concentrate at the walls of the cyclone and gravitate to and accumulate at the depression in the wall of the separator (configured to collect the separating) and/or at the separator's bottom. The accumulated (e.g., pre-transformed and/or debris) material may be removed from the collection area. The accumulated material may be provided to a subsequent separator. In some embodiments, the material collecting at the walls travels to a second separator (e.g., a subsequent cyclone or a sieve assembly). In some embodiments, a subsequent separator comprises a sieve assembly. In some examples, the material that enters the internal compartment of the cyclonic separator is of a first velocity, and is attracted towards the force source. On its way to the force source, the material may lose its velocity in the internal compartment and precipitate toward the bottom of the cyclone and/or towards the collection area. In some examples, the gas that enters the internal compartment of the cyclonic separator is of a first velocity, and is attracted towards the force source (e.g., pump). On its way to the connector, the gaseous material may lose its velocity in the internal compartment, for example, due to an expansion of the cross section of the internal compartments. In some embodiments an obstruction may be placed to exacerbate a volume difference between portions of the cyclone that are closer to the exit opening relative to those further from the exit opening.

At times, the separation and subsequent filtration of the material from the gas flow is performed at predetermined times. For example, after one or more operations of planarizing a layer of pre-transformed material in the material bed, the cyclone may separate (e.g., pre-transformed and/or debris) material from a gas flow. For example, the exiting gas from the cyclonic separator may be filtered (e.g., scrubbed) of any remaining (e.g., soot) particles. Filtration of the exiting gas from the cyclonic separator may occur prior to introduction of the gas into a remaining portion of the 3D printing system (e.g., a processing chamber, an unpacking chamber). In some embodiments, the separation and subsequent filtration of the material from the gas flow is performed (e.g., substantially) continuously (e.g., in real time during at least part of the 3D printing, for example during transformation and/or during operation of the material conveyance system).

At times, the material conveyor system comprises at least two (e.g., cyclonic) separators. In some embodiments, at least two cyclonic separators may be arranged in parallel. For example, a channel comprising a gas carrying material may be an input for at least two cyclonic separators. In some embodiments, at least two cyclonic separators may be arranged in series. For example, a gas exiting from a first cyclonic separator may comprise an inlet gas for a subsequent cyclonic separator. In some embodiments, the gas is an inert gas. In some embodiments, a filter is disposed between an outlet of the cyclonic separator and an inlet to a (e.g., subsequent) compartment. The subsequent compartment may comprise (i) an internal compartment of a (e.g., subsequent) cyclonic separator, (ii) a processing chamber, (iii) a pressure container, and/or (iv) an unpacking chamber. In some embodiments, a plurality of filters is disposed between the outlet of the cyclonic separator and the inlet of the subsequent compartment. In some embodiments, at least two filters of the plurality of filters are configured to remove particles comprising about the same FLS. In some embodiments, at least two filters of the plurality of filters are configured to remove particles comprising a different FLS (e.g., soot from pre-transformed material). In some embodiments, one or more force sources are disposed between the filter(s) and the subsequent compartment(s). In some embodiments, one or more force sources are disposed between a compartment comprising the carried material and a cyclonic separator. The force sources may be any force source disclosed herein (e.g., a pump, or a blower).

At times, a 3D printing cycle corresponds with (i) depositing a (planar) layer of pre-transformed material (e.g., as part of a material bed) above a platform, and (ii) transforming at least a portion of the pre-transformed material to form one or more 3D objects above the platform (e.g., in the material bed). The depositing in (i) and the transforming in (ii) may comprise a print increment. At times, the platform supports a plurality of material beds. One or more 3D objects may be formed in a single material bed during a printing cycle (e.g., print job). The transformation may connect transformed material of a given layer (e.g., printing cycle) to a previously formed 3D object portion (e.g., of a previous printing cycle). The transforming operation may comprise utilizing an energy beam to transform the pre-transformed (or the transformed) material. In some instances, the energy beam is utilized to transform at least a portion of the material bed (e.g., utilizing any of the methods described herein). During a printing cycle, the one or more objects may be printed in the same material bed, above the same platform, with the same printing system, at the same time span, using the same printing instructions, or any combination thereof. A print cycle may comprise printing the one or more objects layer-wise (e.g., layer-by-layer). A layer may comprise a layer height. A layer height may correspond to a height of (e.g., distance between) an exposed surface of a (e.g., newly) formed layer with respect to a (e.g., top) surface of a prior-formed layer. In some embodiments, the layer height is (e.g., substantially) the same for each layer of a print cycle within a material bed. In some embodiments, at least two layers of a print cycle within a material bed have different layer heights. A printing cycle may comprise a collection (e.g., sum) of print increments (e.g., deposition of a layer and transformation of a portion thereof to form at least part of the 3D object). A build cycle may comprise one or more build laps (e.g., the process of forming a printed incremental layer, At times, (e.g., pre-transformed) material is added to the 3D printing system during the 3D printing operation. In some embodiments, the material may be added (e.g., from a bulk reservoir) to the 3D printing system without interruption of at least a portion of the 3D printing. Without interruption may refer to introduction of one or more materials to an environment of the 3D printing system. For example, with minimal introduction of (e.g., ambient air) a reactive agent to an (e.g., any) enclosed portion of the 3D printing system. The reactive agent may be a gas or may be gas borne. The reactive agent may comprise water, hydrogen sulfide, or oxygen. The reactive agent may react with the transformed material (e.g., during and/or after its transformation). Interruption may be regarding at least one process of the 3D printing system (e.g., formation of at least a portion of a 3D object). In some embodiments, the 3D printing system is able to print a plurality of objects without interruption due to a pre-transformed material addition operation. For example, the 3D printing system is able to print at least 1, 5, 10, 15, 50, 100, 500, or 1000 printing cycles without interruption by a pre-transformed material addition operation. The 3D printing system may uninterruptedly print any number of printing cycles within a range of the aforementioned number of printing cycles (e.g., from about 1 to about 1000 cycles, from about 1 to about 500 cycles, or from about 500 to about 1000 cycles). For example, the 3D printing system is able to print (e.g., transform) at least a threshold volume of material without interruption from a pre-transformed material addition operation. In some embodiments, the 3D printing system is able to transform (e.g., print) at a throughput of at least about 6 cubic centimeters of material per hour (cc/hr), 12 cc/hr, 48 cc/hr, 60 cc/hr, 120 cc/hr, 480 cc/hr, or 600 cc/hr. The 3D printing system may print at any rate within a range of the aforementioned values (e.g., from about 6 cc/hr to about 600 cc/hr, from about 6 cc/hr to about 120 cc/hr, or from about 120 cc/hr to about 600 cc/hr). In some embodiments, the 3D printing system can operate (e.g., continuously) without interruption for a period of time of at least about 6 hours (hr), 8 hr, 12 hr, 16 hr, 24 hr, 2 days, 7 days, 15 days, or 1 month. The 3D printing system may operate without interruption for any period of time within a range of the aforementioned values (e.g., from about 6 hr to about 1 month, from about 6 hr to about 15 days, or from 15 days to about 1 month). In some embodiments, at least two pre-transformed material addition operations may be performed without interruption of the 3D printing system.

In some embodiments, the bulk reservoir (e.g., reversibly) couples with a component of the 3D printing system. For example, the (e.g., target) component with which the bulk reservoir couples to add the pre-transformed material may be (i) a pressure container, (ii) a (e.g., cyclonic) separator, (iii) a sieve assembly, or (iv) any combination thereof. The bulk reservoir may engage with the (e.g., target) component by a channel. The channel may facilitate coupling and/or fluidic connection of the bulk reservoir. Fluidic connection may refer to a flow of a material (e.g., in any material phase). The channel may comprise a gas flow. In some embodiments, pre-transformed material is moved from the bulk reservoir to the target component in a dense phase conveyance. In some embodiments, pre-transformed material is moved from the bulk reservoir to the target component in a dilute phase conveyance. In some embodiments, the bulk reservoir is configured to couple with at least two target components. In some embodiments, the bulk reservoir is configured to couple with the at least two target components (e.g., substantially) simultaneously. In some embodiments, the bulk reservoir is configured to couple with the at least two target components at alternating times. The insertion of the pre-transformed material into the component may be controlled. Control may comprise using one or more valves (e.g., FIG. 4, 422, and/or 424). The valves may be any valve described herein.

In some embodiments, pre-transformed material is added (e.g., inserted) to the 3D printing system at a predetermined time. In some embodiments, pre-transformed material is added to the 3D printing system in response to a determined state (e.g., a low pre-transformed material level). For example, a low pre-transformed material level (e.g., within a pressure container) may be determined considering data from one or more sensors disposed adjacent to or within a container. For example, a volume of material (e.g., remaining) in the 3D printing system may be determined considering a volume of pre-transformed material that has been transformed (e.g., during formation of at least a portion of a 3D object).

Figure 21:
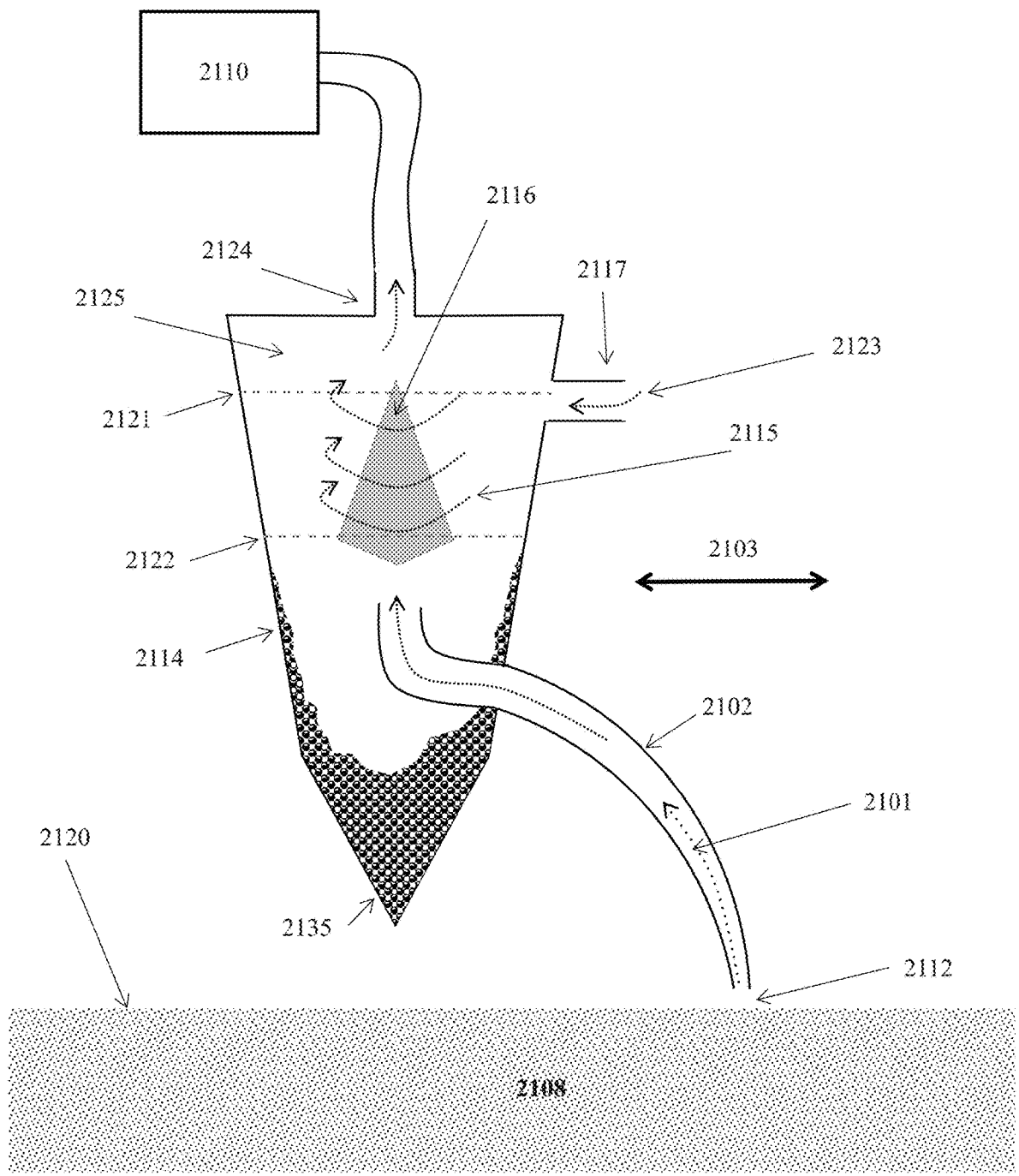
FIG. 21 schematically illustrates a top view of a component of a 3D printing system.

In some embodiments, the operation of a material removal mechanism of the 3D printing system comprises separating the pre-transformed material (e.g., particulate material) from a gas (e.g., in which the pre-transformed material is carried in). The separation can be with or without the use of one or more filters. The operation of the material removal mechanism can comprise a vortex separation (e.g., using a cyclone). For example, the operation of the material removal mechanism can comprise a centrifugal separation (e.g., using a cyclone). FIG. 21 shows an example of an internal compartment 2125 of the material removal mechanism. In some embodiments, the internal compartment of the material removal member comprises a cyclone. In some embodiments, the material removal mechanism comprises a cyclonic separator. In some embodiments, the material removal mechanism comprises cyclonic separation. The operation of the material removal mechanism can comprise gravitational separation. The operation of the material removal mechanism can comprise rotation of the pre-transformed material and/or debris (e.g., in the internal compartment of the material removal mechanism).

In some embodiments, the pre-transformed material (e.g., that is attracted to a force source) rests at the bottom of the internal compartment of the material removal mechanism. Bottom may be towards the gravitational center, and/or towards a target surface (e.g., of a material bed). The force source can be a vacuum source that may be connected to internal compartment (e.g., at a top position, e.g., 2124). The pre-transformed material (e.g., 2108) may be sucked into (e.g., 2101) the internal compartment from the target surface (e.g., 2120) through the nozzle (e.g., 2102) into the internal compartment (e.g., 2125). In some embodiments, the nozzle is separated from the exposed surface of the material bed by a gap (e.g., vertical distance, FIG. 21, 2112). The gap may comprise a gas. The gas may be an atmospheric gas. The gas(es) that is sucked with the pre-transformed material into the internal compartment (e.g., 2115) may rotate within at a rotational speed to form a cyclone. The internal compartment may comprise a cone having its long axis perpendicular to the target surface (and/or a gravitational field vector), and/or its narrow end pointing towards the target surface (and/or a gravitational field vector) (e.g., 2135). Alternatively, the internal compartment may comprise a cone having its long axis parallel to the target surface (and/or a gravitational field vector), and/or its narrow end pointing towards a side wall of the enclosure. The gas may flow in the internal compartment in a helical pattern along the long axis of the cyclone. During the process, the pre-transformed material (and/or debris) sucked into the cyclone, may concentrate at the walls of the cyclone (e.g., 2114) and gravitate to and accumulate at its bottom (e.g., 2135). The accumulated pre-transformed material (e.g., and/or debris) may be removed from the bottom of the cyclone. For example, after one or more operations of planarizing a layer of pre-transformed material in the material bed, the bottom of the cyclone may be opened and the accumulated pre-transformed material (e.g., and/or debris) within may be evacuated. In some examples, the pre-transformed material that enters the internal compartment of the material removal member is of a first velocity, and is attracted towards the force source (e.g., 2110), that is connected to the internal compartment through a connector 2124. On its way to the connector, the pre-transformed material may lose its velocity in the internal compartment and precipitate at the bottom of the cyclone. In some examples, the gas(es) material that enters the internal compartment of the material removal member from the nozzle is of a first velocity, and is attracted towards the force source (e.g., 2110), that is connected to the internal compartment through a connector 2124. On its way to the connector, the gas(es) material may lose its velocity in the internal compartment, for example, due to an expansion of the cross section of the internal compartments (e.g., diameter 2122 is smaller than diameter 2121). An optional hurdle (e.g., 2116) may be placed to exacerbate the volume difference between portions of the cyclone that are closer to the exit opening (e.g., 2124) relative to those further from the exit opening. In some examples, a secondary air flow flows into the cyclone (e.g., 2123) from an optional gas opening port (e.g., 2117). The gas opening port may be disposed adjacent to the nozzle (e.g., at the same side of the nozzle with respect to the direction of travel) (e.g., 2103). The gas opening port may be disposed at a direction relative to the direction of travel, that is different from the direction where the nozzle is disposed. The secondary air flow may reduce abrasion of the internal surface of the internal compartment walls (e.g., 2114). The secondary air flow may push the pre-transformed material from the walls of the internal compartment towards the narrow end of the cyclone (e.g., where it is collected).

In some embodiments, the methods, systems, and/or the apparatus described herein may comprise at least one valve. The valve may be shut or opened according to an input from the at least one sensor, or manually. The degree of valve opening or shutting may be regulated by the control system, for example, according to at least one input from at least one sensor. The systems and/or the apparatus described herein can include one or more valves, such as throttle valves.

In some embodiments, the methods, systems, and/or the apparatus described herein comprise a motor. The motor may be controlled by the control system and/or manually. The apparatuses and/or systems described herein may include a system providing the material (e.g., powder material) to the material bed. The system for providing the material may be controlled by the control system, or manually. The motor may connect to a system providing the material (e.g., powder material) to the material bed. The system and/or apparatus of the present invention may comprise a material reservoir. The material may travel from the reservoir to the system and/or apparatus of the present invention. The material may travel from the reservoir to the system for providing the material to the material bed. The motor may alter (e.g., the position of) the substrate and/or to the base. The motor may alter (e.g., the position of) the elevator. The motor may alter an opening of the enclosure (e.g., its opening or closure). The motor may be a step motor or a servomotor. The methods, systems and/or the apparatus described herein may comprise a piston. The piston may be a trunk, crosshead, slipper, or deflector piston.

In some examples, the systems and/or the apparatus described herein comprise at least one nozzle. The nozzle may be regulated according to at least one input from at least one sensor. The nozzle may be controlled automatically or manually. The controller may control the nozzle. The nozzle may include jet (e.g., gas jet) nozzle, high velocity nozzle, propelling nozzle, magnetic nozzle, spray nozzle, vacuum nozzle, or shaping nozzle (e.g., a die). The nozzle can be a convergent or a divergent nozzle. The spray nozzle may comprise an atomizer nozzle, an air-aspirating nozzle, or a swirl nozzle.

In some examples, the systems and/or the apparatus described herein comprise at least one pump. The pump may be regulated according to at least one input from at least one sensor. The pump may be controlled automatically or manually. The controller may control the pump. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valve-less pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump. In some examples, the systems and/or the apparatus described herein include one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector.

In some embodiments, the systems, apparatuses, and/or components thereof comprise a communication technology. The communication technology may comprise a Bluetooth technology. The systems, apparatuses, and/or components thereof may comprise a communication port. The communication port may be a serial port or a parallel port. The communication port may be a Universal Serial Bus port (i.e., USB). The systems, apparatuses, and/or components thereof may comprise USB ports. The USB can be micro or mini USB. The USB port may relate to device classes comprising 00h, 01h, 02h, 03h, 05h, 06h, 07h, 08h, 09h, 0Ah, 0Bh, 0Dh, 0Eh, 0Fh, 10h, 11h, DCh, E0h, EFh, FEh, or FFh. The surface identification mechanism may comprise a plug and/or a socket (e.g., electrical, AC power, DC power). The systems, apparatuses, and/or components thereof may comprise an adapter (e.g., AC and/or DC power adapter). The systems, apparatuses, and/or components thereof may comprise a power connector. The power connector can be an electrical power connector. The power connector may comprise a magnetically attached power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

In some embodiments, the systems, apparatuses, and/or components thereof comprise one or more controllers. The controller(s) can include (e.g., electrical) circuitry that is configured to generate output (e.g., voltage signals) for directing controlling one or more aspects of the apparatuses (or any parts thereof) described herein. The controllers may be shared between one or more systems or apparatuses. Each apparatus or system may have its own controller. Two or more systems and/or its components may share a controller. Two or more apparatuses and/or its components may share a controller. The controller may monitor and/or direct (e.g., physical) alteration of the operating conditions of the apparatuses, software, and/or methods described herein. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from a sensor). The controller may deliver an output. The controller may comprise multiple controllers. The controller may receive multiple inputs. The controller may generate multiple outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise a keyboard, keypad, mouse, touch screen, microphone, speech recognition package, camera, imaging system, or any combination thereof. The outputs may include a display (e.g., screen), speaker, or printer. The controller may be any controller (e.g., a controller used in 3D printing) such as, for example, the controller disclosed in patent application Ser. No. 15/435,065 that is incorporated herein by reference in their entirety.

At times, the methods, systems, and/or the apparatus described herein further comprise a control system. The control system can be in communication with one or more energy sources and/or energy (e.g., energy beams). The energy sources may be of the same type or of different types. For example, the energy sources can be both lasers, or a laser and an electron beam. For example, the control system may be in communication with the first energy and/or with the second energy. The control system may regulate the one or more energies (e.g., energy beams). The control system may regulate the energy supplied by the one or more energy sources. For example, the control system may regulate the energy supplied by a first energy beam and by a second energy beam, to the pre-transformed material within the material bed. The control system may regulate the position of the one or more energy beams. For example, the control system may regulate the position of the first energy beam and/or the position of the second energy beam.

Figure 13:
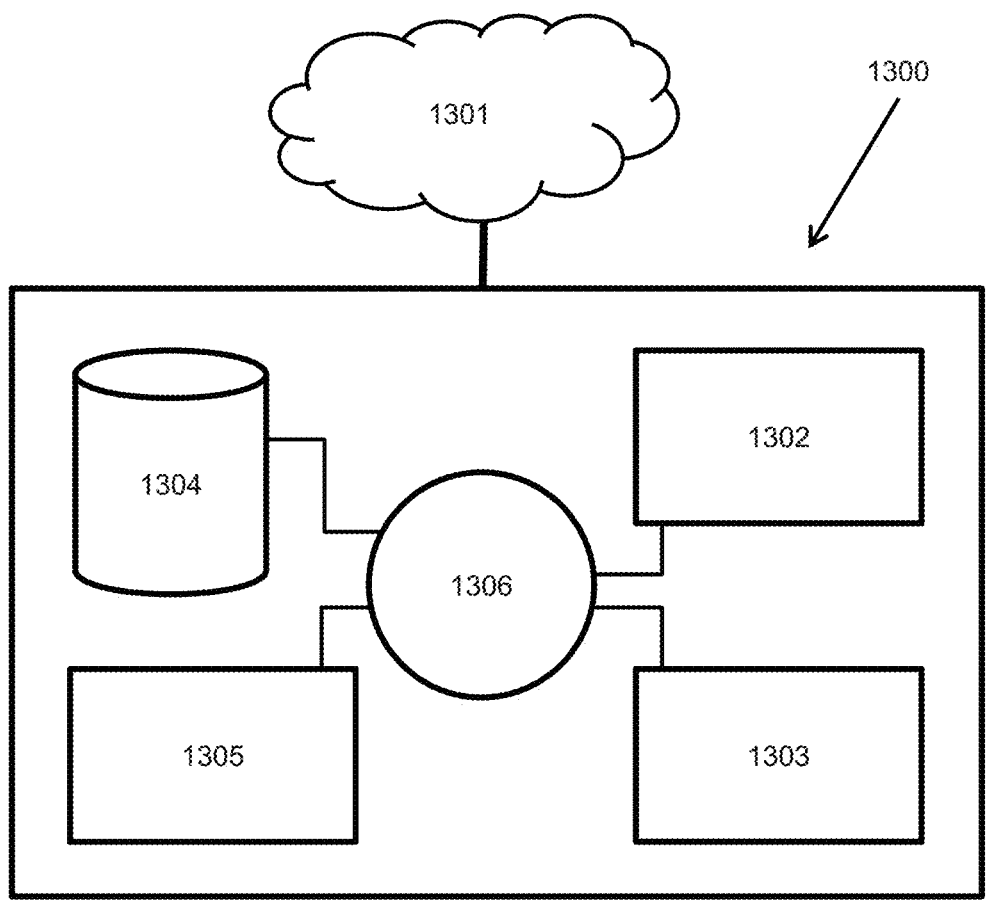
FIG. 13 schematically illustrates a computer control system that is programmed or otherwise configured to facilitate the formation of one or more 3D objects.

In some embodiments, the 3D printing system comprises a processor. The processor may be a processing unit. The controller may comprise a processing unit. The processing unit may be central. The processing unit may comprise a central processing unit (herein "CPU"). The controllers or control mechanisms (e.g., comprising a computer system) may be programmed to implement methods of the disclosure. The processor (e.g., 3D printer processor) may be programmed to implement methods of the disclosure. The controller may control at least one component of the systems and/or apparatuses disclosed herein. FIG. 13 is a schematic example of a computer system 1300 that is programmed or otherwise configured to facilitate the formation of a 3D object according to the methods provided herein. The computer system 1300 can control (e.g., direct, monitor, and/or regulate) various features of printing methods, apparatuses and systems of the present disclosure, such as, for example, control force, translation, heating, cooling and/or maintaining the temperature of a powder bed, process parameters (e.g., chamber pressure), scanning rate (e.g., of the energy beam and/or the platform), scanning route of the energy source, position and/or temperature of the cooling member(s), application of the amount of energy emitted to a selected location, or any combination thereof. The computer system 1300 can be part of, or be in communication with, a 3D printing system or apparatus. The computer may be coupled to one or more mechanisms disclosed herein, and/or any parts thereof. For example, the computer may be coupled to one or more sensors, valves, switches, motors, pumps, scanners, optical components, or any combination thereof.

The computer system 1300 can include a processing unit 1306 (also "processor," "computer" and "computer processor" used herein). The computer system may include memory or memory location 1302 (e.g., random-access memory, read-only memory, flash memory), electronic storage unit 1304 (e.g., hard disk), communication interface 1303 (e.g., network adapter) for communicating with one or more other systems, and peripheral devices 1305, such as cache, other memory, data storage and/or electronic display adapters. The memory 1302, storage unit 1304, interface 1303, and peripheral devices 1305 are in communication with the processing unit 1306 through a communication bus (solid lines), such as a motherboard. The storage unit can be a data storage unit (or data repository) for storing data. The computer system can be operatively coupled to a computer network ("network") 1301 with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

In some examples, the processing unit executes a sequence of machine-readable instructions, which can be embodied in a program or software. The instructions may be stored in a memory location, such as the memory 1302. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 1300 can be included in the circuit.

In some examples, the storage unit 1304 can store files, such as drivers, libraries, and saved programs. The storage unit can store user data (e.g., user preferences and user programs). In some cases, the computer system can include one or more additional data storage units that are external to the computer system, such as located on a remote server that is in communication with the computer system through an intranet or the Internet.

In some embodiments, the computer system communicates with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 1302 or electronic storage unit 1304. The machine executable or machine-readable code can be provided in the form of software. During use, the processor 1306 can execute the code. In some cases, the code can be retrieved from the storage unit and stored on the memory for ready access by the processor. In some situations, the electronic storage unit can be precluded, and machine-executable instructions are stored on memory.

At times, the code is pre-compiled and configured for use with a machine have a processer adapted to execute the code, or can be compiled during runtime. The code can be supplied in a programming language that can be selected to enable the code to execute in a pre-compiled or as-compiled fashion.

In some embodiments, the processing unit includes one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 $mm^2$, or 800 $mm^2$. The integrated circuit chip may have an area of at most about 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 $mm^2$, or 800 $mm^2$. The integrated circuit chip may have an area of any value between the afore-mentioned values (e.g., from about 50 mm² to about 800 mm², from about 50 mm² to about 500 mm², or from about 500 mm² to about 800 mm²). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The independent central processing units may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the afore-mentioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating point operations per second (FLOPS). The number of FLOPS may be at least about 0.1 Tera FLOPS (T-FLOPS), 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, from about 0.1 T-FLOP to about 10 EXA-FLOPS).). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance LINPACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI refers to Message Passing Interface.

In some embodiments, the computer system includes hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by NVidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

In some embodiments, the computer system includes an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

In some embodiments, the computer system includes configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration. The FPGA may comprise configurable FPGA logic, and/or fixed-function hardware comprising multipliers, memories, microprocessor cores, first in-first out (FIFO) and/or error correcting code (ECC) logic, digital signal processing (DSP) blocks, peripheral Component interconnect express (PCI Express) controllers, Ethernet media access control (MAC) blocks, or high-speed serial transceivers. DSP blocks can be DSP slices.

In some instances, the controller uses calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real-time measurements may be conducted during the 3D printing process. The real-time measurements may be in situ measurements in the 3D printing system and/or apparatus. The real-time measurements may be during the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, 1 msec, 80 microseconds (μsec), 50 μsec, 20 μsec, 10 μsec, 5 μsec, or 1 μsec. In some instances, the processing unit may use the signal obtained from the at least one sensor to provide a processing unit output, which output is provided at a speed of any value between the afore-mentioned values (e.g., from about 100 min to about 1 μsec, from about 100 min to about 10 min, from about 10 min to about 1 min, from about 5 min to about 0.5 min, from about 30 sec to about 0.1 sec, from about 0.1 sec to about 1 msec, from about 80 msec to about 10 μsec, from about 50 μsec to about 1 μsec, from about 20 μsec to about 1 μsec, or from about 10 μsec to about 1 μsec).

In some instances, the controller uses calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real-time measurements may be conducted during the 3D printing process. The real-time measurements may be in situ measurements in the 3D printing system and/or apparatus. the real-time measurements may be during the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, 1 msec, 80 microseconds (μsec), 50 μsec, 20 μsec, 10 μsec, 5 μsec, or 1 μsec. In some instances, the processing unit may use the signal obtained from the at least one sensor to provide a processing unit output, which output is provided at a speed of any value between the afore-mentioned values (e.g., from about 100 min to about 1 μsec, from about 100 min to about 10 min, from about 10 min to about 1 min, from about 5 min to about 0.5 min, from about 30 sec to about 0.1 sec, from about 0.1 sec to about 1 msec, from about 80 msec to about 10 μsec, from about 50 μsec to about 1 μsec, from about 20 μsec to about 1 μsec, or from about 10 μsec to about 1 μsec).

At times, the processing unit output comprises an evaluation of the temperature at a location, position at a location (e.g., vertical, and/or horizontal), or a map of locations. The location may be on the target surface. The map may comprise a topological or temperature map. The temperature sensor may comprise a temperature imaging device (e.g., IR imaging device).

At times, the processing unit uses the signal obtained from the at least one sensor in an algorithm that is used in controlling the energy beam. The algorithm may comprise the path of the energy beam. In some instances, the algorithm may be used to alter the path of the energy beam on the target surface. The path may deviate from a cross section of a model corresponding to the desired 3D object. The processing unit may use the output in an algorithm that is used in determining the manner in which a model of the desired 3D object may be sliced. The processing unit may use the signal obtained from the at least one sensor in an algorithm that is used to configure one or more parameters and/or apparatuses relating to the 3D printing process. The parameters may comprise a characteristic of the energy beam. The parameters may comprise movement of the platform and/or material bed. The parameters may comprise relative movement of the energy beam and the material bed. In some instances, the energy beam, the platform (e.g., material bed disposed on the platform), or both may translate. Alternatively, or additionally, the controller may use historical data for the control. Alternatively, or additionally, the processing unit may use historical data in its one or more algorithms. The parameters may comprise the height of the layer of powder material disposed in the enclosure and/or the gap by which the cooling element (e.g., heat sink) is separated from the target surface. The target surface may be the exposed layer of the material bed.

In some embodiments, aspects of the systems, apparatuses, and/or methods provided herein, such as the computer system, are embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all of the tangible memory of the computers, processors or the like, or associated modules thereof, such as various semiconductor memories, tape drives, disk drives, external drives, and the like, which may provide non-transitory storage at any time for the software programming.

In some embodiments, the memory comprises a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

In some embodiments, all or portions of the software are communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

In some embodiments, the computer system includes or is in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms (e.g., from the one or more sensors). The control may rely on historical data. The feedback mechanism may be pre-programmed. The feedback mechanisms may rely on input from sensors (described herein) that are connected to the control unit (i.e., control system or control mechanism e.g., computer) and/or processing unit. The computer system may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

In some embodiments, the system and/or apparatus described herein (e.g., controller) and/or any of their components comprise an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a printed hard copy (e.g., paper). The output device may include a printer. The input device may include a camera, a microphone, a keyboard, or a touch screen.

In some embodiments, the computer system includes, or is in communication with, an electronic display unit that comprises a user interface (UI) for providing, for example, a model design or graphical representation of an object to be printed. Examples of UI's include a graphical user interface (GUI) and web-based user interface. The historical and/or operative data may be displayed on a display unit. The computer system may store historical data concerning various aspects of the operation of the cleaning system. The historical data may be retrieved at predetermined times and/or at a whim. The historical data may be accessed by an operator and/or by a user. The display unit (e.g., monitor) may display various parameters of the printing system (as described herein) in real time or in a delayed time. The display unit may display the desired printed 3D object (e.g., according to a model), the printed 3D object, real time display of the 3D object as it is being printed, or any combination thereof. The display unit may display the cleaning progress of the object, or various aspects thereof. The display unit may display at least one of the total time, time remaining, and time expanded on the cleaned object during the cleaning process. The display unit may display the status of sensors, their reading, and/or time for their calibration or maintenance. The display unit may display the type or types of material used and various characteristics of the material or materials such as temperature and flowability of the pre-transformed material. The display unit may display the amount of a certain gas in the chamber. The gas may comprise oxygen, hydrogen, water vapor, or any of the gasses mentioned herein. The display unit may display the pressure in the chamber. The computer may generate a report comprising various parameters of the methods, objects, apparatuses, or systems described herein. The report may be generated at predetermined time(s), on a request (e.g., from an operator) or at a whim.

Methods, apparatuses, and/or systems of the present disclosure can be implemented by way of one or more algorithms. An algorithm can be implemented by way of software upon execution by one or more computer processors. For example, the processor can be programmed to calculate the path of the energy beam and/or the power per unit area emitted by the energy source (e.g., that should be provided to the material bed in order to achieve the desired result). Other control and/or algorithm examples may be found in patent application Ser. No. 15/435,065 that is incorporated herein by reference in its entirety.

Figure 14:
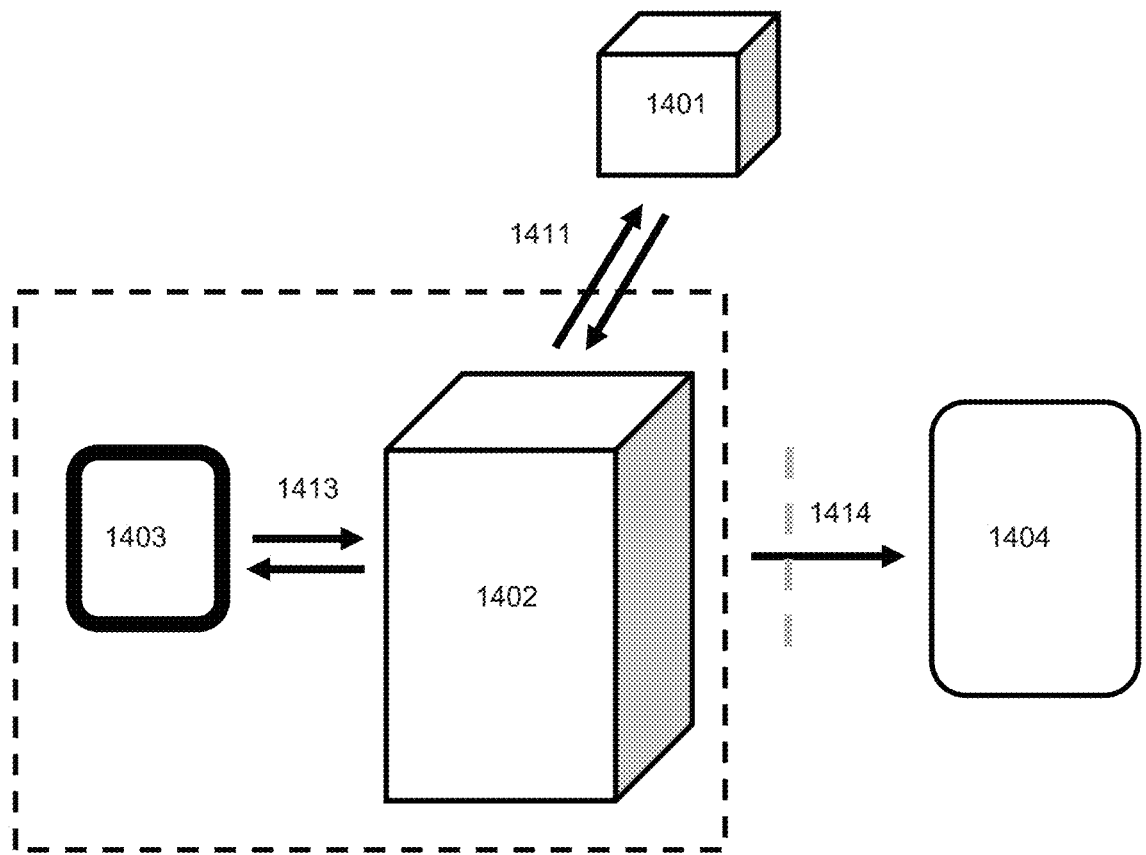
FIG. 14 schematically illustrates a processor and 3D printer architecture that facilitates the formation of one or more 3D objects.

In some embodiments, the 3D printer comprises and/or communicates with a multiplicity of processors. The processors may form a network architecture. Examples of a processor architectures is shown in FIG. 14. FIG. 14 shows an example of a 3D printer 1402 comprising a processor that is in communication with a local processor (e.g., desktop) 1401, a remote processor 1404, and a machine interface 1403. The 3D printer interface is termed herein as "machine interface." The communication of the 3D printer processor with the remote processor and/or machine interface may or may not be through a server. The server may be integrated within the 3D printer. The machine interface may be integrated with, or closely situated adjacent to, the 3D printer 1402. Arrows 1411 and 1413 designate local communications. Arrow 1414 designates communicating through a firewall (shown as a discontinuous line). A machine interface may communicate directly or indirectly with the 3D printer processor. A 3D printing processor may comprise a plurality of machine interfaces. Any of the machine interfaces may be optionally included in the 3D printing system. The communication between the 3D printer processor and the machine interface processor may be unidirectional (e.g., from the machine interface processor to the 3D printer processor), or bidirectional. The arrows in FIG. 14 illustration the directionality of the communication (e.g., flow of information direction) between the processors. The 3D printer processor may be connected directly or indirectly to one or more stationary processors (e.g., desktop). The 3D printer processor may be connected directly or indirectly to one or more mobile processors (e.g., mobile device). The 3D printer processor may be connected directly or indirectly (e.g., through a server) to processors that direct 3D printing instructions. The connection may be local (e.g., in 1401) or remote (e.g., in 1404). The 3D printer processor may communicate with at least one 3D printing monitoring processor. The 3D printing processor may be owned by the entity supplying the printing instruction to the 3D printer, or by a client. The client may be an entity or person that desires at least one 3D printing object.

In some embodiments, the 3D printer comprises at least one processor (referred herein as the "3D printer processor"). The 3D printer may comprise a plurality of processors. At least two of the plurality of the 3D printer processors may interact with each other. At times, at least two of the plurality of the 3D printer processors may not interact with each other. Discontinuous line 1414 illustrates a firewall.

A 3D printer processor may interact with at least one processor that acts as a 3D printer interface (also referred to herein as "machine interface processor"). The processor (e.g., machine interface processor) may be stationary or mobile. The processor may be on a remote computer system. The machine interface one or more processors may be connected to at least one 3D printer processor. The connection may be through a wire (e.g., cable) or be wireless (e.g., via Bluetooth technology). The machine interface may be hardwired to the 3D printer. The machine interface may directly connect to the 3D printer (e.g., to the 3D printer processor). The machine interface may indirectly connect to the 3D printer (e.g., through a server, or through wireless communication). The cable may comprise coaxial cable, shielded twisted cable pair, unshielded twisted cable pair, structured cable (e.g., used in structured cabling), or fiber-optic cable.

At times, the machine interface processor directs 3D print job production, 3D printer management, 3D printer monitoring, or any combination thereof. The machine interface processor may not be able to influence (e.g., direct, or be involved in) pre-print or 3D printing process development. The machine management may comprise controlling the 3D printer controller (e.g., directly, or indirectly). The printer controller may direct starting a 3D printing process, stopping a 3D printing process, maintenance of the 3D printer, clearing alarms (e.g., concerning safety features of the 3D printer).

At times, the machine interface processor allows monitoring of the 3D printing process (e.g., accessible remotely or locally). The machine interface processor may allow viewing a log of the 3D printing and status of the 3D printer at a certain time (e.g., 3D printer snapshot). The machine interface processor may allow to monitor one or more 3D printing parameters. The one or more printing parameters monitored by the machine interface processor can comprise 3D printer status (e.g., 3D printer is idle, preparing to 3D print, 3D printing, maintenance, fault, or offline), active 3D printing (e.g., including a build module number), status and/or position of build module(s), status of build module and processing chamber engagement, type and status of pre-transformed material used in the 3D printing (e.g., amount of pre-transformed material remaining in the reservoir), status of a filter, atmosphere status (e.g., pressure, gas level(s)), ventilator status, layer dispensing mechanism status (e.g., position, speed, rate of deposition, level of exposed layer of the material bed), status of the optical system (e.g., optical window, mirror), status of scanner, alarm (boot log, status change, safety events), motion control commands (e.g., of the energy beam, or of the layer dispensing mechanism), or printed 3D object status (e.g., what layer number is being printed), At times, the machine interface processor allows monitoring the 3D print job management. The 3D print job management may comprise status of each build module (e.g., atmosphere condition, position in the enclosure, position in a queue to go in the enclosure, position in a queue to engage with the processing chamber, position in queue for further processing, power levels of the energy beam, type of pre-transformed material loaded, 3D printing operation diagnostics, status of a filter. The machine interface processor (e.g., output device thereof) may allow viewing and/or editing any of the job management and/or one or more printing parameters. The machine interface processor may show the permission level given to the user (e.g., view, or edit). The machine interface processor may allow viewing and/or assigning a certain 3D object to a particular build module, prioritize 3D objects to be printed, pause 3D objects during 3D printing, delete 3D objects to be printed, select a certain 3D printer for a particular 3D printing job, insert and/or edit considerations for restarting a 3D printing job that was removed from 3D printer. The machine interface processor may allow initiating, pausing, and/or stopping a 3D printing job. The machine interface processor may output message notification (e.g., alarm), log (e.g., other than Excursion log or other default log), or any combination thereof. The 3D printer may interact with at least one server (e.g., print server). The 3D print server may be separate or interrelated in the 3D printer.

At times, one or more users may interact with the one or more 3D printing processors through one or more user processors (e.g., respectively). The interaction may be in parallel and/or sequentially. The users may be clients. The users may belong to entities that desire a 3D object to be printed, or entities who prepare the 3D object printing instructions. The one or more users may interact with the 3D printer (e.g., through the one or more processors of the 3D printer) directly and/or indirectly. Indirect interaction may be through the server. One or more users may be able to monitor one or more aspects of the 3D printing process. One or more users can monitor aspects of the 3D printing process through at least one connection (e.g., network connection). For example, one or more users can monitor aspects of the printing process through direct or indirect connection. Direct connection may be using a local area network (LAN), and/or a wide area network (WAN). The network may interconnect computers within a limited area (e.g., a building, campus, neighborhood). The limited area network may comprise Ethernet or Wi-Fi. The network may have its network equipment and interconnects locally managed. The network may cover a larger geographic distance than the limited area. The network may use telecommunication circuits and/or internet links. The network may comprise Internet Area Network (IAN), and/or the public switched telephone network (PSTN). The communication may comprise web communication. The aspect of the 3D printing process may comprise a 3D printing parameter, machine status, or sensor status. The 3D printing parameter may comprise hatch strategy, energy beam power, energy beam speed, energy beam focus, thickness of a layer (e.g., of hardened material or of pre-transformed material).

At times, a user may develop at least one 3D printing instruction and direct the 3D printer (e.g., through communication with the 3D printer processor) to print in a desired manner according to the developed at least one 3D printing instruction. A user may or may not be able to control (e.g., locally, or remotely) the 3D printer controller. For example, a client may not be able to control the 3D printing controller (e.g., maintenance of the 3D printer).

At times, the user (e.g., other than a client) processor may use real-time and/or historical 3D printing data. The 3D printing data may comprise metrology data, or temperature data. The user processor may comprise quality control. The quality control may use a statistical method (e.g., statistical process control (SPC)). The user processor may log excursion log, report when a signal deviates from the nominal level, or any combination thereof. The user processor may generate a configurable response. The configurable response may comprise a print/pause/stop command (e.g., automatically) to the 3D printer (e.g., to the 3D printing processor). The configurable response may be based on a user defined parameter, threshold, or any combination thereof. The configurable response may result in a user defined action. The user processor may control the 3D printing process and ensure that it operates at its full potential. For example, at its full potential, the 3D printing process may make a maximum number of 3D object with a minimum of waste and/or 3D printer down time. The SPC may comprise a control chart, design of experiments, and/or focus on continuous improvement.

The fundamental length scale (e.g., the diameter, spherical equivalent diameter, diameter of a bounding circle, or largest of height, width and length; abbreviated herein as "FLS") of the printed 3D object or a portion thereof can be at least about 50 micrometers ($\mu m$), 80 $\mu m$, 100 $\mu m$, 120 $\mu m$, 150 $\mu m$, 170 $\mu m$, 200 $\mu m$, 230 $\mu m$, 250 $\mu m$, 270 $\mu m$, 300 $\mu m$, 400 $\mu m$, 500 $\mu m$, 600 $\mu m$, 700 $\mu m$, 800 $\mu m$, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object or a portion thereof can be at most about 150 $\mu m$, 170 $\mu m$, 200 $\mu m$, 230 $\mu m$, 250 $\mu m$, 270 $\mu m$, 300 $\mu m$, 400 $\mu m$, 500 $\mu m$, 600 $\mu m$, 700 $\mu m$, 800 $\mu m$, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, 100 m, 500 m, or 1000 m. The FLS of the printed 3D object or a portion thereof can any value between the afore-mentioned values (e.g., from about 50 $\mu m$ to about 1000 m, from about 500 $\mu m$ to about 100 m, from about 50 $\mu m$ to about 50 cm, or from about 50 cm to about 1000 m). In some cases, the FLS of the printed 3D object or a portion thereof may be in between any of the afore-mentioned FLS values. The portion of the 3D object may be a heated portion or disposed portion (e.g., tile).

At times, the layer of pre-transformed material (e.g., powder) is of a predetermined height (thickness). The layer of pre-transformed material can comprise the material prior to its transformation in the 3D printing process. The layer of pre-transformed material may have an upper surface that is substantially flat, leveled, or smooth. In some instances, the layer of pre-transformed material may have an upper surface that is not flat, leveled, or smooth. The layer of pre-transformed material may have an upper surface that is corrugated or uneven. The layer of pre-transformed material may have an average or mean (e.g., pre-determined) height. The height of the layer of pre-transformed material (e.g., powder) may be at least about 5 micrometers (μm), 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be at most about 5 micrometers (μm), 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be any number between the afore-mentioned heights (e.g., from about 5 μm to about 1000 mm, from about 5 μm to about 1 mm, from about 25 μm to about 1 mm, or from about 1 mm to about 1000 mm). The "height" of the layer of material (e.g., powder) may at times be referred to as the "thickness" of the layer of material. In some instances, the layer of hardened material may be a sheet of metal. The layer of hardened material may be fabricated using a 3D manufacturing methodology. Occasionally, the first layer of hardened material may be thicker than a subsequent layer of hardened material. The first layer of hardened material may be at least about 1.1 times, 1.2 times, 1.4 times, 1.6 times, 1.8 times, 2 times, 4 times, 6 times, 8 times, 10 times, 20 times, 30 times, 50 times, 100 times, 500 times, 1000 times, or thicker (higher) than the average (or mean) thickness of a subsequent layer of hardened material, the average thickens of an average subsequent layer of hardened material, or the average thickness of any of the subsequent layers of hardened material.

In some instances, one or more intervening layers separate adjacent components from one another. For example, the one or more intervening layers can have a thickness of at most about 10 micrometers ("microns"), 1 micron, 500 nanometers ("nm"), 100 nm, 50 nm, 10 nm, or 1 nm. For example, the one or more intervening layers can have a thickness of at least about 10 micrometers ("microns"), 1 micron, 500 nanometers ("nm"), 100 nm, 50 nm, 10 nm, or 1 nm. In an example, a first layer is adjacent to a second layer when the first layer is in direct contact with the second layer. In another example, a first layer is adjacent to a second layer when the first layer is separated from the second layer by a third layer. In some instances, adjacent to may be 'above' or 'below.' Below can be in the direction of the gravitational force or towards the platform. Above can be in the direction opposite to the gravitational force or away from the platform.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for printing at least one three-dimensional object, the apparatus comprising:
    at least one controller comprising a power connector, the at least one controller being configured to:
    (A) operatively couple with a dispenser and with a recycling system;
    (B) direct the dispenser to dispense a dispensed amount of a pre-transformed material to form (a) a layer of a material bed utilized for printing at least a portion of the at least one three-dimensional object, and (b) an excess material, the dispensed amount being at least 95 percent of an amount of the pre-transformed material required to form the layer of the material bed utilized for the printing, the excess material comprising the dispensed amount of the pre-transformed material that does not form the layer of the material bed; and
    (C) direct recycling the excess material.

2. The apparatus of claim 1, wherein the at least one controller is configured to direct the recycling of the excess material at least in part during the printing of the at least one three-dimensional object; and optionally wherein the at least one controller is configured to direct the recycling of the excess material continuously during the printing of the at least one three-dimensional object.

3. The apparatus of claim 1, wherein the at least one controller is configured to direct the printing of the at least one three-dimensional object from the material bed that comprises the pre-transformed material that includes a material comprising elemental metal, metal alloy, ceramic, or an allotrope of elemental carbon.

4. The apparatus of claim 1, wherein the at least one controller is configured to direct the printing of the at least one three-dimensional object from the material bed that comprises the pre-transformed material made of a material that includes a particulate material.

5. The apparatus of claim 1, wherein the at least one controller is configured to (i) operatively couple with a gas flow system, and (ii) direct the gas flow system to, during the printing of the at least one three-dimensional object, maintain a positive pressure in a printing enclosure enclosing the material bed, the positive pressure being above ambient pressure of an ambient environment external to the printing enclosure.

6. The apparatus of claim 5, wherein the gas flow system comprises a venturi mechanism.

7. The apparatus of claim 1, wherein the at least one controller is configured to direct flow of the pre-transformed material at least in part by directing utilization of a dense phase conveyance of the pre-transformed material, the flow of the pre-transformed material being from a material reservoir to the dispenser that dispenses the dispensed amount of the pre-transformed material.

8. The apparatus of claim 1, wherein the at least one controller is configured to direct the recycling system to recycle the excess material at least in part by sieving at a rate of at least about half cubic centimeter of the excess material per minute, and per square centimeter of a sieving area.

9. The apparatus of claim 1, wherein the at least one controller is configured to direct the dispenser to dispense the dispensed amount of the pre-transformed material is in a first enclosure having a first atmosphere, and wherein the at least one controller is configured to direct the recycling system to recycle the excess material is in a second enclosure having a second atmosphere, the first atmosphere and the second atmosphere each being different from an external atmosphere to the first enclosure and to the second enclosure at least in part by having the external atmosphere comprising a higher level of a reactive agent that reacts with the pre-transformed material during the printing of the at least one three-dimensional object, the higher level being relative to a lower level of the reactive agent in each of the first atmosphere and of the second atmosphere.

10. The apparatus of claim 1, wherein the at least one controller is configured to direct printing the at least one three-dimensional object from the material bed during a printing cycle; and wherein the at least one controller is configured to direct recycling the excess material during printing cycle, the excess material weighing at least 50 kilograms.

11. The apparatus of claim 1, wherein the at least one controller is configured to direct the recycling system to recycle the excess material at a throughput of at least about six cubic centimeters of the excess material per hour (cc/hr).

12. The apparatus of claim 5, wherein the positive pressure is a first positive pressure; wherein the at least one controller is configured to direct the recycling system to recycle the excess material at least in part by utilizing a filtering enclosure of the recycling system, the filtering enclosure being configured to filter under a second positive pressure above the ambient pressure that is external also to the filtering enclosure, the filtering enclosure comprising: (i) at least one wall enclosing a first volume configured to accommodate an internal environment; (ii) an inlet port disposed in the at least one wall, the inlet port being configured to direct the excess material into the first volume; (iii) a second volume configured to accommodate a filtered material collected from the first volume; (iv) an exit port disposed in the at least one wall, the exit port being configured to direct the filtered material out of the second volume and out of the filtering enclosure; and (v) a supportive structure configured to accommodate a filtration member having a filter and a frame configured to support the filter, the filtration member (a) being disposed in the filtering enclosure at an angle with respect to a normal to a gravitational field vector and (b) divides the filtering enclosure at least into the first volume and into the second volume, the filtration member being configured for reversible extraction of the filtration member from the filtering enclosure and for reversible insertion of the filtration member to the filtering enclosure; and wherein the at least one controller is configured to direct the gas flow system to maintain the second positive pressure in the filtering enclosure during recycling of the excess material.

13. The apparatus of claim 12, wherein the filtration member is operatively coupled with at least one modulatable agitator having a movable member, wherein the movable member is configured to be controlled and modulated, the movable member being coupled with the filtration member and is operable for moving the filtration member to facilitate filtration of the excess material thereby; and wherein the at least one controller is configured to operatively couple with the modulatable agitator and direct the modulatable agitator to move the movable member during recycling of the excess material.

14. The apparatus of claim 12, wherein the filtering enclosure is operatively coupled with a sensor configured to detect a characteristic of an accumulation in the filtering enclosure, the accumulation being of the excess material and/or of the filtered material; and wherein the at least one controller is configured to (a) operatively couple with the sensor to collect data from the sensor during the recycling, and (b) direct recycling of the excess material based at least in part on the data collected by the sensor during recycling.

15. The apparatus of claim 12, wherein the at least one controller is configured to, at least during filtering of the excess material in the filtering enclosure, maintain the internal environment of the filtering enclosure at a reduced level of a reactive agent as compared to the ambient environment, the reactive agent being capable of reacting with the pre-transformed material during the printing.

16. The apparatus of claim 1, wherein the dispenser is comprised in a layer dispenser mechanism that comprises, or that is operatively coupled with, a cyclonic separator.

17. A method of printing the at least one three-dimensional object, the method comprising: (A) providing the apparatus of claim 1, and (B) using the apparatus in association with the printing of the at least one three-dimensional object.

18. The method of claim 17, wherein the recycling of the excess material is at least in part during the printing of the at least one three-dimensional object.

19. The method of claim 17, wherein the recycling of the excess material is continuous during the printing of the at least one three-dimensional object.

20. The method of claim 17 further comprising flowing the pre-transformed material from a material reservoir to the dispenser that dispenses the dispensed amount of the pre-transformed material, wherein the flowing of the pre-transformed material comprises utilizing a dense phase conveyance of the pre-transformed material.

21. The method of claim 20, wherein the recycling of the excess material comprises sieving at a rate of at least about half cubic centimeter of the excess material per minute, and per square centimeter of a sieving area.

22. The method of claim 17, wherein dispensing the dispensed amount of the pre-transformed material is in a first enclosure having a first atmosphere, and the recycling of the excess material is in a second enclosure having a second atmosphere, the first atmosphere and the second atmosphere each being different from an external atmosphere to the first enclosure and to the second enclosure at least in part by having the external atmosphere comprising a higher level of a reactive agent that reacts with the pre-transformed material during the printing of the at least one three-dimensional object, the higher level being relative to a lower level of the reactive agent in each of the first atmosphere and of the second atmosphere.

23. The method of claim 17, wherein the at least the portion of the material bed is the material bed; wherein the at least the portion of the at least one three-dimensional object is the at least one three-dimensional object; wherein the printing of the at least one three-dimensional object from the material bed is during a printing cycle; and wherein the excess material from the printing cycle being recycled and/or sieved weighs at least 50 kilograms.

24. The method of claim 17, wherein the recycling of the excess material comprises sieving the excess material, and the recycling of the excess material is at a throughput of at least about six cubic centimeters of the excess material per hour (cc/hr); and optionally wherein and the sieving of the excess material is at a throughput of at least about six cubic centimeters of the excess material per hour (cc/hr).

25. Non-transitory computer readable program instructions for printing the at least one three-dimensional object, the program instructions, when read by one or more processors, cause the one or more processors to direct execution of one or more operations of the apparatus of claim 1, the program instructions being inscribed on at least one non-transitory computer readable medium.

* * * * *